GENERAL SIGNAL-FLOW DIAGRAM

INITIAL-CLEAR, ERASE & HALT
FLOW DIAGRAM

INSERT OCTAL
FLOW DIAGRAM

FILL OCTAL
FLOW DIAGRAM

FILL BI-OCTAL
FLOW DIAGRAM

CONTINUOUS OPERATION,
ONE-STEP & ONE-INSTRUCTION
FLOW DIAGRAM

ADDITION FLOW DIAGRAM

SUBTRACTION FLOW DIAGRAM

LOGICAL MULTIPLICATION
FLOW DIAGRAM

LOW-ORDER MULTIPLICATION
FLOW DIAGRAM

HIGH-ORDER MULTIPLICATION & ROUND-OFF FLOW DIAGRAM

BRANCH INSTRUCTION FLOW DIAGRAM

TAPE READ & TAPE REVERSE
FLOW DIAGRAM

TAPE RECORD FLOW DIAGRAM

Sept. 1, 1959 R. F. SHAW ET AL 2,902,675
STORAGE APPARATUS FOR TYPING CONTROL
Filed July 28, 1953 45 Sheets-Sheet 16

OCTAL TYPE-OUT
FLOW DIAGRAM

BI-OCTAL TYPE-OUT
FLOW DIAGRAM

REGISTER TYPE-OUT
FLOW DIAGRAM

Sept. 1, 1959     R. F. SHAW ET AL     2,902,675
STORAGE APPARATUS FOR TYPING CONTROL
Filed July 28, 1953     45 Sheets-Sheet 19

GATE 620

BUFFER 640

DELAY LINE 660

PULSE AMPLIFIER 800

INVENTORS.
ROBERT F. SHAW
ALBERT A. AUERBACH
BY
S.C. Yuter
ATTORNEY.

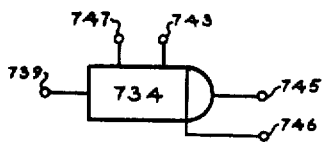
FIG. 20a
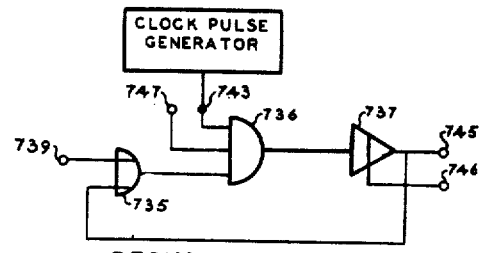
RESHAPER 734
FIG. 20b
FIG. 20c
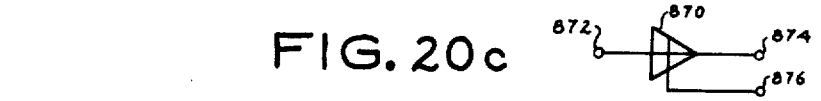
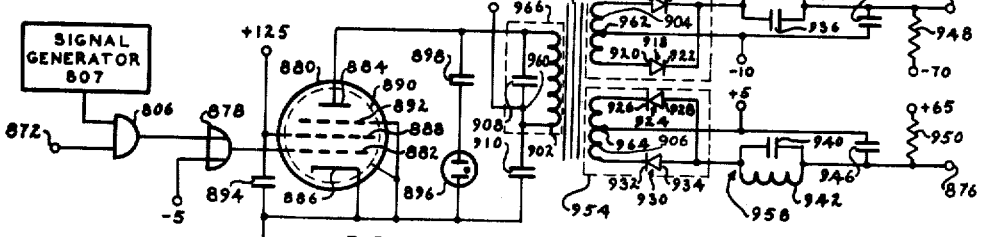
D-C AMPLIFIER 870
FIG. 20d
FIG. 20e
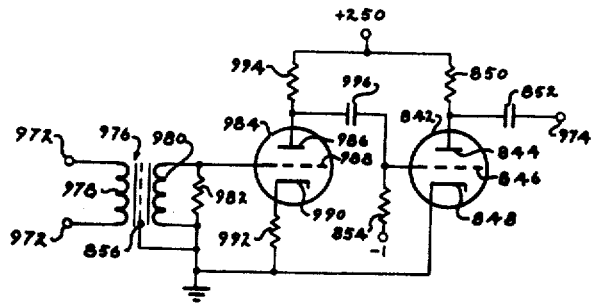
TAPE READING AMPLIFIER 970
FIG. 20f

SET DOMINANT FLIP FLOP 700

RESET DOMINANT FLIP FLOP 718

DELAY FLOP 760

*INVENTORS.*
*ROBERT F. SHAW*
*ALBERT A. AUERBACH*
BY
*S.C. Yuter*
ATTORNEY.

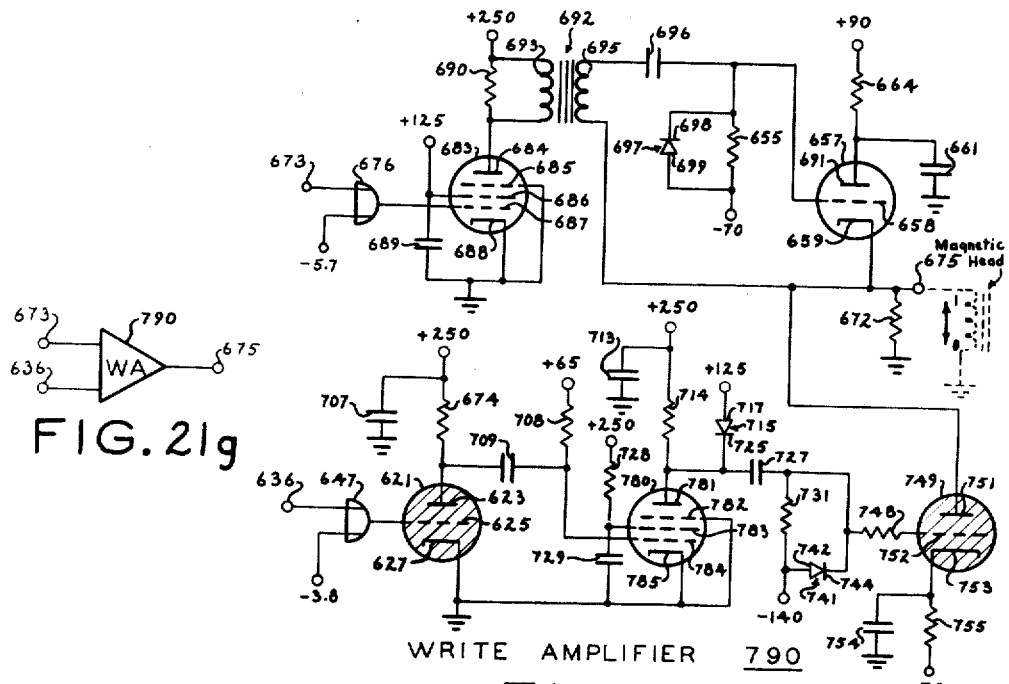
FIG. 21g
WRITE AMPLIFIER 790
FIG. 21h
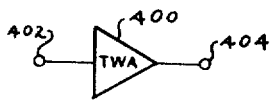
FIG. 21i
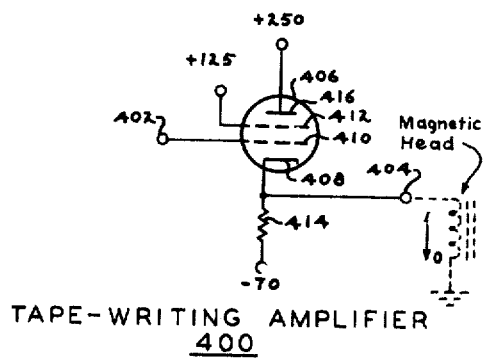
TAPE-WRITING AMPLIFIER 400
FIG. 21j

MEMORY DRUM 38

INVENTORS
ROBERT F. SHAW
ALBERT A. AUERBACH
BY
S.C. Yuter
ATTORNEY.

CYCLING UNIT 34b

STATIC CONTROL REGISTER 28

Sept. 1, 1959     R. F. SHAW ET AL     2,902,675
STORAGE APPARATUS FOR TYPING CONTROL
Filed July 28, 1953                                                  45 Sheets-Sheet 34

INVENTORS.
ROBERT F. SHAW
ALBERT A. AUERBACH
BY
ATTORNEY.

INVENTORS.
ROBERT F. SHAW
ALBERT A. AUERBACH
BY
ATTORNEY.

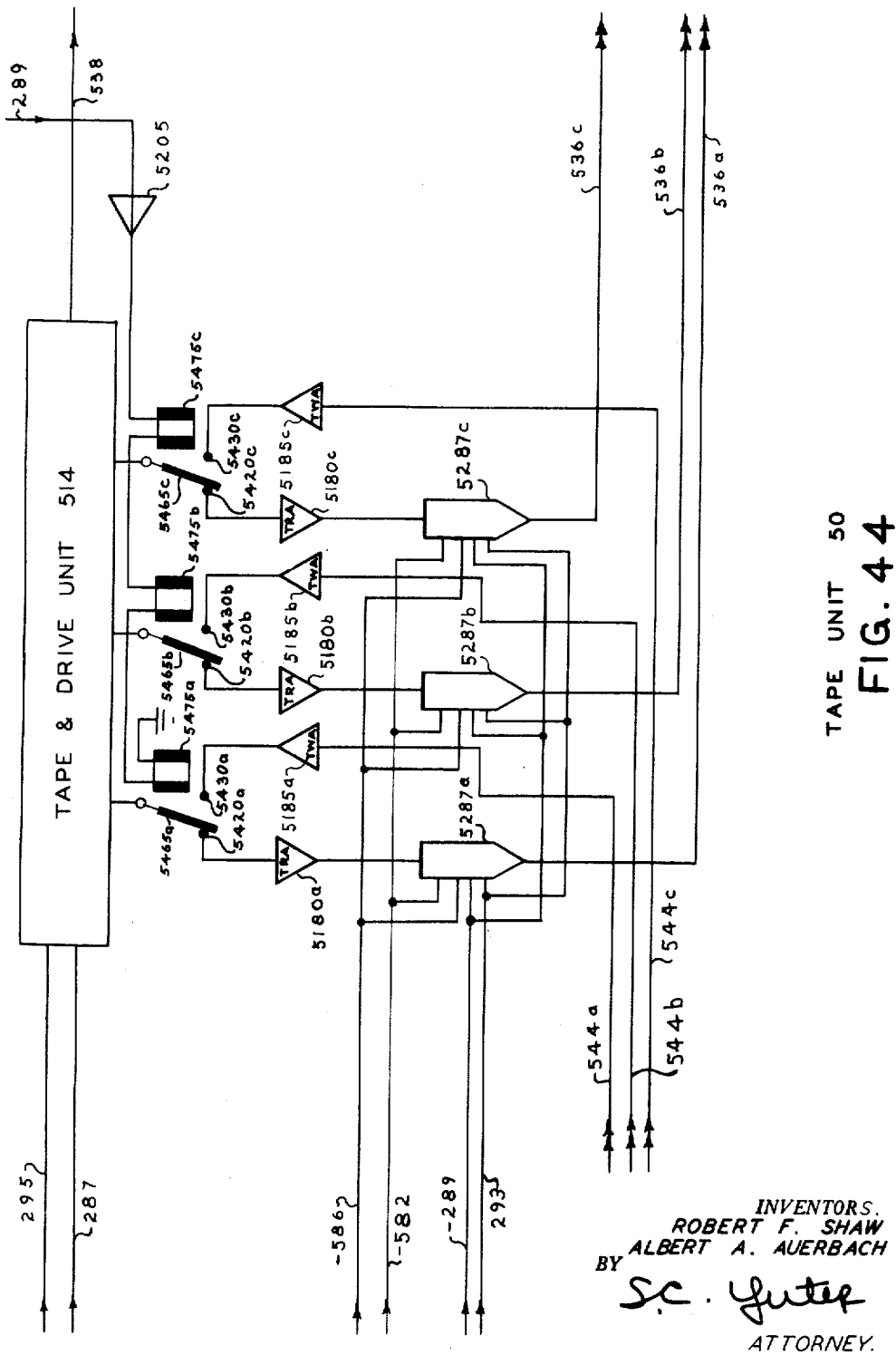

United States Patent Office 2,902,675
Patented Sept. 1, 1959

2,902,675

STORAGE APPARATUS FOR TYPING CONTROL

Robert F. Shaw, Brooklyn, and Albert A. Auerbach, Hollis, N.Y., assignors to Underwood Corporation, New York, N.Y., a corporation of Delaware Application July 28, 1953, Serial No. 370,826

5 Claims. (Cl. 340—174)

I. DIGITAL COMPUTER APPARATUS

This invention relates to calculating and data processing apparatus, and more particularly to electronic digital computer apparatus.

Any mathematical problem can be broken down into a sequence of simple arithmetic and logical operations. Electronic digital computers are capable of carrying out these arithmetic and logical operations at extremely high speeds. An electronic digital computer can therefore be used to solve mathematical problems of great length and complexity in a small fraction of the time required by a human being.

The problem to be solved is broken down into a sequence of simple steps. Each of these steps is specified by an "instruction" and the sequence of instructions is called a "program." This program and all necessary information is entered into the computer's "memory." The computer thereafter carries out the instructions automatically and at high speed.

Information may be inserted into the computer by typing the data on an electric typewriter. Data which is typed into the computer is typed in groups which are designated words of information. The words are stored in a memory unit in positions designated by addresses. Provision is made for typing a plurality of words into the computer whereby a single address is typed to locate a position in which to store the first word. Thereafter, the computer automatically supplies consecutive addresses for the remainder of the words which are to be typed.

Since typing is an operation performed by a human being, it is subject to errors. The computer, however, normally supplies an address for each word irrespective of an error in typing the word. Provision must therefore be made for correcting a typing error without affecting the sequence of addresses supplied for the words being typed.

Therefore, an object of the present invention is the provision of apparatus for sequentially storing correctly typed words of information in consecutive addresses irrespective of any incorrectly typed word of information.

A feature of the invention is means for automatically storing a retyped word of information in a position following the last word correctly typed.

As the problem is solved, the results are stored in digital form in a portion of the memory unit. The computer then functions to present the computed rseults in tangible form by typing out the information on an electric typewriter, the typing of each digit requiring the performance of a plurality of steps. The type-out operation is automatically terminated when the desired number of digits has been typed out.

An object of the invention, therefore, is to provide improved apparatus for typing out information stored in the memory unit of an electronic digital computer.

Another object of the invention is to supply an improved means for controlling the steps of the type-out operation of an electronic digital computer.

A feature of the invention is apparatus which is responsive to a distinctive character in the last word of information typed and which functions to terminate the type-out operation.

One part of the memory unit of the computer is a rotatable drum having a magnetizable surface. The magnetizable surface is divided into a plurality of channels and the program is usually recorded in a sequence of consecutive positions in each channel. Each of these positions is designated by an "address," and control apparatus in the computer system automatically generates a sequence of signals representing consecutive addresses which correspond to the positions which will store the program. Information is also usually stored in a sequence of consecutive positions in each of the channels.

Heretofore, during the performance of the program, the same control apparatus was employed to generate the addresses corresponding to the location of the program and the addresses corresponding to the location of the remaining information. Therefore, if it became necessary to stop the computer system in the middle of a program and insert additional information in the memory unit, the program address stored in the control apparatus was replaced by an address designating the location for the new information. Before the program could be resumed, an additional operation was required to restore the address of the program data governing the next instruction. This increased the time required to solve the problem.

An object of the invention, therefore, is the provision of apparatus for allowing the interruption of a program of instructions without affecting the sequence of the program when it is resumed.

Another object of the invention is the provision of means for selectively converting an information storage device to an address storage device by the addition of a minimum amount of apparatus.

A feature of the invention is a device for storing addresses for data during the program of operation and replacing said device by other means during a second program of operation.

Another part of the computer's "memory" is a magnetic recording tape which contains sprocket pulses designating the discrete areas of the tape that have acceptable magnetic properties. Data is recorded only in the designated areas. The sprocket pulses are also employed to control the recording and reading operations.

During computer operation, recorded information is transferred to other parts of the computer via a storage device which makes the information available in a very short time. In the past, there was a tendency to transfer the information before it was fully stored in the storage device. Premature transfer resulted in faulty computer operation.

An object of the invention, therefore, is to provide improved apparatus for reading and transferring data recorded on sprocketed magnetic tape.

Another object of the invention is to insure that information transferred from a sprocketed magnetic tape via an intermediate storage device is fully stored in the storage device before an attempt is made to transfer the information to other parts of the computer system.

Heretofore, high-speed electronic digital computers have been in the super calculator class and of prohibitive cost from the point of view of most industrial and scientific institutions.

The general object of the invention is to provide apparatus for reducing the size and cost of a compact fully-automatic general-purpose digital computer.

The computer system will carry out a series of mathematical computations several hundred times faster than a human operator using a conventional desk calculator. The computer system is capable of multiplying numbers having a length equivalent to nine decimal digits at the approximate rate of fifteen hundred per minute and can perform about two thousand additions per minute on numbers of the same size. With proper programming, up to thirty-six hundred operations per minute is possible.

II. INTRODUCTION

The computer system which is the subject of this specification is a high-speed electronic digital computer of the serial type and primarily functions to arithmetically manipulate numerical data.

The numerical data (or information, as it may be designated) of a problem is inserted into the computer system by typing the numerical digits of the information on a standard keyboard of a typewriter which is a part of the computer system.

The computer system is designed to manipulate information which is composed of numbers expressed in the binary system as will be explained. As the only digits used in the binary system are zero and one, the binary system is readily adaptable to electronic expression by the presence or absence of a pulse signal. The presence of a pulse signal may be used to represent a one and the absence of a pulse signal may be used to represent a zero.

Information may be typed into the computer system in either decimal or octal form. Octal information is directly converted into binary form in the computer system. Decimal information is bi-octally coded (as will be shown) and is then converted to the binary equivalent of the decimal information.

(a) The octal number system

The octal number system is a numerical means of expressing a finite quantity as a series of coefficients of different powers of eight, which is known as the "base" or "radix" of the system.

Thus, for example, the quantity five hundred and twenty-nine is written as 529 in the decimal system (whose base or radix is ten) and as 1021 in the octal system as shown below.

Decimal:
    as used 529
    as understood $5(10)^2 + 2(10)^1 + 9(10)^0$
    or $500 + 20 + 9 = 529$
Octal:
    as used 1021
    as understood $1(8)^3 + 0(8)^2 + 2(8)^1 + 1(8)^0$, or
    (octal) $1000 + 0 + 20 + 1 = 1021$
    (decimal) $512 + 0 + 16 + 1 = 529$ The digits used to express numbers in the octal system are the digits zero through seven; eight and nine are not used, since it is a property of a number system that the number of different values which any coefficient can assume is equal to the base. Thus if the base is eight, the eight values zero through seven are sufficient to represent any digit.

(b) Bi-octal coding

Bi-octal coding is a method whereby each digit of a decimal number is represented by two octal digits. Since each decimal digit of a decimal number is individually bi-octally coded, bi-octal codes are only required for the decimal digits zero through nine as shown below:

| Decimal | Bi-Octal | Decimal | Bi-Octal |
|---|---|---|---|
| 0 | 00 | 5 | 05 |
| 1 | 01 | 6 | 06 |
| 2 | 02 | 7 | 07 |
| 3 | 03 | 8 | 10 |
| 4 | 04 | 9 | 11 |

Thus, in the example previously given, the decimal number 529 which is octally written as 1021 is bi-octally coded as 050211.

Being dependent on the octal system, bi-octal coding uses only the digits from zero through seven. Bi-octal coding is used as an intermediate step in converting decimal numbers to binary numbers in the computer system.

(c) The binary system

The binary system is a numerical means of expressing a quantity in terms of coefficients of powers of two. For example, the digit 7 is expressed as 111 in the binary system as shown below:

Decimal:
    as used       7
    as understood $7(10)^0$
    or             $7 \times 1 = 7$
Binary:
    as used       111
    as understood $1(2)^2 + 1(2)^1 + 1(2)^0$
    or             $4 + 2 + 1 = 7$ Since the base of this system is two, each coefficient only needs two distinct values, and thus zero and one are used for this purpose.

In summation and to further illustrate the distinction between the number systems, a list is shown below which contains the decimal numbers from zero through twenty and their octal, bi-octal, and binary equivalents.

| Decimal | Bi-Octal | Octal | Binary |
|---|---|---|---|
| 0 | 00 | 0 | 0 |
| 1 | 01 | 1 | 1 |
| 2 | 02 | 2 | 10 |
| 3 | 03 | 3 | 11 |
| 4 | 04 | 4 | 100 |
| 5 | 05 | 5 | 101 |
| 6 | 06 | 6 | 110 |
| 7 | 07 | 7 | 111 |
| 8 | 10 | 10 | 1000 |
| 9 | 11 | 11 | 1001 |
| 10 | 0100 | 12 | 1010 |
| 11 | 0101 | 13 | 1011 |
| 12 | 0102 | 14 | 1100 |
| 13 | 0103 | 15 | 1101 |
| 14 | 0104 | 16 | 1110 |
| 15 | 0105 | 17 | 1111 |
| 16 | 0106 | 20 | 10000 |
| 17 | 0107 | 21 | 10001 |
| 18 | 0110 | 22 | 10010 |
| 19 | 0111 | 23 | 10011 |
| 20 | 0200 | 24 | 10100 |

(d) Signals and pulses

The computer system, being of the electronic type, handles information in electrical pulse signal form, the presence of a pulse signal representing a one and the absence of a pulse signal representing a zero. Therefore, the digit 5 (101 in the binary system) is represented by the following combination of pulses: pulse, no pulse, pulse, Information is frequently manipulated as a signal which is a group of pulses which occur during a period of time equal to that occupied by thirty sequential pulses or thirty pulse times. The thirty pulse-time information signal is hereinafter referred to as a word of information or simply as a word. The pulses representing information occur at a uniform rate; this means that if all possible pulses were present in a word, for example (that is, if the word contained all ones and no zeros), the time interval between the leading edge (or any specified point) of one pulse and the corresponding point on the preceding or following pulse is a constant. This time interval is called one pulse time. More particularly, a pulse time is eight and sixty-eight hundredths microseconds in the particular computer system to be described.

A period of thirty pulse times is hereinafter designated a minor cycle. The basic timing cycle of the computer system is also thirty pulse times long and is the standard timing cycle by which phasing problems are considered. A minor cycle need not be in phase with the basic timing cycle.

The time position of a pulse in a signal which lasts for a minor cycle is a relative position and the time of origin of a pulse in a minor cycle is designated by a "$p$" followed by a number less than thirty which expresses the number of pulse times (to a quarter of a pulse time) which have elapsed since the origin of the first pulse designated $p0$ of the minor cycle signal. Thus $p5$ begins five pulse times after the beginning of the first pulse $p0$ in the same minor cycle and $p13\frac{1}{4}$ begins thirteen and one-quarter pulse times after the beginning of $p0$. What would normally be a $p30$ becomes the $p0$ of the next successive minor cycle due to the length of a minor cycle.

The time position of a pulse in reference to the basic timing cycle is an absolute time with respect to any phasing problem and is designated "$t$" followed by a number which represents the number of pulse times which have elapsed since the beginning of a basic timing cycle. Thus $t0$ originates at the beginning of a basic timing cycle and $t10\frac{3}{4}$ begins at ten and three-quarters pulse times after the beginning of that cycle.

A word of information lasts for a minor cycle and its pulses may be designated $p0$ through $p29$. If the word is in phase with the basic timing cycle, $p0$ of the word will occur at $t0$, $p1$ occurs at $t1$, etc. If the word is out of phase and, for example, lags the basic timing cycle by four pulse times, $p0$ occurs at $t4$, $p1$ occurs at $t5$, etc.

(e) Potential

Signals have either a positive or negative polarity, and are sometimes designated as present or absent. Positive signals are generally of a potential of five volts with respect to ground. Negative signals are generally of a potential of ten volts with respect to ground. There is no zero potential condition so that a signal which is present or absent is respectively either positive or negative. For example, when it is stated that a normally positive signal is absent, what is meant is that the potential on the line which would carry the signal is negative.

Positive pulses are positive for only one-half of a pulse time and return to the negative level for the remaining one-half of a pulse time. Thus, if $p5$ is a positive pulse, $p5$ is positive until $p5\frac{2}{4}$ and then becomes negative until $p6$ occurs. Similarly, negative pulses are negative for one-half of a pulse time.

For example, if a signal comprises three pulses such as pulse, no pulse, pulse and $p4$ is the first pulse, a positive potential exists from $p4$ to $p4\frac{2}{4}$ and a negative potential exists from $p4\frac{2}{4}$ until (but not including) $p6$. The signal becomes positive until $p6\frac{2}{4}$ and is then negative until (but not necessarily including) $p7$.

The word "signal" may be used not only to designate a series of pulses but may be used to designate a continuous positive or negative potential as will later be shown. The term "pulse signal" may be used where ambiguities would otherwise appear and the term connotes a signal comprising a plurality of pulses.

(f) Word of information

A "word of information" may represent either a numerical constant and its sign (plus or minus) or a number which is an instruction for the computer system (sometimes designated as an instruction signal). Occasionally, the word may be used interchangeably as a numerical constant and an instruction signal.

When the word is a numerical constant, the first (earliest) pulse $p0$ represents the least significant binary digit of the number and each consecutive pulse represents the next more significant binary digit up to $p29$.

The pulse $p28$ represents the most significant binary digit and $p29$ represents the sign of the number. When $p29$ is present, the sign of the number is minus (and in this case the remaining digits represent the complement of the number, as described later). When $p29$ is absent, the sign of the number is plus.

A word is typed in as a group of ten octal digits. If the word represents a number, the three binary digits which comprise pulse positions $p27$ through $p29$ correspond to the two most significant binary digits and the sign.

When the word represents a ten octal digit number which is an instruction signal, the number represents an instruction proper for the computer system which is hereinafter designated I and three locations in a storage device or memory in which to find or store words of information upon which the instruction is performed.

Words of information are generally stored in the computer system on a magnetic drum and a location on the magnetic drum in which a word may be stored or from which a word may be removed is specified by an address.

The magnetic drum (as will be explained in detail) is effectively divided into a number of channels each of which correspond to an associated reading and recording head. Each channel is divided into sixty-four positions, and each position is large enough to store exactly one word of information.

Each position is identified by a two-octal-digit number which is permanently magnetized in binary form on a special channel of the magnetic drum. The two-octal-digit numbers represent the octal numbers 00 through 77, corresponding to the decimal numbers from zero to sixty-three. There are eight channels on the magnetic drum which are utilized for storing words. The eight channels are designated by the numbers zero to seven respectively.

The addresses which are three-octal-digit numbers specify both the channel and a position on channel. The most significant octal digit represents the channel and the remaining two digits represent the position on the channel. For example, the address 523 specifies channel 5 and position 19 on said channel (since octal 23 equals decimal nineteen).

Generally, the nine least significant octal digits of the instruction signal signify three addresses A1, A2, A3. The three least significant octal digits represent A1 which specifies a position on the magnetic drum from which a word representing a first operand is to be read. The three next more significant digits represent A2 which specifies a position from which a word representing the second operand is to be read. The three next more significant digits represent A3, which specifies a position on the magnetic drum in which a word representing the result of the operation with the two operands from addresses A1 and A2 is to be recorded.

The most significant octal digit represents the instruction proper I. For example, the arbitrarily selected instruction signal 4350173662 may be written as 4 (I) 350 (A3) 173 (A2) 662 (A1). The instruction signal may generally be referred to as I, A3, A2, A1.

(g) Instruction proper

The computer system functions to perform certain procedures either as manually or automatically directed.

The procedures which the computer system performs while operating automatically are as follows: addition, subtraction, logical multiplication, low order multiplication, high order multiplication, high order multiplication with round-off, branch instruction, halt, and certain auxiliary procedures.

While automatically operating, the computer system is instructed to perform a given procedure by I which as previously noted is the most significant octal digit of the instruction signal. Table A illustrates how I is octally coded for each procedure.

TABLE A

Procedure I:
  Addition ------------------------------------ 4
  Subtraction --------------------------------- 5
  Logical multiplication ---------------------- 6
  Branch instruction -------------------------- 7
  Low order multiplication -------------------- 1
  High order multiplication ------------------- 2
  High order multiplication with round-off ---- 3
  Halt and auxiliary -------------------------- 0

The auxiliary procedures are procedures which involve external operations such as the use of a magnetic tape or the automatic performance of a typing operation. More particularly, these procedures are halt, tape read, tape record, tape reverse, type-out octal, and type-out bi-octal which are later explained.

These auxiliary precedures and the halt procedure are specified by coding A3 as well as I so that A3 and I become the instruction proper. A1 and A2 in this case are not significant.

Table B illustrates how I and A3 are octally coded for each external procedure. The designation "n" represents an octal digit which specifies a channel on the magnetic drum.

TABLE B

| Procedure | I | A3 |
|---|---|---|
| Halt | 0 | 000 |
| Tape Read | 0 | n42 |
| Tape Record | 0 | n43 |
| Tape Reverse | 0 | 046 |
| Type-Out Octal | 0 | n03 |
| Type-Out Bi-Octal | 0 | n13 |

(h) Sequence-directing address

Besides the addresses A3, A2, and A1, another address hereinafter designated the sequence-directing address is utilized in the computer system.

A sequence-directing address is a nine pulse-time signal which represents three octal digits and specifies a position in a channel on the magnetic drum. The sequence-directing address is used to locate an instruction signal for the computer system to interpret.

In actual computer operation, the computer system sequentially generates a series of consecutive sequence-directing addresses each of which is used to locate an instruction signal. The computer system first responds to the instruction signal which is located on the magnetic drum by use of the first sequence-directing address, and then responds to the second instruction signal as located by the second consecutive address, and so continues to respond to instruction signals located by the consecutive sequence-directing addresses which are generated until the computer system is instructed to halt.

Initially, the computer system generates the sequence-directing address 000 (octal). The use of the term "generate" is figurative as the sequence-directing address 000 is a nine pulse-time signal in which pulses are absent.

The sequence-directing address 000 designates the 00 position on channel 0 of the magnetic drum and the word located in such a position will have been planned and will have been inserted so as to be an instruction signal.

As the computer system performs the procedure directed by the sequence-directing address 000, the computer system automatically increases the sequence-directing address by one to 001 and subsequently generates consecutive sequence-directing addresses as each procedure is performed.

In this manner, the computer system functions to use the sequence-directing address to direct the sequence in which procedures are to be performed. When it is desired to vary the normal sequence, the branch instruction signal is located by the sequence-directing address as will be shown and operates to modify the then existing sequence-directing address.

(i) Procedure steps

Normally, the computer system operates during a procedure in a series of four steps which are designated K0, K1, K2 and K3 and occur in this order. In certain of the procedures, one or more of these steps may be omitted as, for example, when data is inserted into the computer system as will later be noted. Almost all of the procedures begin during step K0 and continue sequentially through K1, K2 and K3 and end during K0 whereat the next procedure is begun or the computer system halted.

The steps K0, K1, K2 and K3 may vary in time length and this may be true even in repeating the same procedure. The K steps are delineated respectively by the generation of the control signals K0, K1, K2 and K3 which are generated or terminated when the computer system completes certain functions which are part of a procedure. For example, when the signal K1 is generated the computer system is at K1, or when the computer system terminates the generation of the signal K2, the computer system has completed K2.

The K signals may be generated for a variable number of minor cycles and the number of minor cycles is dependent upon the length of time required for the computer system to perform an operation.

The computer system also generates a signal designated J which when generated occurs for the duration of the first minor cycle of a K step. As a result, this first minor cycle may be referred to as the J cycle. In the case of input and output operations the J cycle may occur more than once during the same K step.

The computer system sometimes generates a signal designated AM for the duration of the second minor cycle of a K step which may be referred to as the AM cycle. It is to be understood that the alphabetic designation of any signal already recited or to be recited has no significance other than that specifically stated.

(j) Binary arithmetic

As the computer system arithmetically manipulates numbers expressed in the binary system, brief reference will be made to certain of the binary arithmetic operations and expressions involved, namely, addition, complementing, subtraction, multiplication, and unit adding. For purposes of explanation, it will be assumed that the capacity of the computer is a four binary digit number. The actual capacity of the computer is a twenty-nine binary digit number plus a sign digit.

Binary addition is similar to the commonly used decimal addition except that only zeros and ones are involved. The four different situations which may arise in the addition of two binary digits are shown below.

| 0  | 1  | 0  | 1  |
|----|----|----|----|
| +0 | +0 | +1 | +1 |
| 0  | 1  | 1  | 10 |

In the example in which two ones are added, it should be noted that a carry results which is deposited in the next more significant place.

Therefore in adding two binary numbers containing more than one digit, it is in general necessary to know the rules for adding three binary digits (corresponding digits of each of the two original numbers, plus the carry from the preceding digit). These rules are as follows:

| 0 | 0  | 0  | 1  |
|---|----|----|----|
| 0 | 0  | 1  | 1  |
| 0 | 1  | 1  | 1  |
| 0 | 1  | 10 | 11 |

Unit adding is the operation of adding one to a number. For example, 1010 becomes 1011.

Functionally, unit adding is accomplished by inspecting the binary number digit by digit from the least significant digit and responding to the two situations which are encountered as follows: If the least significant digit is a zero, a one is substituted in its place and no changes are made on the remaining digits; if the least significant digit is a one, the least significant digit and each successive digit which is a one are converted to zeros until the first zero is encountered; that zero is made a one and no further changes are made on the remaining digits.

Division and other types of arithmetic manipulation which may be accomplished in logical steps are performed by means of programing which is hereinafter explained.

The following illustration demonstrates the binary addition of binary numbers which involve a plurality of digits:

| Binary | | Decimal |
|--------|---|------|
| 001    | = | 1    |
| +101   | = | +5   |
| 110    | = | 6    |

The complementing of a binary number involves expressing the number with its opposite sign, or in other words expressing the number in a different form so that if added to its original form, the result is zero. In general, adding the complement of a number "a" to another number "b" is mathematically equivalent to subtracting "a" from "b." For this reason the complement of "a" behaves mathematically like the quantity "−a."

Complementing of the type performed in this computer system is mathematically done as follows: Each digit of the number to be complemented is subtracted from 1, so that ones become zeros and zeros become ones (since 1−1=0 and 1−0=1), and then a one is added (with carry when necessary) to the least significant digit of the result as shown below:

```
Original number _____ 0110
Number inverted _____ 1001
Add one _____  +1

Complement _____ 1010
If added to original number_____ 0110
                                     _____
                                    1| 0000
```

The extra digit which results when the number is added to its complement to illustrate that the result is zero exceeds the capacity of the problem and is ignored. (A decimal number is complemented in similar fashion except that each digit is subtracted from 9.)

Functionally, complementing is accomplished by inspecting the number digit by digit beginning with the least significant digit, and keeping each zero digit until the first "one" is encountered which is retained and thereafter inverting each successive digit.

Applying this functional method to the above example (0110), the first two least significant digits are retained and the third and fourth significant digits become 10. The result is 1010 and corresponds to the result obtained mathematically above.

In the computer system, subtraction is accomplished by complementing the subtrahend and adding it to the minuend. An example is shown below.

```
Subtrahend _____ 0100
Complement of subtrahend _____ 1100
Minuend _____ 0110
+ complement of subtrahend _____ 1100
                                     _____
                                    1| 0010
```

Multiplication is performed by successive additions. One operand, the multiplicand, is added into the product in a given position if the corresponding multiplier digit is a 1, and then shifted over one place to the left. If the corresponding multiplier digit is a zero, the shift is still performed, but not the addition. An example is the following:

```
      Multiplicand  0101
      Multiplier    0111
```

Since the least significant digit of the multiplier equals 1, the multiplicand is added.

```
                    0101
```

The multiplicand is shifted; since the next multiplier digit is also a 1, the multiplicand is added.

```
      0101    Previous partial product
      0101    Shifted multiplicand
      01111   New partial product
```

The multiplicand is shifted; since the next multiplier digit is also a 1, the multiplicand is added.

```
      01111   Partial product
      0101    Shifted multiplicand
      100011  New partial product
```

The multiplicand is shifted; since the next multiplier digit is a zero, no addition occurs.

```
      100011   Partial product
      0000     Shifted multiplicand not added
      0100011  Final product
```

It will be seen from this example that the product contains too many digits to be accommodated in one word (recalling that four-digit words are being used in these examples). For this reason two multiplication operations are provided in the computer. The one corresponding to the above example is referred to as "low order multiplication," and as it is performed by the computer it retains only the twenty-seven least significant digits of the product, storing these together with three zeros (in the sign and two most significant digit positions) to form one thirty digit word. (This would correspond in the above example, to storing only the last three digits, preceded by a zero, i.e., 0011.) All digits more significant than the ones retained are progressively discarded from the multiplicand as it is shifted to the left each time.

The other operation, referred to as "high order multiplication," is essentially similar except in two respects: (1) negative factors, if present, are first complemented to make them positive, so the operations are always performed on positive numbers (the final result is complemented if necessary to give it the proper sign); (2) instead of shifting the multiplicand to the left, the partial product is shifted to the right each time. Finally, the thirty most significant digits of the product are stored, after first complementing them if necessary. Again using the same factor as above, the process is as follows: Since the least significant multiplier digit equals 1; the multiplicand is added.

0101

The partial product is shifted, discarding the least significant digit.

0010(1)

Since the next multiplier digit is also a 1, the multiplicand is added.

```
0100 (0)   Old partial product (shifted)
0000       (Multiplicand not added)
0100       Final product
```

The partial product is again shifted, discarding a digit; since the next multiplier digit is also a 1, the multiplicand is added again.

```
0011(1)   Old partial product (shifted)
0101      Multiplicand
1000      New partial product
```

The partial product is again shifted, discarding a digit; since the next multiplier digit is a zero, no addition occurs.

```
0100 (0)   Old partial product (shifted)
0000       (Multiplicand not added)
0100       Final product
```

The final result is equal to the four most significant digits of the final product previously shown.

The high and low order products of a given pair of factors are related to each other mathematically in the following way: if the low order product is multiplied by $2^{-27}$ and added algebraically to the high order product, the result is the complete (double length) product.

(k) Procedures

As has been noted, the computer system performs certain operations as automatically or manually directed. These operations are designated procedures and are next listed and briefly described as to major purpose. Each procedure will later be described in detail.

(1) *Initial clear.*—The computer system is cleared and its sequence-directing address becomes 000.

(2) *Insert octal.*—The computer system receives a word of information and an address in octal form and stores the word in a position on the magnetic drum as specified by the address.

(3) *Insert bi-octal.*—The computer system receives a word of information in decimal form and an address in octal form, and stores the word in a position on the magnetic drum as specified by the address.

(4) *Fill octal.*—The computer system receives a plurality of words of information in octal form and an address in octal form and stores the data in consecutive positions on the magnetic drum of which the first position is specified by the address.

(5) *Fill bi-octal.*—The computer system receives a plurality of words of information in decimal form and an address in octal form and stores the data in consecutive positions on the magnetic drum of which the first position is specified by the address.

(6) *Erase.*—The computer system functions to correct a typing error made during the insertion of information.

(7) *Halt.*—The computer system stops at step K0.

(8) *Continuous operation.*—The computer system operates from procedure to procedure without halting.

(9) *One-instruction.*—The computer system operates through one procedure and halts.

(10) *One-step.*—The computer system operates through one K step and halts.

(11) *Addition.*—The computer system adds the contents of a specified address A1 to the contents of a second specified address A2 and records the sum in a third specified address A3.

(12) *Subtraction.*—The computer system subtracts the contents of a specified address A1 from the contents of a second specified address A2 and records the difference in a third specified address A3.

(13) *Logical multiplication.*—The computer system multiplies each binary digit of the contents of a specified address A1 by its associated binary digit of the contents of a second specified address A2 and records the result in a third specified address A3.

(14) *Low order multiplication.*—The computer system multiplies the contents of a specified address A2 by the contents of a second specified address A1 and records the twenty-seven least significant digits of the product in a third specified address A3.

(15) *High order multiplication.*—The computer system multiplies the contents of a specified address A2 by the contents of a second specified address A1 and records the twenty-nine most significant digits and sign digit in a third specified address A3.

(16) *Branch instruction.*—The computer system samples the contents of address A1 and depending upon the qualities of the contents of A1 replaces the sequence-directing address with address A2 or address A3, or proceeds without changing the sequence-directing address.

(17) *Tape read.*—The computer system reads information from a magnetic tape and records the information on the magnetic drum.

(18) *Tape reverse.*—The computer system rewinds the magnetic tape a certain specified distance.

(19) *Tape record.*—The computer system reads information from the magnetic drum and records the information on a magnetic tape.

(20) *Type-out octal.*—The computer system reads information from the magnetic drum and types out the information in octal form.

(21) *Type-out bi-octal.*—The computer system reads information from the magnetic drum and types it out, interpreting each group of six binary digits as one character.

(22) *Read out.*—The computer system selects information which is temporarily stored in certain parts of the computer system other than the magnetic drum or magnetic tape and performs the typing operations specified by this information.

(l) Programming

A program is a series of instruction signals (each comprising I, A3, A2, A1) which when encoded in octal form and inserted into the computer system directs the sequence of procedures which the computer system is to perform. A program is the result of the division of a mathematical problem into basic logical steps which each correspond to a procedure which the computer system can perform.

The instruction signals which constitute the program are typed into the computer system and are individually recorded in positions on the magnetic drum which will be selected by sequence-directing addresses. For example, to make the computer system first perform an addition and since the first sequence-directing address is known to be 000, the instruction signal 4 A3, A2, A1 is inserted into the computer system and recorded in the position designated by the 000 address on the magnetic drum. When the computer system is subsequently directed to operate continuously, the sequence-directing address 000 will locate the instruction signal 4 A3, A2, A1 and the computer system will, since 4 signifies addition, add the contents of A1 to the contents of A2 and will record the sum in A3.

An illustration of a simple program in which twenty pairs of numbers are added and the sum of each pair stored is shown below:

| Address on memory drum in which instruction or number is stored | I | A3 | A2 | A1 | |
|---|---|---|---|---|---|
| 000 | 4 | 200 | 101 | 100 | Add numbers. |
| 001 | 4 | 000 | 150 | 000 | Modify add instruction. |
| 002 | 5 | 151 | 151 | 152 | Subtract 1 from tally. |
| 003 | 7 | 000 | 010 | 151 | Test for completion. |
| 010 | 0 | 000 | 000 | 000 | Halt. |
| 100 | 0 | 000 | 000 | 214 | Constants (twenty pairs |
| 101 | 0 | 000 | 000 | 331 | of numbers). |
| * * * | * | * | * | * | * * * |
| 147 | 0 | 000 | 000 | 724 | |
| 150 | 0 | 001 | 002 | 002 | Modifying constant. |
| 151 | 0 | 000 | 000 | 024 | Tally. |
| 152 | 0 | 000 | 000 | 001 | Unit for modifying tally. |

Assuming that the above program has been inserted into the computer system and recorded on the magnetic drum and the computer system has been prepared to operate continuously starting with the 000 sequence-directing address, the instruction signal 4 200 101 100 is first located in the 000 address on the magnetic drum and inspected and as 4 represents the instruction for the addition procedure, the content of 100 (A1) which is 0 000 000 214 is added to the content of 101 (A2) which is 0 000 000 331. The sum 0 000 000 545 is recorded upon the magnetic drum in the position designated by 200 (A3).

The next consecutive sequence-directing address 001 is generated and 4 000 150 000 is inspected. The contents of 000 which is the instruction signal 4 200 101 100 is added to the contents of 150 which is 0 001 002 002. The result is 4 201 103 102 which is recorded in 000 on the magnetic drum and which replaces the instruction signal previously located at 000 so when the sequence-directing address 000 is encountered again, the contents of 102 will be added to the contents of 103 and the sum will be recorded in 201. In other words, 000 will direct the addition of the next pair of numbers.

Thus when the sequence-directing address 000 is encountered again, two new constants (those in 102 and 103) will be added and the sum will be recorded in 201 which is the next consecutive position on the magnetic drum in relation to the position in which the sum of the first pair of numerical constants was recorded.

The next sequence-directing address encountered is 002. As a result, the instruction signal 5 151 151 152 is inspected and as 5 directs subtraction, the contents of 152 is subtracted from the contents of 151 and the difference is recorded in 151. The contents of 152 is 0 000 000 001 and is subtracted from the contents of 151 which is 0 000 000 024 which is the octal equivalent of the decimal number 20. The difference 0 000 000 023 which is decimal 19 is recorded in 151.

The number recorded in 151 corresponds to the number of addition still to be performed, so that after twenty additions the numerical constant recorded in 151 will be 0 000 000 000. However, only one addition has thus far been performed.

The next sequence-directing address 003 locates 7 000 010 151 and 7 directs the performance of the branch instruction procedure. The computer system accordingly inspects the numerical constant recorded in 151 which is now 0 000 000 023. As will be shown later in detail, since 0 000 000 023 is positive and greater than zero, A3 which is 000 is substituted as the sequence-directing address. As a result, the computer system obtains its next instruction from address 000, where it finds the instruction for adding the next two numbers.

The next two constants are thereby added and the sum is deposited in 201 as already indicated and preparation is made for adding two new constants. The number in 151 is again decreased by one and the branch instruction again causes the sequence-directing address to revert to 000.

After the addition of each of the twenty pairs of numerical constants, the number recorded in 151 will be reduced to 0 000 000 000 due to the twenty successive subtractions of 0 000 000 001 which each accompany an addition of two numerical constants.

The branch instruction then located by the sequence-directing address 003 causes the number in 151 which is now 0 000 000 000 to be inspected and since the number is zero, A2 (which is 010) is substituted as the sequence-directing address (as will be explained).

As a result, the computer system next inspects the instruction signal 0 000 000 000 which is located in 010 and which is the instruction for halt and the computer system halts. The program has been completed.

A program may involve any of the automatic procedures (which have been listed) in any sequence as necessary to the solution of a problem. For example, division may be programmed by use of the automatic procedures.

The invention will be described in connection with a high-speed electronic digital computer which is described and claimed in the co-pending application of Samuel Lubkin, Serial No. 370,538, filed July 27, 1953, and assigned to the same assignee.

Other objects, features and advantages of the invention will appear in the subsequent detailed description which is accompanied by drawings wherein.

Figure 7:
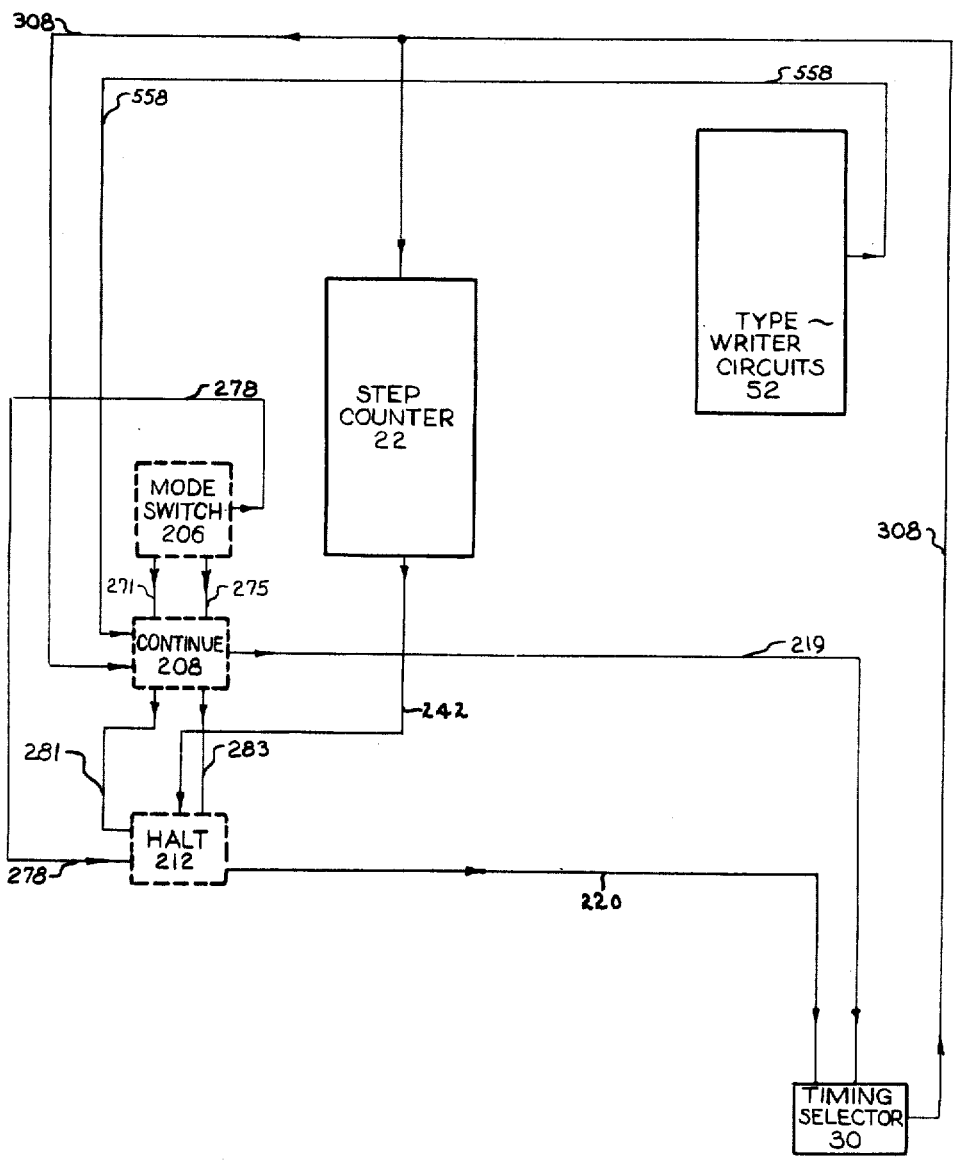

Fig. 7 diagrammatically illustrates the signal flow during the continuous operation, one-instruction, and one-step procedures, among the block symbols comprising the computer system.

Figure 8:
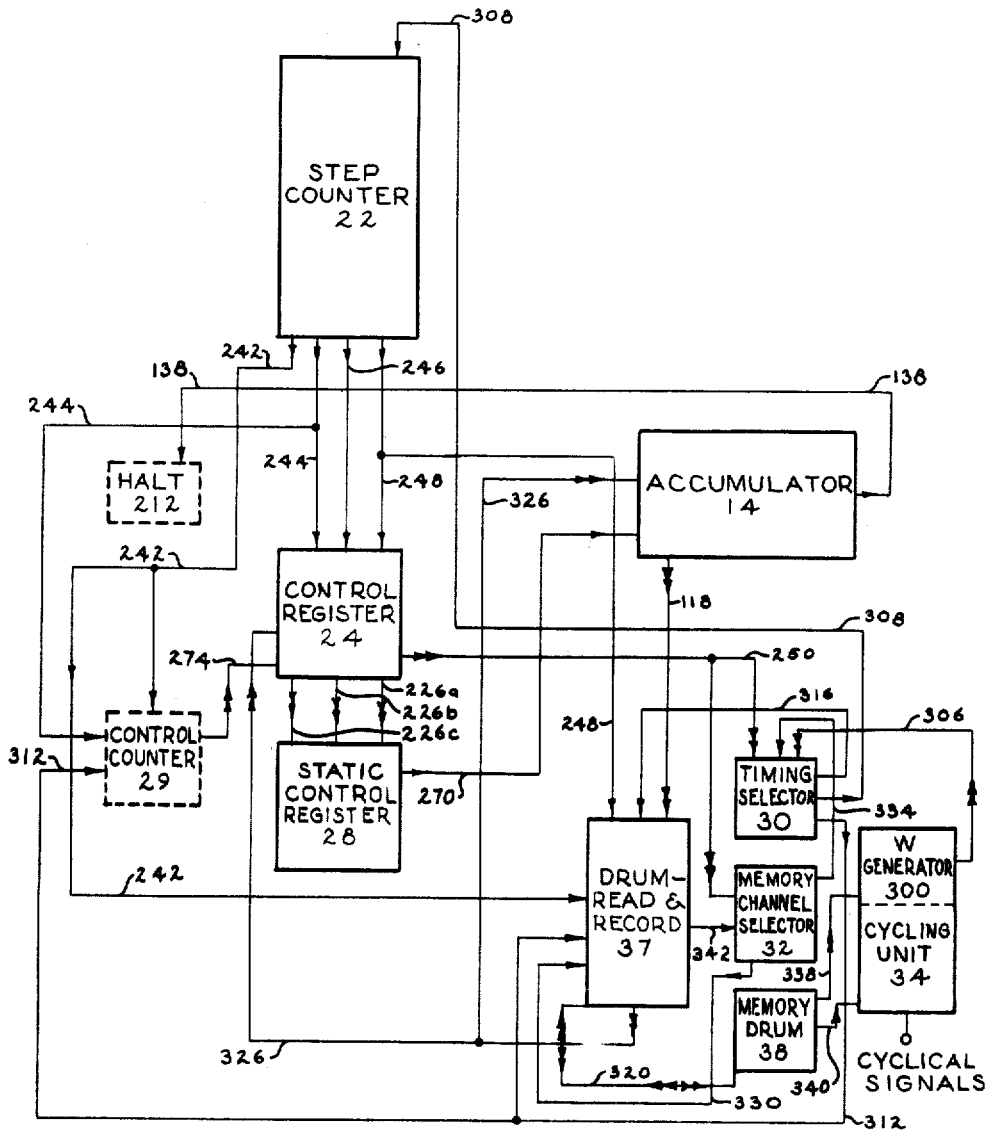

Fig. 8 shows the electronic signal flow among the block symbols during the addition procedure.

Figure 9:
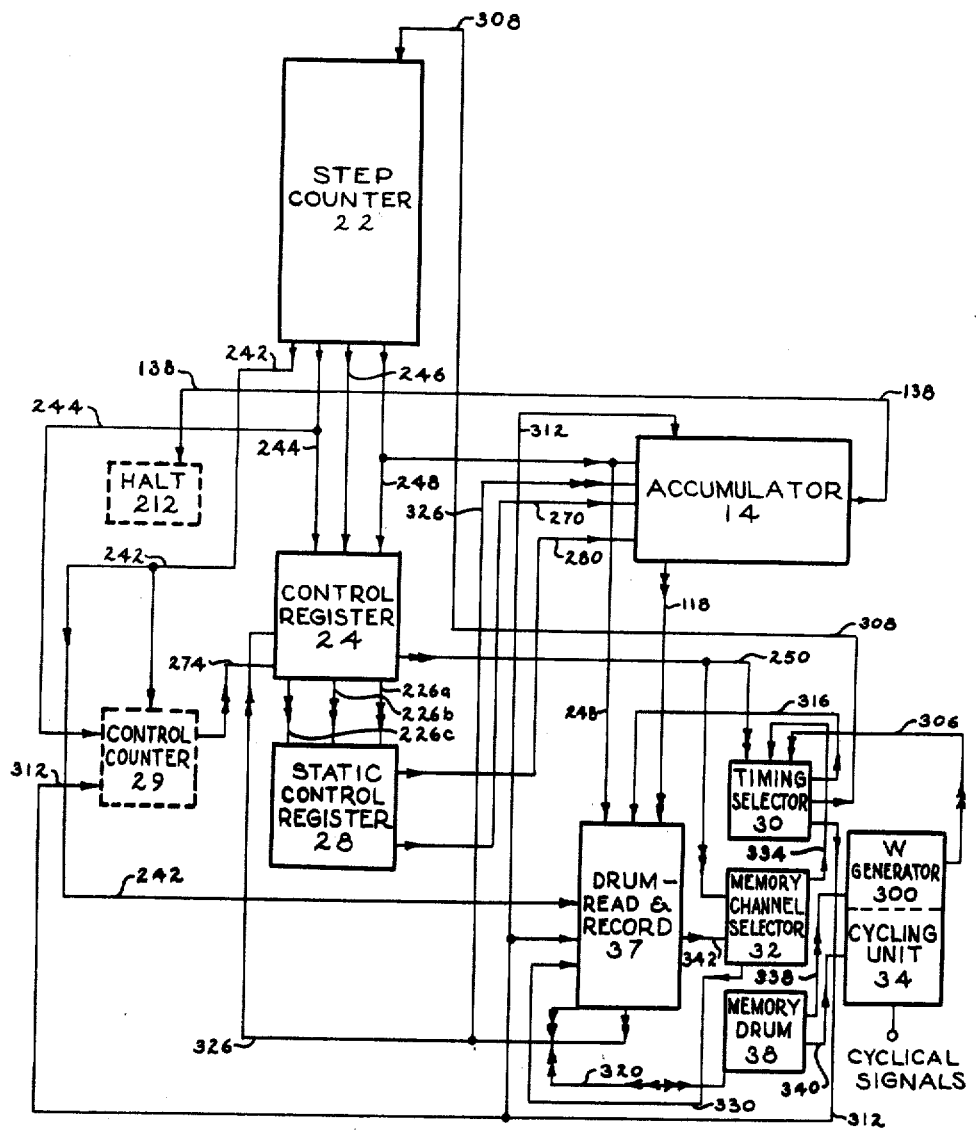

Fig. 9 illustrates the signal flow during the subtraction procedure among the block symbols comprising the computer system.

Figure 10:
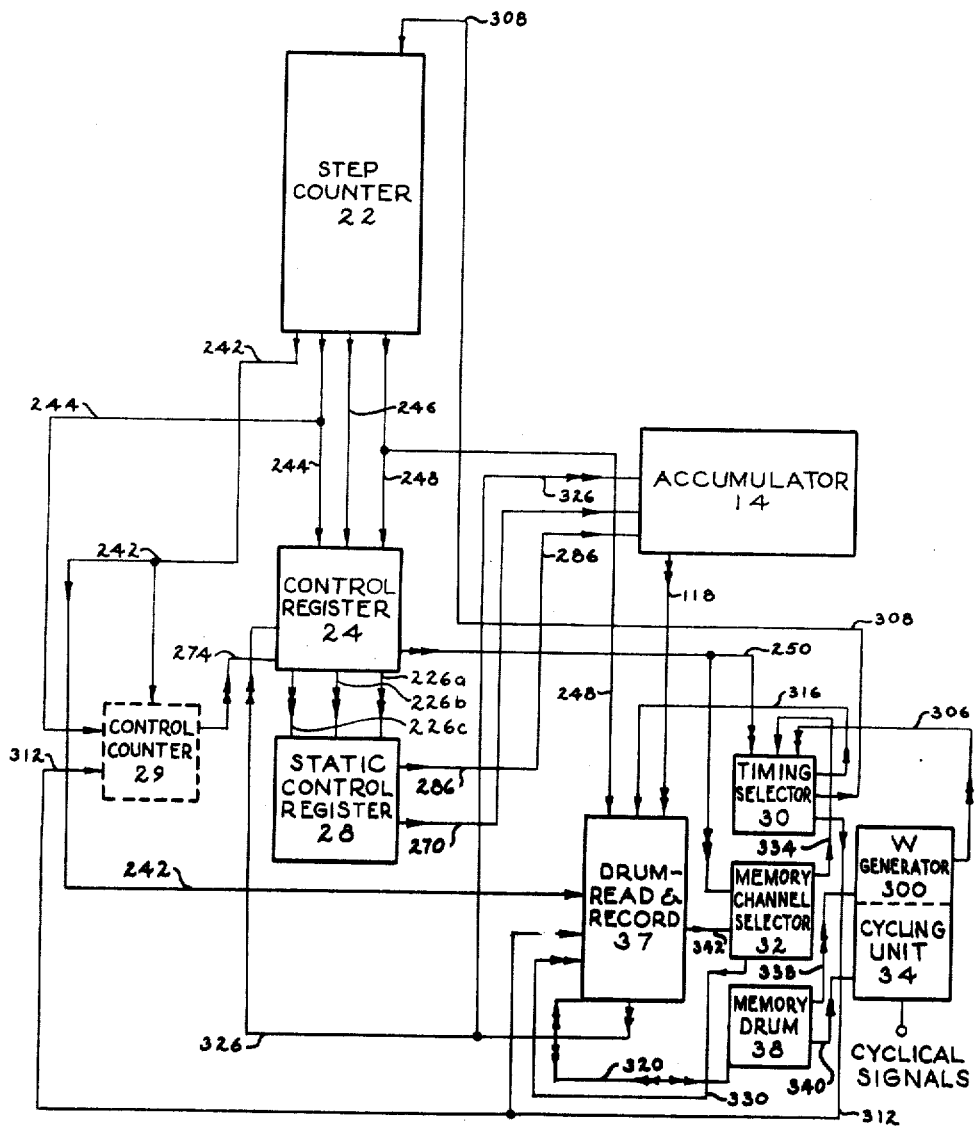

Fig. 10 is a block diagram which shows the signal flow during the logical multiplication procedure.

Figure 11:
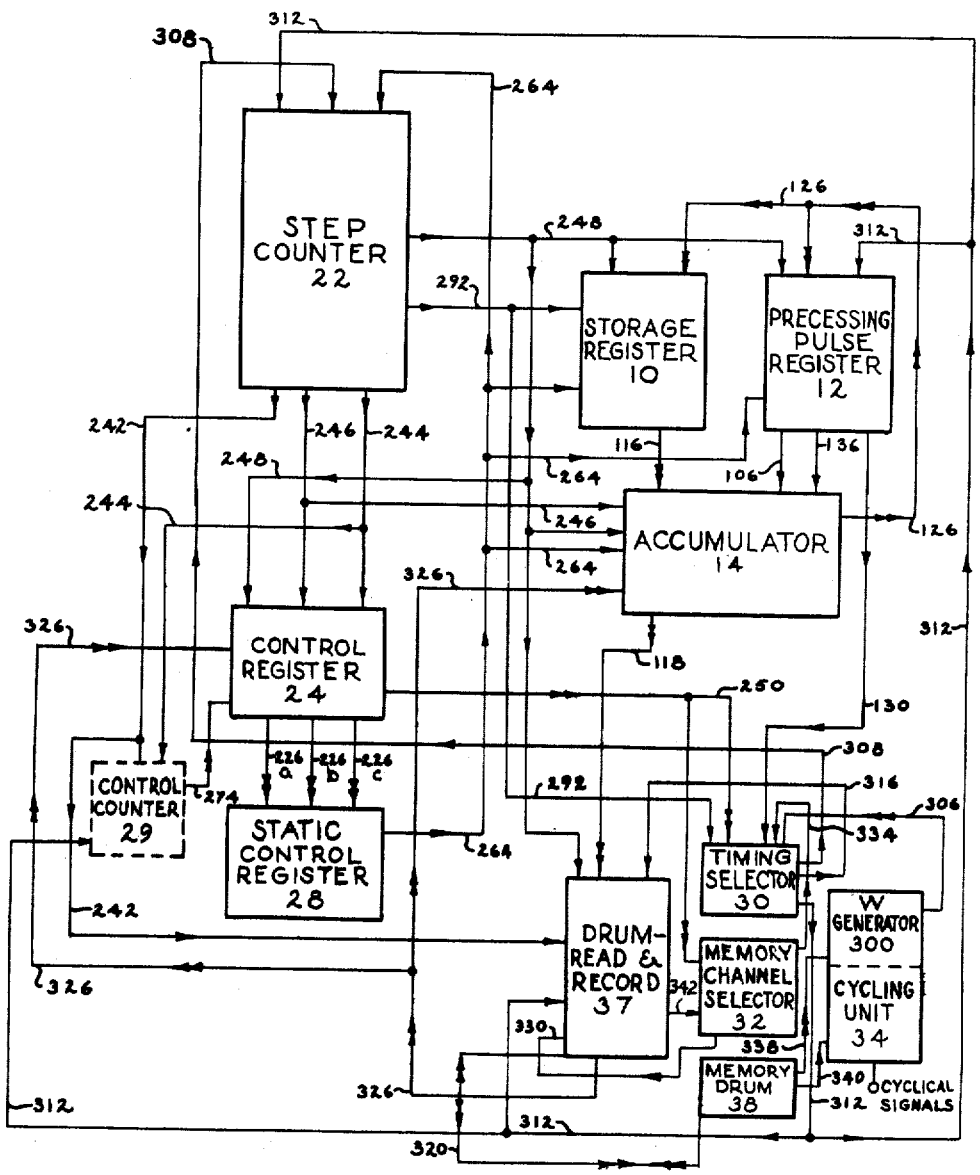

Fig. 11 is a block diagram which illustrates the signal flow during the low order multiplication procedure.

Figure 12:
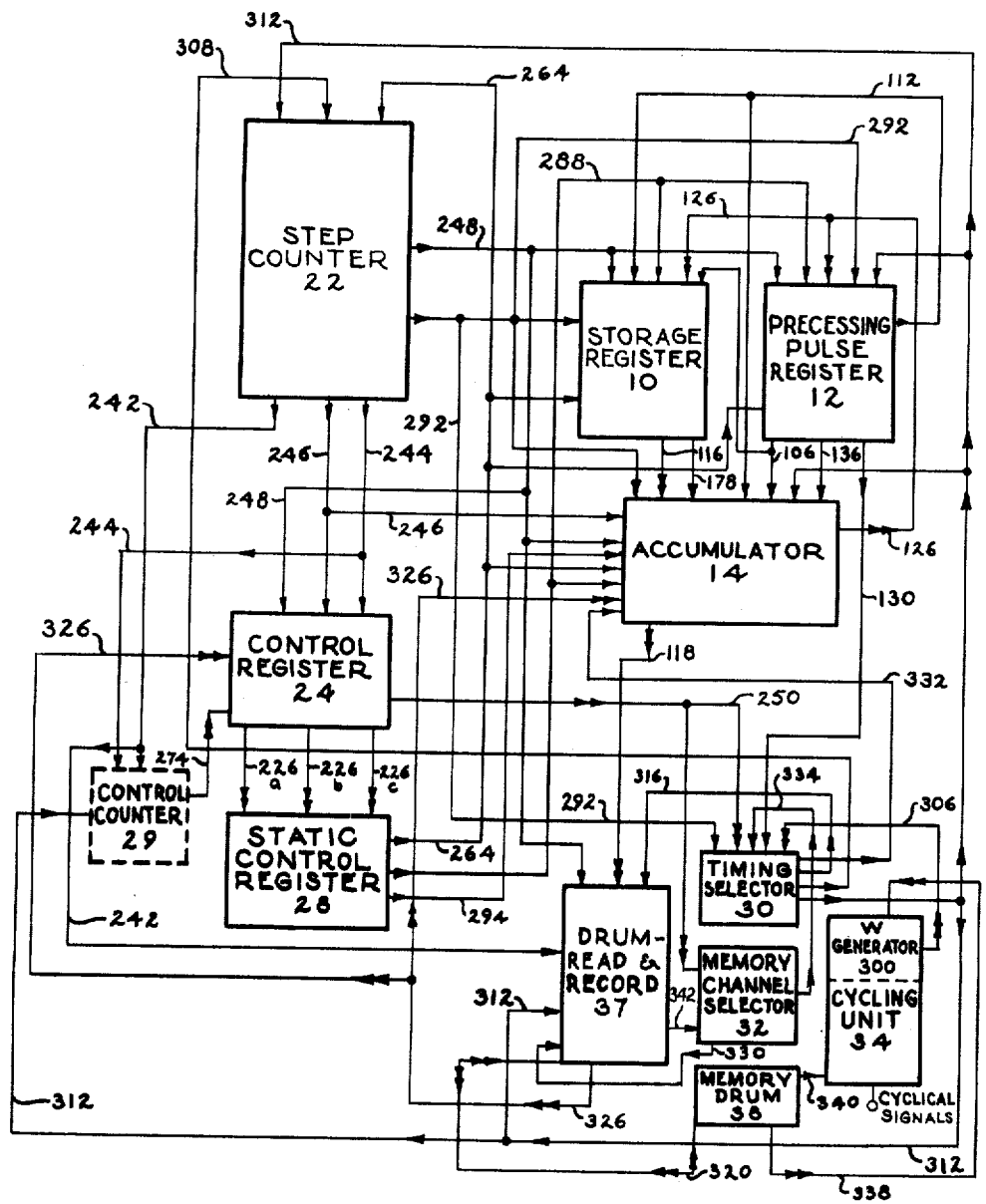

Fig. 12 illustrates the signal flow for high order multiplication.

Figure 13:
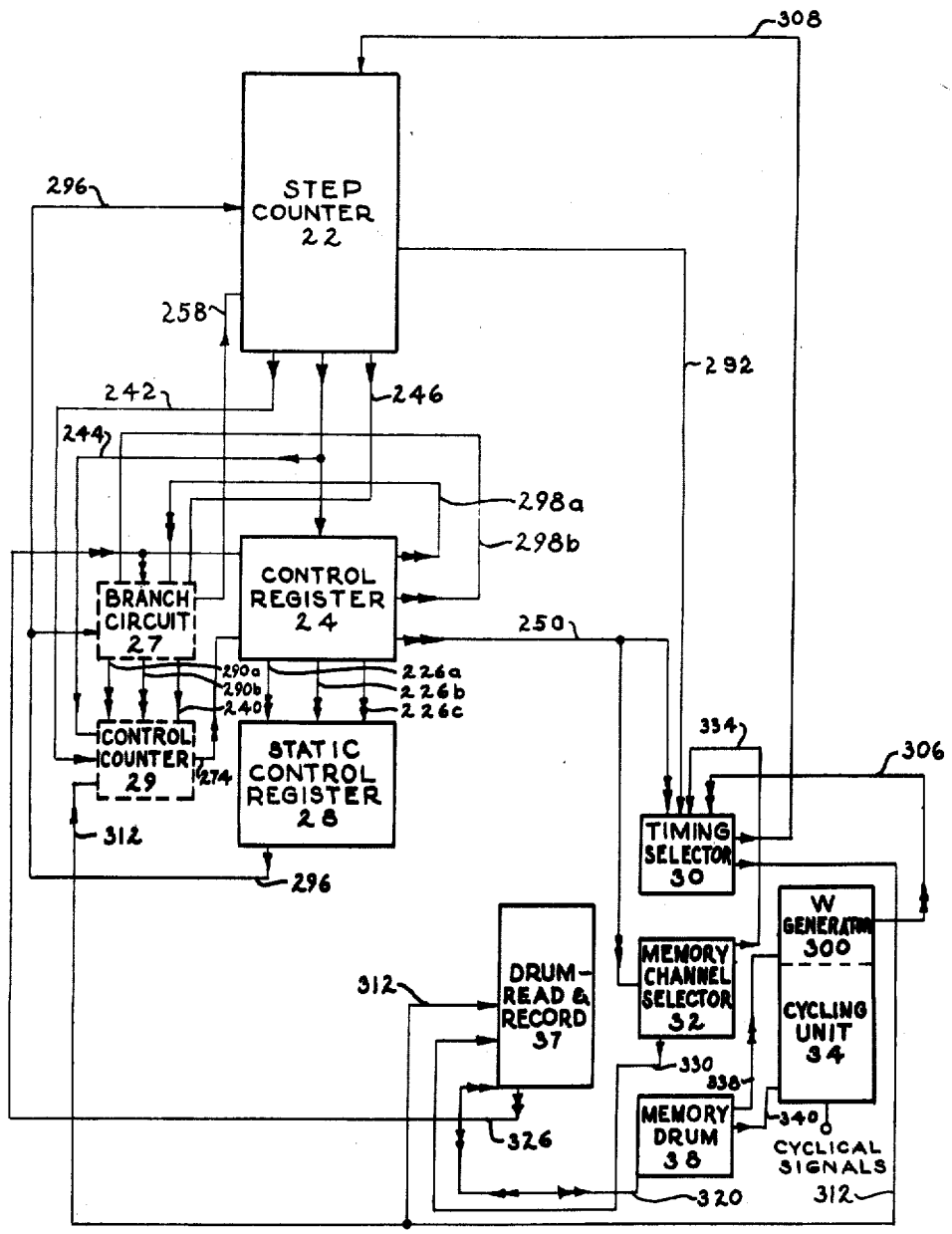

Fig. 13 is a block diagram which shows the signal flow during the branch instruction procedure.

Figure 14:
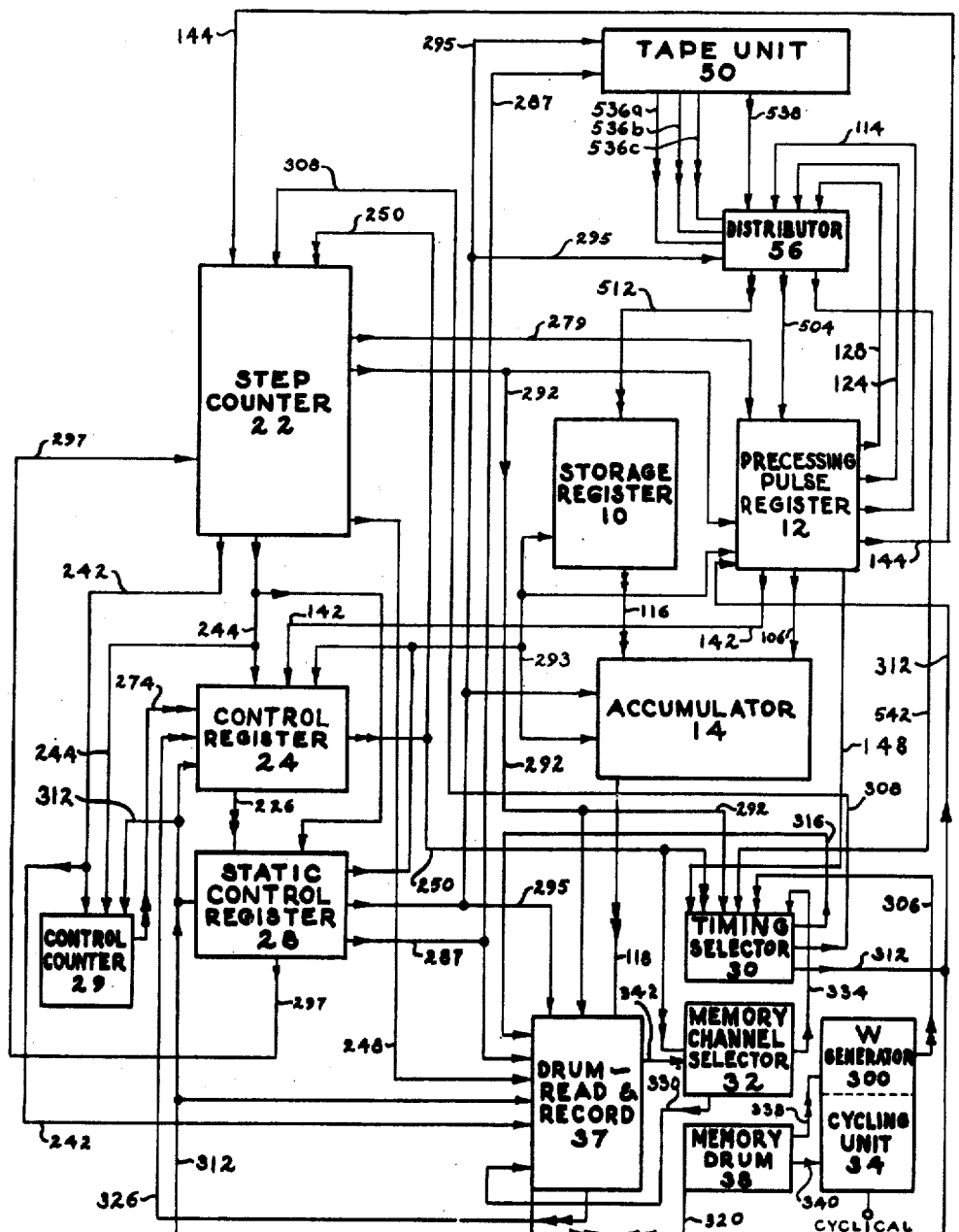

Fig. 14 is a block diagram which shows the signal flow during the tape-read and tape reverse procedures.

Figure 15:
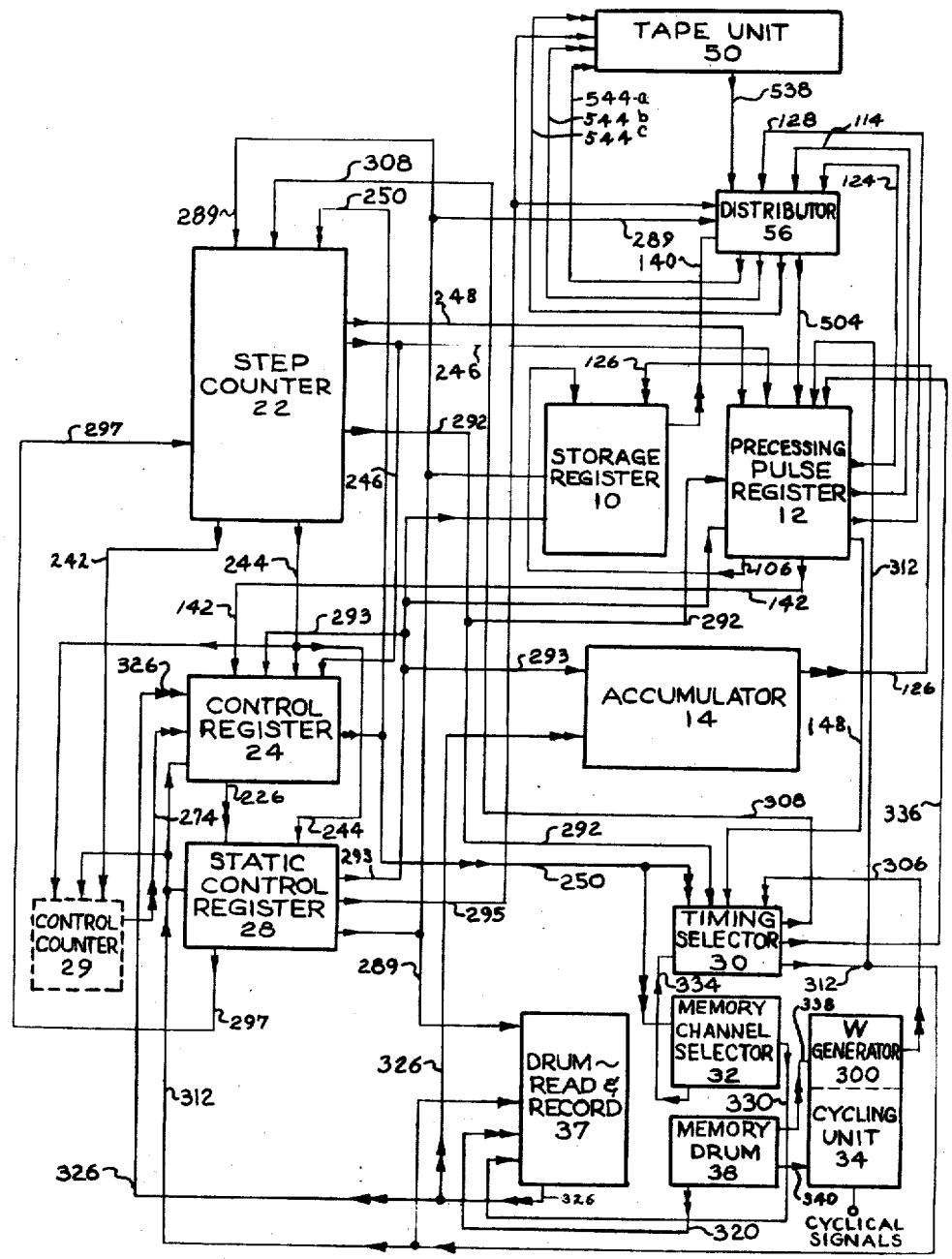

Fig. 15 shows the interchange of signals during the tape record procedure.

Figure 16:
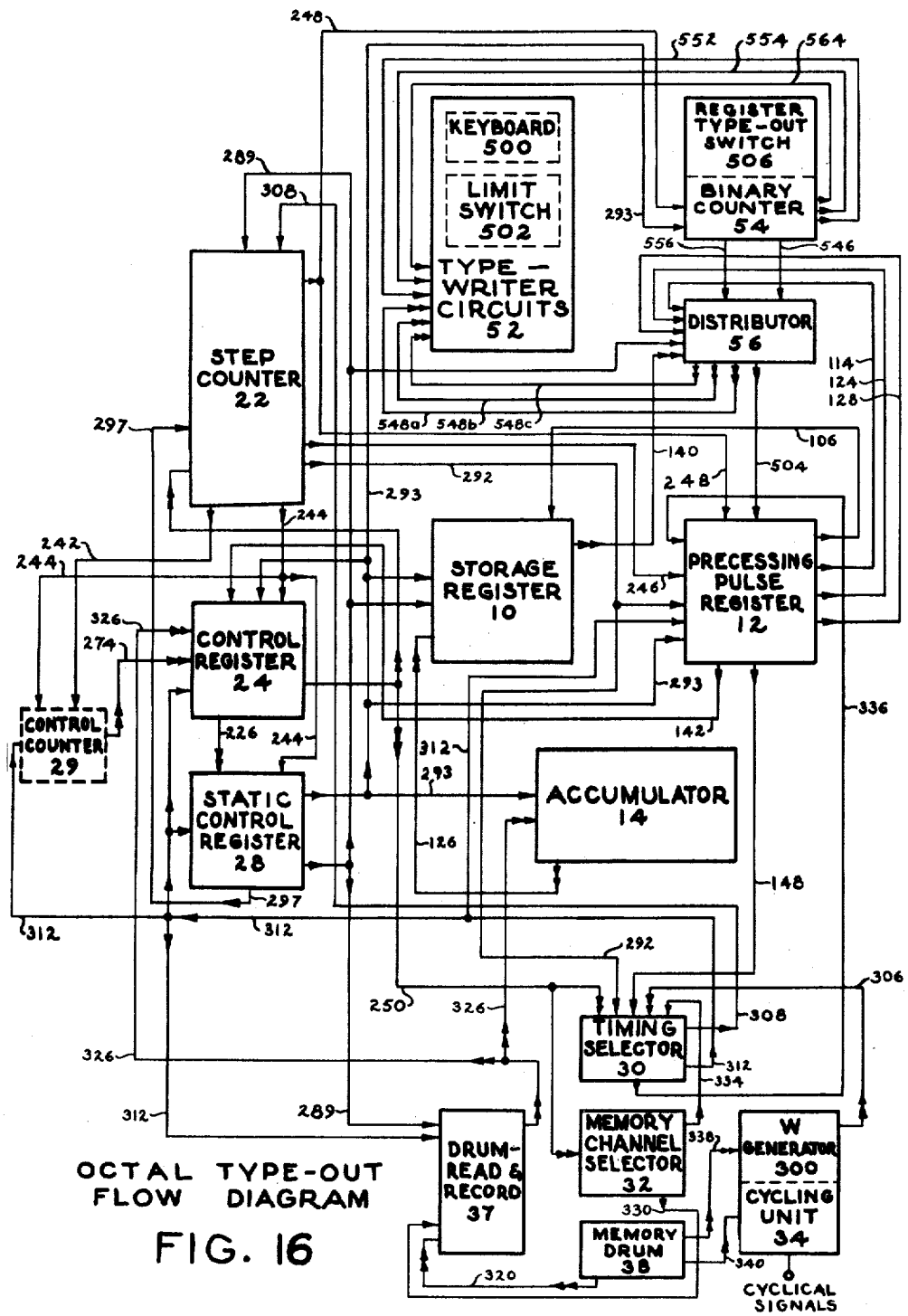

Fig. 16 is a block diagram which illustrates the flow of signals during the octal type-out procedure.

Figure 17:
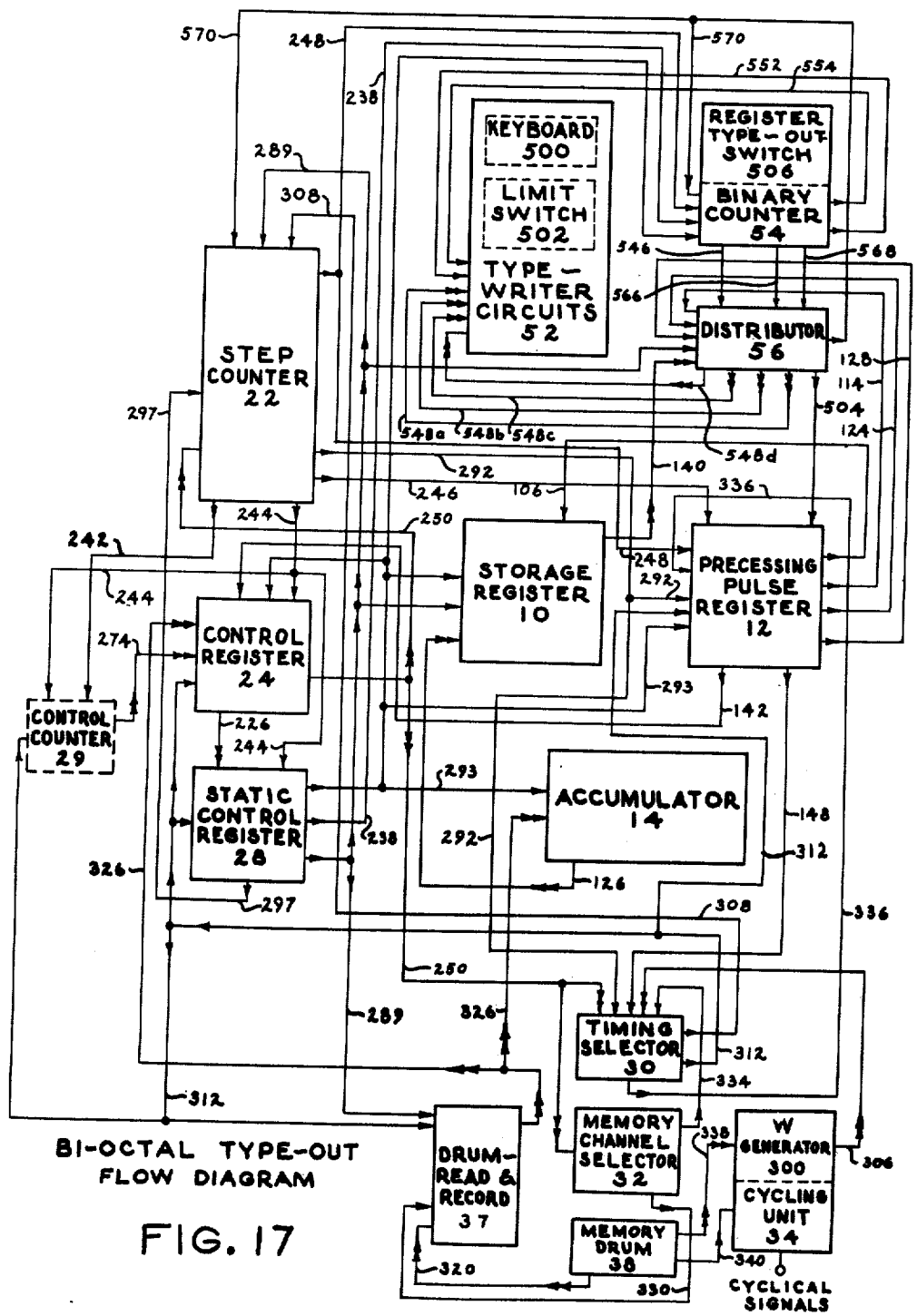

Fig. 17 is a block diagram which shows the flow of signals during the bi-octal type-out procedure.

Figure 18:
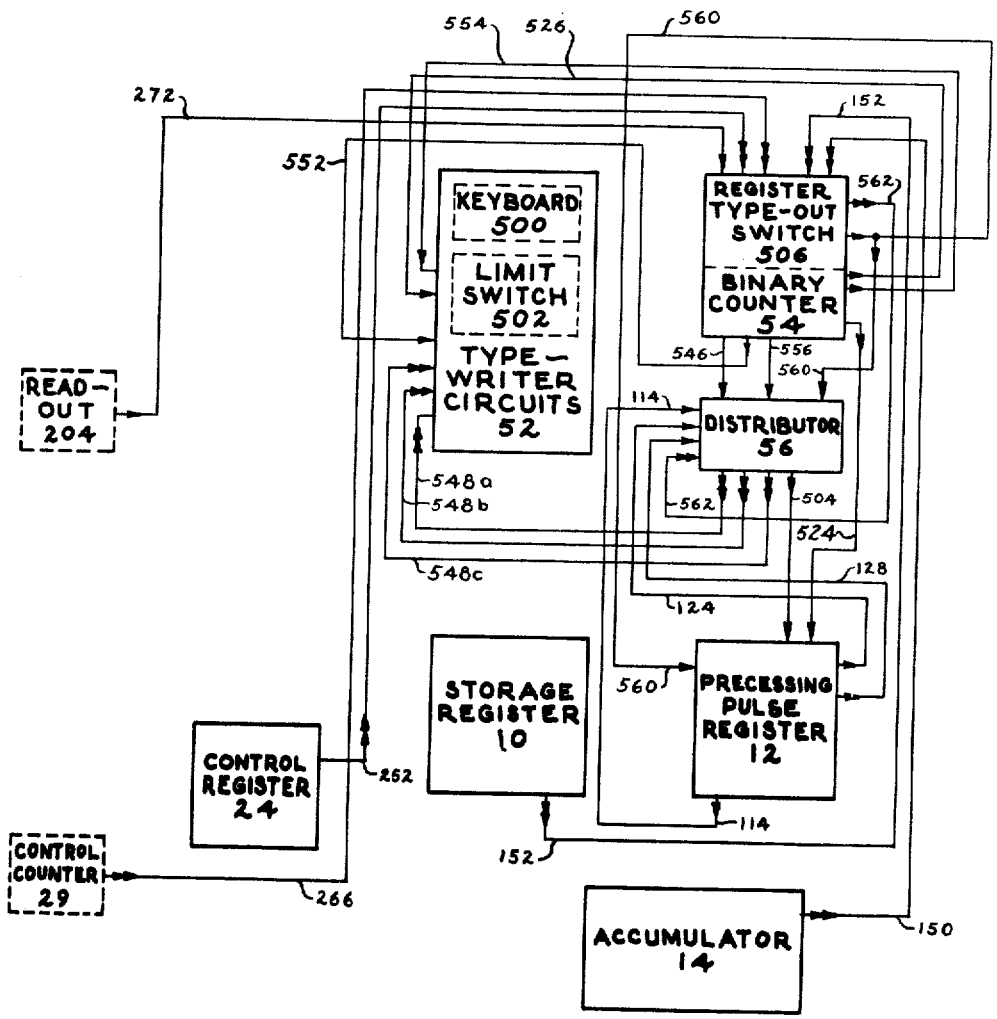

Fig. 18 illustrates the signal flow for the register type-out procedure.

Figs. 19a–h, 20a–g, and 21a–j illustrate the logical symbols which are used to describe the logical diagrams of the various block symbols, and include the circuits of the logical symbols.

Fig. 19a shows the logical symbol for a gate.

Fig. 19b schematically illustrates the circuit of a gate.

Fig. 19c shows the logical symbol for a buffer.

Fig. 19d shows the circuit of a buffer.

Fig. 19e is the logical symbol for a relay line.

Fig. 19f illustrates the schematic circuitry of a delay line.

Fig. 19g illustrates the pulse amplifier logical symbol.

Fig. 19h is the schematic diagram of a pulse amplifier.

Fig. 20a shows the reshaper logical symbol.

Fig. 20b illustrates the logical details of a reshaper.

Fig. 20c shows the logical symbol for a D.-C. amplifier.

Fig. 20d is a detailed diagram of a D.-C. amplifier.

Fig. 20e illustrates the logical symbol for a tape reading amplifier.

Fig. 20f illustrates the circuit represented by the symbol for a tape reading amplifier.

Fig. 20g shows the logical symbol for a drum reading amplifier, the circuit of which is substantially the same as that shown in Fig. 20f.

Figure 21A:
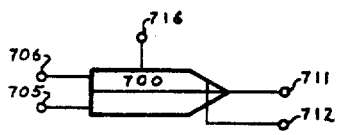

Fig. 21a shows the logical symbol for a set dominant flip flop.

Figure 21B:
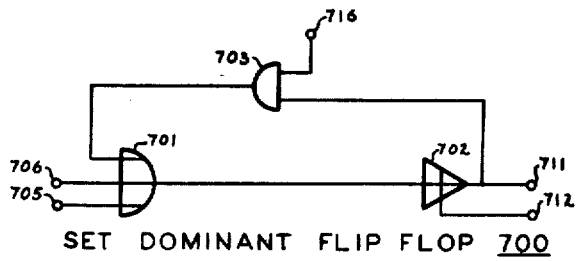

Fig. 21b diagrammatically shows the logical circuit of a set dominant flip flop.

Figure 21C:
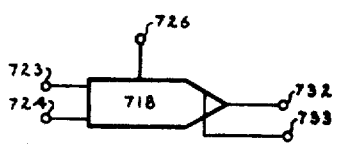

Fig. 21c shows the reset dominant flip flop logical symbol.

Figure 21D:
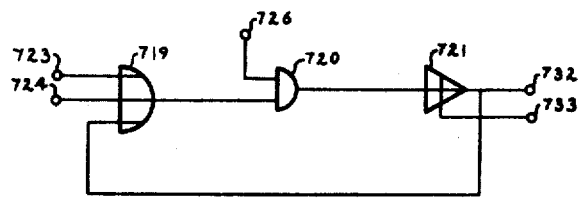

Fig. 21d illustrates the logical details of a reset dominant flip flop.

Figure 21E:
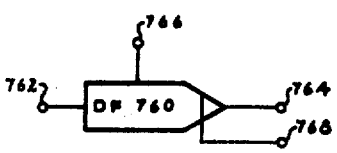

Fig. 21e shows the delay flop logical symbol.

Figure 21F:
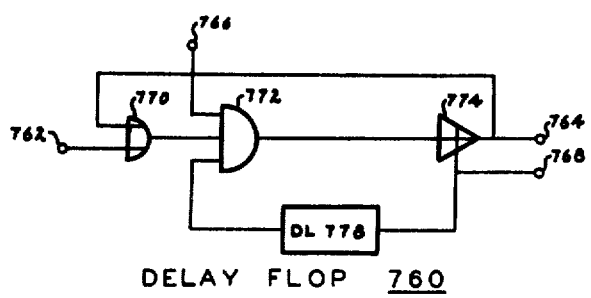

Fig. 21f shows the details of delay flop employing logical symbols.

Fig. 21g illustrates the logical symbol for a write amplifier.

Fig. 21h illustrates the circuit of a write amplifier.

Fig. 21i illustrates the logical symbol for a tape writing amplifier.

Fig. 21j is a schematic diagram of a tape writing amplifier.

Figs. 22–24 and 26–44 logically show the contents of the block symbols used to describe the various procedures.

Figure 22:
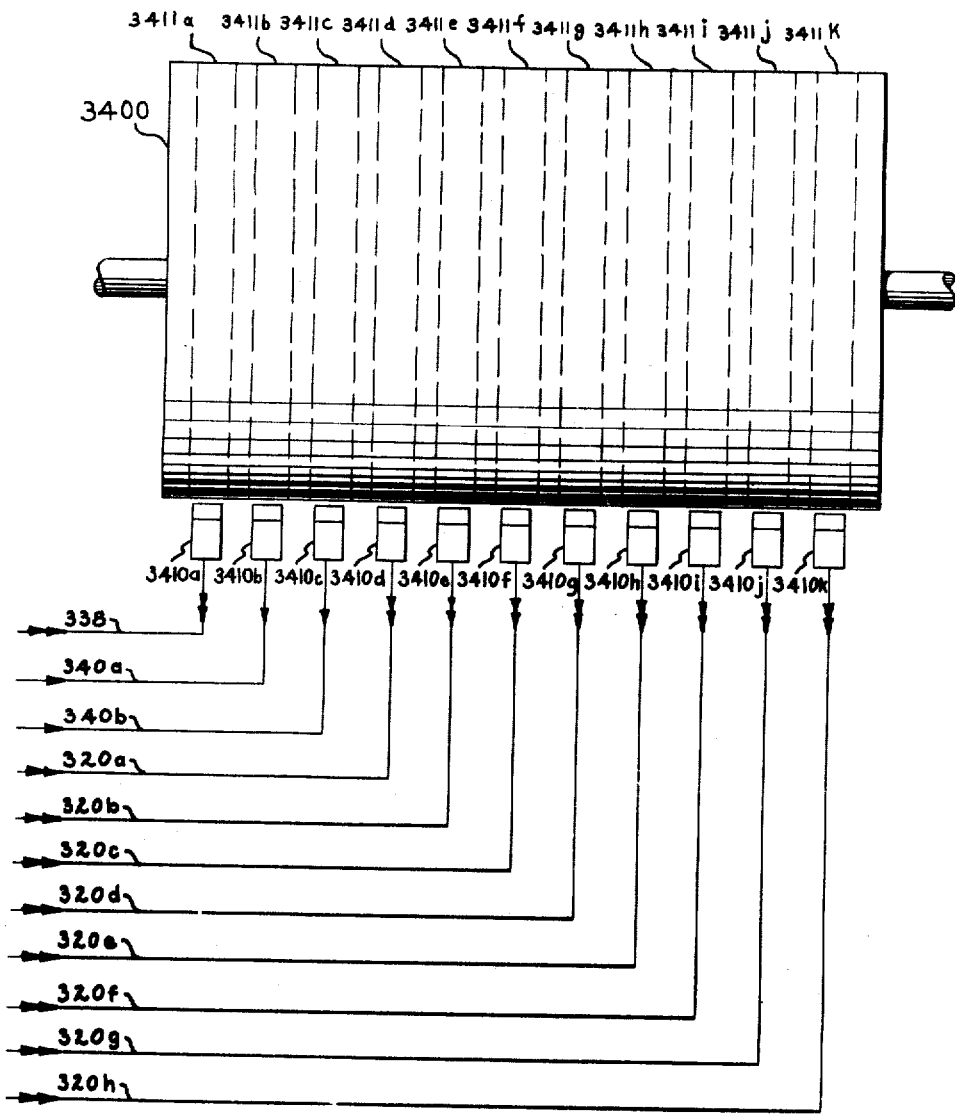

Fig. 22 illustrates the circuit of the memory drum and includes a diagrammatic view of the magnetic drum.

Figure 23:
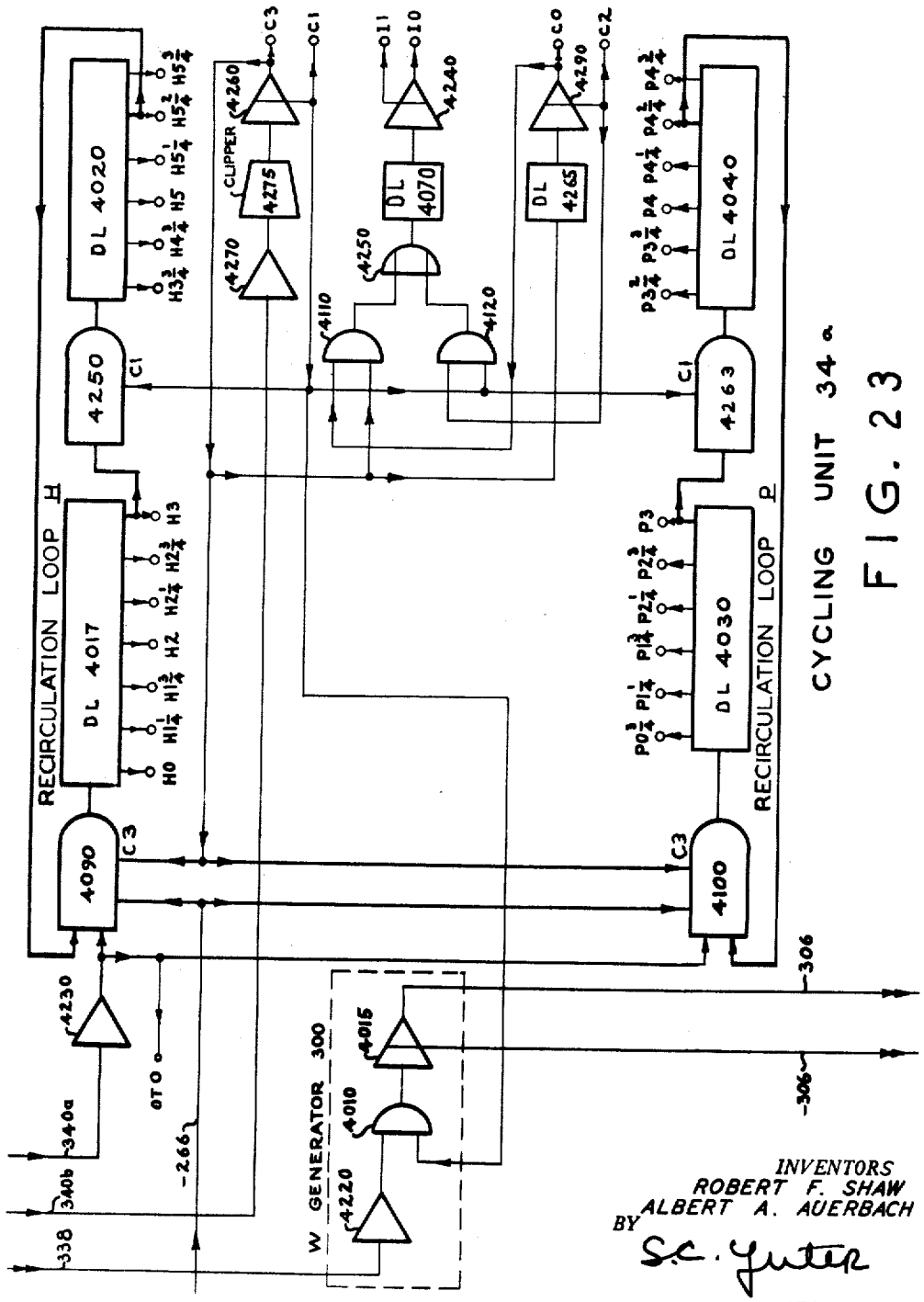

Fig. 23 shows the circuit of the W generator and a part of the cycling unit.

Figure 24:
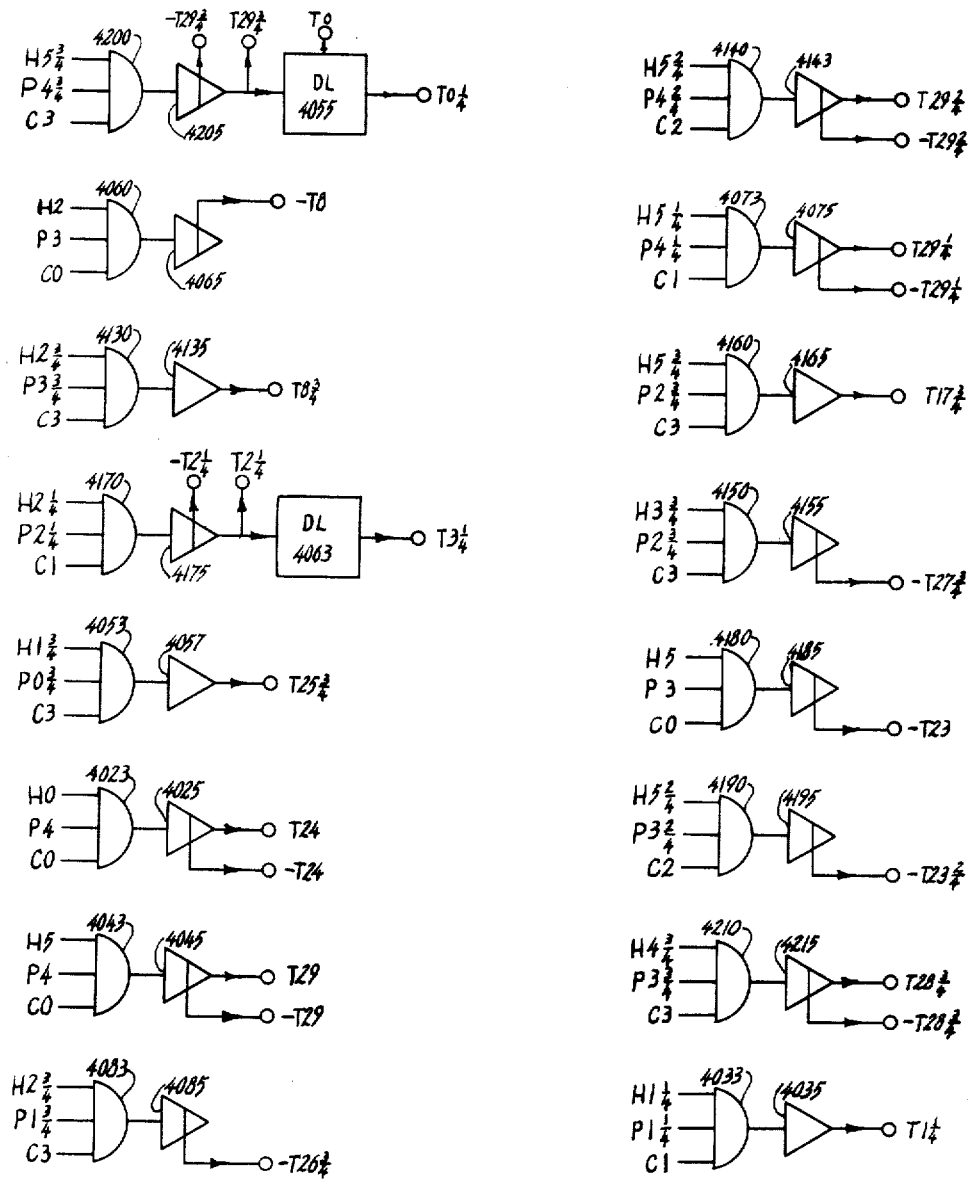

Fig. 24 shows another part of the cycling unit circuit.

Figure 25:
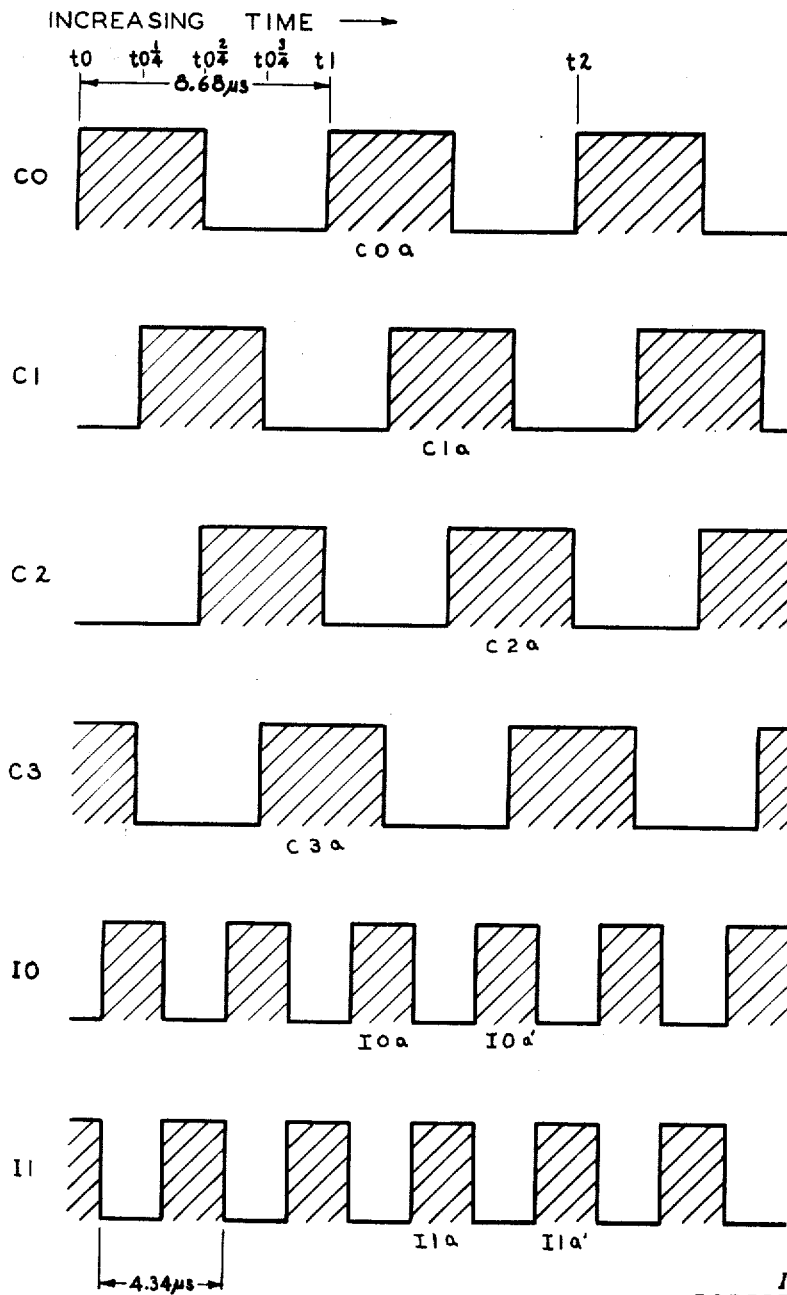

Fig. 25 is a time chart which illustrates the cyclical signals which are generated in the cycling unit.

Figure 26:
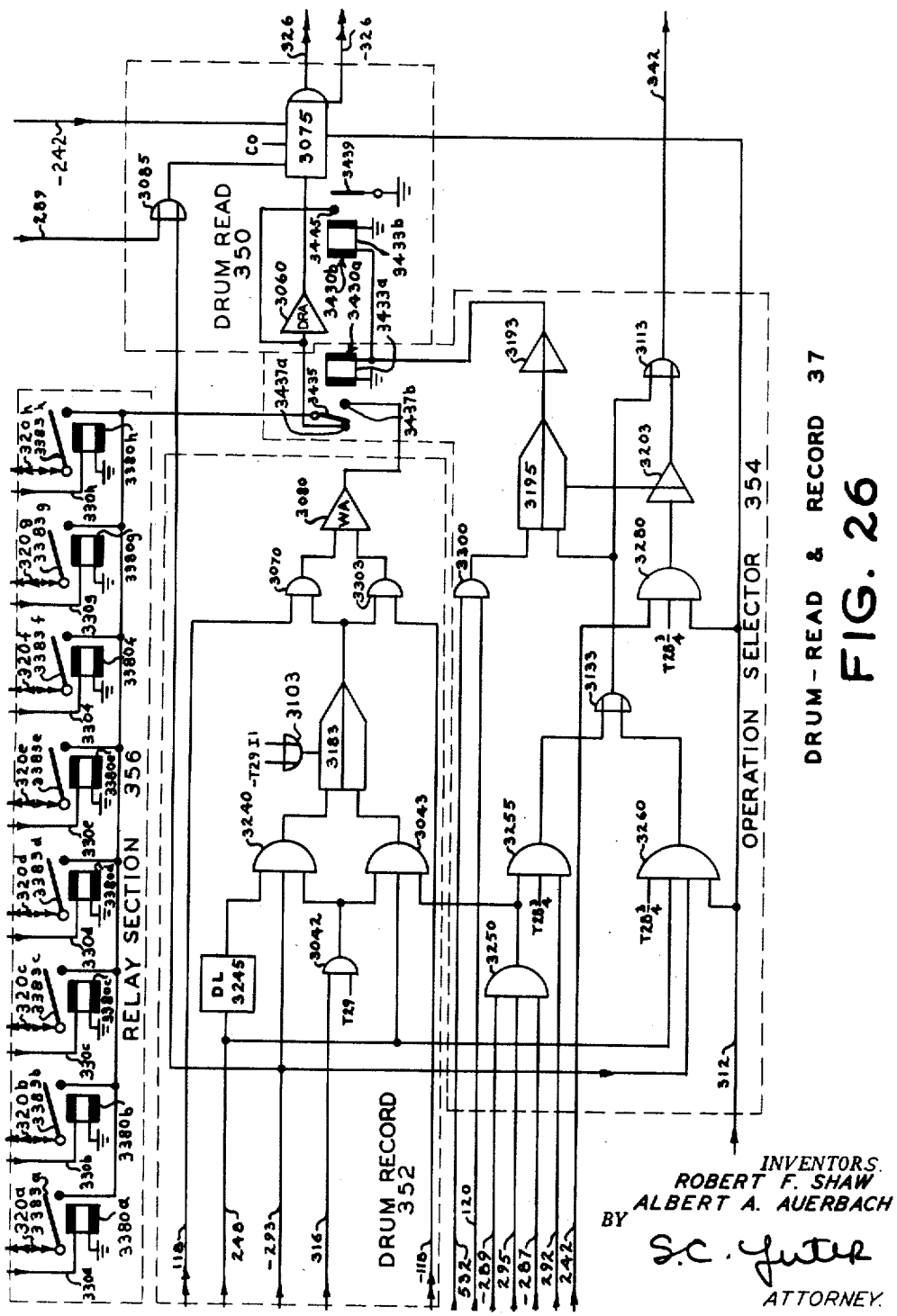

Fig. 26 shows the circuit of the drum-read and record.

Figure 27:
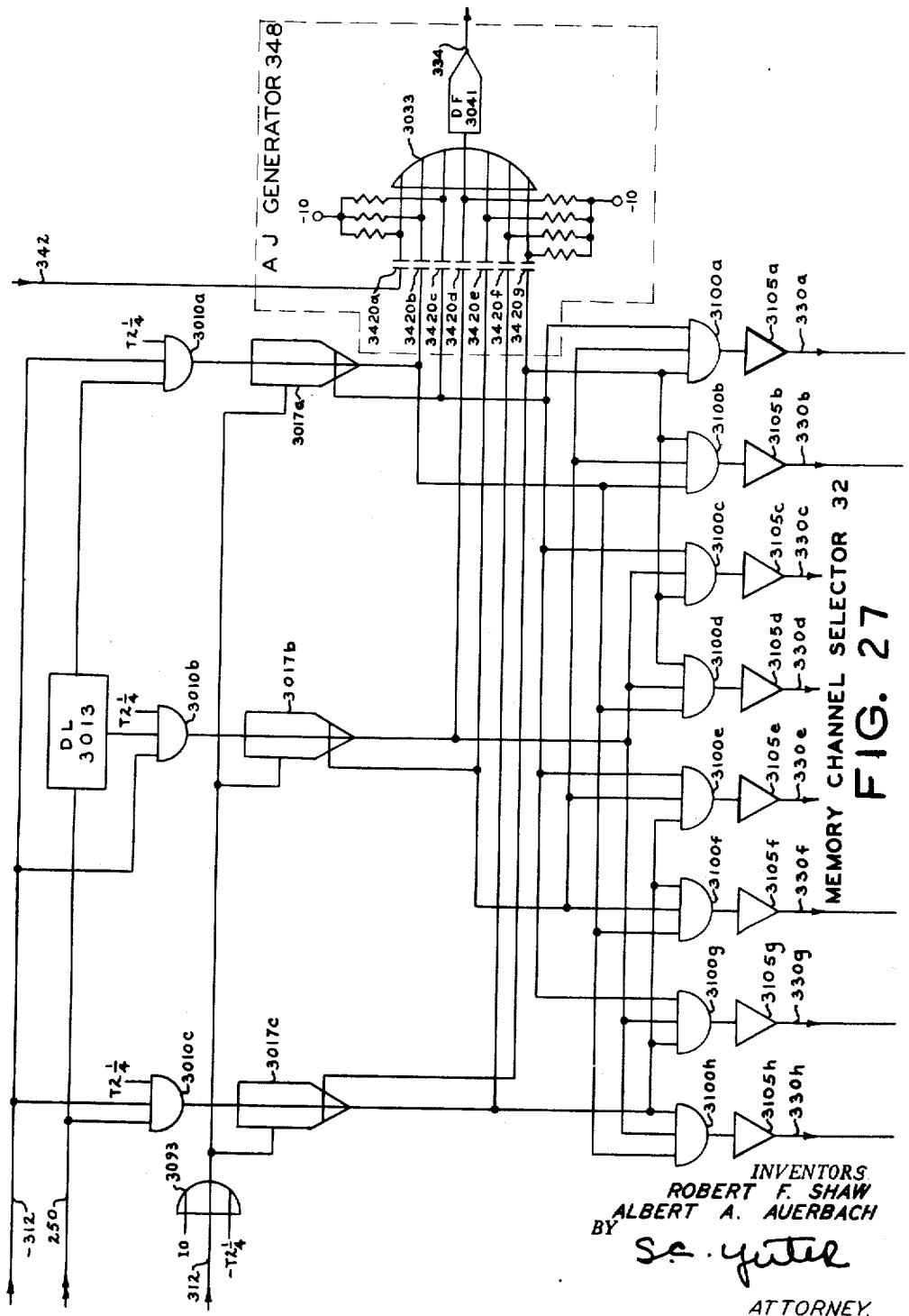

Fig. 27 illustrates the circuit of the memory channel selector.

Figure 28:
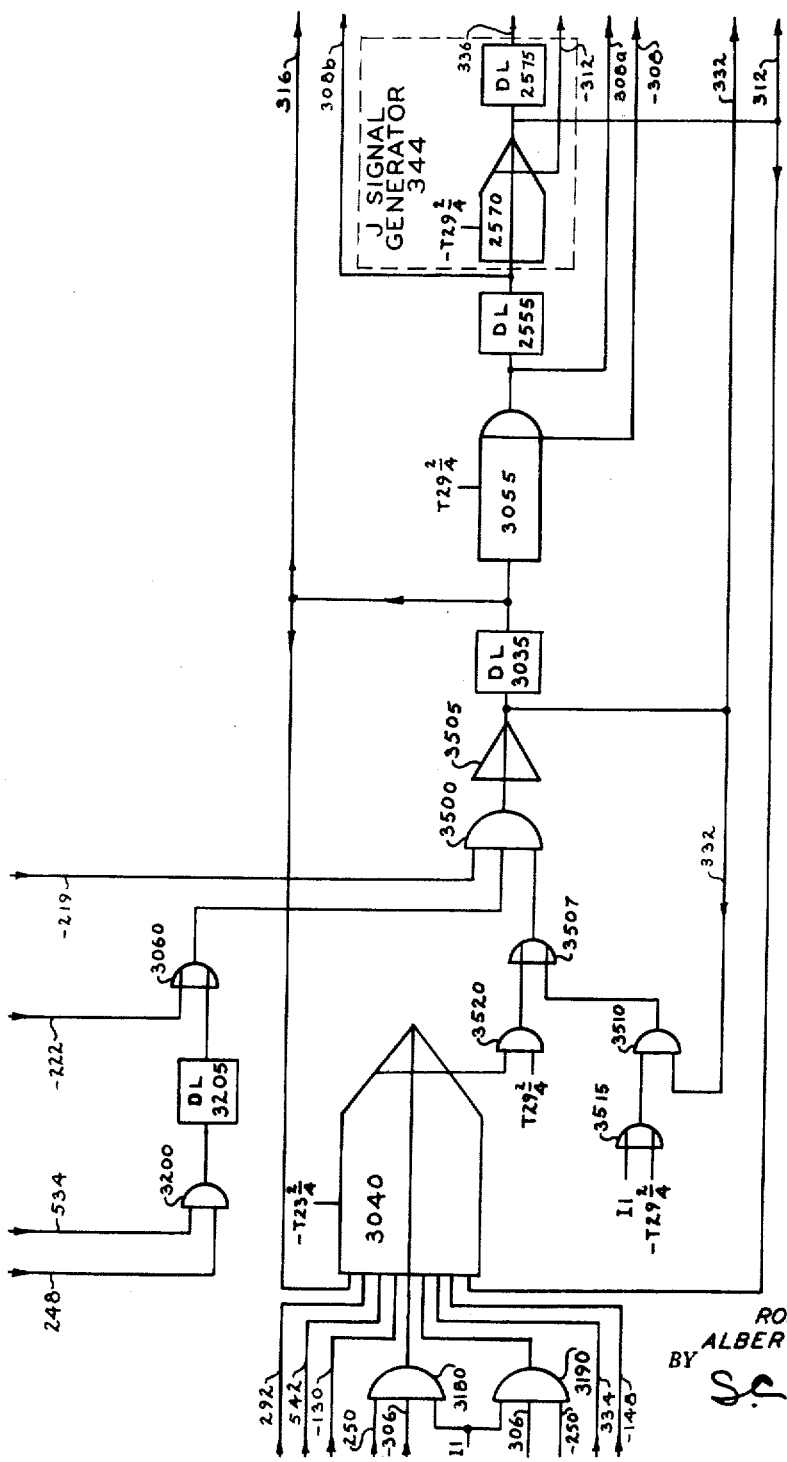

Fig. 28 shows the circuit of the timing selector.

Figure 29:
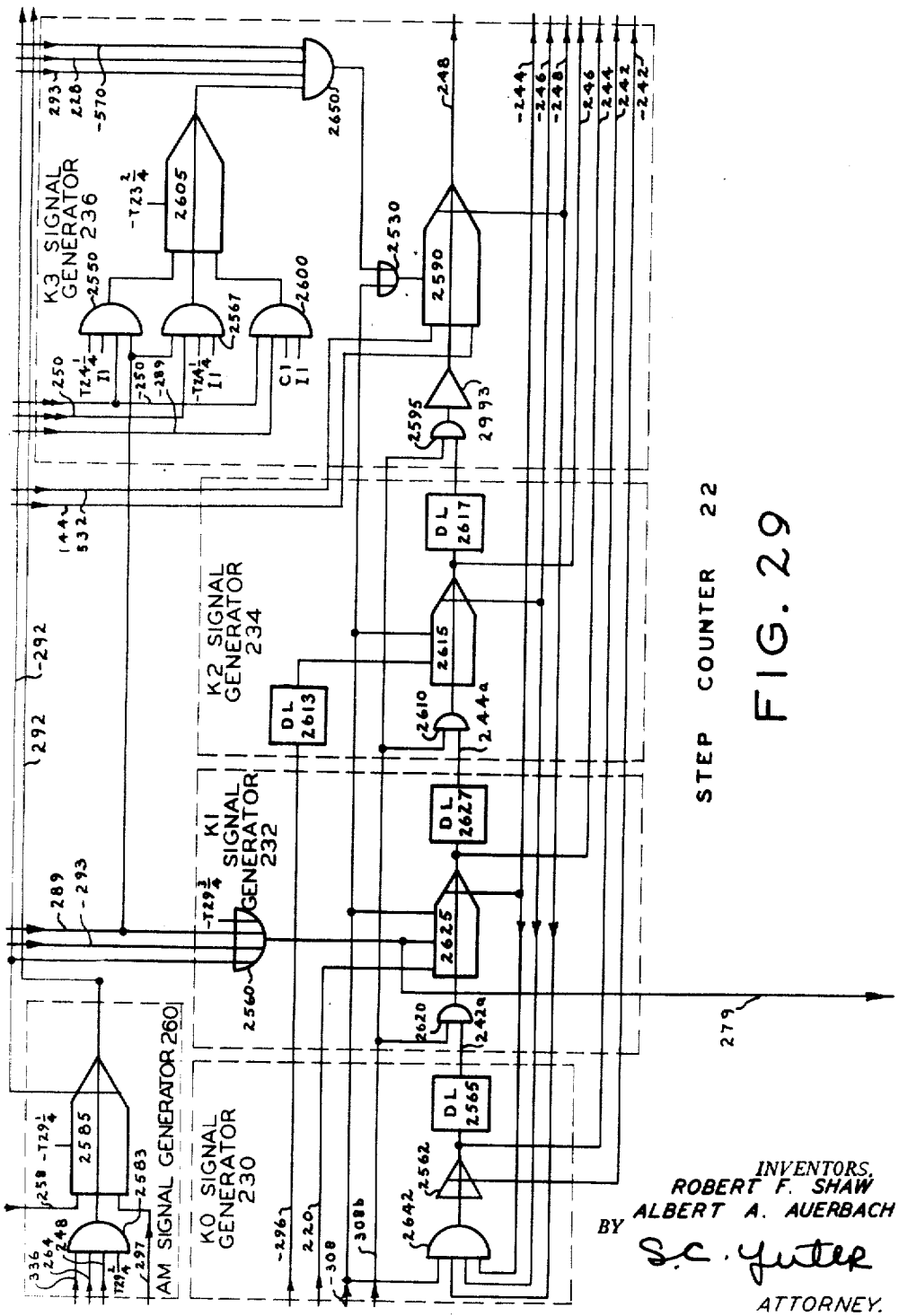

Fig. 29 shows the circuit of the step counter.

Figure 30:
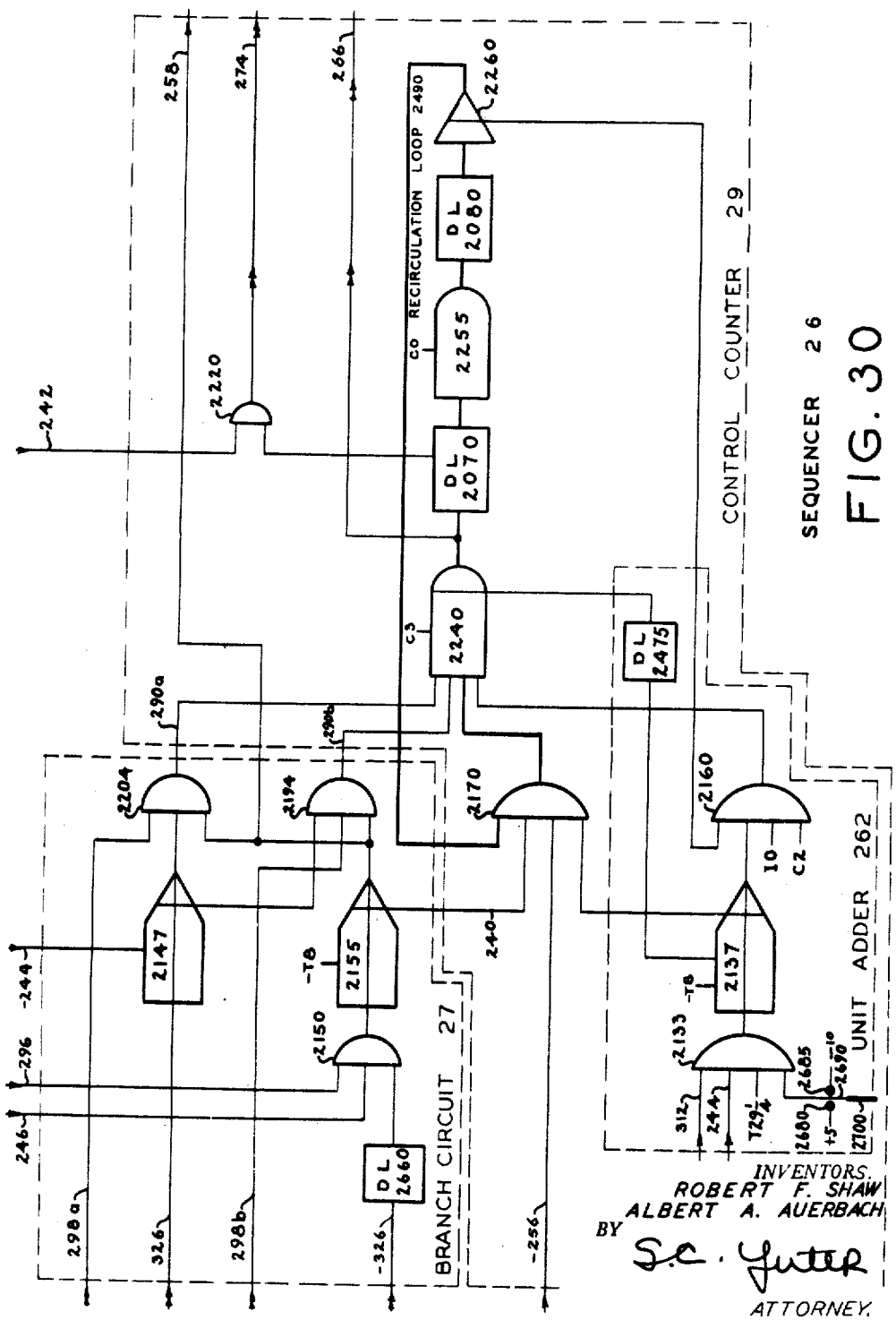

Fig. 30 illustrates the sequencer circuit which includes the branch circuit and the control counter.

Figure 31:
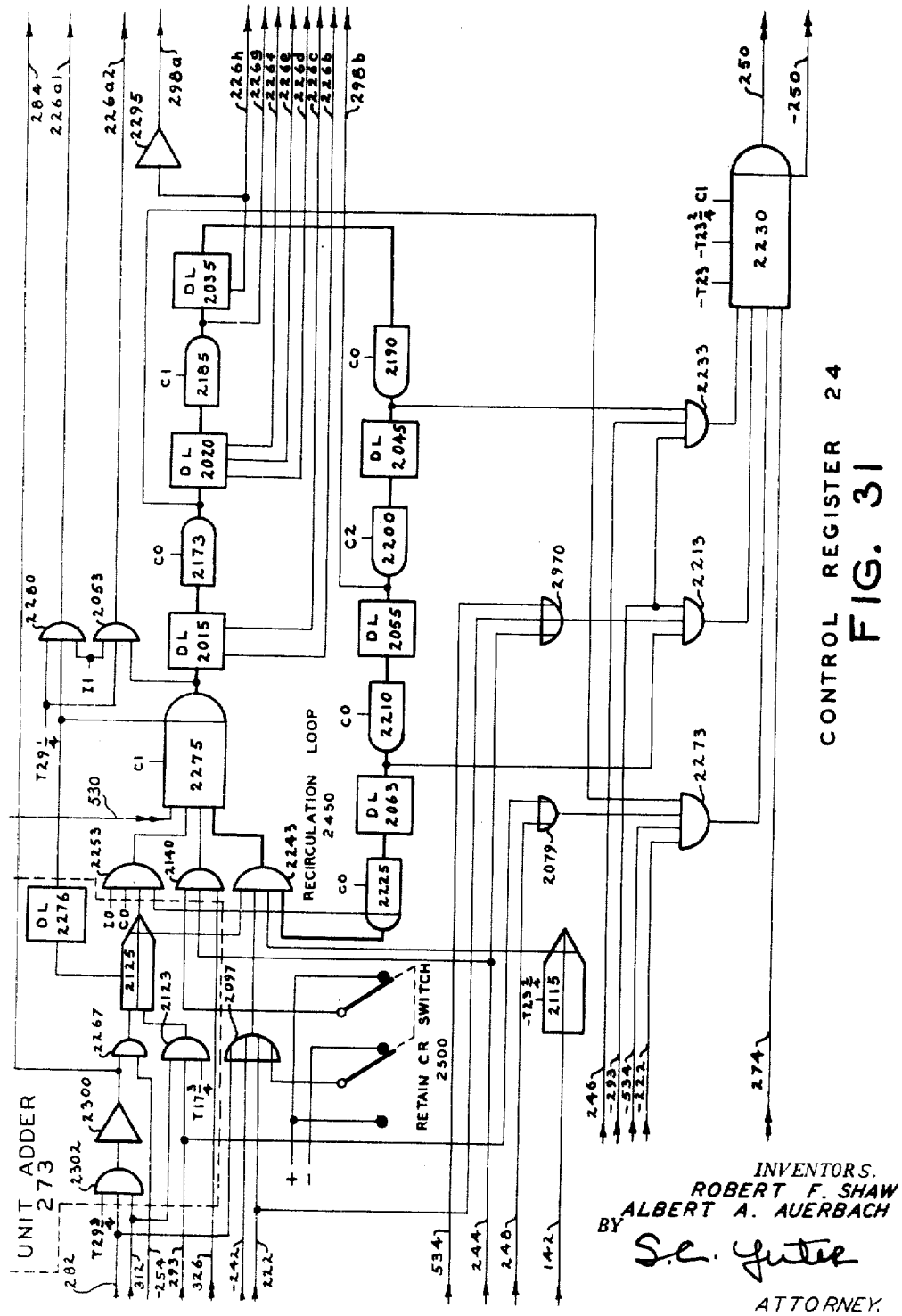

Fig. 31 shows the circuit of the control register.

Figure 32:
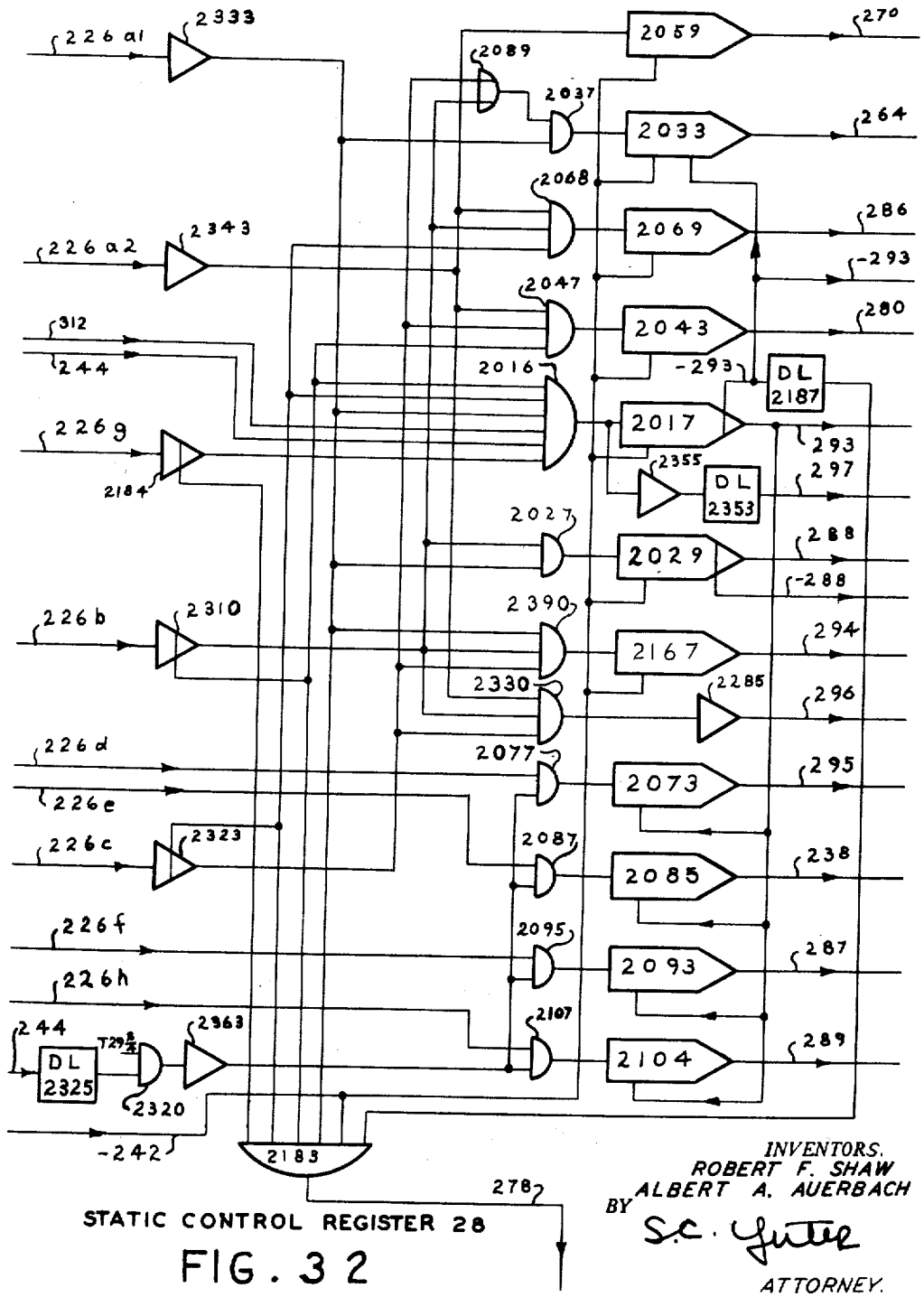

Fig. 32 illustrates the static control register circuit.

Figure 33:
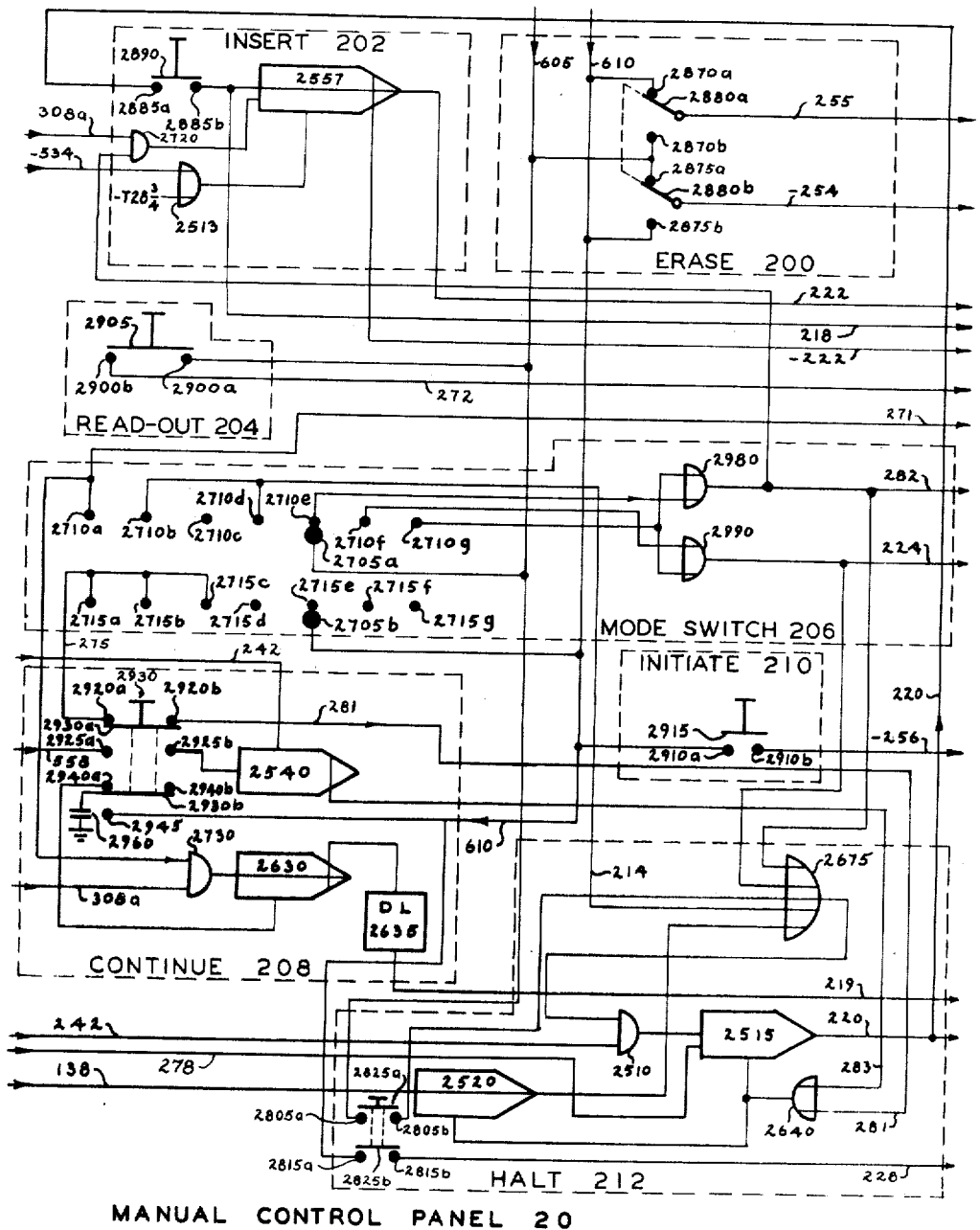

Fig. 33 shows the manual control panel circuitry which includes the erase, the insert, the read-out, the mode switch, the continue, the initiate, and the halt circuits.

Figure 34:
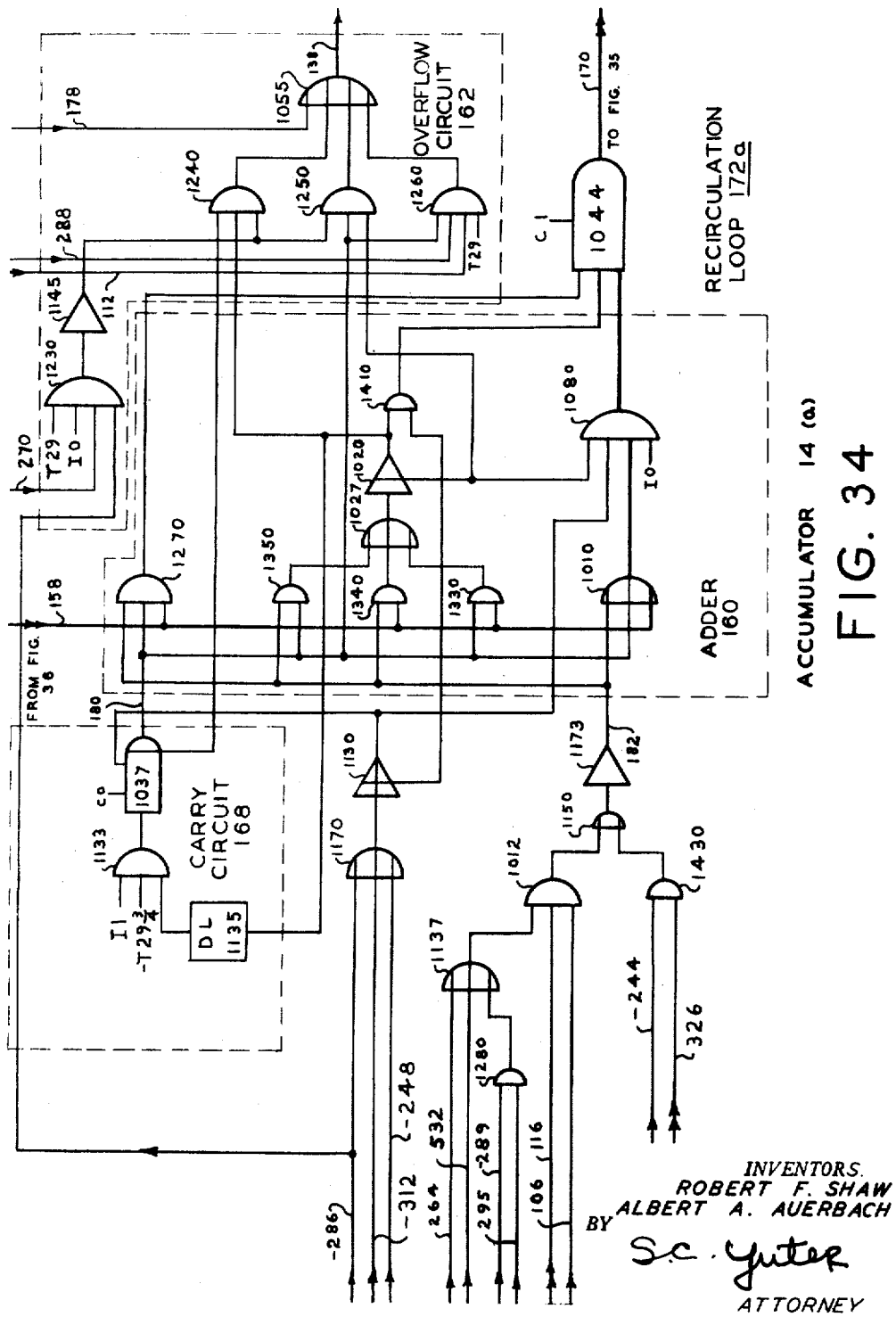
Figure 35:
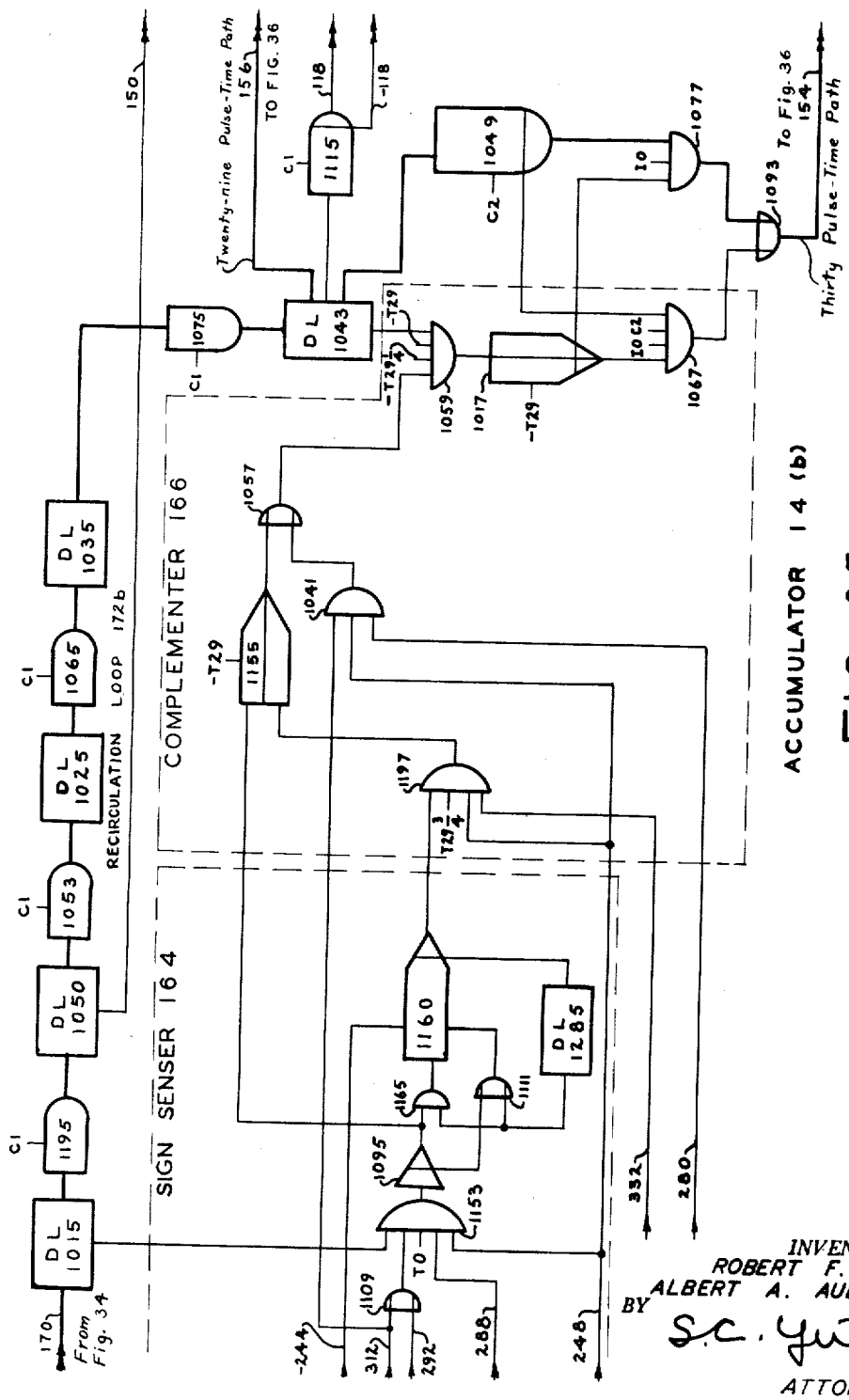
Figure 36:
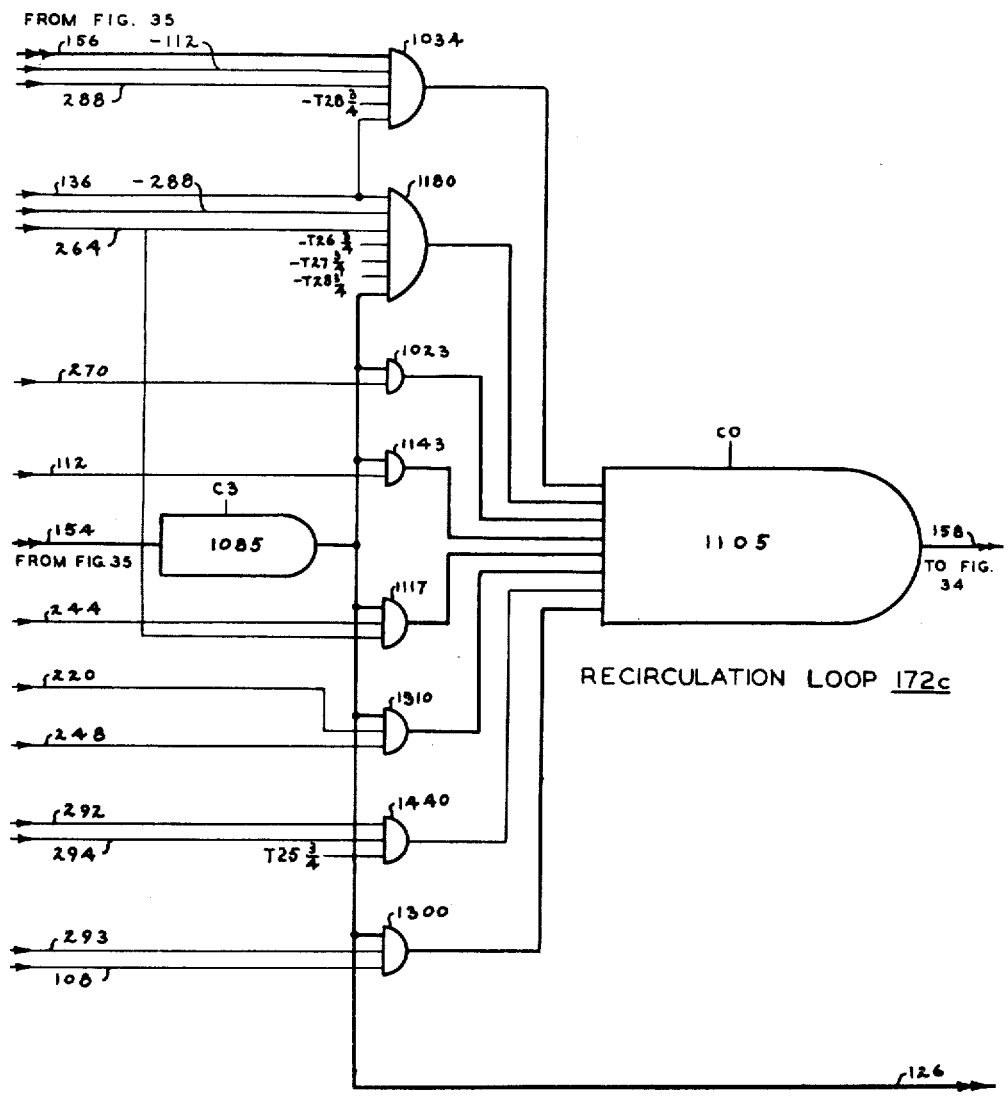

Figs. 34, 35, and 36 illustrate the circuitry of the accumulator.

Figure 37:
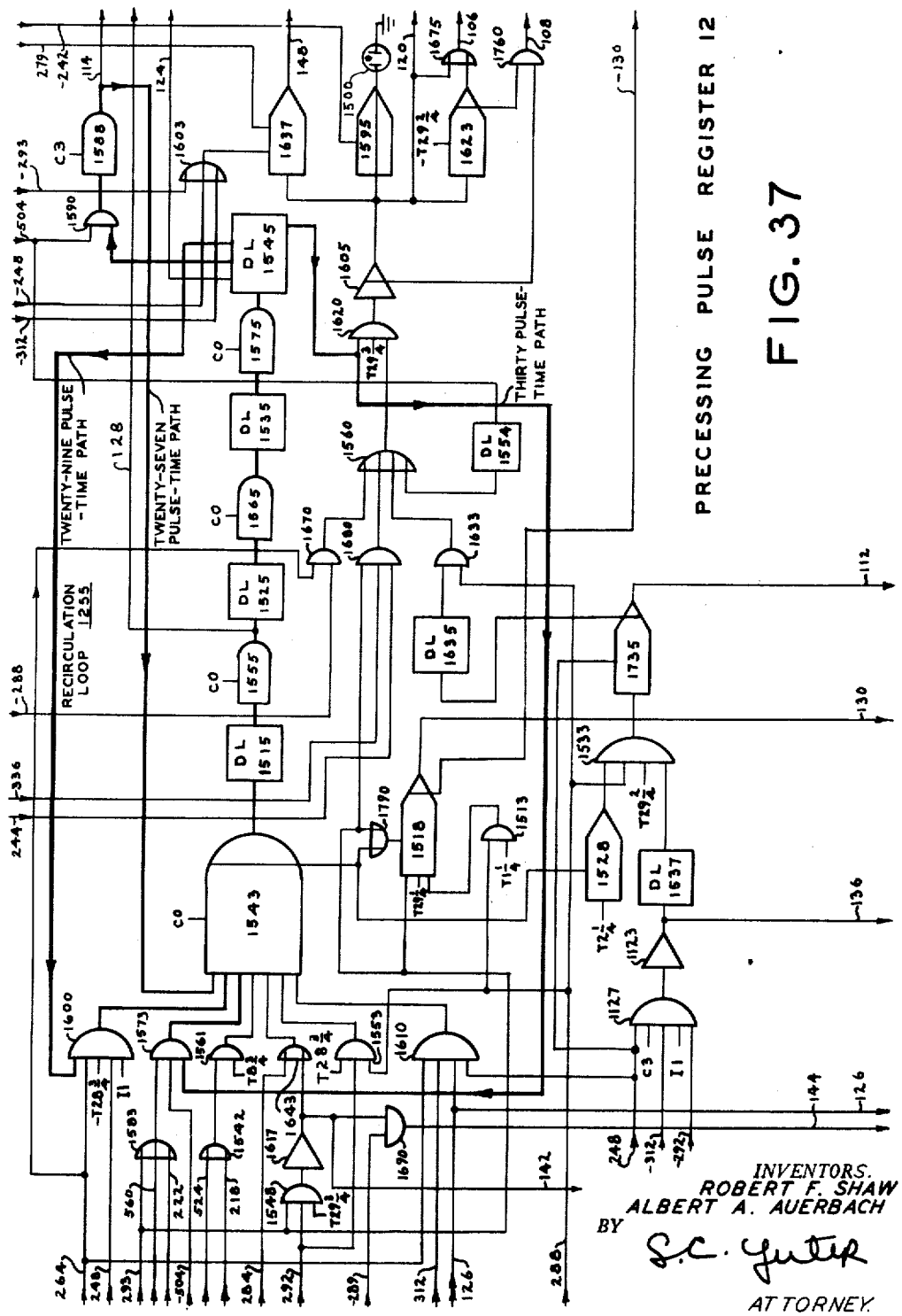

Fig. 37 shows the processing pulse register circuit.

Figure 38:
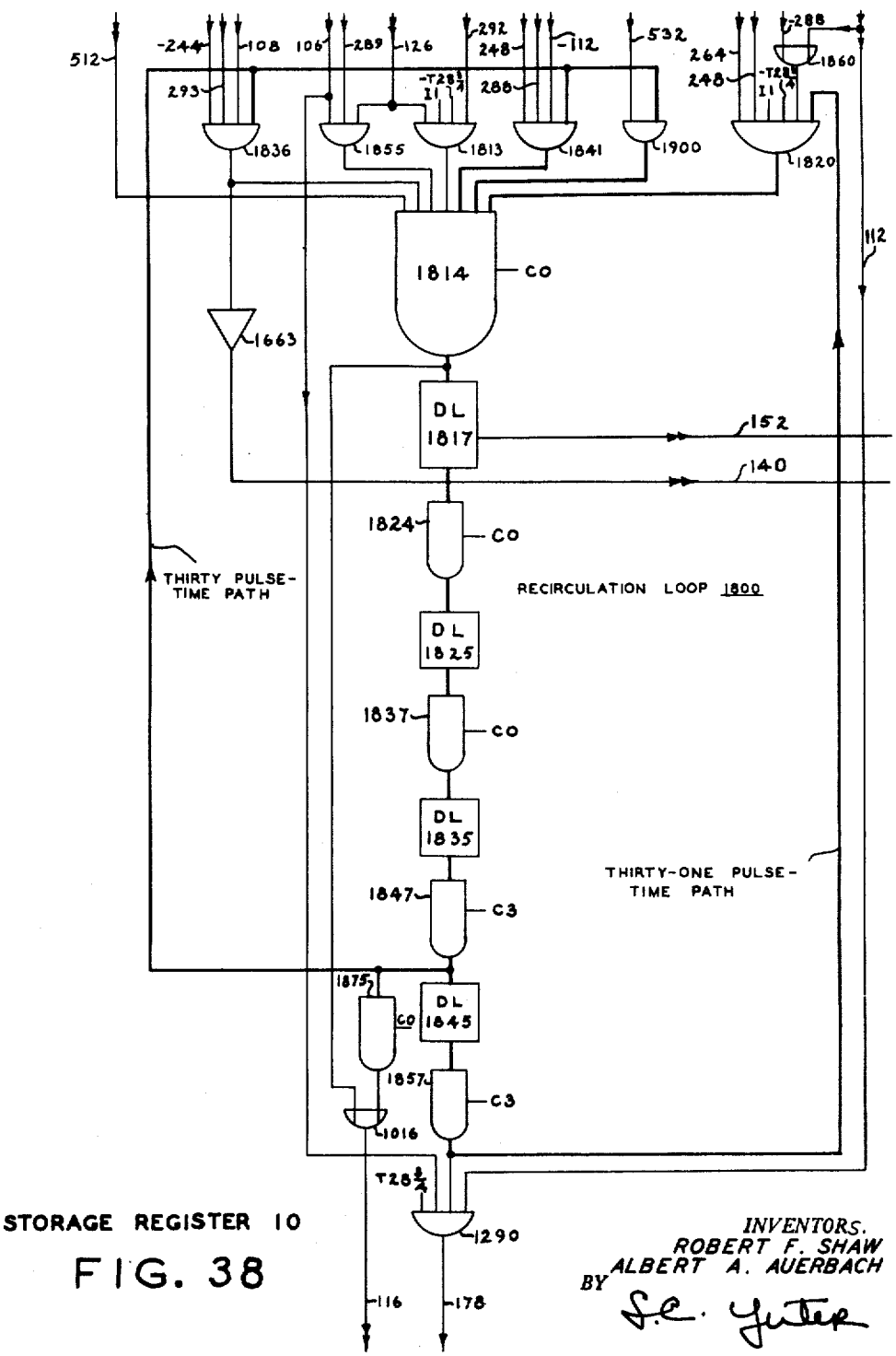

Fig. 38 shows the circuit of the storage register.

Figure 39:
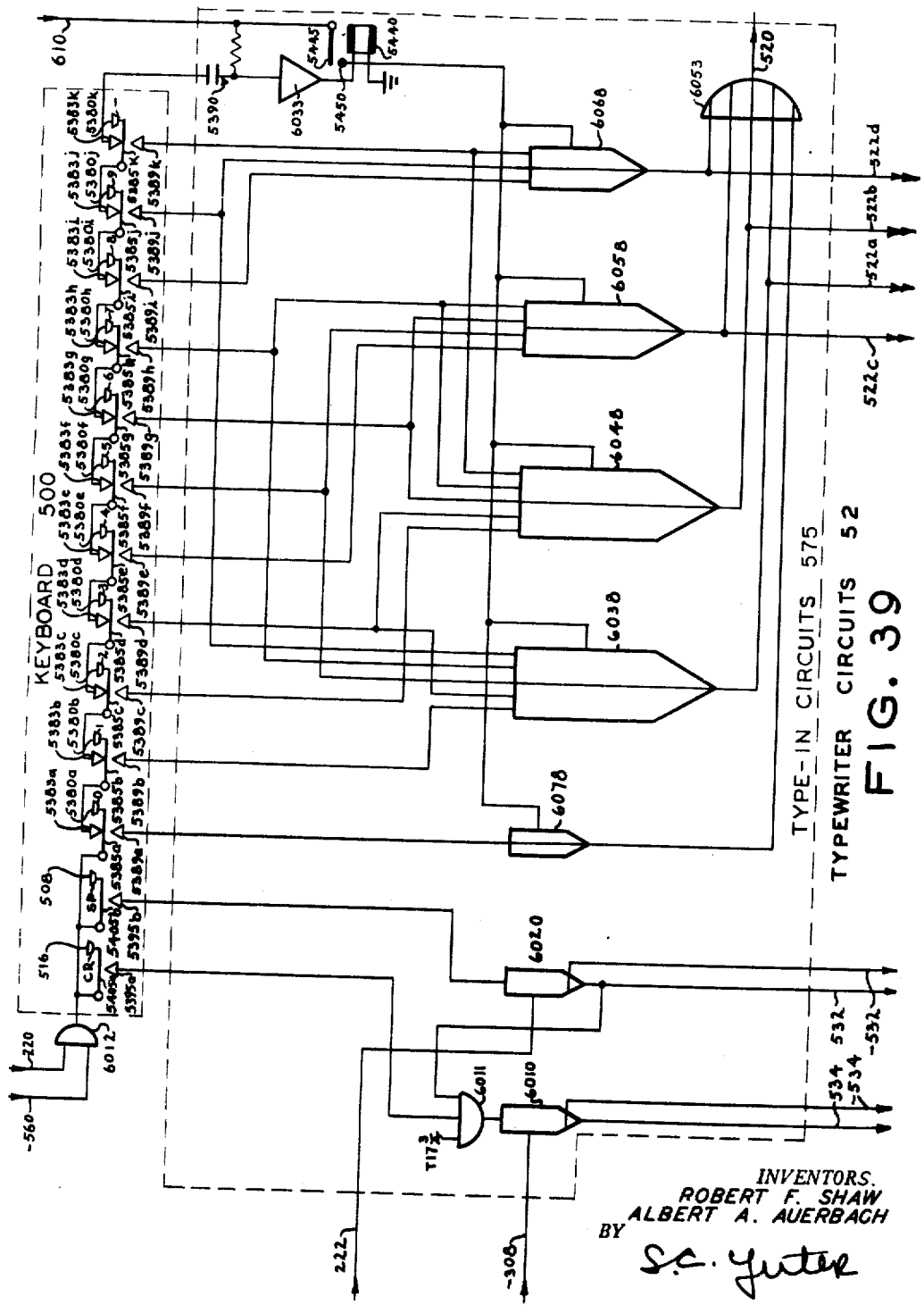
Figure 40:
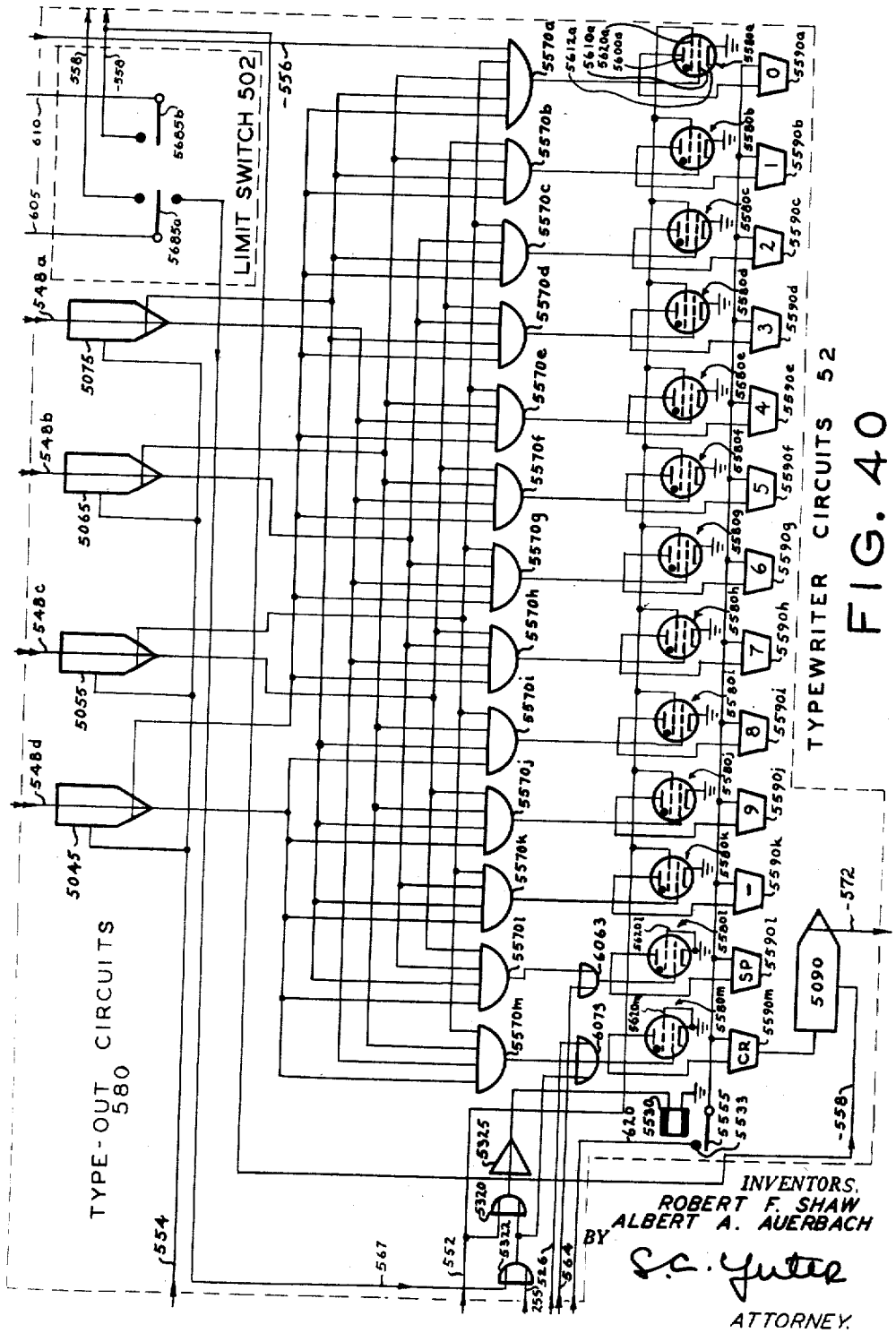

Figs. 39 and 40 illustrate the typewriter circuits.

Figure 41:
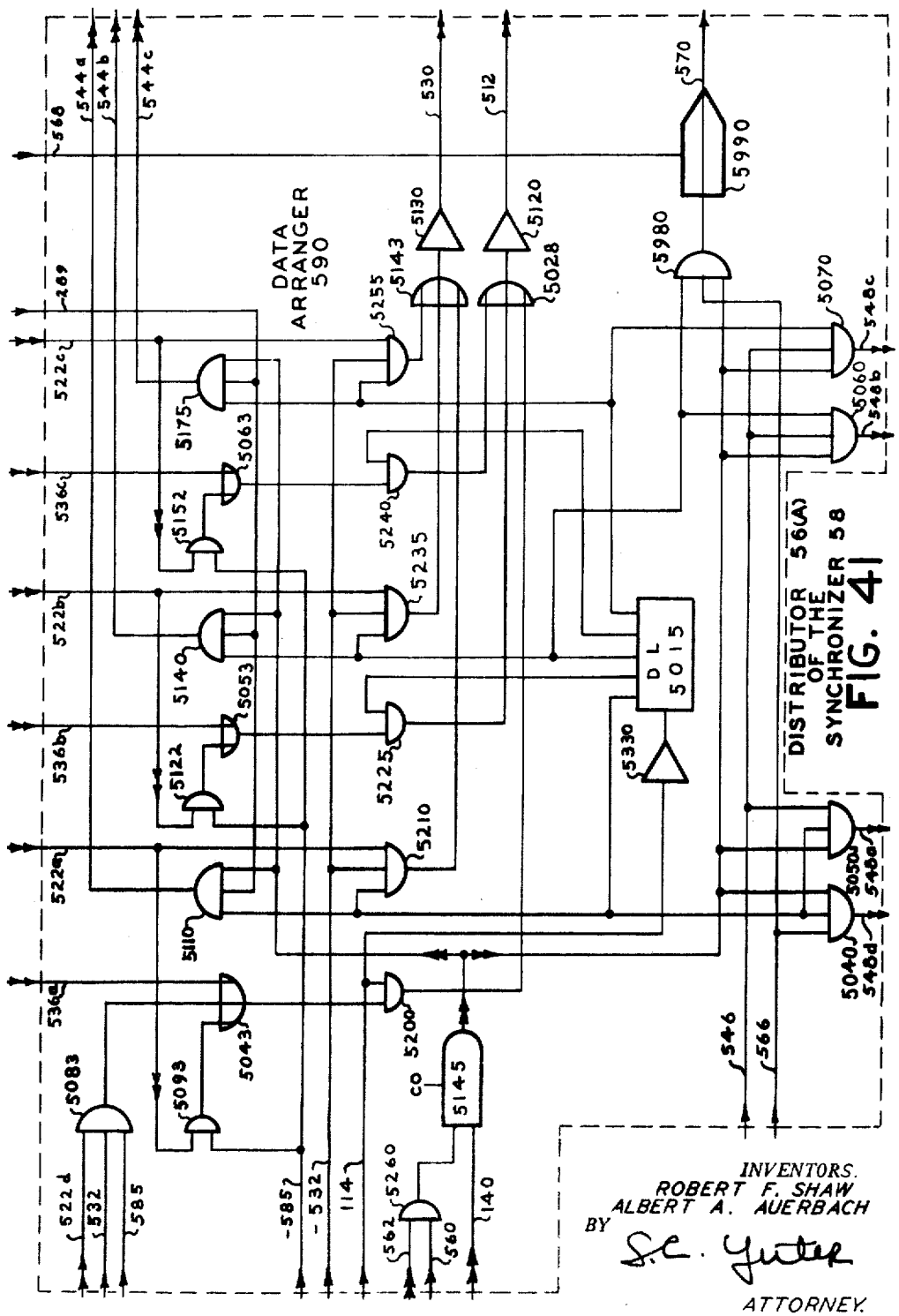
Figure 42:
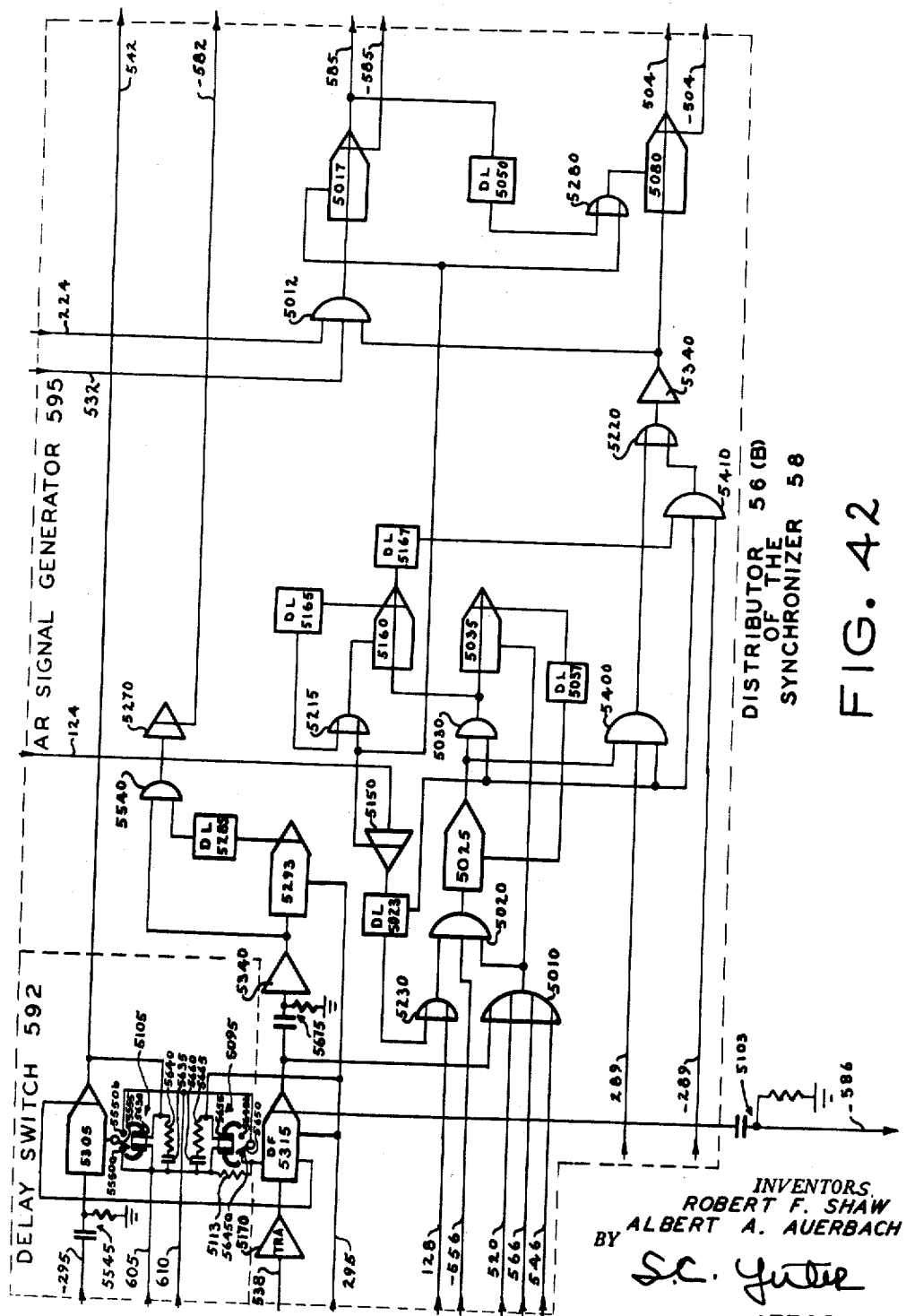

Figs. 41 and 42 illustrate the distributor circuit of the synchronizer.

Figure 43:
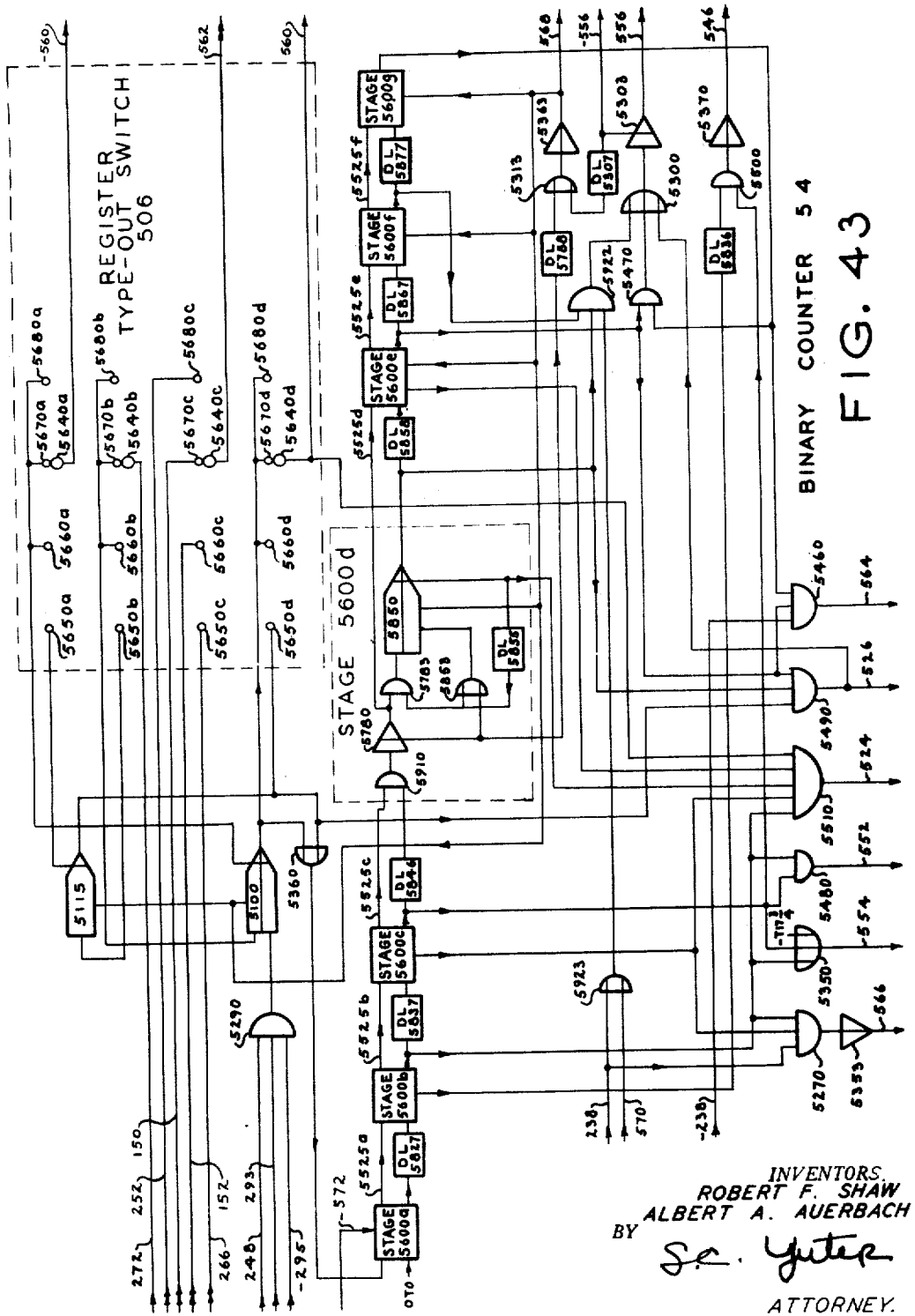

Fig. 43 illustrates the binary counter circuitry and the register type-out switch which are a part of the synchronizer.

Fig. 44 is a diagram of the tape unit circuitry.

A complete logical diagram of the computer system may readily be prepared by interconnecting the detailed logical diagrams in accordance with the connections shown in the various procedures.

TABLE OF CONTENTS

| Subject | Column |
|---|---|
| I. Digital Computer Apparatus | 1 |
| II. Introduction | 3 |
| III. General Signal Flow | 17 |
| IV. Initial-Clear | 19 |
| V. Insert Octal | 19 |
| VI. Insert Bi-Octal | 23 |
| VII. Fill Octal | 27 |
| VIII. Fill Bi-Octal | 31 |
| IX. Erase | 33 |
| X. Halt | 33 |
| XI. Continuous Operation | 34 |
| XII. One-Instruction | 34 |
| XIII. One-Step | 35 |
| XIV. Addition | 35 |
| XV. Subtraction | 38 |
| XVI. Logical Multiplication | 41 |
| XVII. Low Order Multiplication | 44 |
| XVIII. High Order Multiplication | 48 |
| XIX. Multiplication with Roundoff | 53 |
| XX. Branch Instruction | 53 |
| XXI. Tape-Read | 56 |
| XXII. Tape-Reverse | 60 |
| XXIII. Tape-Record | 60 |
| XXIV. Octal Type-Out | 64 |
| XXV. Bi-Octal Type-Out | 68 |
| XXVI. Register Type-Out | 73 |
| XXVII. Description of Symbols | 77 |
| XXVIII. Gate | 77 |
| XXIX. Buffer | 79 |
| XXX. Delay Line | 80 |
| XXXI. Pulse Amplifier | 80 |
| XXXII. Reshaper | 81 |
| XXXIII. D.-C. Amplifier | 82 |
| XXXIV. Tape-Reading Amplifier | 84 |
| XXXV. Drum-Reading Amplifier | 85 |
| XXXVI. Set Dominant Flip Flop | 85 |
| XXXVII. Reset Dominant Flip Flop | 86 |
| XXXVIII. Delay Flop | 87 |
| XXXIX. Write Amplifier | 88 |
| XL. Tape-Writing Amplifier | 90 |
| XLI. Introduction to Detailed Description | 90 |
| XLII. Memory Drum 38 | 91 |
| XLIII. Cycling Unit 34 | 92 |
| XLIV. W Generator 300 | 97 |
| XLV. Drum-Read and Record 37 | 97 |
| XLVI. The Memory Channel Selector 32 | 100 |
| XLVII. The Timing Selector 30 | 103 |

TABLE OF CONTENTS—Continued

| Subject | Column |
|---|---|
| XLVIII. Step Counter 22 | 106 |
| XLIX. Sequencer 26 | 111 |
| L. The Control Counter 29 | 111 |
| LI. Branch Circuit 27 | 114 |
| LII. Control Register 24 | 115 |
| LIII. The Static Control Register 28 | 121 |
| LIV. Manual Control Panel 20 | 126 |
| LV. The Accumulator 14 | 129 |
| LVI. Precessing Pulse Register 12 | 140 |
| LVII. Storage Register 10 | 146 |
| LVIII. Typewriter Circuits 52 | 149 |
| LIX. Synchronizer 58 | 154 |
| LX. Distributor 56 | 154 |
| LXI. Binary Counter 54 | 162 |
| LXII. Tape Unit 50 | 167 |
| LXIII. Conclusion | 168 |

III. GENERAL SIGNAL FLOW

Figure 1:
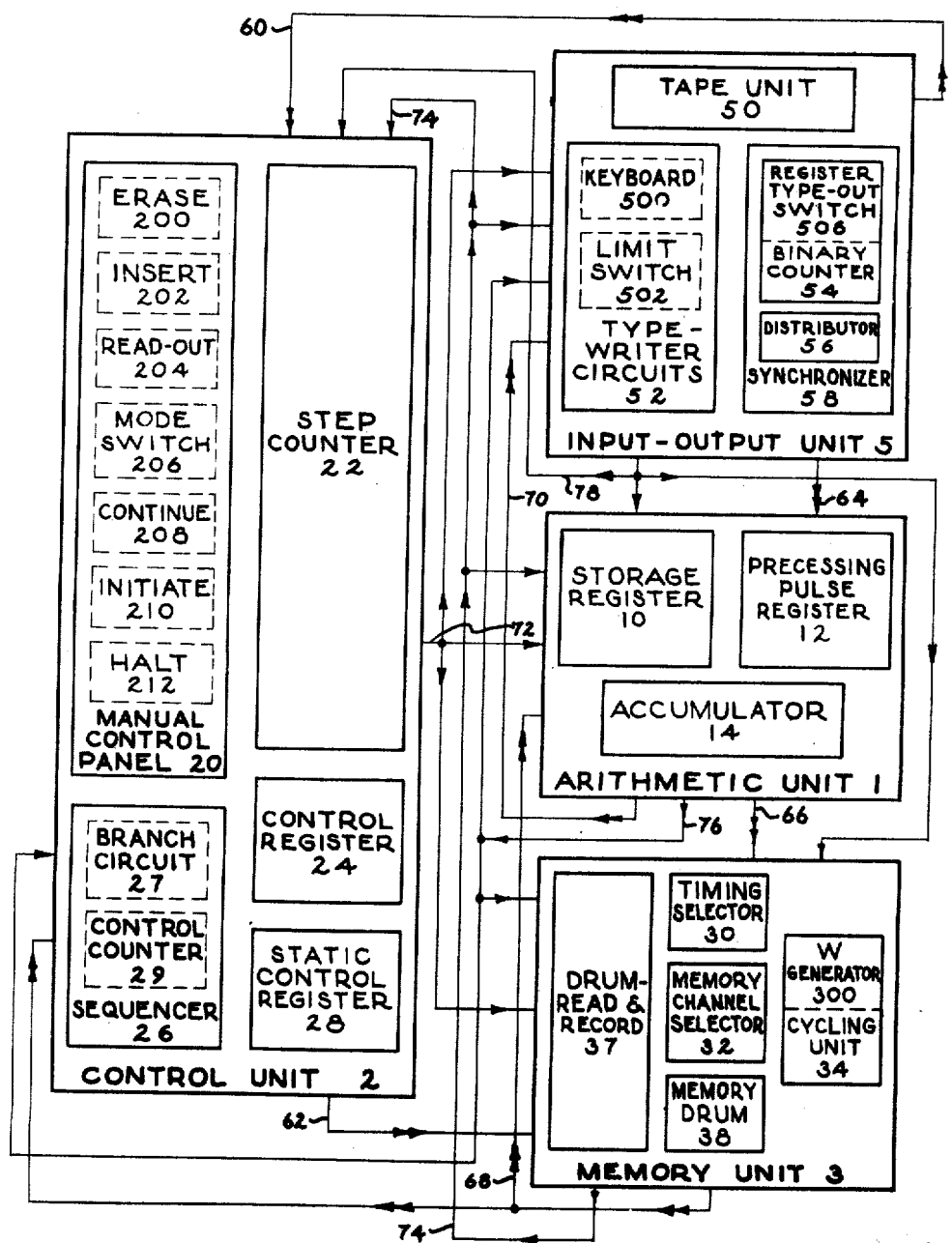
Fig. 1 is a diagrammatic chart in which the basic units of the computer system are shown in block symbol form and the general signal flow for the various procedures the computer system performs is illustrated.

The general signal-flow diagram shown in Fig. 1 illustrates the general flow of information signals, address information signals, and control signals in the computer system. The lines that connect the blocks which denote the basic units represent cables which may contain a plurality of wires through which electrical signals are transmitted. The flow of information signals and address information signals is indicated more particularly by double arrowheads on the lines which represent the cables. The flow of control signals is along lines designated by single arrowheads. The polarity of the various signals will not be indicated except where necessary, as in the case of the sub-unit descriptions which will hereinafter be described in greater detail.

The computer system includes the following basic units: the arithmetic unit 1, the control unit 2, the memory unit 3, and the input-output unit 5.

The arithmetic unit 1, whose primary function is to arithmetically manipulate information signals, comprises the storage register 10, the precessing pulse register 12, and the accumulator 14.

The control unit 2, the primary function of which is to direct the sequence of operations of the computer system, comprises the manual control panel 20, the step counter 22, the control register 24, the sequencer 26 (which includes the branch circuit 27 and the control counter 29), and the static control register 28.

The memory unit 3, whose fundamental operations are to store information and to generate cyclical or timing signals, comprises the timing selector 30, the memory channel selector 32, the cycling unit 34 (including the W generator 300), the drum-read and record 37, and the memory drum 38.

The input-output unit 5, whose basic functions are to receive and encode typed-in information, to decode and type-out information, and to read information from the magnetic tape and record information on the magnetic tape, comprises the tape unit 50, the typewriter circuits 52 (including the keyboard 500 and the limit switch 502), and the synchronizer 58 (which includes the binary counter 54 to which the register type-out switch 506 is coupled, and the distributor 56).

Pulse signals which represent parts of words of information are generated in the input-output unit 5 when characters are typed on the keyboard 500. These information signals are passed via the input information cable 64 to the arithmetic unit 1 and are assembled into a signal which represents a complete word of information which is then fed from the arithmetic unit 1 via the arithmetic information cable 66 to the memory unit 3. The memory unit 3 stores the information signal representing the word until a subsequent operation replaces it with a different word.

When information signals are to be inserted into the computer system and stored in the memory unit 3, signals which represent addresses are generated in the input-output unit 5 as a result of the operation of the keyboard 500 and are transmitted via the input address cable 60 to the control unit 2, and from the control unit 2 via the control address cable 62 to the memory unit 3. The memory unit 3 utilizes the address information signals to locate positions in which to store signals which represent words of information. Address information signals may also be generated in the control unit 2 and are fed via the control address cable 62 to the memory unit 3.

When an arithmetic operation is to be performed on words of information, the necessary information signals are transmitted from the memory unit 3 via the memory information cable 68 to the arithmetic unit 1 where the arithmetic operation is performed. The signal representing the result of any particular arithmetic operation is fed from the arithmetic unit 1 via the arithmetic information cable 66 to the memory unit 3 and is stored. The address information signals which designate the positions in the memory unit 3 from which the words on which the arithmetic operation is to be performed are to be taken and in which the resulting information signal is to be stored, are fed from the memory unit 3 via the memory information cable 68 to the control unit 2, and then are transmitted at the proper time via the control address cable 62 back to the memory unit 3.

When information is to be recorded on tape or typed out in the input-output unit 5, the address information signal, which designates the information signal stored in the memory unit 3 to be recorded on tape or decoded and typed-out, is fed from the control unit 2 via the control address cable 62 to the memory unit 3. The designated information signal is fed from the memory unit 3 via the memory information cable 68 to the arithmetic unit 1 and from the arithmetic unit 1 is passed via the output information cable 70 to the input-output unit 5 which records the information on tape or decodes it and performs the specified typing operation.

When a computer system procedure other than a manually controlled procedure is to be performed, an address information signal is fed from the control unit 2 via the control address cable 62 to the memory unit 3 and is utilized to locate a stored signal which represents a word of information. This word of information (called the instruction signal) contains the instruction as to what procedure to follow and may contain the addresses of operands and an address for the resultant information produced by by the operation. The instruction signal is passed via the memory information cable 68 to the control unit 2 and operates to generate signals in the control unit 2 which are distributed via the procedure control cable 72 as required to the arithmetic unit 1, the memory unit 3, and the input-output unit 5, in order to initiate the procedure which is designated by the instruction signal. The control unit 2 also periodically forwards address information signals via the control address cable 62 to the memory unit 3 in order to locate the operands for the performed operations and to locate the address in which the result is to be stored.

Each of the basic units other than the control unit 2 may also generate control signals when necessary which function to aid the computer system to perform designated operations. The memory unit 3 may transmit control signals via the memory control cable 74 to any of the other basic units. The arithmetic unit 1 feeds control signals to any of the other basic units via the arithmetic control cable 76. The input-output unit 5 transmits control signals to any of the other three basic units via the input-output control cable 78.

In the detailed description of the various procedures which follow, no attempt will be made to describe the flow of the cyclical signals which are distributed by the cycling unit 34. The effect of cyclical signals will be described in the sections which disclose the details of the sub-units. It should be understood, however, that cyclical signal flow is an integral part of the control signal flow and is generally excluded only for the purpose of clarity.

Those control signals which are utilized to inhibit the flow of other signals are discussed only when they contribute to the continuity of the description of signal flow. The presence and purpose of the inhibiting control signals will be specifically indicated hereinafter.

It should be understood that, where information, words of information, or addresses are referred to as being present in the computer, what is meant is the presence of an equivalent signal. For example, if it were to be stated that a word of information is circulating in the storage register 10, what is meant is that a signal which represents that word of information is circulating in the storage register 10.

Additionally, reference will be made to pulses, signals, and pulse signals. A reference to a pulse is a reference to a single pulse. A signal or a pulse signal is to be understood to mean one pulse or the plurality of pulses which constitute the signal.

IV. INITIAL-CLEAR

Figure 2:
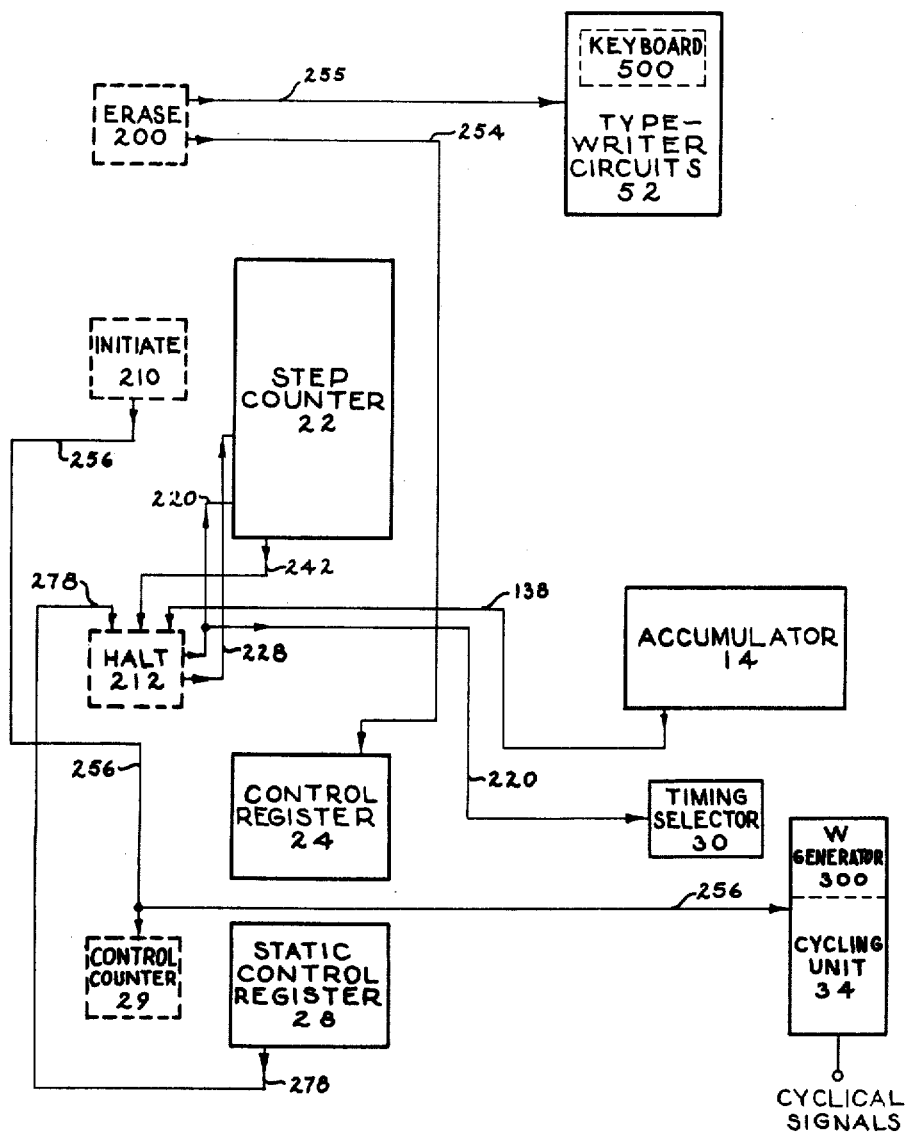
Fig. 2 is a block diagram which illustrates the signal flow during the initial clear, erase and halt procedures.

The initial-clear procedure illustrated in Fig. 2 is a manually controlled procedure which is used when the computer system is to be initially operated with a 000 sequence-directing address in the control counter 29.

The operation of an initiate switch (not shown) in the initiate 210 produces an inhibiting signal AG. AG is fed via the AG line 256 to the control counter 29 and to the cycling unit 34.

AG functions in the control counter 29 to block the circulation of any sequence-directing address which may be circulating in pulse form in the control counter 29 and, thus, effectively changes the sequence-directing address to 000.

AG operates within the cycling unit 34 to interrupt the generation of the cyclical signals so that the generation of the cyclical signals in the cycling unit 34 can be reinitiated without spurious signals being present.

The computer system is thus prepared to go as manually directed to the next procedure, for example, the insert octal procedure.

V. INSERT OCTAL

The computer system functions during the insert octal procedure to receive an address and a single word of information typed in octal form, to convert each octal digit of the address and the word of information to its equivalent expression in the binary digit system, to rearrange the binary digits in predetermined order and synchronize them with the timing of the computer system, and to insert the word of information in its binary form into the position on the memory drum 38 designated by the address.

Figure 3:
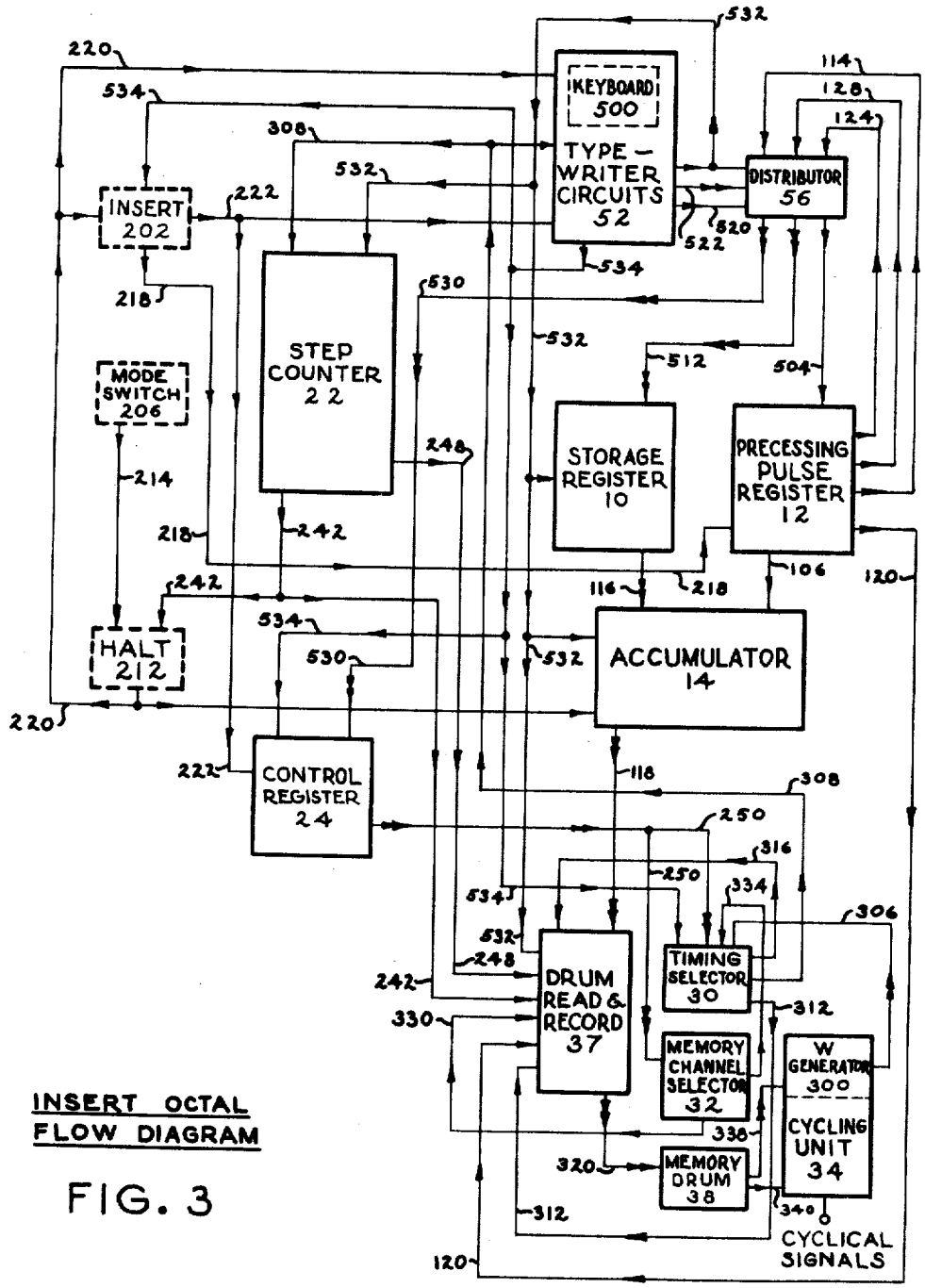
Fig. 3 is a block diagram which shows the signal flow during the insert octal procedure.

The manual operations which are performed to direct the insert octal procedure which is illustrated in Fig. 3 are begun by setting the mode switch 206 to the "insert octal" position. Then an insert switch (not shown) of the insert 202 is temporarily depressed. This prepares the computer system to receive data in the typewriter circuits 52. When these manual operations have been performed, the address (three octal digits) is typed on the keyboard 500. Then, the space bar (not shown) of the keyboard 500 is depressed preparatory to typing the word of information. Thereafter, the word of information (ten octal digits which are typed in standard order; that is, the most significant digit first) is inserted into the typewriter circuits 52. After all of the ten digits are typed, the carriage return key (not shown) of the keyboard 500 is operated completing the manual portion of the insert octal procedure.

The automatic portion of the octal procedure is begun at the K0 step. K0 is fed from the step counter 22 to the halt 212 via the K0 line 242. The mode switch 206 when set in the "insert octal" position sends a signal to the halt 212 via the mode switch output line 214. This signal enables the halt 212 to generate Y during the K0 step. Y is fed via the halt output line 220 to the accumulator 14, the typewriter circuits 52, and the insert 202. Y functions in the accumulator 14 to close a recirculation loop in order to prepare the accumulator 14 to receive and store a word of information. Y operates in the typewriter circuits 52 to aid in permitting the subsequent generation of a signal AH as will be hereinafter indicated.

The insert 202 produces the signals AF and V when the insert switch is operated while Y is present. AF, which occurs only for the duration of the operation of the insert switch, is forwarded via the insert output line 218 to the precessing pulse register 12 and functions to gate a control pulse into a recirculation loop within the precessing pulse register 12. V, which is a continuing signal, is transmitted to the control register 24 and the typewriter circuits 52 via the insert V line 222. V functions within the control register 24 to close a recirculation loop which will receive and store the address. V operates in the typewriter circuits 52 in conjunction with Y to aid in permitting the subsequent generation of the signal AH.

The computer system is now prepared to receive the address. When an octal digit of the address is typed, the three continuing signals BA, BB and BC are generated in the typewriter circuits 52 which express the octal digit in binary form. BA, BB and BC are transmitted simultaneously to the distributor 56 via the distributor input cable 522 and remain present in the distributor 56 long enough for the latter to operate properly. The typing of an octal digit of the address also generates a signal AV within the typewriter circuits 52 which is forwarded to the distributor 56 via the AV line 520.

During this time, the control pulse circulating in the precessing pulse register 12 (as a result of AF) has been generating two pulses AW1 and AW2 at predetermined times in every minor cycle. AW1 and AW2 are forwarded to the distributor 56 via the AW1 line 124 and the AW2 line 128, respectively. AW1 and AW2 are utilized within the distributor 56 with AV to produce a continuing signal AR which is of short duration.

AR is fed from the distributor 56 to the precessing pulse register 12 via the AR line 504 and functions to shift the circulating control pulse to a time position which is three pulse times earlier than the time position which the circulating control pulse originally occupied in a minor cycle. As a result, a pulse AS which is equivalent in time position to the shifted control pulse is forwarded from the precessing pulse register 12 to the distributor 56 via the AS line 114.

AS functions within the distributor 56 to convert BA, BB and BC to pulse form and to distribute these pulses in the three pulse times through which the shift was made and in the order in which the computer system is designed to handle them (least significant digit first). This three pulse signal is designated AP. AS further functions to synchronize these pulses with the timing of the remainder of the computer system, and to permit the pulses to be transmitted to the control register 24 via the AP output line 530.

When the three octal digits of the address have been typed on keyboard 500 (as explained above), AS will have been shifted three times. Since each shift comprises three pulse times, AS shifts a total of nine pulse times. An AP will have been serially distributed, least significant digit first in each three pulse position group. The least significant digit of each AP will occur three pulse times earlier in time than the least significant digit of the AP which represents the next most significant octal digit. Therefore, the binary representations of the three octal digits of the address will be arranged serially in the nine pulse times so that the least significant binary digit of the least significant octal digit occurs first in time and the most significant binary digit of the most significant octal digit occurs last in time. In this order, the address circulates within the control register 24.

The space bar of the keyboard 500 is operated after the three octal digits of the address have been typed. This operation generates the continuing signal AH in the typewriter circuits 52 due to the presence of V and Y as previously mentioned. AH is transmitted via the AH line 532 to the distributor 56, the accumulator 14, the storage register 10, the step counter 22, and the drum-read and record 37.

In the distributor 56, AH inhibits the further flow of signals to the control register 24. AH acts in the accumulator 14 to assist in permitting the subsequent entry of the word of information. In the storage register 10, AH functions to close a recirculation loop which will receive and store the word of information. AH operates in the step counter 22 to step the computer system from K0 to K3 and functions within the drum-read and record 37 to send the word of information to the memory drum 38. In summary, AH functions to aid in preparing the computer system to receive the word of information.

The word of information (ten octal digits) is then inserted most significant digit first into the typewriater circuits 52. Each octal digit is immediately expressed in binary form in the typewriter circuits 52 by the signals BA, BB and BC as explained above in connection with each octal digit of the address. BA, BB and BC are forwarded via the distributor input cable 522 to the distributor 56. BA, BB and BC remain in the distributor 56 until they are later arranged, synchronized, and distributed in pulse form.

As previously explained for the insertion of a digit of the address, an AV is generated in the typewriter circuits 52 for each insertion of a digit of the word of information and a subsequent AR occurs. The presence of AR in the distributor 56 now causes a three pulse shift of the circulating control pulse in the precessing pulse register 12 and the resulting AS pulse is forwarded to the distributor 56 via the AS line 114 as occurred for the insertion of an address digit.

AS is utilized in the distributor 56 to convert BA, BB and BC to pulse form and to arrange and synchronize the pulses in a three pulse signal AL which is distributed in the three pulse times through which the shift was made. As a result of AS, AL representing the octal digit typed, is then forwarded to the storage register 10 via the AL line 512. In this manner, an octal digit is represented in three sequential pulse positions. The least significant binary digit is represented in the earliest pulse position and the most significant binary digit is represented in the third pulse position.

As the second (and each successive) digit is typed, it is represented in the storage register 10 in three pulse positions as explained above. Each AL is distributed in a minor cycle so as to immediately precede in time the AL representing the octal digit inserted previously. As a result, the ten octal digits of the word of information occupy a total of thirty pulse positions (the time length of a minor cycle), and the least significant binary digit of the least significant octal digit appears in the earliest pulse position. The pulses which represent the word of information are thus arranged in the storage register 10 in the order in which the computer system is designed to handle them.

When the control pulse circulating within the precessing pulse register 12 is shifted the three pulse positions for the least significant octal digit which is typed last, it has been shifted through a minor cycle. The control pulse then functions to generate a gating signal in the precessing pulse register 12 which is fed via the accumulator gating line 106 to the accumulator 14 and which, with AH being present, enables the accumulator 14 to receive the arranged word of information, which is transferred via the storage register output line 116 from the storage register 10 to the accumulator 14 and circulates in the recirculation loop closed by Y.

At the same time as the gating signal is generated, a pulse BL is generated within the precessing pulse register 12 as a result of the last shift of the control pulse. BL is fed via the BL output line 120 to the drum-read and record 37 and will function therein with AH to prepare the drum-read and record 37 to send the word of information to the memory drum 38.

After the word of information has been typed, the carriage return key of the keyboard 500 is operated and a continuing signal AI is generated in the typewriter circuits 52. AI is fed via the AI line 534 to the insert 202, the control register 24, and the timing selector 30. In the insert 202, AI terminates V. The termination of V operates in the typewriter circuits 52 to end AH, thus preparing the computer system to complete the procedure.

In the control register 24, AI establishes a path via the address output line 250 to the timing selector 30 and the memory channel selector 32 so that the address circulating in the control register 24 will be sampled by the timing selector 30 and the memory channel selector 32. The memory channel selector 32 utilizes part of the address to generate a signal on a line (designated by the address) of a group of relay selecting lines 330 which feed the drum-read and record 37. Each of the relay lines 330 is associated with a designated channel on the memory drum 38. This signal operates one of the relays (not shown) in the drum-read and record 37 and aids in enabling the drum-read and record 37 to send information to the designated channel via one of the memory drum input-output lines 320.

At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in each channel, are sequentially forwarded from the memory drum 38 via the W line 338 to the W generator 300, and then via W output line 306 from the W generator 300 of the cycling unit 34 to the timing selector 30. AI functions in the timing selector 30 to allow the timing selector 30 to compare the addresses circulating in the control register 24 with addresses W. When an address W is identical to the circulating address, the timing selector 30 generates a continuing signal FJD, a subsequent transfer pulse X, and then a continuing signal J.

FJD is transmitted via the FJD line 316 to the drum-read and record 37 where it aids in preparing the drum-read and record 37 to receive the word of information from the accumulator 14. X is fed via the X line 308 to the step counter 22 where it steps the computer system from K3 to K0, and to the typewriter circuits 52 where it terminates AI. J is sent via the J line 312 to the drum-read and record 37 where it will later operate to prepare drum-read and record 37 for reading from the memory drum 38 during the next procedure. Before K3 is superseded by K0 it is fed from the step counter 22 via the K3 line 248 to the drum-read and record 37 where it is delayed in the drum-read and record 37 and operates with FJD to prepare the drum-read and record 37 to receive the word of information. (The designation G will occasionally be used to represent any thirty pulse-time information signal when it is transmitted to the drum-read and record 37.)

The word of information G is transferred via the G output line 118 from the accumulator 14 to the drum-read and record circuits 37 and is sent from there to the memory drum 38 via the designated memory drum input-output line 320. It is recorded on the memory drum 38 in the position and channel indicated by the address.

Following the recording of the word on the memory drum 38, K0 which is fed via the K0 line 242 to the drum-read and record 37, operates with J to prepare the drum-read and record 37 for receiving information from the memory drum 38 if required to do so during the next procedure in the program.

Thus, during the insert octal procedure a word of information containing ten octal digits is recorded in predetermined order in a designated position on the memory drum 38.

VI. INSERT BI-OCTAL

The computer system functions during the insert bi-octal procedure to receive an address typed in octal form, to convert each octal digit of the address to its equivalent expression in the binary digit system, to receive a word of information typed in decimal form, to convert the decimal form into bi-octal representation, to convert the bi-octal representation of each decimal digit of the word of information to its equivalent expression in the binary system, to rearrange the binary digits of the address and the word of information in predetermined order and synchronize them with the timing of the remainder of the computer system, and to insert the word in its binary form into the position on the memory drum 38 designated by the address.

Figure 4:
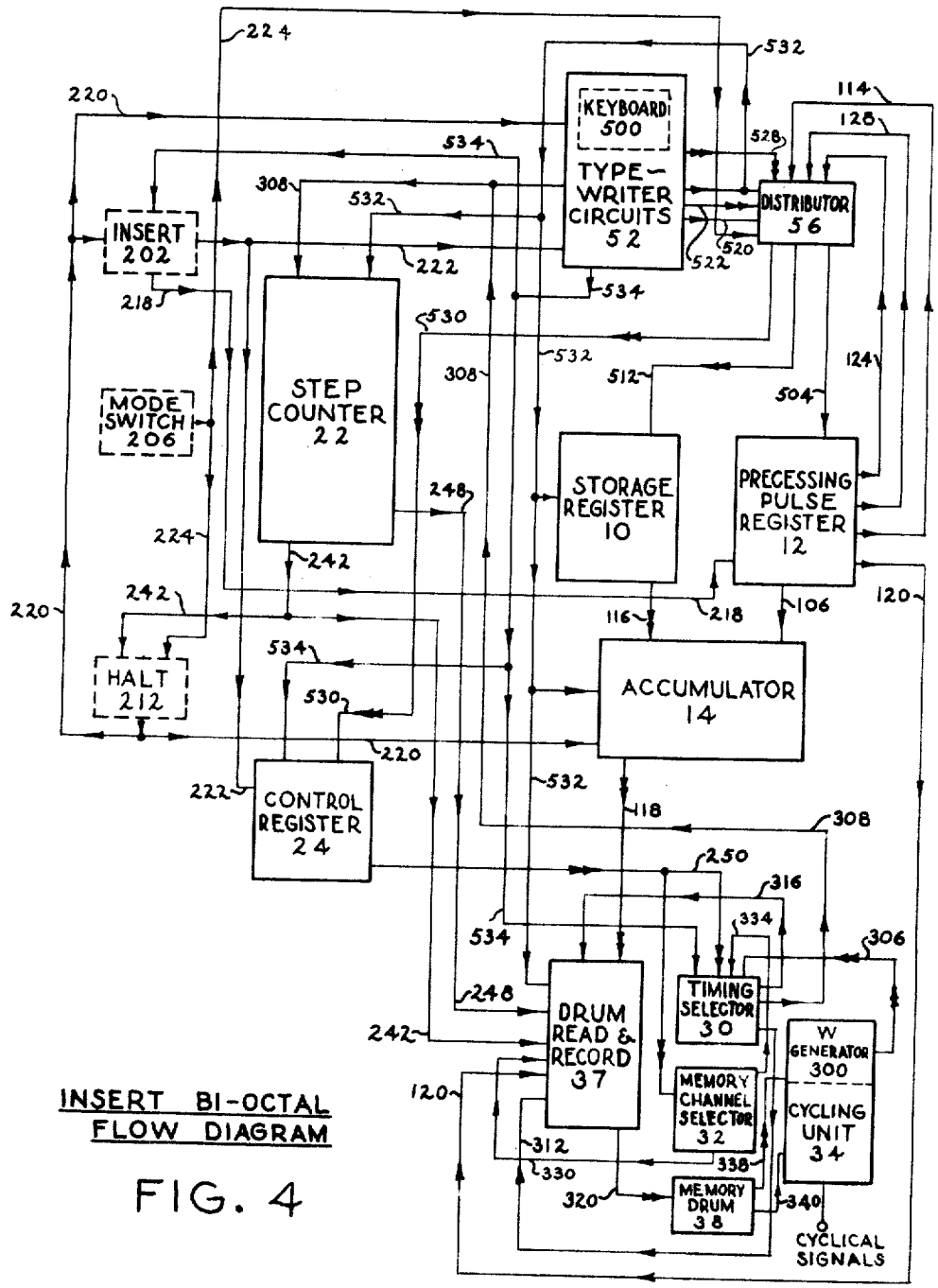
Fig. 4 shows the signal flow during the insert bi-octal procedure among block symbols representing the various components of the computer system.

The manual operations which are performed to direct the insert bi-octal procedure which is illustrated in Fig. 4 are begun by setting the mode switch 206 to the "insert bi-octal" position; the insert switch of the insert 202 is then temporarily depressed. This operation prepares the computer system to receive data in the typewriter circuits 52. When these manual operations have been performed, the address (three octal digits) is typed on the keyboard 500 of the typewriter circuits 52. This is followed by the operation of the space bar of the keyboard 500 preparatory to typing the word of information. Then the word of information (five decimal digits which are typed in standard order; that is, the most significant digit first) is inserted into the typewriter circuits 52. After all of the five decimal digits are typed, the carriage return key of the keyboard 500 is operated completing the manual portion of the insert bi-octal procedure.

The automatic portion of the bi-octal procedure is begun at the K0 step. K0 is fed from the step counter 22 to the halt 212 via the K0 line 242. The mode switch 206 when set in the "insert bi-octal" position sends a signal to the halt 212 via the AE line 224. This signal enables the halt 212 to generate Y during the K0 step. Y is fed via the halt output line 220 to the accumulator 14, the insert 202 and the typewriter circuits 52. Y functions within the accumulator 14 to close a recirculation loop which will receive and store the word of information. Y operates within the typewriter circuits 52 to aid in permitting the subsequent generation of a signal AH as will be shown.

When the insert switch is operated, the insert 202 produces the signals AF and V because of the presence of Y. AF, which occurs only for the duration of the operation of the insert switch, is forwarded via the insert output line 218 to the precessing pulse register 12 and functions to gate a control pulse into a recirculation loop within the precessing pulse register 12. V, which is a continuing signal, is transmitted via the insert V line 222 to the control register 24 and the typewriter circuits 52. V functions within the control register 24 to close a recirculation loop which will receive and store the address, V operates in the typewriter circuits 52 to help in permitting the subsequent generation of a signal AH as will be hereinafter indicated.

The placing of the mode switch 206 in the "insert bi-octal" position generates a signal AE. AE is transmitted via the AE line 224 from the mode switch 206 to the distributor 56 and remains present at the distributor 56. The function of AE is to aid in arranging the pulse representation of the word of information in proper order. AE is also fed to the halt 212 via the AE line 224 and insures the generation of Y.

The computer system is now prepared to receive the address which is typed on the keyboard 500 of the typewriter circuits 52. When an octal digit of the address is typed, three continuing signals BA, BB and BC are generated in the typewriter circuits 52. These signals express the octal digit in binary form. BA, BB and BC are transmitted to the distributor 56 via the distributor input cable 522 and remain present in the distributor 56 long enough for the latter to operate properly. When an octal digit of the address is typed, a signal AV is also generated within the typewriter circuits 52 and is forwarded via the AV line 520 to the distributor 56.

During this time, the control pulse recirculating in the precessing pulse register 12 has been generating two pulses AW1 and AW2 at predetermined times in every minor cycle. AW1 and AW2 are forwarded to the distributor 56 via the AW1 line 124 and the AW2 line 128, respectively. AW1 and AW2 are utilized within the distributor 56 with AV to produce a continuing signal AR which is of short duration.

AR is fed from the distributor 56 to the precessing pulse register 12 via the AR line 504 and functions to shift the circulating control pulse to a time position three pulse times earlier than the time position the circulating control pulse originally occupied in a minor cycle. As a result, a pulse AS which is equivalent in time position to the shifted control pulse is forwarded from the precessing pulse register 12 via the AS line 114 to the distributor 56. AS functions within the distributor 56 to convert BA, BB and BC to pulse form and to distribute these pulses in the three pulse times through which the shift was made and in the order in which the computer system is designed to handle them (least significant digit first). This three pulse signal is designated AP. AS further functions to synchronize these pulses with the timing of the remainder of the computer system, and to permit the pulses to be transmitted via the AP output line 530 to the control register 24.

When the three octal digits of the address have been typed on the keyboard 500 (as explained above), AS will have been shifted three times. Since each shift comprises three pulse times, AS shifts a total of nine pulse times. An AP will have been serially distributed least significant digit first in each three pulse position group. The least significant digit of each AP will occur three pulse times earlier in time than the least significant digit of the AP which represents the next most significant octal digit. Therefore, the binary representations of the three octal digits are arranged serially in the nine pulse times so that the least significant binary digit of the least significant octal digit occurs first in time, and the most significant binary digit of the most significant octal digit occurs last in time. In this order, the address circulates within the control register 24.

The space bar of the keyboard 500 is operated after the three octal digits of the address have been typed. This operation generates the continuing signal AH in the typewriter circuits 52 due to the presence of V as previously mentioned. AH is transmitted via the AH line 532 to the distributor 56, the accumulator 14, the storage register 10, the step counter 22, and the drum-read and record 37.

In the distributor 56, AH inhibits the further flow of signals to the control register 24. AH acts in the accumulator 14 to help in permitting the subsequent entry of the word of information. In the storage register 10, AH functions to close a recirculation loop which will receive and store the word of information. AH acts in the step counter 22 to step the computer system from K0 to K3, and functions within the drum-read and record 37 to aid the preparation of the drum-read and record 37 for sending the word of information to the memory drum 38. In summary, AH functions to aid in preparing the computer system to receive the word of information.

The word of information (five decimal digits) is then inserted most significant digit first into the typewriter circuits 52. Means (see Fig. 39) exist within the typewriter circuits 52 of Fig. 4, for the automatic bi-octal representation of decimal digits which are typed on the keyboard 500. Thus, when a decimal digit is typed, it is received in the typewriter circuits 52 as two octal digits. Each of these two octal digits is immediately expressed in binary form.

It will be recalled that decimal digits vary from 0 to 9. The decimal digits from 0 through 7 are each bi-octally expressed by a 0 followed by a second less significant octal digit (0 through 7) and the decimal digits 8 and 9 are bi-octally expressed by a 1 followed by a second less significant octal digit (0 or 1). Since the most significant octal digit is either a 0 or a 1 the most significant octal digit may be binarily expressed by only one binary digit, corresponding to the least significant binary digit of that octal digit. The other two binary digits of the octal digit are always zero, and thus no provision need be made for producing pulses in the corresponding positions. The signal equivalent of this least significant binary digit is hereinafter designated BD. The least significant octal digit of the bi-octal representation is a complete octal digit (that is, one in which any of the three binary digits may be either 0 or 1), the binary expression of which will be designated BA, BB, and BC as was the binary expression of an octal digit of the address.

When a decimal digit of the word of information is inserted into the typewriter circuits 52, the binarily expressed bi-octal equivalent is transmitted to the distributor 56. BA, BB, and BC are forwarded via the distributor input cable 522 to the distributor 56. BD is transmitted via the BD input line 528 to the distributor 56. BA, BB, BC, and BD remain in the distributor 56 until they are later arranged, synchronized, and distributed in pulse form.

As previously explained for the insertion of a digit of the address, an AV is generated in the typewriter circuits 52 for each insertion of a digit of the word of information, and a subsequent AR results. The presence of AH and AE with AR in the distributor 56 causes two successive shifts of the circulating control pulse in the precessing pulse register 12, and the two resulting AS pulses (three pulse portions apart) are forwarded via the AS line 114 to the distributor 56 as they successively occur.

The first AS is utilized to convert BD to pulse form, to synchronize BD with the timing of the remainder of the computer system, and to position BD in the least significant time position (the earliest) of the three pulse times provided by AS. The remaining two pulse positions are not filled. As a result of AS this three pulse time signal which is designated AL is forwarded from the distributor 56 via the AL line 512 to the storage register 10 which was previously prepared by AH to receive and store the word of information.

Thereafter, the second AS is utilized in the distributor 56 to convert BA, BB, and BC to pulse form and to arrange and synchronize the pulses. As a result of AS, a second AL occupying three pulse positions is then forwarded to the storage register 10 via the AL line 512 and stored in the three pulse positions preceding the AL representing the most significant bi-octal digit.

In this manner, a decimal digit is represented in six sequential pulse positions. The least significant binary digit of the least significant octal digit is represented in the earliest pulse position, and the most significant octal digit is represented by the presence or absence of a pulse in the fourth pulse position.

As the second (and each successive) decimal digit is typed, it is represented in six pulse positions as explained above. Each group of six pulse positions is distributed in the minor cycle so as to immediately precede the group representing the decimal digit inserted previously. As a result, the five decimal digits of the word of information are represented in a total of thirty pulse positions (the time length of a minor cycle). Therein the least significant binary digit of the least significant bi-octally coded decimal digit is represented in the earliest pulse position. The pulses representing the word of information are thus arranged in the order in which the computer system is designed to manipulate them.

When the control pulse circulating within the precessing pulse register 12 is shifted the three pulse positions for the least significant octal digit of the least significant bi-octally coded decimal digit, it has been shifted through a minor cycle. The control pulse then functions to generate a gating signal in the precessing pulse register 12 which is fed via the accumulator gating line 106 to the accumulator 14 and which, with AH being present, prepares the accumulator 14 to receive the arranged word of information which is transferred from the storage register 10 via the storage register output line 116 to the accumulator 14 and circulates in the recirculation loop closed by Y.

At the same time as the gating signal is generated, a pulse BL is generated within the precessing pulse register 12 as a result of the last shift of the control pulse. BL is fed bia the BL output line 120 to the drum-read and record 37 and will function therein with AH to prepare the drum-read and record 37 to send the word of information to the memory drum 38 via one of the memory drum input-output lines 320.

After the word of information has been typed, the carriage return key of the keyboard 500 is operated and a continuing signal AI is generated in the typewriter circuits 52. AI is fed via the AI line 534 to the insert 202, the control register 24, and the timing selector 30. In the insert 202, AI terminates V. The termination of V operates in the typewriter circuits 52 to end AH thus preparing the computer system to complete the procedure.

In the control register 24, AI establishes a path via the address output line 250 to the timing selector 30 and the memory channel selector 32 so that the address circulating in the control register 24 will be sampled by the timing selector 30 and the memory channel selector 32.

The memory channel selector 32 utilizes one part of the address to generate a signal on one line (designated by the address) of a group of relay selecting lines 330 which feed the drum-read and record 37. Each of the relay lines 330 is associated with a designated channel on the memory drum 38. This signal operates one of the relays (not shown) in the drum-read and record 37 and aids in enabling the drum-read and record 37 to send information to the designated channel of the memory drum 38 via one of the memory drum input-output lines 320.

At the same time that relay operation is initiated, the memory channel selector 32 sends a signal AJ via the AJ line 334 to the timing selector 30 where AJ temporarily prevents the generation of signals until the selected relay has had time to complete its operation.

During this time, addresses W are sequentially forwarded from the memory drum 38 via the W line 338 to the W generator 300 of cycling unit 34, and then via the W output line 306 from the W generator 300 to the timing selector 30. AI functions in the timing selector 30 to allow the timing selector 30 to compare the address circulating in the control register 24 with addresses W. When an address W is identical to the circulating address, the timing selector 30 generates a continuing signal FJD, a subsequent transfer pulse X, and then a continuing signal J.

FJD is transmitted via the FJD line 316 to the drum-read and record 37 where it aids in preparing the drum-read and record 37 to receive the word of information from the accumulator 14. X is fed via the X line 308 to the step counter 22 where it steps the computer system from K3 to K0, and to the typewriter circuits 52 where it terminates AI. J is sent via the J line 312 to the drum-read and record 37 where it will later operate to prepare for reading from the memory drum 38 during a subsequent procedure.

After step K3 is superseded by step K0, K3 (which was fed from the step counter 22 to the drum-read and record 37 via the K3 line 248) is delayed in the drum-read and record 37 and operates with FJD to prepare the drum-read and record 37 to receive the word of information.

The word of information is transferred via the G output line 118 from the accumulator 14 to the drum-read and record 37 and is sent from there to the memory drum 38 via the designated memory drum input-output line 320. It is recorded on the memory drum 38 in the position indicated by the address.

Following the recording of the word on the memory drum 38, K0 which is fed via the K0 line 242 to the drum-read and record 37 operates with J to prepare for receiving information from the memory drum 38 if required to do so during a subsequent procedure in the program.

Thus, during the insert bi-octal procedure, a word of information containing five decimal digits is recorded in predetermined order in a designated position on the memory drum 38.

VII. FILL OCTAL

The computer system functions during the fill octal procedure to receive an address typed in octal form, to receive words of information typed in octal form, to convert each octal digit of the address and every word of information to the binary system, to rearrange the binary digits in predetermined order and synchronize them with the timing of the remainder of the computer system, and to insert the words sequentially in binary form into positions on the memory drum 38 designated by consecutive addresses starting with the typed address.

Figure 5:
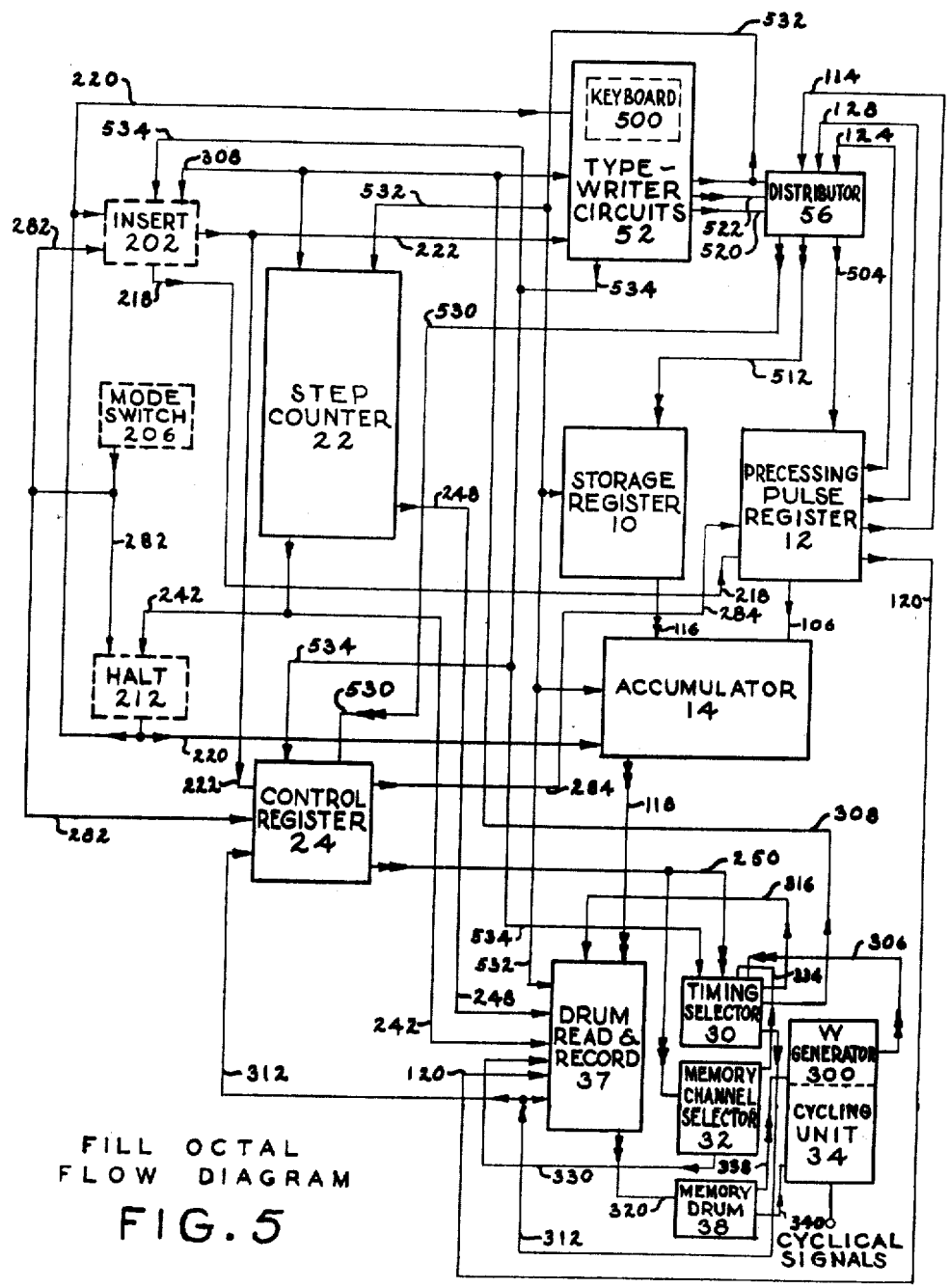
Fig. 5 is a block diagram showing the signal flow during the fill octal procedure.

The manual operations which are performed to direct the fill octal procedure which is illustrated in Fig. 5, are begun by setting mode switch 206 to the "fill octal" position. Following this operation, the insert switch 203 of the insert 202 is temporarily depressed. This operation prepares the computer system to receive data in the typewriter circuits 52. When these manual operations have been performed, the address (three octal digits) of the word of information which is to be typed first is inserted into the typewriter circuits 52 via the keyboard 500. Then the space bar of the keyboard 500 is depressed preparatory to typing the first word of information. Thereafter, the first word of information (ten octal digits which are typed in standard order; that is, the most significant digit first) is inserted into the typewriter circuits 52. After the first word of information is typed, the carriage return key and the space bar of the keyboard 500 are operated. Additional words of information may then be typed without accompanying addresses since the computer system will provide consecutive addresses if the carriage return key and the space bar are operated before the insertion of each additional word.

The automatic portion of the fill octal procedure is begun at the K0 step. K0 is fed from the step counter 22 to the halt 212 via the K0 line 242. The mode switch 206 when set in the "fill octal" position sends a signal to the halt 212 via the BT line 282. This signal enables the halt 212 to generate Y during the K0 step. Y is fed via the halt output line 220 to the accumulator 14, the typewriter circuits 52, and the insert 202. Y functions within the accumulator 14 to close a recirculation loop which will receive and store a word of information. Y operates within the typewriter circuits 52 and the insert 202 to permit the generation of subsequent signals as will be shown.

When the mode switch 206 is placed in the "fill octal" position, a signal is fed via the BT line 282 to the halt 212 and insures the generation of Y. At the same time, the mode switch 206 produces a signal BT which is fed via the BT line 282 to the insert 202 and the control register 24.

BT functions in the insert 202 to prevent the termination of the fill octal procedure after the recording of any single word of information. BT operates in the control register 24 to keep a recirculation loop closed for the storage of successive addresses, to aid in preparing the control register 24 for numerically increasing the address by one for each successive word of information inserted into the computer system, and to aid in generating a pulse BV which is later used to help in distributing the pulses which represent a word of information.

When the insert switch is operated, the insert 202 produces the signal AF and V because of the presence of Y. AF, which occurs only for the duration of the operation of the insert switch, is forwarded via the insert output line 218 to the precessing pulse register 12 and functions to gate a control pulse into a recirculation loop within the precessing pulse register 12. V, which is a continuing signal, is transmitted via the insert V line 222 to the control register 24 and the typewriter circuits 52. V functions within the control register 24 to aid in closing a recirculation loop which will receive and store the address. V operates in the typewriter circuits 52 in conjunction with Y to aid in permitting the subsequent generation of the signal AH.

The computer system is now prepared to receive the address of the first word of information which is typed on the keyboard 500 of the typewriter circuits 52. When an octal digit of the address is typed, three continuing signals BA, BB and BC are generated in the typewriter circuits 52. These signals express the octal digit in binary form. BA, BB and BC are transmitted via the distributor input cable 522 to the distributor 56 and remain present in the distributor long enough for the latter to operate properly. When an octal digit of the address is typed, a signal AV is also generated within the typewriter circuits 52 and is forwarded via the AV line 520 to the distributor 56.

During this time, the control pulse recirculating in the precessing pulse register 12 has been generating two pulses AW1 and AW2 at predetermined times in every minor cycle. AW1 and AW2 are forwarded to the distributor 56 via the AW1 line 124 and the AW2 line 128, respectively. AW1 and AW2 are utilized within the distributor 56 with AV to produce a continuing signal AR which is of short duration.

AR is fed from the distributor 56 to the precessing pulse register 12 via the AR line 504 and functions to shift the circulating control pulse to a time position three pulse times earlier than the time position the circulating control pulse originally occupied in a minor cycle. As a result, a pulse AS which is equivalent in time position to the shifted control pulse is forwarded via the AS line 114 from the precessing pulse register 12 to the distributor 56.

AS functions within the distributor 56 to convert BA, BB and BC to pulse form and distribute these pulses in the three pulse times through which the shift was made and in the order in which the computer system is designed to handle them (least significant digit first). This three pulse signal is designated AP. AS further functions to synchronize these pulses with the timing of the remainder of the computer system, and to permit the pulses to be transmitted to the control register 24 via the AP output line 530.

When the three octal digits of the address have been typed on the keyboard 500 (as explained above), AS will have been shifted three times. Since each shift comprises three pulse times, AS shifts a total of nine pulse times. Therefore, an AP will have been serially distributed, least significant digit first in each three pulse position group. The least significant digit of each AP will occur three pulse times earlier in time than the least significant digit of the preceding AP. Therefore, the binary representations of the three octal digits are arranged serially in the nine pulse times so that the least significant binary digit of the least significant octal digit occurs first in time and the most significant binary digit of the most significant octal digit occurs last in time. In this order, the address circulates within the control register 24.

The space bar is operated after the three octal digits of the address have been typed. This operation generates the continuing signal AH in the typewriter circuits 52 due to the presence of V. AH is transmitted via the AH line 532 to the distributor 56, the accumulator 14, the storage register 10, the step counter 22, and the drum-read and record 37.

In the distributor 56, AH exhibits the further flow of signals to the control register 24. AH acts in the accumulator 14 to help in permitting the entry of the word of information. In the storage register 10, AH functions to close a recirculation loop which will receive and store a word of information. AH acts in the step counter 22 to step the computer system from K0 to K3 and functions within the drum-read and record 37 to prepare the drum-read and record 37 to send a word of information to the memory drum 38. In summary, AH functions to aid in preparing the computer system to receive the words of information as they are typed.

Each word of information (ten octal digits) is then inserted most significant digit first into the typewriter circuits 52. Each octal digit is immediately expressed in binary form in the typewriter circuits 52 by the signals BA, BB, and BC as was each octal digit of the address. Then BA, BB, and BC are forwarded via the distributor input cable 522 to the distributor 56. BA, BB, and BC remain in the distributor 56 until they are later arranged, synchronized, and distributed in pulse form.

As previously explained for the insertion of a digit of the address, an AV is generated in the typewriter circuits 52 for each insertion of a digit of the word of information and a subsequent AR occurs. The presence of AR in the distributor 56 now causes a shift of the circulating control pulse in the precessing pulse register 12 and the resulting AS pulse is forwarded to the distributor 56 via the AS line 114.

AS is utilized in the distributor 56 to convert BA, BB, and BC to pulse form and to arrange and synchronize the pulses in a three pulse signal which is distributed in the three pulse times through which the shift was made. As a result of AS, AL is forwarded via the AL line 512 to the storage register 10. In this manner, an octal digit is represented in three sequential pulse positions. The least significant binary digit is represented in the earliest pulse position and the most significant binary digit is represented in the third pulse position.

As the second (and each successive) digit is typed, it is represented in three pulse positions as explained above. Each AL is distributed in the minor cycle so as to immediately precede in time the AL representing the octal digit inserted previously. As a result, the ten octal digits of the word of information are represented in a total of thirty pulse positions (the time length of a minor cycle). Therein, the least significant binary digit of the least significant octal digit is represented in the earliest pulse position. The pulses which represent the word of information are thus arranged in the storage register 10 in the order in which the computer system is designed to handle them.

When the control pulse circulating within the precessing pulse register 12 is shifted the three pulse positions for the least significant octal digit of the first word of information, it has been shifted through a minor cycle. The control pulse then functions to generate a gating signal which is fed via the accumulator gating line 106 to the accumulator 14 and which, with AH being present at the AH line 532, prepares the accumulator 14 to receive the word of information circulating in the storage register 10. The word of information is transferred via the storage register output line 116 from the storage register 10 to the accumulator 14 and circulates in the recirculation loop closed by Y.

At the same time as the gating signal is generated a pulse BL is generated within the precessing pulse register 12 as a result of the last shift of the control pulse. BL is fed via the BL output line 120 to the drum-read and record 37 and functions therein with AH to prepare the drum-read and record to record the word of information on the memory drum 38.

After the first word of information has been typed, the carriage return key is operated and a continuing signal AI is generated in the typewriter circuits 52. AI is fed via the AI line 534 to the insert 202, the control register 24, and the timing selector 30. In the insert 202 AI terminates V.

In the control register 24, AI establishes a path via the address output line 250 to the timing selector 30 and the memory channel selector 32 so that the address circulating in the control register 24 will be sampled by the timing selector 30 and the memory channel selector 32. The memory channel selector 32 utilizes one part of the address to generate a signal on a line (designated by the address) of a group of relay selecting lines 330 which feed the drum-read and record 37. Each of the relay lines 330 is associated with a designated channel on the memory drum 38. This signal operates one of the relays (not shown) in the drum-read and record 37 and aids in enabling the drum-read and record 37 to send information to the designated channel via one of the memory drum input-output lines 320.

At the same time that relay operation is initiated the memory channel selector 32 sends a signal AJ via the AJ line 334 to the timing selector 30 where AJ temporarily prevents the generation of signals until the selected relay has had time to complete its operation.

During this time, addresses W which correspond to positions in each channel are sequentially forwarded from the memory drum 38 via the W line 338 to the W generator 300 and then via W output line 306 from the W generator 300 of the cycling unit 34 to the timing selector 30. AI functions in the timing selector 30 to enable the timing selector 30 to compare the address circulating in the control register 24 with addresses W. When an address W is identical to the circulating address, the timing selector 30 generates a continuing signal FJD, a subsequent transfer pulse X, and then a continuing signal J.

FJD is transmitted via the FJD line 316 to the drum-read and record 37 where it aids in preparing the drum-read and record 37 to receive the word of information from the accumulator 14. X is fed via the X line 308 to the insert 202, to the step counter 22, and to the typewriter circuits 52 where it terminates AI. X operates with BT in the insert 202 to regenerate V so that when the space bar is subsequently operated, AH will result and the computer system will return to step K3. X functions in the step counter 22 to generate K0 and terminate K3. J is sent via the J line 312 to the control register 24, and to the drum-read and record 37 where it will later operate to prepare drum-read and record 37 for reading from the memory drum 38 during the next procedure. In the control register 24, J functions with BT to allow the control register 24 to numerically increase the circulating address by one. Thus, the next consecutive address is provided. The BV which results from the coincidence of J and BT in the control register 24 is transmitted via the BV line 284 to the precessing pulse register 12 and gates a new control pulse into a recirculation loop therein.

K3, which is fed from the step counter 22 to the drum-read and record 37 via the K3 line 248, is delayed in the drum-read and record 37 after it is superseded in the step counter 22 by K0 and operates with FJD to prepare the drum-read and record 37 to receive the word of information.

The word of information, designated G when it is to be transmitted to the memory drum 38, is transferred via the G output line 118 from the accumulator 14 to the drum-read and record 37 and is fed from there sent to the memory drum 38 via the designated memory drum input-output line 320. It is recorded on the memory drum 38 in the position and channel indicated by the inserted address.

When the space bar is operated prior to the typing of the next word of information, AH is again generated in the typewriter circuits 52 because of the presence of V. As previously described, the computer system is stepped by step K3 by AH and is then ready to receive the next word of information which will be recorded on the memory drum 38 in the position whose address corresponds to the new address in the control register 24.

In this manner, the computer system functions during the fill octal procedure to receive a series of words of information containing ten octal digits and to record them in binary form in consecutive positions on the memory drum 38.

VIII. FILL BI-OCTAL

Figure 6:
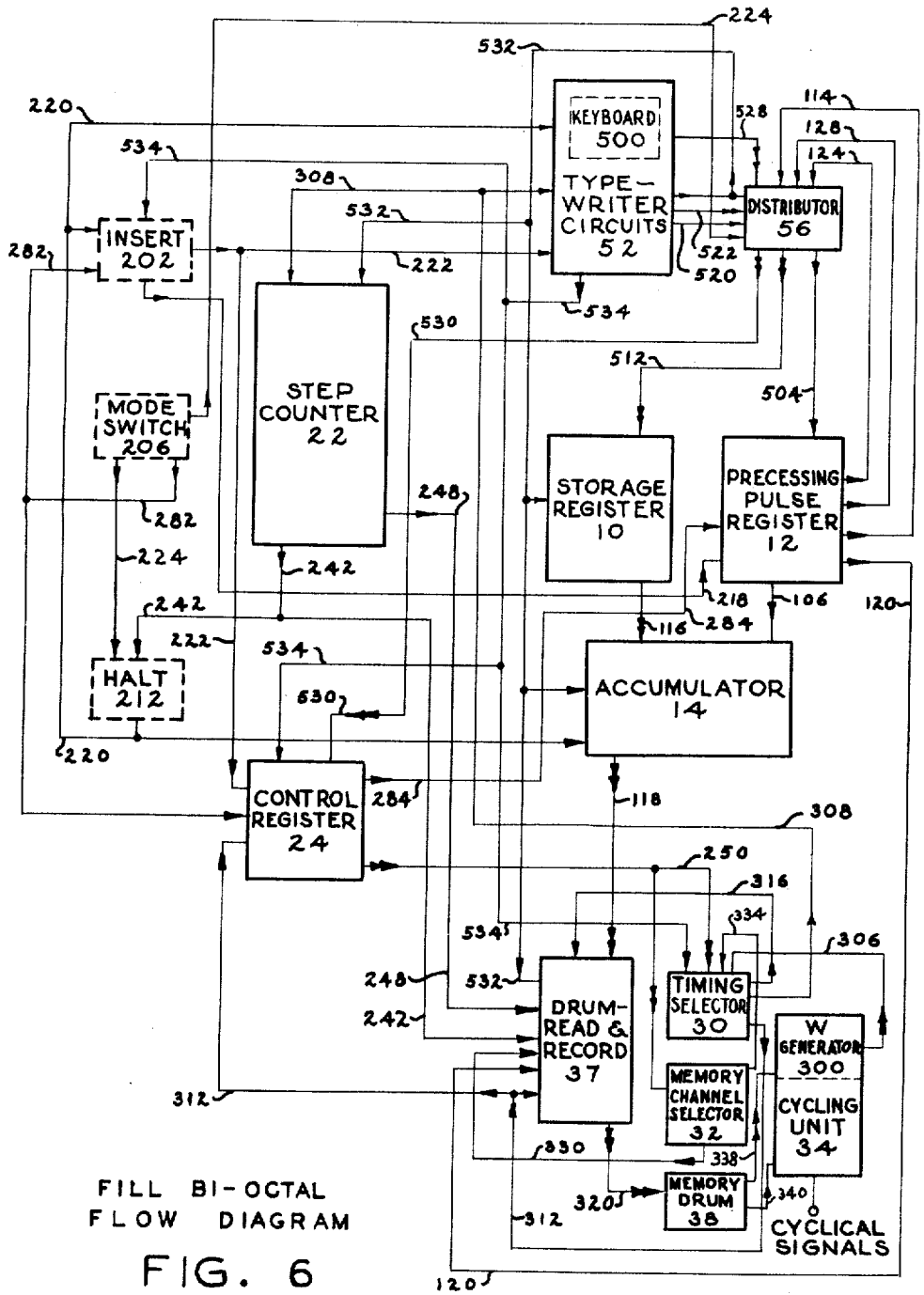
Fig. 6 represents a block diagram illustrative of the signal flow during the fill bi-octal procedure.

The computer system functions during the fill bi-octal procedure illustrated in Fig. 6 to receive an address typed in octal form, to receive words of information typed in decimal form, to convert the decimal form into bi-octal representation, to convert each octal digit of the address to binary form, to convert the bi-octal representation of each decimal digit of each word of information to the binary system, to rearrange the binary digits in predetermined order and synchronize them with the timing of the remainder of the computer system, and to insert the words sequentially in binary form into positions on the memory drum 38 designated by consecutive addresses starting with the inserted address.

The manual operations which are performed to direct the fill bi-octal procedure are initiated by setting the mode switch 206 to the "fill bi-octal" position and temporarily depressing the insert switch of the insert 202. This operation prepares the computer system to receive data in the typewriter circuits 52. When these manual operations have been performed, the address (three octal digits) of the word of information which is to be typed first is inserted into the typewriter circuits 52 via the keyboard 500. This is followed by the operation of the space bar of the keyboard 500 which operation precedes the insertion of the first word of information. Then the first word of information (five decimal digits which are typed in standard order; that is, the most significant digit first) is inserted into the typewriter circuits 52. After the first word of information is typed, the carriage return key and the space bar of the keyboard 500 are operated. Additional words of information may then be typed without accompanying addresses since the computer system will provide consecutive addresses if the carriage return key and the space bar are operated before the insertion of each additional word.

The fill bi-octal procedure differs from the fill octal procedure in only one respect; that is, the generation of the signal AE when the mode switch 206 is placed in the "fill bi-octal" position. The signal BT, generated in the fill octal procedure, is also produced by this setting of the mode switch 206. Thereafter, the computer system functions as it would for the fill octal procedure except for the means utilized for arranging the signal representations of the words of information.

AE is fed via the AE line 224 from the mode switch 206 to the distributor 56 and remains present at the distributor 56. The function of AE is to aid in rearranging in proper order the signal representation of words of information.

Means (see Fig. 39) exist within the typewriter circuits 52 for the automatic bi-octal representation of decimal digits which are typed on the keyboard 500. Thus, when a decimal digit is typed, it is received in the typewriter circuits 52 as two octal digits. Each of these two octal digits is immediately expressed in binary form.

It will be recalled that decimal digits may vary from 0 to 9. The decimal digits from 0 to 7 are each bi-octally expressed by a 0 followed by a second less significant octal digit (0 to 7) and the decimal digits 8 and 9 are bi-octally expressed by a 1 followed by a second less significant octal digit (0 or 1). Since the most significant octal digit is either a 0 or a 1 for the purpose of expressing the decimal digits 0 through 9, the most significant octal digit may be binarily expressed by a maximum of one binary digit. The signal equivalent of this digit is hereinafter designated BD. Since the other two binary digits of this octal digit are always zero, no provision need be made for inserting pulses in the corresponding position. The least significant octal digit is expressed binarily by the signals BA, BB, and BC.

When a decimal digit of the word of information is inserted into the typewriter circuits 52, the binarily expressed bi-octal equivalent is transmitted to the distributor 56. BA, BB, and BC are forwarded via the distributor input cable 522 to the distributor 56. BD is transmitted via the BD input line 528. BA, BB, BC, and BD remain in the distributor 56 until they are later arranged, synchronized, and distributed.

The presence of AE in the distributor 56 causes two successive shifts of the circulating control pulse in the precessing pulse register 12 and the two resulting AS pulses are forwarded to the distributor 56 via the AS line 114 as they successively occur.

The first AS is utilized to convert BD to pulse form, to synchronize BD with the timing of the remainder of the computer system, and to position BD in the least significant time position (the earliest) of the three pulse times provided by AS. The remaining two pulse positions are not filled. As a result of AS this three pulse signal, hereinafter designated AL, is forwarded from the distributor 56 via the AL line 512 to the storage register 10 which was previously prepared by AH to receive and store the word of information.

Sequentially, the second AS is utilized in the distributor 56 to convert BA, BB, and BC to pulse form and to arrange and synchronize the pulses. As a result of AS the rearranged pulse group also designated AL is then forwarded to the storage register 10 via the AL line 512. AL is distributed through three pulse times earlier than the AL representing the more significant octal digit of the pair.

In this manner, a decimal digit is represented in six sequential pulse positions. The least significant binary digit of the least significant octal digit is represented in the earliest pulse position, and the binary digit representing the most significant octal digit occupies the fourth pulse position.

As the second (and each successive) decimal digit is typed, it is represented in six pulse positions as explained above. Each group of six pulse positions is distributed in a minor cycle so as to immediately precede the group representing the decimal digit inserted previously. As a result, the five decimal digits of the word of information are represented in a total of thirty pulse positions (the time length of a minor cycle). Therein the least significant binary digit of the least significant bi-octally coded decimal digit is represented in the earliest pulse position. The pulses representing the word of information are thus arranged in the storage register 10 in the order in which the computer system is designed to handle them.

When the control pulse circulating within the precessing pulse register 12 is shifted the three pulse positions for the least significant octal digit of the least significant bi-octally coded decimal digit, it has been shifted through a minor cycle. The control pulse then functions to generate a gating signal which is fed to the accumulator 14 via the accumulator gating line 106 and which, with AH being present, prepares the accumulator 14 to receive the word of information. The word of information is transferred from the storage register 10 to the accumulator 14 via the storage register output line 116 and circulates in the accumulator 14 through a recirculation loop closed by Y.

When the pulses representing the word of information have been transferred to the accumulator 14, the computer system continues functioning during the fill bi-octal procedure in the same manner as for the fill octal procedure and varies only as described above in the method utilized for representing digits of the word of information.

IX. ERASE

The erase procedure is a manually controlled operation which will permit a typing error to be corrected. This will not affect the consecutive address sequence of the fill procedures if the erase procedure is utilized before operating the carriage return key.

During a fill procedure the operation of an erase switch in the erase 200 shown in Fig. 2 produces two signals BX and BF' respectively. BX is fed via the BX line 254 to the control register 24 and prevents the control register 24 from changing the circulating address to the next consecutive address. BF' is transmitted via the BF' line 255 to the typewriter circuits 52 and activates a carriage return actuator which operates the carriage return key. The fill procedure will then continue following the operation of the carriage return key as described before and, as a result, the incorrect word is recorded on the memory drum 38 in the position whose address corresponds to the address circulating in the control register 24.

When the correct word of information is subsequently inserted into the computer system, the fill procedure continues and the correct word is sent to the position designated by the address which is still circulating unchanged in the control register 24. Thus, the correct word of information is sent to the position occupied by the incorrect word and replaces the incorrect word.

X. HALT

The halt procedure shown in Fig. 2 is generally used to prevent the stepping of the computer system to step K1 (i.e., to halt the computer before carrying out the next instruction following occurrence of the halt signal), and occurs as a result of the operation of the halt switch of the halt 212, or a programmed instruction, or overflow (which exists when a procedure of addition, subtraction, high order multiplication, or high order multiplication with round-off results in an answer which is not a number which the computer system can correctly manipulate). Operation of the halt switch also permits manual termination of a type-out operation at the end of any desired word.

When the continuing signal K0 is fed via the K0 line 242 from the step counter 22 to the halt 212, a continuing signal Y will be generated when the halt switch is operated. Y is fed via the halt output line 220 to the step counter 22 to clear the latter from K1 back to K0 in the case of a programmed halt. Y is also fed via the halt output line 220 to the timing selector 30, where it functions to block occurrence of the X signal which steps the step counter 22 to K1.

If a type-out operation is in progress the step counter 22 will be on K3; in this case the operation of the halt switch will transmit a signal TT via the TT line 228 to the step counter 22. TT will permit step counter 22 to clear to K0 on completion of the word in process of being typed, thus terminating the type-out operation.

When overflow occurs, a signal AD is fed from the accumulator 14 to the halt 212 via the overflow indicator line 138 and functions, when K0 is fed from the step counter 22 via the K0 line 242, to generate Y. Y operates as aforementioned to prevent the generation of K1 in the step counter 22.

If halt occurs as a result of the programmed halt instruction, the static control register 28 will feed a signal to the halt 212 via the halt instruction line 278. This signal generates Y in the halt 212 whether K0 is present or not. Y operates as explained above to clear the step counter 22 to K0, and to prevent the generation of another K1 in the step counter 22.

XI. CONTINUOUS OPERATION

After a program of procedures has been typed into the computer system the continuous operation procedure shown in Fig. 7 enables the computer system to operate automatically through a programmed sequence without interruption. Initially with the typewriter carriage at the beginning of its movement the mode switch 206 is set in the continuous position and a continue switch of the continue 208 is closed. The automatic operation will then continue until terminated by a halt instruction.

When the typewriter carriage is at the beginning of a line (for example, after being returned by the operation of the carriage return key during the insertion of the program), the typewriter circuits 52 generate a signal AT. AT is fed via the AT line 558 to the continue 208 and remains present.

Depressing the continue switch produces a halt reset signal which is sent to the halt 212 via the AT halt rest line 283; this signal persists even after the switch is released. When the mode switch 206 is set in the "continuous," "one-instruction," or "one-step" position, a signal is fed via the continue input line 275 to the continue 208, and when the continue switch is released, is transmitted to the halt 212 via the halt reset line 281. Coincidence of the reset signals on lines 281 and 283 causes termination of the signal Y, which is being fed via the halt output line 220 to the timing selector 30. Thus operation of the continue switch becomes effective only when it is released after being depressed, and then only if the mode switch 206 has been set to "continuous," "one-instruction," or "one-step."

The termination of Y enables the timing selector 30 to operate normally without interruption. Generally, the X signals, which are generated by the timing selector 30, are periodically fed via the X line 308 to the step counter 22 to step the computer system from one step to the next. When a halt instruction occurs, Y is fed via the halt output line 220 to the timing selector 30 and prevents the generation of X signals, thus halting the computer.

XII. ONE-INSTRUCTION

When it is desired that the computer system operate through one procedure (also designated as one instruction; for example, addition or multiplication) the mode switch of Fig. 7 is set in the one-instruction position and with the typewriter carriage at the beginning of its movement the continue switch of the continue 208 is closed. Thereafter, the computer system will operate for one-instruction and halt when the procedure has been completed.

When the typewriter carriage is at the beginning of a line, the typewriter circuits 52 generate a signal AT which is fed via the AT line 558 to the continue 208 and remains present. When the mode switch 206 is set in the one-instruction position, a halt instruction signal is sent via the halt instruction line 278 to the halt 212. When the next K0 is sent from the step counter 22 via the K0 line 242 to the halt 212, K0 and the halt instruction signal generate the signal Y. Y is sent via the halt output line 220 to the timing selector 30 and will prevent the stepping of the computer system to step K1.

When set in the one-instruction position, the mode switch 206 also sends a signal via the continue input line 275 to the continue 208. This signal operates with AT, when the continue switch is actuated and released, to generate two halt reset signals which are fed via the halt reset line 281 and the AT halt reset line 283, respectively, to the halt 212 and by their coincidence operate to terminate Y which was fed via the halt output line 220 to the timing selector 30. Thereafter the periodic generation of X signals which are transmitted from the timing selector 30 via the X line 308 to the step counter 22 steps the computer through K1, K2, K3 and K0. When the second K0 is fed to the halt 212 Y is again generated and prevents the computer from stepping to K1.

Since a second K0 will not be fed to the halt 212 until one procedure has been completed, the computer system is enabled to complete one procedure before being halted.

XIII. ONE-STEP

When it is desired that the computer system operate through one step (i.e., K0, K1, K2, or K3) of a procedure, the mode switch 206 of Fig. 7 is set in the "one-step" position and with the typewriter carriage at the beginning of its movement the continue switch of the continue 208 is depressed. The computer system will operate for one step and then halt before the computer system is stepped to the next sequential step.

When the typewriter carriage is at the beginning of a line the typewriter circuits 52 generate a signal AT. AT is fed via the AT line 558 to the continue 208 and remains present. When the mode switch 206 is set in the "one-step" position, a signal BY and a second signal are generated. BY is transmitted via the BY line 271 to the continue 208 and primes the circuitry for the subsequent termination of the computer system operation. The second signal is fed to the continue 208 via the continue input line 275 and, with AT, allows the actuation and release of the continue switch to generate two halt reset signals.

The two halt reset signals are transmitted via the halt reset line 281 and the AT halt reset line 283 to the halt 212 and by their coincidence operate to terminate the signal Y which was fed via the halt output line 220 to the timing selector 30.

The termination of Y enables a signal X to be generated in the timing selector 30. X, which is sent via the X line 308 to the step counter 22 to step the computer to the next sequential K step, is also sent via the X line 308 to the continue 208. X operates with BY to generate a signal which is fed via the one-step control line 219 from the continue 208 to the timing selector 30 and which prevents the further generation of X signals by the timing selector 30. Thus it functions in a manner similar to the Y signal. Each time the continue switch is actuated and released, the signal on the one-step control line 219 is removed, allowing an X to occur and step the computer system one step, but this same X again combines with BY to re-establish the signal on the one-step control line 219, preventing any further X from occurring until the continue switch is again depressed and released.

XIV. ADDITION

The computer system functions during the addition procedure illustrated in Fig. 8 to add two numbers located in specified memory positions and store the sum in a third specified position. These operations are performed in response to a word of instruction obtained from the memory drum 38 which is of the form I A3 A2 A1. If $I=4$, the word of instruction is interpreted to mean "add." A3, A2, and A1 are numbers representing addresses on the memory drum 38. The position on the memory drum 38 whose address corresponds to the address A1 contains the augend; the position on the memory drum 38 whose address corresponds to A2 contains the addend, and A3 denotes the location of a position on the memory drum into which the sum of the contents of the positions designated by A1 and A2 will be stored.

If the program containing the words of instruction and the operands is assumed to have been inserted the continue switch is depressed to start the automatic operation. A sequence-directing address corresponding to the location of a word of instruction on the memory drum 3P will be circulating within the control counter 29 as will hereinafter be indicated, and it will be assumed that the address specified is one containing an "add" instruction. The automatic operation is begun at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30. In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 306 from the W generator 300 to the timing selector 30. The timing selector 30 compares each address W with one part of the sequence-directing address until an identical address W is found.

As a result of the identify of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the number representing the sequence-directing address to be increased to the next consecutive value, corresponding to the next consecutive address. J is also fed via the J line 312 to the drum-read and record 37 and functions to enable the drum-read and record 37 to receive the word of information stored in the selected position on the memory drum 38. The word designated by the sequence-directing address is composed of the pulses which represent the word of instruction comprising 4, A1, A2, and A3.

K1 is fed via the K1 line 244 to the control register 24 and functions to permit the word from the memory drum 38 to enter the control register 24. The word of instruction contained in the position on the memory drum 38 designated by the sequence-directing address is forwarded via the memory drum input-output line 320 from the memory drum 38 to the drum-read and record 37. (The designation F will occasionally be used to represent any thirty pulse-time information signal when it is transmitted from the drum-read and record 37.) The word of instruction F passes through the drum-read and record 37 and is transferred via the F line 326 to the control register 24. The word of instruction circulates in the control register 24 during the major portion of the addition procedure.

Pulses which are equivalent to the portion of the word of instruction which represent I are sent via the static control register input lines 226a, 226b, and 226c to the static control register 28 and, as I is in this case an instruction for addition (i.e., $I=4$), the pulses generate a continuing signal A. A is fed via the A control line 270 to the accumulator 14 and prepares the accumulator 14 to receive and add the augend and addend, and to retain the resulting sum.

As a result of K1, the word of instruction is also transmitted from the control register 24 to the timing selector 30 and the memory channel selector 32 via the address output line 250. K1 transmits the word with such timing that the A1 portion of the word of instruction arrives at the memory channel selector 32 and the timing selector 30 during the functioning periods of these two circuits. As a result, the memory channel selector 32 selects the channel of the memory drum 38 designated by the channel-designating part of A1, and the timing selector 30 compares the position-locating part of A1 with each W received from the W generator 300 as was previously described for the comparison of the sequence-directing address.

When the position-locating part of A1 is identical to W, another X and J result and the position on the memory drum 38 whose address corresponds to A1 is thereby located. J functions within the timing selector 30 to prevent further comparisons from being made during the next thirty pulse times. X is transmitted via the X line 308 to the step counter 22 and aids in generating the continuing signal K2 and terminates K1, thereby stepping the computer system to step K2.

During the first minor cycle of K2, when J is present, the word which is the contents of the address designated by A1 (the augend) is forwarded from the memory drum 38 to the drum-read and record 37 via one of the memory drum input-output lines 320 (designated by A1) and is passed via the F line 326 to the accumulator 14 14 which receives and stores it' Since K1 is no longer being fed to the control register 24, the word designated by A1 does not enter the control register 24.

K2 is fed from the step counter 22 via the K2 line 246 to the control register 24. As a result of K2, the word of instruction is again sent from the control register 24 via the address output line 250 to the timing selector 30 and the memory channel selector 32 during the functioning periods of these circuits.

The designated channel of the memory drum 38 and the position in the designated channel whose address corresponds to A2 are located as previously described in respect to A1. When an address W identical to the position-locating part of A2 appears, X is generated and sent to the step counter 22 and functions to terminate K2 and generate the continuing signal K3 thereby stepping the computer system to step K3. The J which results acts within the timing selector 30 to prevent further comparison from being made during the next thirty pulse times.

The word which is the contents of the address designated by A2 (the addend) is fed via the memory drum input-output line 320 which is designated by A2 to the drum-read and record 37 and is passed via the F line 326 to the accumulator 14.

The accumulator 14, which includes means for digit carry when necessary, adds the addend to the augend. (If the result of the addition is a number which the computer system cannot correctly manipulate, a pulse AD is transmitted via the overflow indicator line 138 to the halt 212 and functions to aid in halting the computer after completion of the procedure.) The sum circulates within the accumulator 14.

K3 is sent via the K3 line 248 from the step counter 22 to the control register 24 and the drum-read and record 37. J is fed from the timing selector 30 to the drum-read and record 37 via the J line 312. J and K3 function to prepare the drum-read and record 37 to send information to the memory drum 38 and to send a signal via the delay flop input line 342 to the memory channel selector 32 to generate AJ and temporarily block the timing selector 30 as previously described. Due to K3, the control register 24 sends the word of instruction to the timing selector 30 and the memory channel selector 32 via the address output line 250. In a manner similar to the operation previously mentioned, the transmission of the word of instruction is timed so that the A3 portion of the word of instruction controls the functioning of the memory channel selector 32 and the timing selector 30.

The proper channel and position on the memory drum 38 corresponding to A3 are located in a manner as was described for A1 and A2 and the timing selector 30 generates another X and J as well as a signal FJD which lasts for thirty pulse times.

X is sent via the X line 308 to the step counter 22 and terminates K3 and generates K0 thereby stepping the computer system to step K0. J is transmitted via the J line 312 to the drum-read and record 37 where, with K0 received via the K0 line 242, J will later function to prevent the drum-read and record 37 from sending information to the memory drum 38.

FJD is sent via the FJD line 316 to the drum-read and record 37 and functions with a delayed K3 to permit the drum-read and record 37 to receive the sum resulting from the addition operation, the sum is circulating in the accumulator 14 and is transmitted via the G output line 118. The signal representing the sum is then transferred to the drum-read and record 37 and from there to the memory drum 38 via the memory drum input-output line 320 designated by A3 and is recorded on the memory drum 38 in the position whose address corresponds to A3. When the sum has been recorded, J and K0 function in the drum-read and record 37 to prevent further recording on the memory drum 38 and to send a signal via the delay flop input line 342 to the memory channel selector 32 to generate AJ and temporarily block the timing selector 30 as previously described. The addition procedure has been completed and the computer system is prepared to go to the next procedure as directed.

Thus, in the addition procedure, the computer system has functioned to locate an augend and addend, to add these two and retain the sum, and to record the sum in the appropriate position on the memory drum 38.

XV. SUBTRACTION

The computer system functions during the subtraction procedure illustrated in Fig. 9 to subtract two numbers located in specified memory positions and store the difference in a third specified position. These operations are performed in response to a word of instruction obtained from the memory drum 38 which is of the form I A3 A2 A1. If $I=5$, the word of instruction is interpreted to mean "subtract." A3, A2 and A1 are numbers representing addresses on the memory drum 38. The position on the memory drum 38 whose address corresponds to the address A1 contains the subtrahend; the position on the memory drum 38 whose address corresponds to A2 contains the minuend, and A3 denotes the location of a position on the memory drum into which the difference of the contents of the positions designated by A1 and A2 will be stored.

If the program containing the words of instruction and the operands is assumed to have been inserted, the continue switch is depressed to start the automatic operation. A sequence-directing address corresponding to the location of the word of instruction on the memory drum 38 will be circulating within the control counter 29 as will hereinafter be indicated.

The automatic operation is begun at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34 and then via the W output line 306 from the W generator 300 to the timing selector 30. The timing selector 30 compares each address W with one part of the sequence-directing address until an identical address W is found.

As a result of the identity of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the number representing the sequence-directing address to be increased to the next consecutive value, corresponding to the next consecutive address. J is also fed via the J line 312 to the drum-read and record 37 and functions to enable the drum-read and record 37 to receive the word of information stored in the selected position on the memory drum 38. The word designated by the sequence-directing address is composed of the pulses which represent the word of instruction comprising I, A1, A2, and A3.

K1 is fed via the K1 line 244 to the control register 24 and functions to permit the word from the memory drum 38 to enter the control register 24. The word of instruction contained in the position on the memory drum 38 designated by the sequence-directing address is forwarded via the memory drum input-output line 320 from the memory drum 38 to the drum-read and record 37. The word of instruction passes through the drum-read and record 37 and is transferred via the F line 326 to the control register 24 and the word of instruction circulates in the control register 24 during the major portion of the subtraction procedure.

Pulses which are equivalent to the portion of the word of instruction which represent I are sent via the static control register input lines 226a, 226b, and 226c to the static control register 28 and, as I is in this case an instruction for subtraction (i.e., $I=5$), the pulses generate the continuing signals A and S. S is fed via the S control line 280 to the accumulator 14 and aids in preparing the accumulator 14 for subtraction. A is fed via the A control line 270 to the accumulator 14 and prepares the accumulator 14 to receive the subtrahend and minuend, and to retain the resulting difference.

As a result of K1, the word of instruction is also transmitted from the control register 24 to the timing selector 30 and the memory channel selector 32 via the address output line 250. K1 transmits the word with such timing that the A1 portion of the word of instruction arrives at the memory channel selector 32 and the timing selector 30 during the functioning periods of these two circuits. As a result, the memory channel selector 32 selects the channel of the memory drum 38 designated by the channel-designating part of A1, and the timing selector 30 compares the position-locating part of A1 with each W received from the W generator 300 as was previously described for the comparison of the sequence-directing address.

When the position-locating part of A1 is identical to W, another X and J result and the position on the memory drum 38 whose address corresponds to A1 is thereby located. J functions within the timing selector 30 to prevent further comparisons from being made during the next thirty pulse times. X is transmitted via the X line 308 to the step counter 22 and aids in generating the continuing signal K2 and terminates K1 thereby stepping the computer system to step K2.

During the first minor cycle of K2, when J is present, the word which is the contents of the address designated by A1 (the subtrahend) is forwarded from the memory drum 38 to the drum-read and record 37 via one of the memory drum input-output lines 320 (designated by A1) and is passed via the F line 326 to the accumulator 14 which receives and stores it. Since K1 is no longer being fed to the control register 24, the word designated by A1 does not enter the control register 24.

K2 is fed via the K2 line 246 to the control register 24. As a result of K2, the word of instruction is again sent from the control register 24 via the address output line 250 to the timing selector 30 and the memory channel selector 32. K2 transmits the word of instruction with such timing that the A2 portion of the word of instruction arrives at the timing selector 30 and the memory channel selector 32 during the functioning periods of these circuits.

The designated channel of the memory drum 38 and the position in the designated channel whose address corresponds to A2 are located as previously described in respect to A1. When an address W identical to the position-locating part of A2 appears, X is generated and sent to the step counter 22 and functions to terminate K2 and generate the continuing signal K3 thereby stepping the computer system to K3. The J which results acts within the timing selector 30 to prevent further comparison from being made during the next thirty pulse times.

The word which is the contents of the address designated by A2 (the minuend) is fed via the memory drum input-output line 320 which is designated by A2 to the drum-read and record 37 and is passed to the accumulator 14 via the F line 326.

K3 is sent via the K3 line 248 from the step counter 22 to the control register 24, the accumulator 14, and the drum-read and record 37. J is fed from the timing selector 30 to the drum-read and record 37 and the accumulator 14 via the J line 312. J and K3 function to prepare the drum-read and record 37 to send information to the memory drum 38 and to send a signal via the delay flop input line 342 to the memory channel selector 32 to generate AJ and temporarily block the timing selector 30 as previously described. J and K3 function with S in the accumulator 14 to prepare the accumulator 14 to complement the subtrahend.

As the accumulator 14 receives the minuend, it complements the circulating subtrahend and adds the complemented subtrahend to the minuend. In this manner, subtraction is accomplished. (If the result of this action is a number which the computer system cannot correctly manipulate, a pulse AD is transmitted via the overflow indicator line 138 to the halt 212 and functions to aid in halting the computer after completion of the procedure.) The difference circulates within the accumulator 14.

Due to K3, the control register 24 sends the word of instruction to the timing selector 30 and the memory channel selector 32 via the address output line 250. In a manner similar to the operation previously mentioned, the transmission of the word of instruction is timed so that the A3 portion of the word of instruction controls the functioning of the memory channel selector 32 and the timing selector 30.

The proper channel and position on the memory drum 38 corresponding to A3 are located in a manner as was described for A1 and A2 and the timing selector 30 generates another X and J as well as a signal FJD which lasts for thirty pulse times.

X is sent via the X line 308 to the step counter 22 and terminates K3 and generates K0 thereby stepping the computer system to K0. J is transmitted to the drum-read and record 37 where, with K0 received via the K0 line 242, J will later function to prevent the drum-read and record 37 from sending information to the memory drum 38.

FJD is sent via the FJD line 316 to the drum-read and record 37 and functions with a delayed K3 to permit the drum-read and record 37 to receive the difference resulting from the subtraction operation; this quantity is circulating in the accumulator 14 and is transmitted via the G output line 118. The signal representing the difference is then transferred to the memory drum 38 via the memory drum input-output line 320 designated by A3, and is recorded on the memory drum 38 in the position whose address corresponds to A3. When the difference has been recorded, J and K0 function in the drum-read and record 37 to prevent further recording on the memory drum 38 and to send a signal via the delay flop input line 342 to generate AJ and temporarily block the timing selector 30 as previously described. The subtraction procedure has been completed and the computer system is prepared to go to the next procedure as directed.

Thus in the subtraction procedure the computer system has functioned to locate a subtrahend and minuend, to subtract the former from the latter and retain the difference, and to record the difference in the appropriate position on the memory drum 38.

XVI. LOGICAL MULTIPLICATION

The computer system functions during the logical multiplication procedure illustrated in Fig. 10 to multiply digit by digit two numbers located in specified memory positions and store the product in a third specified position. These operations are performed in response to a word of instruction obtained from the memory drum 38 which is of the form I A3 A2 A1. If $I=6$, the word of instruction is interpreted to mean "logical multiplication." A3, A2 and A1 are numbers representing addresses on the memory drum 38. The position on the memory drum 38 whose address corresponds to A1 contains the multiplier; the position whose address corresponds to A2 contains the multiplicand; and A3 denotes the location of a position on the memory drum 38 into which the logical product of the contents of the positions designated by A1 and A2 will be stored. During logical multiplication, each digit of one operand is multiplied by the corresponding digit in the other operand without carry.

If the program containing the words of instruction and the operands is assumed to have been inserted, the continue switch is depressed to start the automatic operation. A sequence-directing address corresponding to the location of a word of instruction on the memory drum 38 will be circulating within the control counter 29 as will hereinafter be indicated, and it will be assumed that the address specified is one containing a "logical multiplication" instruction.

The automatic operation is begun at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 306 from the W generator 300 to the timing selector 300. The timing selector 30 compares each address W with one part of the sequence-directing address until an identical address W is found.

As a result of the identity of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the number representing the sequence-directing address to be increased to the next consecutive value corresponding to the next consecutive address. J is also fed via the J line 312 to the drum-read and record 37 and functions to enable the drum-read and record 37 to receive the word of information stored in the selected position on the memory drum 38. The word designated by the sequence-directing address is composed of the pulses which represent the word of instruction comprising I, A1, A2, and A3.

K1 is fed via the K1 line 244 to the control register 24 and functions to permit the word from the memory drum 38 to enter the control register 24. The word of instruction contained in the position on the memory drum 38 designated by the sequence-directing address is forwarded via the memory drum input-output line 320 from the memory drum 38 to the drum-read and record 37. The word of instruction passes through the drum-read and record 37 and is transferred via the F line 326 to the control register 24, and the word of instruction circulates in the control register 24 during the major portion of the logical multiplication procedure.

Pulses which are equivalent to the portion of the word of instruction which represent I are sent via the static control register input lines 226–a, 226–b, and 226–c to the static control register 28 and, as I is in this case an instruction for logical multiplication (i.e., I=6), the pulses generate continuing signals L and A. L is fed via the L control line 286 to the accumulator 14 and prepares the accumulator 14 to receive and logically multiply the operands, and A is fed to the accumulator 14 via the A control line 270 and functions to permit the accumulator 14 to retain the result.

As a result of K1, the word of instruction is also transmitted from the control register 24 to the timing selector 30 and the memory channel selector 32 via the address output line 250. K1 times the transmission of the word so that the A1 portion of the word of instruction arrives at the memory channel selector 32 and the timing selector 30 during the functioning periods of these two circuits. As a result, the memory channel selector 32 selects the channel of the memory drum 38 designated by the channel designating part of A1, and the timing selector 30 compares the position-locating part of A1 with each W received from the W generator 300 as was previously described for the comparison of the sequence-directing address.

When the position-locating part of A1 is identical to W, another X and J result and the position on the memory drum 38 whose address corresponds to A1 is thereby located. J functions within the timing selector 30 to prevent further comparisons from being made during the next thirty pulse times. X is transmitted via the X line 308 to the step counter 22 and aids in generating the continuing signal K2 and terminates K1 thereby stepping the computer system to step K2.

During the first minor cycle of K2, when J is present, the word which is the contents of the address designated by A1 (the multiplier) is forwarded from the memory drum 38 to the drum-read and record 37 via one of the memory drum input-output lines 320 (designated by A1) and is passed via the F line 326 to the accumulator 14 which receives and stores it. Since K1 is no longer being fed to the control register 24, the word designated by A1 does not enter the control register 24.

K2 is fed via the K2 line 246 to the control register 24. As a result of K2, the word of instruction is again sent from the control register 24 via the address output line 250 to the timing selector 30 and the memory channel selector 32. K2 times the transmission of the word so that A2 arrives at the timing selector 30 and the memory channel selector 32 during the functioning periods of these circuits.

The designated channel and the position on the memory drum 38 whose address corresponds to A2 are located as previously described in respect to A1. When an address W is identical to the position-locating part of A2, X is generated and sent to the step counter 22 and functions to terminate K2 and generate the continuing signal K3 thereby stepping the computer system to step K3. The J which results acts within the timing selector 30 to prevent further comparison from being made during the next thirty pulse times.

The word which is the contents of the address designated by A2 (the multiplicand) is fed via the memory drum input-output line 320 which is designated by A2 to the drum-read and record 37 and is passed to the accumulator 14 via the F line 326.

When the multiplicand enters the accumulator 14, its least significant digit is multiplied without carry by the least significant digit of the multiplier and this is followed by the multiplication without carry of the second least significant digits of the operands, and so on until each digit of the multiplicand is multiplied by the corresponding digit of the multiplier. The product then circulates in the accumulator 14.

K3 is sent via the K3 line 248 from the step counter 22 to the control register 24 and the drum-read and record 37. J is fed from the timing selector 30 to the drum-read and record 37 via the J line 312. J and K3 function to prepare the drum-read and record 37 to send information to the memory drum 38, and to send a signal via the delay flop input line 342 to the memory channel selector 32 to generate AJ and temporarily block the timing selector 30 as previously described.

Due to K3, the control register 24 sends the word of instruction designated by the sequence-directing address to the timing selector 30 and the memory channel selector 32 via the address output line 250. The transmission of the word of instruction is timed so that the A3 portion of the word controls the functioning of the memory channel selector 32 and the timing selector 30.

The proper channel and position on the memory drum 38 corresponding to A3 are located in a manner as was described for A1 and A2 and the timing selector 30 generates another X and J as well as a signal FJD which lasts for thirty pulse times.

X is sent via the X line 308 to the step counter 22 and terminates K3 and generates K0 thereby stepping the computer system to step K0. J is transmitted via the J line 312 to the drum-read and record 37 where, with K0 received via the K0 line 242, J will later function to prevent the drum-read and record 37 from sending information to the memory drum 38.

FJD is sent via the FJD line 316 to the drum-read and record 37 and functions with a delayed K3 to permit the drum-read and record 37 to receive the product of the logical multiplication circulating in the accumulator 14 via the G output line 118. The signal is then transferred to the drum-read and record 37 and from there to the memory drum 38 via the memory drum input-output line 320 designated by A3, and is recorded on the memory drum 38 in the position whose address corresponds to A3.

When the product has been recorded, J and K0 function in the drum-read and record 37 to prevent further recording on the memory drum 38, and to send a signal via the delay flop input line 342 to generate AJ and temporarily block the timing selector 30 as previously described. The logical multiplication procedure has been completed and the computer system is prepared to go to the next procedure as directed.

Thus, in the logical multiplication procedure, the computer system has functioned to locate two operands, to multiply them digit by digit without carry and to record the product in the appropriate position on the memory drum 38.

XVII. LOW ORDER MULTIPLICATION

The computer system functions during the low order multiplication procedure illustrated in Fig. 11 to multiply two numbers located in specified memory positions and store the twenty-seven least significant binary digits of the product in a third specified position. These operations are performed in response to a word of instruction obtained from the memory drum 38 which is of the form I A3 A2 A1. If I=1, the word of instruction is interpreted to mean "low order multiplication." A3, A2, and A1 are numbers representing addresses on the memory drum 38. The position on the memory drum 38 whose address corresponds to the address A1 contains the multiplier; the position on the memory drum 38 whose address corresponds to A2 contains the multiplicand, and A3 denotes the location of a position on the memory drum 38 into which the twenty-seven least significant binary digits of the product of the contents of the positions designated by A1 and A2 will be stored.

If the program containing the words of instruction and the operands is assumed to have been inserted, the continue switch is depressed to start the automatic operation. A sequence-directing address corresponding to the location of a word of instruction on the memory drum 38 will be circulating within the control counter 29 as will hereinafter be indicated and it will be assumed that the address specified is one containing a "low order multiplication" instruction.

The automatic operation is begun at the K0 step. K0 is fed via the K0 line 242 from the step counter 22 to the control counter 29 and functions to gate the sequence-directing address via the sequence output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 30 from the W generator 300 to the timing selector 30. The timing selector 30 compares each address W with one part of the sequence-directing address until an identical address W is found.

As a result of the identity of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the number representing the sequence-directing address to be increased to the next consecutive value corresponding to the next consecutive address. J is also fed via the J line 312 to the drum-read and record 37 and functions to enable the drum-read and record 37 to receive the word of information stored in the selected position on the memory drum 38. The word designated by the sequence-directing address is composed of the pulses which represent the word of instruction comprising I, A1, A2, and A3.

K1 is fed via the K1 line 244 to the control register 24 and functions to permit the word from the memory drum 38 to enter the control register 24. The word of instruction contained in the position on the memory drum 38 designated by the sequence-directing address is forwarded via the memory drum input-output line 320 from the memory drum 38 to the drum-read and record 37. The word of instruction passes though the drum-read and record 37 and is transferred via the F line 326 to the control register 24, and the word of instruction circulates in the control register 24 during the major portion of the low order multiplication procedure.

Pulses which are equivalent to the portion of the word of instruction which represent I are sent via the static control register input lines 226a, 226b, and 226c to the static control register 28 and, as I is in this case an instruction for low order multiplication (i.e., I=1), the pulses generate a continuing signal M. M is fed via the M control line 264 to the storage register 10, the precessing pulse register 12, the accumulator 14, and the step counter 22. M functions in the storage register 10 to aid in closing a recirculation loop so that the storage register 10 can store a word of information. M functions to prepare the precessing pulse register 12 and the accumulator 14 to receive a word of information, and to aid in closing a recirculation loop in each circuit so that information can be recirculated. M subsequently acts in the step counter 22 to generate an auxiliary signal AM, as will be shown.

As a result of K1, the word of instruction is also transmitted from the control register 24 to the timing selector 30 and the memory channel selector 32 via the address output line 250. K1 times the transmission of the word so that the A1 portion of the word of instruction arrives at the memory channel selector 32 and the timing selector 30 during the functioning periods of these two circuits. As a result, the memory channel selector 32 selects the channel of the memory drum 38 designated by the channel designating part of A1, and the timing selector 30 compares the position-locating part of A1 with each W received from the W generator 300 as was previously described for the comparison of the sequence-directing address.

When the position-locating part of A1 is identical to W, another X and J result and the position on the memory drum 38 whose address corresponds to the position-locating part of A1 is thereby located. J functions within the timing selector 30 to prevent further comparisons from being made during the next thirty pulse times. X is transmitted via the X line 308 to the step counter 22 and aids in generating the continuing signal K2 and terminates K1 thereby stepping the computer system to step K2.

During the first minor cycle of K2, when J is present, the word which is the contents of the address designated by A1 (the multiplier) is forwarded from the memory drum 38 to the drum-read and record 37 via one of the memory drum input-output lines 320 (designated by A1) and is passed via the F line 326 to the accomulator 14 which receives and stores it. Since K1 is no longer being fed to the control register 24, the word designated by A1 does not enter the control register 24.

K2 is fed from the step counter 22 via the K2 line 246 to the control register 24 and the accumulator 14. As a result of K2, the word of instruction is again sent from the control register 24 via the address output line 250 to the timing selector 30 and the memory channel selector 32. K2 times the transmission of the word so that the A2 portion of the word of instruction arrives at the timing selector 30 and the memory channel selector 32 during the functionnig periods of these two circuits. K2 functions with M in the accumulator 14 to close a recirculation loop so that the accumulator 14 can store the word of information whose position on the memory drum 38 was designated by A2.

The designated channel of the memory drum 38 and the position on the memory drum 38 whose address corresponds to A2 are located as previously described in respect to A1. When an address W identical to the position-locating portion of A2 appears, X is generated and sent to the step counter 22 and functions to terminate K2 and generate K3 thereby stepping the computer system to step K3. The resulting J acts within the timing selector 30 to prevent comparison from being made during the next thirty pulse times.

J is sent via the J line 312 to the precessing pulse register 12 and prevents generation of a signal which would otherwise be sent via the accumulator input line 136 to the accumulator 14 to close the recirculation loop which is open due to the termination of K2. When the word designated by A2 (the multiplicand) is received it will be forwarded to the storage register 10 by way of the accumulator 14. J also functions with M to prepare the precessing pulse register 12 to receive the contents of the accumulator 14 (the multiplier).

The step counter 22 receives J via the J line 312 and generates an auxiliary signal AM which arises after the termination of J and lasts for thirty pulse times. AM is sent via the AM line 292 to the storage register 10 to aid in preparing it to receive the operand designated by A2. AM is sent via the same line to the timing selector 30 to block the generation of signals for thirty pulse times.

K3 is fed via the K3 line 248 to the storage register 10, the precessing pulse register 12, the accumulator 14, the control register 24, and the drum-read and record 37.

In the storage register 10, K3 acts with M to close a recirculation loop thus preparing the storage register 10 to receive and store the multiplicand (designated by A2). The recirculation loop under these conditions is so arranged that the multiplicand precesses or shifts one pulse time later in time with respect to the word circulating in accumulator 14. K3 functions with M and J in the precessing pulse register 12 to allow the multiplier designated by A1 to be reecived from the accumulator 14 via the accumulator output line 126. K3 will close a recirculation loop in the accumulator 14 after the multiplicand has been passed to the storage register 10, and enables the accumulator 14 to later receive and store the product. K3 functions in the control register 24 to permit the timing selector 30 and memory channel selector 32 to sample A3 via the address output line 250 in the manner previously explained for A2. K3 acts in the drum-read and record 37 to aid in preparing for the subsequent sending of information to the memory drum 38, and also acts with J to send a signal via the delay flop input line 342 to the memory channel selector 32 to generate AJ which temporarily blocks the timing seelctor 30 as previously described.

As mentioned above, the multiplier is sent during the coexistence of J and K3 from the accumulator 14 via the accumulator output line 126 to the precessing pulse register 12. The multiplicand is simultaneously transmitted to the accumulator 14, but does not circulate in the accumulator 14 because there is no closed recirculation loop. Instead, the multiplicand passes through the accumulator 14 and, as a result of AM, which by that time is present, passes via the accumulator output line 126, enters the storage register 10. It does not enter the precessing pulse register 12 because of the prior termination of J.

When the multiplier has entered the precessing pulse register 12 and the multiplicand is entering or has entered the storage register 10, the circuits function as following during each minor cycle: If the multiplying digit of the multiplier is a 1 (which is represented by the presence of a pulse), the precessing pulses register 12 forwards a gating signal via the accumulator gating line 106 to the accumulator 14 which is then able to receive a signal equivalent to the entire multiplicand from the storage register 10 via the storage register output line 116. If the multiplying digit is a 0, the multiplicand is inhibited from entering the accumulator 14.

The first partial product (the forwarded multiplicand) circulates in the accumulator 14 in which, after the termination of J and AM during step K3, there is a closed recirculation loop. The next partial product which enters the accumulator 14 is shifted one pulse time later in time with respect to the word in the accumulator 14, and is added to the partial product previously entered and their sum circulates. Successive partial products which enter the accumulator 14 are each shifted to a position one pulse time later in time with respect to the one which preceded them and are added to the circulating sums of prior partial products. The accumulator 14 operates during each minor cycle to discard the contents of the three earliest (and most significant) pulse positions. These pulse positions are not required for the low order multiplication product.

When all of the multiplying digits which will gate the multiplicand to the accumulator 14 have been utilized, the product circulates in the accumulator 14. The precessing pulse register 12 then forwards a signal AB to the timing selector 30 via the AB line 130. AB permits the timing selector 30 to compare the position-locating portion of A3 with W as previously described in respect to A1 and A2.

More particularly, AB is generated in the precessing pulse register 12 when all of the 1's of the multiplier have been used for multiplication purposes and all of the remaining successive digits of the multiplier are 0's. Since AB permits the timing selector 30 to function, the actual multiplying operation is effectively terminated. The computer system thus senses that the results of further multiplications of the multiplicand by digits of the multiplier will be zero and functions to terminate the actual multiplication operation to reduce the required computation time.

In the timing selector 30 when W is identical to the part of A3 which is used for locating the designated position on the memory drum 38, the timing selector 30 generates another X and J as well as a signal FJD which lasts for thirty pulse times. X is sent via the X line 308 to the step counter 22 and terminates K3 and generates K0 thereby stepping the computer system to step K0. J is transmitted via the J line 312 to the drum-read and record 37 where, with K0 which is forwarded via the K0 line 242, J will subsequently function to prevent the drum-read and record 37 from sending information to the memory drum 38 and to send a signal via the delay flop input line 342 to the memory channel selector 32 to generate AJ and temporarily block the timing selector 30 as previously described.

FJD is sent via the FJD line 316 to the drum-read and record 37 and functions with a delayed K3 to permit the drum-read and record 37 to receive the product from the accumulator 14 via the G output line 118. The product is then transferred to the memory drum 38 via the memory drum input-output line 320 designated by A3 and is recorded on the memory drum 38 in the position whose address corresponds to the position-locating portion of A3. When the product has been recorded, J and K0 function in the drum-read and record 37 to prevent further recording on the memory drum 38. The low order multiplication procedure has been completed and the computer system is prepared to go to the next procedure as directed.

Thus, during the low order multiplication procedure, the computer system has functioned to locate a multiplier and multiplicand, to multiply these two and retain the twenty-seven least significant binary digits of their product, and to record these twenty-seven least significant binary digits in the appropriate position on the memory drum 38.

XVIII. HIGH ORDER MULTIPLICATION

The computer system functions during the high order multiplication procedure illustrated in Fig. 12 to multiply two numbers located in specified memory positions and store the sign and the twenty-nine most significant binary digits of the product in a third specified position. These operations are performed in response to a word of instruction obtained from the memory drum 38 which is of the form I A3 A2 A1. If $I=2$, the word of instruction is interpreted to mean "high order multiplication." A3, A2, and A1 are numbers representing addresses on the memory drum 38. The position on the memory drum 38 whose address corresponds to the address A1 contains the multiplier; the position on the memory drum 38 whose address corresponds to A2 contains the multiplicand, and A3 denotes the location of a position on the memory drum 38 into which the sign and the twenty-nine most significant binary digits of the product of the contents of the positions designated by A1 and A2 will be stored.

If the program containing the words of instruction and spect to A1. When an address W identical to the position-locating portion of A2 appears, X is generated and sent to the step counter 22 and functions to terminate K2 and generate K3 thereby stepping the computer system to step K3. The resulting J acts within the timing selector 30 to prevent comparison from being made during the next thirty pulse times.

J is sent via the J line 312 to the precessing pulse register 12 and prevents generation of a signal which would otherwise be sent via the accumulator input line 136 to the accumulator 14 to close the recirculation loop which is open due to the termination of K2. When the word designated by A2 (the multiplicand) is received it will be forwarded to the storage register 10 by way of the accumulator 14. J also functions with M to prepare the precessing pulse register 12 to receive the contents of the accumulator 14 (the multiplier). The accumulator 14 which receives J via the J line 312 utilizes J to aid in priming complementing and sign-sensing circuitry. The step counter 22 receives J via the J line 312 and generates an auxiliary signal AM which arises after the termination of J and lasts for thirty pulse times.

AM is sent via the AM line 292 to the storage register 10 to aid in preparing it to receive the multiplicand and to the accumulator 14 to aid in priming the sign-sensing and complementing circuitry. AM is transmitted via the same line to the timing selector 30 and prevents the generation of signals for the next thirty pulse times. AM is also sent to the precessing pulse register 12 via the AM line 292 and functions to gate a control pulse into the recirculation loop.

K3 is fed via the K3 line 248 to the storage register 10, the precessing pulse register 12, the accumulator 14, the control register 24, and the drum-read and record 37.

In the storage register 10, K3 acts with N to close a recirculation loop thus preparing the storage register 10 to receive and store the multiplicand designated by A2 and to prepare for a subsequent modification of the recirculation loop closed by K3 and M. K3 functions with M and J in the precessing pulse register 12 to allow the multiplier designated by A1 to be received from the accumulator 14 via the accumulator output line 126. K3 functions with N in the precessing pulse register 12 to generate a subsequent auxiliary signal as will be shown. K3 will later operate with N to close a recirculation loop in the accumulator 14 and thus provide for the proper addition of the partial products of the multiplication. K3 also aids in priming the complementing and sign-sensing circuitry of the accumulator 14. K3 functions in the control register 24 to permit the timing selector 30 and memory channel selector 32 to sample A3 via the address output line 250 in the manner previously explained for A2. K3 acts in the drum-read and record 37 to aid in preparing for the subsequent sending of information to the memory drum 38 and also acts with J to generate a signal which is sent via the delay flop input line 342 to the memory channel selector 32 to generate AJ which temporarily blocks the timing selector 30 as previously described.

As mentioned above, the multiplier is sent during the coexistence of J and K3 from the accumulator 14 via the accumulator output line 126 to the precessing pulse register 12. If the multiplier is a negative number, it will be complemented (before being sent to the precessing register 12) in the accumulator 14 by the complementing circuitry which has been primed by J, K3 and N. The sign-sensing circuitry (primed by J, K3, and N) of the accumulator 14 will retain a signal which indicates that the multiplier has been complemented and will later operate to complement the product of the multiplication. If the multiplier is positive, the complementing and sign-sensing circuitry will not affect it.

The multiplicand is simultaneously transmitted to the accumulator 14 but does not recirculate in the accumulator 14 because there is no closed recirculation loop. Instead, the multiplicand passes through the accumulator 14 and, via the accumulator output line 126, enters the storage register 10. It does not enter the precessing pulse register 12 because of the prior termination of J.

If the multiplicand is negative and the multiplier has been complemented, the complementing circuitry (primed by AM, K3 and N) of the accumulator 14 will complement the multiplicand (before sending it to the storage register 10), but the sign-sensing circuitry of the accumulator 14 will terminate the signal generated by the negative multiplier and thus will not later cause the product of the multiplication to be complemented. If the multiplicand is negative and the multiplier has not been complemented, the complementing circuitry will complement the multiplicand and the sign-sensing circuitry will retain a signal and later will operate to complement the product of the multiplication. The sign-sensing and complementing circuitry do not affect a positive multiplicand.

When the multiplier has entered the precessing pulse register 12 and the multiplicand is entering or has entered the storage register 10, the circuits function as follows during each minor cycle: If the multiplying digit of the multiplier is a 1 (which is represented by the presence of a pulse), the precessing pulse register 12 forwards a gating signal via the accumulator gating line 106 to the accumulator 14 which is then able to receive a signal equivalent to the entire multiplicand from the storage register 10 via the storage register output line 116. If the multiplying digit is a 0, the multiplicand is inhibited from entering the accumulator 14.

The first partial product (the forwarded multiplicand) circulates in the accumulator 14 in which, after the termination of J during step K3, there is a closed recirculation loop. The next partial product (corresponding to the multiplicand) which enters the accumulator 14 is added to the partial product previously entered and their sum circulates, but before the addition takes place, the first partial product is advanced in time with respect to the next one by an amount equal to one pulse time. Successive partial products which enter the accumulator 14 are added to the circulating sums of prior partial products, each such sum being advanced in time as previously described before the addition takes place. The accumulator 14 operates during each minor cycle to discard the least significant digit of the successive sums as they are accumulated and circulated through the accumulator 14 until the signal is transmitted from the precessing pulse register 12 to the accumulator 14.

As a result of the presence of K3, the control pulse and N, a signal AN is subsequently generated in the precessing pulse register 12 and is fed via the AN line 112 to the accumulator 14 to assist in enabling the accumulator 14 to add the partial products and to terminate the discarding of digits of the results, and to alert the overflow circuitry. AN terminates the discarding of digits and the advancing in time of the sums immediately preceding the accumulating of the final product. As a result the final product comprises thirty digits which represent the twenty-nine most significant digits and the sign of the product (the sign at this point always being positive, since negative factors have been complemented).

AN is also fed via the AN line 112 to the storage register 10 and operates to delay the final partial product by one pulse time before sending it to the accumulator 14, and to gate an overflow signal to the accumulator 14 via the overflow indicator line 178 if the information circulating in the storage register 10 and precessing pulse register 12 indicates that the result of the multiplication will be a number which the computer system cannot correctly manipulate. The precessing pulse register 12 in such instance transmits a signal indicating the possibility of overflow to the storage register 10 via a branch of the accumulator gating line 106.

the operands is assumed to have been inserted, the continue switch is depressed to start the automatic operation. A sequence-directing address corresponding to the location of a word of instruction on the memory drum 38 will be circulating within the control counter 29 as will hereinafter be indicated and it will be assumed that the address specified is one containing a "high order multiplication" instruction.

The automatic operation is begun at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 306 from the W generator 300 to the timing selector 30. The timing selector 30 compares each address W with one part of the sequence-directing address until an identical address W is found.

As a result of the identity of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the number representing the sequence-directing address to be increased to the next consecutive value corresponding to the next consecutive address. J is also fed via the J line 312 to the drum-read and record 37 and functions to enable the drum-read and record 37 to receive the word of information stored in the selected position on the memory drum 38. The word designated by the sequence-directing address is composed of the pulses which represent the word of instruction comprising I, A1, A2, and A3.

K1 is fed via the K1 line 244 to the control register 24 and functions to permit the word from the memory drum 38 to enter the control register 24. The word of instruction contained in the position on the memory drum 38 designated by the sequence-directing address is forwarded via the memory drum input-output line 320 from the memory drum 38 to the drum-read and record 37. The word of instruction passes through the drum-read and record 37 and is transferred via the F line 326 to the control register 24, and the word of instruction circulates in the control register 24 during the major portion of the high order multiplication procedure.

Pulses which are equivalent to the portion of the word of instruction which represent I are sent via the static control register input lines 226a, 226b, and 226c to the static control register 28 and, as I is in this case an instruction for high order multiplication (i.e., $I=2$), the pulses generate continuing signals N and M.

N is forwarded via the N control line 288 to the storage register 10, the precessing pulse register 12, and the accumulator 14. N operates in the storage register 10 to aid in closing a recirculation loop for the subsequent storage of the multiplicand. In the precessing pulse register 12, N remains present and later aids in generating auxiliary signals as will be shown. N functions in the accumulator 14 to help in priming sign-sensing, complementing, and overflow circuitry (not shown) which will be later utilized, and N remains present in the accumulator 14 to close a recirculation loop during step K3.

M is forwarded via the M control line 264 to the storage register 10, the precessing pulse register 12, the accumulator 14, and the step counter 22. M functions in the storage register 10 to aid in modifying the recirculation loop which N aids in closing. M functions to prepare the precessing pulse register 12 and the accumulator 14 to receive a word of information, and to aid in closing a recirculation loop in each circuit so that information can be circulated. M subsequently acts in the step counter 22 to generate an auxiliary signal AM as will be shown.

As a result of K1, the word of instruction is also transmitted from the control register 24 to the timing selector 30 and the memory channel selector 32 via the address output line 250. K1 times the transmission of the word so that the A1 portion of the word of instruction arrives at the memory channel selector 32 and the timing selector 30 during the functioning periods of these two circuits. As a result, the memory channel selector 32 selects the channel of the memory drum 38 designated by the channel designating part of A1, and the timing selector 30 compares the position-locating part of A1 with each W received from the W generator 300 as was previously described for the comparison of the sequence-directing address.

When the position-locating portion of A1 is identical to W, another X and J result and the position on the memory drum 38 whose address corresponds to the position-locating portion of A1 is thereby located. J functions within the timing selector 30 to prevent further comparisons from being made during the next thirty pulse times. X is transmitted via the X line 308 to the step counter 22 and aids in generating the continuing signal K2 and terminates K1 thereby stepping the computer system to step K2.

During the first minor cycle of K2, when J is present, the word which is the contents of the address designated by A1 (the multiplier) is forwarded from the memory drum 38 to the drum-read and record 37 via one of the memory drum input-output lines 320 (designated by A1) and is passed via the F line 326 to the accumulator 14 which receives and stores it. Since K1 is no longer being fed to the control register 24, the word designated by A1 does not enter the control register 24.

K2 is fed from the step counter 22 via the K2 line 246 to the control register 24 and to the accumulator 14. As a result of K2, the word of instruction is again sent from the control register 24 via the address output line 250 to the timing selector 30 and the memory channel selector 32. K2 times the transmission of the word so that the A2 portion of the word of instruction arrives at the timing selector 30 and the memory channel selector 32 during the functioning periods of these two circuits. K2 functions with M in the accumulator 14 to close a recirculation loop so that the accumulator 14 can store the word of information whose position on the memory drum 38 is designated by A1.

The designated channel of the memory drum 38 and the position on the memory drum 38 whose address corresponds to A2 are located as previously described in re- When the multiplication is complete and the product circulates in the accumulator 14, the precessing pulse register 12 forwards a signal AB via the AB line 130 to the timing selector 30. AB permits the timing selector 30 to compare the position-locating part of A3 with W as previously described in respect to A1 and A2.

When an address W is identical to the part of A3 which is used for locating the designated position on the memory drum 38, the timing selector 30 generates another X and J as well as signals FJ and FJD which last for thirty pulse times. X is sent via the X line 308 to the step counter 22 and terminates K3 and generates K0 thereby stepping the computer system to step K0. J is transmitted to the drum-read and record 37 where, with K0 which is forwarded via the K0 line 242, J will subsequently function to prevent the drum-read and record 37 from sending information to the memory drum 38.

FJ is sent via the FJ line 332 from the timing selector 30 to the accumulator 14 and functions with K3 to complement the product if the sign-sensing circuitry has been set for complementing the product.

FJD is sent via the FJD line 316 to the drum-read and record 37 and functions with a delayed K3 to permit the drum-read and record 37 to receive the product from the accumulator 14 via the G output line 118. The product is then transferred to the memory drum 38 via the memory drum input-output line 320 designated by A3 and is recorded on the memory drum 38 in the position whose address corresponds to A3.

When the product has been recorded, J and K0 function in the drum-read and record 37 to prevent further recording on the memory drum 38 and to send a signal via the delay flop input line 342 to the memory channel selector 32 to generate AJ and temporarily block the timing selector 30 as previously described. The high order multiplication procedure has been completed and the computer system is prepared to go to the next procedure as directed.

Thus, during the high order multiplication procedure, the computer system functions to locate a multiplier and multiplicand, to multiply these two and retain the sign and the twenty-nine most significant binary digits of their product, and to record this product and proper sign in the appropriate position on the memory drum 38.

XIX. MULTIPLICATION WITH ROUNDOFF

The computer system functions during the multiplication with roundoff procedure as it would function for the high order multiplication procedure except that a binary digit is added to the thirtieth most significant place of the product of the multiplication. Since the thirtieth most significant place of the product is eventually discarded in high order multiplication, the effect of the addition of the binary digit is the carry which may result into the retained portion of the product.

The multiplication with roundoff procedure will be described in connection with the high order multiplication procedure illustrated in Fig. 12.

When the instruction I, which is 3 for the multiplication with roundoff procedure, is received by the static control register 28, a continuing signal BM is generated as well as the signals M and N. BM is fed via the BM line 294 from the static control register 28 to the accumulator 14 and, when AM is present, gates a pulse into the accumulator 14. The gated pulse is timed to coincide with the thirtieth most significant pulse position of the final product and is added in the accumulator 14 to the thirtieth most significant place of the product.

The only effect which this addition has on the result is the carry which may be produced. This modified high order multiplication is the multiplication with roundoff procedure.

XX. BRANCH INSTRUCTION

The computer system functions during the branch instruction procedure illustrated in Fig. 13 to change the sequence-directing address which is circulating in the control counter 29. The computer system locates an instruction I which is 7 for branch instruction, and three addresses A1, A2, and A3. The word of information whose location on the memory drum 38 is designated by A1 is examined and if the word is numerically zero, the address A2 is substituted in place of the sequence-directing address in the control counter 29; if the word is numerically positive and non-zero, the address A3 is substituted. If the word is numerically negative, the sequence-directing address is not changed.

At the beginning of the branch instruction procedure, a sequence-directing address (nine binary digits represented by a nine pulse time signal) circulates within the control counter 29. The branch instruction always occurs during the automatic operation of the computer beginning at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 306 from the W generator 300 to the timing selector 30. The timing selector 30 compares each address W with one part of the sequence-directing address until an identical address W is found.

As a result of the identity of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the sequence-directing address to be increased to the value corresponding to the next consecutive address.

J is also fed via the J line 312 to the drum-read and record 37 and functions to enable the drum-read and record 37 to receive the word of information stored in the selected position on the memory drum 38. The word of information designated by the sequence-directing address is composed of the pulses which represent the word of instruction comprising I, A1, A2, and A3, and it is assumed that at this time $I=7$, indicating a branch instruction.

K1 is fed via the K1 line 244 to the control register 24 and functions to permit the word of instruction from the memory drum 38 to enter the control register 24. The word of instruction contained in the position on the memory drum 38 designated by the sequence-directing address is forwarded via the memory drum input-output line 320 from the memory drum 38 to the drum-read and record 37. The word passes through the drum-read and record 37 and is transferred via the F line 326 to the control register 24, and the word of instruction circulates in the control register 24 during the major portion of the branch instruction procedure.

Pulses which are equivalent to the portion of the word of instruction which represent I are sent via the static control register input lines 226a, 226b, and 226c to the static control register 28 and, as I is in this case an instruction for branch instruction (i.e., $I=7$), the pulses periodically generate the pulse B. B is fed periodically via the B control line 296 to the branch circuit 27 and aids in preparing the branch circuit 27 to change the sequence-directing address in the control counter 29. B is also fed to the step counter 22 where B will subsequently terminate K2 and step the computer system to K0.

As a result of K1, the word of instruction is also transmitted from the control register 24 to the timing selector 30 and the memory channel selector 32 via the address output line 250. K1 times the transmission of the word of instruction so that the A1 portion of the word arrives at the memory channel selector 32 and the timing selector 30 during the functioning periods of these two circuits. As a result, the memory channel selector 32 selects the channel designating part of A1, and the timing selector 30 compares the position-locating part of A1 with each W received from the W generator 300 as was previously described for the comparison of the sequence-directing address.

When the position-locating portion of A1 is identical to W, another X and J result and the position on the memory drum 38 whose address corresponds to A1 is located. J functions within the timing selector 30 to prevent further comparisons from being made during the next thirty pulse times. X is transmitted via the X line 308 to the step counter 22 and aids in generating the continuing signal K2 and terminates K1 thereby stepping the computer system to step K2.

K2 is fed via the K2 line 246 to the branch circuit 27. The word of information which is the contents of the address designated by A1 is forwarded from the memory drum 38 to the drum-read and record 37 via one of the memory drum input-output lines 320 (designated by A1), and is passed via the F line 326 to the branch circuit 27 which has been prepared by B and K2 to receive it. Since K1 is no longer being fed to the control register 24, the word of information designated by A1 does not enter the control register 24.

The addresses A3 and A2 are simultaneously fed from the control register 24 via the branch instruction lines 298a and 298b, respectively, to the branch circuit 27. The branch circuit 27 examines the word of information designated by A1 to determine whether the word is positive and non-zero, zero, or negative. If the word designated by A1 is positive and non-zero, the address A3 is transmitted via the sequence-changing line 290a to the control counter 29; if the word designated by A1 is zero, the address A2 is transmitted via the sequence-changing line 290b to the control counter 29.

If either A2 or A3 is transmitted, the branch circuit 27 also sends a signal via the branch clear line 240 to the control counter 29 and blocks the sequence-directing address which was circulating, and generates the signal CJ. CJ is fed via the CJ line 258 to the step counter 22 and generates AM. AM is fed via the AM line 292 to the timing selector 30 and prevents the timing selector 30 from comparing the signal in the control counter 29 with the address information signals W while the signal in the control counter 29 is being changed.

If the contents of A1 are negative, the sequence-directing address circulating in the control counter is not changed to A3 or A2, but is left unchanged, and thus has a value corresponding to the next consecutive address as explained above.

Thus, during the branch instruction procedure, the computer decides whether or not to substitute another sequence-directing address for the next consecutive address, depending on the condition of the contents of A1.

XXI. TAPE-READ

The computer system functions during the tape-read procedure illustrated in Fig. 14 to locate an instruction of tape-read, to obtain words of information from the tape unit 50, and to record these words in appropriate positions on a designated channel of the memory drum 38.

If the program containing the words of instruction and the operands is assumed to have been inserted, the continue switch is depressed to start the automatic operation. A sequence-directing address corresponding to the location of the word of instruction on the memory drum 38 will be circulating within the control counter 29 as will hereinafter be indicated.

The automatic operation is begun at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay selecting lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 306 from the W generator 309 to the timing selector 30. The timing selector 30 compares each address W with one part of the sequence-directing address until an identical address W is found.

As a result of the identity of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the sequence-directing address to be increased to the next consecutive address. J is also fed via the J line 312 to the drum-read and record 37 to receive the word of information stored in the selected position on the memory drum 38. J is also fed to the static control register 28 via the J line 312 and will aid in preparing for the subsequent generation of control signals E and BP.

K1 is fed via the K1 line 244 to the control register 24 and functions to permit the receipt of the word of information designated by the sequence-directing address. K1 also functions to gate a path for this word of information via the address output line 250 to the timing selector 30 and the memory channel selector 32. K1 is also fed via the K1 line 244 to the static control register 28 and aids in preparing for the subsequent generation of the control signals D, E, and BP.

The word of instruction contained in the position on the memory drum 38 designated by the sequence-directing address is forwarded via the memory drum input-output line 320 from the memory drum 38 to the drum-read and record 37. The word passes through the drum-read and record 37 and is transferred via the F line 326 to the control register 24, and the word of instruction circulates in the control register 24 during the major portion of the tape-read procedure, certain parts of it being altered in the course of the process as hereinafter described.

Pulses which are equivalent to the portion of the word of instruction which represent I and A3 are sent via the static control register input line 226 to the static control register 28 and, as I and A3 are in this case an instruction for tape-read, the pulses generate the control signals D, E, and BP.

As will be shown, D, E, and BP aid in preparing the computer system for transferring information to the memory drum 38 from the tape unit 50.

The tape unit 50 includes the tape-read and record heads (not shown) which will be used to read pulses (which represent binarily-expressed octal digits) from the magnetic tape (not shown). On the magnetic tape, sprocket pulses are permanently recorded in positions which will be examined by a tape-read and record head immediately preceding each reading of a binarily-expressed digit. The sprocket pulses are used to aid in preparing the computer system to receive binarily-expressed octal digits from the tape unit 50.

It should be noted that although the multiple functions of the signals are sequentially explained the operations due to the presence of D, E, and BP occur at substantially the same time unless stated otherwise.

D is fed via the D control line 295 from the static control register 28 to the tape unit 50, the distributor 56, the accumulator 14, and the drum-read and record 37.

D operates in the tape unit 50 to allow the magnetic tape to be accelerated to operating speed, and in the distributor 56 to permit the entrance of sprocket pulses (but only during the time the tape is moving at substantially normal speed). When the magnetic tape has been accelerated to operating speed, the first sprocket pulse read by the tape-read and record head is fed via the sprocket pulse line 538 from the tape unit 50 to the distributor 56 and aids in generating the signal AR hereinafter explained. The binarily-expressed octal digit, whose presence is indicated by the appearance of a sprocket pulse, is then read by the appropriate tape-read and record head and three signals BA, BB, and BC (which represent the binary expression of the octal digit) are generated and transmitted in parallel via the tape output lines 536 to the distributor 56 and remain available for later distribution in pulse form to the storage register 10.

D functions to aid in subsequently preparing the acculator 14 to receive complete words of information from the storage register 10 sequentially and to store a word at a time. D remains present in the drum-read and record 37 to aid in priming the circuitry to receive words of information from the accumulator 14 to be forwarded to the memory drum 38.

E is sent via the E control line 293 from the static control register 28 to the precessing pulse register 12, the storage register 10, the accumulator 14, and the control register 24.

E functions in the precessing pulse register 12 to aid in later permitting the entrance of a control pulse (to initiate the signals which will be used to distribute BA, BB, and BC), to close a recirculation loop for the control pulse, and to aid in subsequently generating the auxiliary signals BK and BN which function as will be shown.

E will operate in the storage register 10 after step K1 to close a recirculation loop for the storage of information which will be received from the distributor 56. E aids the closing of a recirculation loop in the accumulator 14 for the storage of information which will be received from the storage register 10. E prepares the control register 24 to later send an address to the timing selector 30 and the memory channel selector 32 for each word of information which will be read.

BP is sent via the BP control line 297 from the static control register 28 to the step counter 22 and generates the signal AM after the J generated during the step K1 has been terminated. AM is sent via the AM line 292 to the timing selector 30, the drum-read and record 37, and the precessing pulse register 12.

AM, which lasts thirty pulse times, prevents the timing selector 30 from functioning during that period. AM operates with D in the drum-read and record 37 to allow information to be received from the accumulator 14 and sent to the memory drum 38, and to allow a signal to be sent via the delay flop input line 342 to the memory channel selector 32 to generate AJ which functions to temporarily block the action of the timing selector 30; and with E in the precessing pulse register 12 AJ functions to generate BK and BN and to gate the control pulse into the recirculation loop closed by E. The control pulse then circulates in the recirculation loop.

At this time, the instruction circulating in the control register 24 is modified by BK. BK is sent from the precessing pulse register 12 via the BK line 142 to the control register 24 and clears all but the channel designating part of the address A3 of the instruction. Due to the clearing action of BK, the remainder of the address is zero and the address for the first word of information to be recorded on the memory drum 38 becomes the zero position on the channel designated by the instruction. BN is transmitted from the precessing pulse register 12 via the BN line 144 to the step counter 22 and generates K3 thereby stepping the computer system to step K3.

In the precessing pulse register 12, the circulating control pulse previously mentioned periodically generates two pulses AW1 and AW2 at predetermined time intervals. AW1 and AW2 are forwarded periodically via the AW1 line 124 and the AW2 line 128, respectively, to the distributor 56.

In the tape unit 50, a sprocket pulse is generated as previously mentioned and is forwarded via the sprocket pulse line 538 to the distributor 56 as the binary expression of each octal digit is read from the magnetic tape. The sprocket pulse functions with AW1 or AW2, whichever arrives in the distributor 56 earliest after the generation of the sprocket pulse, to generate a signal AR.

AR is fed from the distributor 56 to the precessing pulse register 12 via the AR line 504 and functions to shift the circulating control pulse to a time position three pulse times earlier than the time position the circulating control pulse originally occupied in reference to its original position in a minor cycle. As a result, a pulse AS which is equivalent in time position to the shifted control pulse is forwarded via the AS line 114 from the precessing pulse register 12 to the distributor 56.

AS functions in the distributor 56 to convert BA, BB, and BC to pulse form and distribute these pulses in the three pulse times through which the shift was made and in the order in which the computer system is designed to handle them (least significant digit first). This three pulse signal is designated AL. AS thus functions to synchronize these pulses with the timing of the remainder of the computer system. AL is forwarded from the distributor 56 via the AL line 512 to the storage register 10. Each binarily-expressed octal digit which is read from the magnetic tape is sent from the tape unit 50 to the storage register 10 in the same manner and circulates in the storage register 10 until a complete word of information is serially distributed in a thirty pulse-time signal.

A pulse BR is generated in the step counter 22 at the end of the AM cycle and is fed via the BR line 279 to the precessing pulse register 12 where it functions to terminate the normally present continuing signal BQ. BQ is sent via the BQ line 148 to the timing selector 30 and allows the timing selector 30 to function; thus its termination prevents functioning of the timing selector 30 until a complete word has been read from the tape unit 50 and is ready for transfer to the memory drum 38.

When the control pulse shifts for the distribution of the last octal digit of a word of information, it also functions to restore the BQ signal, thus permitting timing selector 30 to function after a further delay of at least thirty pulse times.

At the same time a signal is sent from the precessing pulse register 12 to the accumulator 14 via the accumulator gating line 106 and permits the contents of the storage register 10 to be sent via the storage register output line 116 to the accumulator 14. The same gating signal, with E, opens the recirculation loop in the accumulator 14 so that the word of information previously stored may be cleared as the new word is read in.

The memory channel selector 32 again operates to select the proper channel of the memory drum 38. In the timing selector 30 the position-locating portion of the address which is forwarded via the address output line 250 from the control register 24 is compared with addresses W received from the W generator 390 in the same manner as the timing selector 30 made comparisons for the sequence-directing address.

When an address W is identical to the position-locating part of the address from control register 24, the timing selector 30 generates the signals J, X, and FJD. J is sent via the J line 312 to the control register 24 where it functions with E to increase the address to the value corresponding to the next consecutive address. J is also sent to the precessing pulse register 12, where it functions to terminate the BQ signal, thus again preventing the timing selector 30 from operating until another word of information has been read from the tape unit 50. The X which is fed to the step counter 22 does not step the computer system to step K0 at this time because the address circulating in the control register 24 is sent to the step counter 22 via the address output line 250 and prevents the termination of K3.

K3 and FJD are fed via the K3 line 248 and the FJD line 316, respectively, to the drum-read and record 37 and prepare the drum-read and record 37 to receive via the G output line 118 the first word of information which has been circulating in the accumulator 14.

The drum-read and record 37 transmits the first word of information to the memory drum 38 via that memory drum input-output line 320 which has been selected by the address and the word is recorded in the zero position on the memory drum 38.

Since the computer system has not been stepped to step K0, additional words of information will be transferred from the tape unit 50 to the memory drum 38 as described above and will be recorded in positions designated by consecutive addresses.

When one word of information has been recorded in each of the sixty-four positions on the designated channel of the memory drum 38, the address which is sent from the control register 24 to the step counter 22 via the address output line 250 permits X to function. X then steps the computer system to step K0.

Stepping to K0 results in the termination of E and D. The termination of D causes the tape to start decelerating; it also generates an AU signal in distributor 56, which is transmitted via the AU line 542 to the timing selector 30, when it prevents operation of the timing selector 30 until sufficient time has elapsed for the tape to come to rest. Thus, if a tape operation of any kind is followed by another tape operation, the latter will not start until the tape has come to rest.

K0 and J are fed via the K0 line 242 and J line 312, respectively, to the drum-read and record 37 and prevent further information from being sent to the memory drum 38. The tape-read procedure has been completed and the computer system is prepared to go to the next procedure as directed.

Thus, during the tape-read procedure, the computer system functions to transfer a number of words of information from the tape unit 50 to the memory drum 38. The number of words transferred is equal to the number of words required to fill all positions in one channel of the memory drum 38.

XXII. TAPE-REVERSE

The computer system functions during the tape-reverse procedure illustrated in Fig. 14 to rewind the magnetic tape and to prevent information from being recorded on the memory drum 38 during the operation. The procedure terminates after a length of the magnetic tape on which sixty-four words have been recorded has been rewound.

The tape-reverse procedure is substantially the same as the tape-read procedure, differing from the tape-read procedure only by the generation of the additional control signal R in the static control register 28.

The computer system operates as it would for tape-read except that a control signal R is also generated when the word of instruction (with I and A3 representing "tape-reverse") is sent to the static control register 28. R is fed via the R control line 287 from the static control register 28 to the tape unit 50 and the drum-read and record 37.

In the tape unit 50, R operates relays which reverse the direction of motion of the magnetic tape. In the drum-read and record 37, R prevents information from being sent to the memory drum 38, and prevents a signal from being sent via the delay flop line 342 to the memory channel selector 32 to generate AJ.

The tape-reverse procedure then terminates as it would for the tape-read procedure after a length of tape carrying sixty-four words has been rewound.

XXIII. TAPE-RECORD

The computer system functions during the tape-record procedure illustrated in Fig. 15 to locate an instruction of tape-record, to read words of information from the memory drum 38, and to record these words in the tape unit 50.

If the program containing the words of instruction and the operands is assumed to have been inserted, the continue switch is depressed to start the automatic operation. A sequence-directing address corresponding to the location of the word of instruction on the memory drum 38 will be circulating within the control counter 29 as will hereinafter be indicated.

The automatic operation is begun at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 306 from the W generator 300 to the timing selector 30. The timing selector 30 compares each address W with one part of the sequence-directing address until an identical address W is found.

As a result of the identity of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the sequence-directing address to be increased to the next consecutive address. J is also fed via the J line 312 to the drum-read and record 37 and functions to enable the drum-read and record 37 to receive the word of information stored in the selected position on the memory drum 38. J is also fed to the static control register 28 via the J line 312 and will aid in preparing for the subsequent generation of control signals E and BP.

K1 is fed via the K1 line 244 to the control register 24 and functions to permit the control register 24 to receive the word of information designated by the sequence-directing address. K1 also functions to gate a path for this word of information via the address output line 250 to the timing selector 30 and the memory channel selector 32. K1 is also fed via the K1 line 244 to the static control register 28 and aids in preparing for the subsequent generation of the control signals Z, D, E, and BP.

The word of instruction contained in the position on the memory drum 38 designated by the sequence-directing address is forwarded via the memory drum input-output line 320 from the memory drum 38 to the drum-read and record 37. The word passes through the drum-read and record 37 and is transferred via the F line 326 to the control register 24, and the word of instruction circulates in the control register 24 during the major portion of the tape-record procedure.

Pulses which are equivalent to the portion of the word of instruction which represent I and portions of A3 are sent via the static control register input lines 226 to the static control register 28 and, as I and A3 combine in this case to form an instruction for tape-record, the pulses generate the control signals Z, D, E, and BP. As will be shown, Z, D, E, and BP aid in preparing the computer system for transferring information from the memory drum 38 to the tape unit 50.

The tape unit 50 includes the tape-read and record heads (not shown) which will be used to record pulses (which represent binarily-expressed octal digits) on the magnetic tape (not shown). On the magnetic tape, sprocket pulses are permanently recorded in positions which correspond to portions of the magnetic tape which have acceptable magnetic properties so that recorded pulses will be properly reproduced during tape-read. The sprocket pulses are used to aid in preparing the computer system to record on the magnetic tape.

It should be noted that although the multiple functions of the signals are sequentially explained the operations due to the presence of Z, D, E, and BP occur at substantially the same time unless stated otherwise.

Z is sent via the Z control line 289 from the static control register 28 to the drum-read and record 37, the storage register 10, the distributor 56, and the step counter 22.

Z will later aid to prepare the drum-read and record 37 to receive designated words of information from the memory drum 38. As will be explained more specifically, each word of information will be transmitted via the drum-read and record 37 to the accumulator 14, and then to the storage register 10 which will be prepared by Z to receive information.

Z aids to prepare the distributor 56 to arrange the words which will be later received from the storage register 10 and forwarded to the tape unit 50. Z also helps in the distributor 56 to generate AR (which subsequently aids to arrange information in required order) at a time early in respect to the time at which AR would be generated if Z were not present (as, for example, during the tape-read procedure). The earlier generation of AR permits information to be recorded close to the sprocket pulse on the magnetic tape and insures that the information will not be overlooked in any subsequent tape-read procedure.

Z will later function to aid in preventing the termination of step K3 in the step counter 22 and, thereby, will provide for continuous operation of the computer system during the tape-record procedure. Z also functions in the step counter 22 to prevent the generation of the BR signal.

D is fed via the D control line 295 from the static control register 28 to the tape unit 50 and the distributor 56. D operates in the tape unit 50 to move the magnetic tape, and in the distributor 56 to permit the entrance of sprocket pulses (but only during the time the tape is moving at substantially normal speed).

E is sent via the E control line 293 from the static control register 28 to the precessing pulse register 12, the storage register 10, the accumulator 14, and the control register 24.

E functions in the precessing pulse register 12 to aid in later permitting the entrance of a control pulse (to initiate the signals which will be used to distribute the binary expressions of the octal digits to be recorded), to close a recirculation loop for the control pulse, and to aid in subsequently generating the auxiliary signals BK and BQ which function as will be shown.

E will operate in the storage register 10 after step K1 to close a recirculation loop for the storage of information which will be received from the accumulator 14. E aids the closing of a recirculation loop in the accumulator 14 for the storage of information which will be received from the memory drum 38.

E prepares the control register 24 to later send an address to the timing selector 30 and the memory channel selector 32 for each word of information which will be read.

BP is sent via the BP control line 297 from the static control register 28 to the step counter 22 and generates the signal AM after the J generated during the step K1 has been terminated. AM is sent via the AM line 292 to the timing selector 30 and the precessing pulse register 12.

AM, which lasts thirty pulse times, prevents the timing selector 30 from functioning during that period. AM operates with E in the precessing pulse register 12 to generate BK and to gate the control pulse into the recirculation loop closed by E. The control pulse circulates in the recirculation loop.

At this time, the instruction circulating in the control register 24 is modified by BK which is sent via the BK line 142 from the precessing pulse register 12 to the control register 24 and clears all but one part of the instruction. The uncleared part of the instruction functions as the channel-designating part of the address for locating the first word of information on the memory drum 38. Due to the clearing action of BK, the remainder of the address is zero and the address for the first word of information to be located on the memory drum 38 becomes the zero position on the channel designated by the instruction.

The new address is fed via the address output line 250 to the memory channel selector 32 and the timing selector 30 and functions (as was described for the sequence-directing address) to aid in the memory channel selector 32 to select the designated channel of the memory drum 38 and to aid in generating X and J in the timing selector 30.

X is fed via the X line 308 to the step counter 22 and aids in generating K2 and terminating K1 thereby stepping the computer system to step K2.

J is fed via the J line 312 to the drum-read and record 37 and, with Z, will permit the located word of information to be received via one of the memory drum input-output lines 320 from the memory drum 38. J is also fed via the J line 312 to the control register 24 and operates with E to permit the circulating address to be increased numerically to the next consecutive address.

In the timing selector 30, a signal JD is produced as a result of the generation of J and is fed via the JD line 336 to the precessing pulse register 12. K2 is sent from the step counter 22 via the K2 line 246 to the precessing pulse register 12 and functions with the circulating control pulse, JD, and E to generate a signal which is fed via the accumulator gating line 106 to the storage register 10, and which enables information to be transmitted from the accumulator 14 through the accumulator output line 126 to the storage register 10.

The first word of information located by the modified instruction is fed via the selected memory drum input-output line 320 from the memory drum 38 to the drum-read and record 37 and passes via the F line 326 to the accumulator 14. It should be noted that since K1 has been terminated the word will not enter the control register 24. The word of information is fed via the accumulator output line 126 to the storage register 10 where it circulates. The word is periodically forwarded from the storage register 10 via the distributor line 140 to the distributor 56.

K2 is fed from the step counter 22 via the K2 line 246 to the control register 24, where it functions to gate the address of the second word to be recorded, via the address output line 250, to the timing selector 30 and the memory channel selector 32. The new address functions in a manner similar to that already described to generate J and X signals. X functions to step the computer to step K3, and J functions as previously described to permit transfer of the word to the accumulator 14, where it continues to circulate until needed. J is sent via the J line 312, and K3 via the K3 line 248, to the precessing pulse register 12, where they combine to cause termination of the BQ signal. The BQ signal is sent to the timing selector 30 via the BQ line 148, and its termination prevents further operation of the timing selector until the BQ signal is restored.

J is also sent via the J line 312 to the control register 24, where it functions as before to increase the address by one unit, thereby preparing the system to obtain the third word in the group to be recorded on tape.

In the precessing pulse register 12, the circulating control pulse previously mentioned periodically generates two pulses AW1 and AW2 at predetermined time intervals. AW1 and AW2 are forwarded periodically via the AW1 line 124 and the AW2 line 128, respectively, to the distributor 56.

In the tape unit 50, when a sprocket pulse is generated identifying a position in which the binary expression of an octal digit may be recorded, it is forwarded via the sprocket pulse line 538 to the distributor 56. The sprocket pulse functions with AW1 or AW2, whichever arrives in the distributor 56 earliest after the generation of the sprocket pulse, to generate a signal AR.

AR is fed from the distributor 56 via the AR line 504 to the precessing pulse register 12 and functions to shift the circulating control pulse to a time position three pulse times earlier than the time position the circulating control pulse originally occupied in reference to its original position in a minor cycle. As a result, a pulse AS which is equivalent in time position to the shifted control pulse is forwarded from the precessing pulse register 12 via the AS line 114 to the distributor 56.

As functions with Z in the distributor 56 to sample groups of three pulses of the word which is periodically fed to the distributor 56, and to permit each group to be forwarded sequentially via the tape input lines 544 to the tape-read and record heads of the tape unit 50. More particularly, at the first appearance of a sprocket pulse in the tape unit 50, AS operates on the three pulses which represent the most significant octal digit of the word. When the next sprocket pulse appears in the tape unit 50, AS shifts to a time position which is three pulse times earlier and operates on the next most significant octal digit. As sequentially operates until the entire word circulating in the storage register 10 is sent to the tape unit 50 to be recorded.

When the control pulse circulating in the precessing pulse register 12 shifts for the least significant octal digit of the first word, it has been shifted through a minor cycle and causes a signal to be generated and sent via the accumulator gating line 106 to the storage register 10 where it gates the second word via the accumulator output line 126 into the storage register 10. It also restores the BQ signal, permitting the timing selector 30 to operate and bring the third word into the accumulator 14. The J signal which accompanies the transfer of this third word functions in the control register 24 to increase the address again, now causing it to specify the fourth word; J also functions as before to terminate BQ, preventing further transfers from the memory drum 38 to the accumulator 14.

The step counter 22 is prevented from advancing from the K3 step by Z and the address circulating in the control register 24 which is fed via the address output line 250 to the step counter 22. As a result of the continuance of K3, the previously described process repeats.

When all words of information recorded on one designated channel of the memory drum 38 have been transferred to the tape unit 50, the address forwarded to the step counter 22 permits the generation of K0 and the procedure is completed. The computer system is then prepared to go to the next step as directed.

The computer system has functioned during the tape-record procedure to transfer sixty-four words of information from the memory drum 38 to the tape unit 50. The number of words transferred is equal to the number of words required to fill all positions on one channel of the memory drum 38.

XXIV. OCTAL TYPE-OUT

The computer system functions during the octal type-out procedure illustrated in Fig. 16 to locate a designated channel of the memory drum 38, to read the thirty-pulse signal representations corresponding to each of the sixty-four words of information which are recorded in the designated channel, and to perform a typing operation for each group of three pulses so that sixty-four words of ten octal digits each are typed.

If the program containing the words of instruction and the operands is assumed to have been inserted, the continue switch is depressed to start the automatic operation. A sequence-directing address corresponding to the location of the word of instruction on the memory drum 38 will be circulating within the control counter 29 as will hereinafter be indicated.

The automatic operation is begun at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 306 from the W generator 300 to the timing selector 30. The timing selector 30 compares each address W with the position-locating part of the sequence-directing address until an identical address W is found.

As a result of the identity of the addresses in the timing selector 30, a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the sequence-directing address to be increased to the next consecutive address. J is also fed via the J line 312 to the drum-read and record 37 and functions to enable the drum-read and record 37 to receive the word of information stored in the selected position on the memory drum 38. J is also fed to the static control register 28 via the J line 312 and will aid in preparing for the subsequent generation of control signals E and BP.

K1 is fed via the K1 line 244 to the control register 24 and functions to permit the receipt of the word of information designated by the sequence-directing address. K1 also functions to gate a path for this word of information via the address output line 250 to the timing selector 30 and the memory channel selector 32. K1 is also fed via the K1 line 244 to the static control register 28 and aids in preparing for the subsequent generation of the control signals Z, E, and BP.

The word of instruction contained in the position on the memory drum 38 designated by the sequence-directing address is forwarded via the memory drum input-output line 320 from the memory drum 38 to the drum-read and record 37. The word passes through the drum-read and record 37 and is transferred via the F line 326 to the control register 24, and the word of instruction circulates in the control register 24 during the major portion of the octal type-out procedure.

Pulses which are equivalent to the portions of the word of instruction which represent I and A3 are sent via the static control register input lines 226 to the static control register 28 and, as I and A3 are in this case an instruction for octal type-out, the pulses generate the control signals Z, E, and BP.

In the following discussion of Z, E, and BP, it should be noted that although the multiple functions of the signals are sequentially explained, the effects of Z, E, and BP occur at substantially the same time unless otherwise noted.

Z is sent via the Z control line 289 from the static control register 28 to the drum-read and record 37, the storage register 10, the distributor 56, and the step counter 22.

Z will later aid to prepare the drum-read and record 37 to sequentially receive designated words of information from the memory drum 38 and to forward these words sequentially to the accumulator 14. Z prepares the storage register 10 to receive information subsequently from the accumulator 14 and will function in the distributor 56 to aid in generating the signal AR which will be used for shifting a control pulse as will be explained. Z will later function in the step counter 22 to aid in preventing the termination of step K3 and will thereby provide for continuous operation of the computer system during the octal type-out procedure. Z also functions in the step counter 22 to prevent the generation of the signal BR.

E is sent via the E control line 293 from the static control register 28 to the precessing pulse register 12, the accumulator 14, the storage register 10, the control register 24, and the binary counter 54.

E functions in the precessing pulse register 12 to aid in later gating a control pulse which will initiate the signals which will be used to distribute the binary expressions of octal digits, to assist in causing termination of the BQ signal, to close a recirculation loop for the control pulse, and to aid in subsequently generating the auxiliary signal BK which functions as will be shown. E aids in the closing of a recirculation loop in the accumulator 14 for the storage of information which will be received from the memory drum 38, and will operate in the storage register 10 after the termination of step K1 to close a recirculation loop for the storage of information which will be received from the accumulator 14. E prepares the control register 24 to later send addresses to the timing selector 30 and the memory channel selector 32 corresponding to the addresses of the words of information which are to be read. E will function during K3 to prepare the binary counter 54 to control the type-out process.

BP is sent via the BP control line 297 from the static control register 28 to the step counter 22 and will generate the signal AM after the J generated during step K1 has been terminated. AM is sent via the AM line 292 to the timing selector 30 and the precessing pulse register 12.

AM, which lasts thirty pulse times, prevents the timing selector 30 from functioning during that period. AM operates with E in the precessing pulse register 12 to generate BK and to gate the control pulse into the recirculation loop closed by E.

At this time, the instruction circulating in the control register 24 is modified by BK which is sent via the BK line 142 from the precessing pulse register 12 to the control register 24 and clears all but one part of the instruction. The uncleared part of the instruction functions as the channel-designating part of the address for locating the first word of information on the memory drum 38. Due to the clearing action of BK, the remainder of the address is zero and the address for the first word of information to be located on the memory drum 38 becomes the zero position on the channel designated by the instruction.

The new address is fed via the address output line 250 to the memory channel selector 32 and timing selector 30, and functions (as was described for the sequence-directing address) to aid in the memory channel selector 32 to select the designated channel of the memory drum 38, and to aid in generating X and J in the timing selector 30.

X is fed via the X line 308 to the step counter 22 and aids in generating K2 and terminating K1 thereby stepping the computer system to step K2.

J is fed via the J line 312 to the drum-read and record 37 and, with Z, will permit the located word of information to be received from the memory drum 38. J is also fed via the J line 312 to the control register 24 and operates with E to permit the circulating address to be increased numerically to the next consecutive address.

In the timing selector 30, a signal JD is produced as a result of the generation of J and is fed via the JD line 336 to the precessing pulse register 12. K2 is sent from the step counter 22 via the K2 line 246 to the precessing pulse register 12 and functions with the circulating control pulse, JD, and E, to generate a signal which is fed via the accumulator gating line 106 to the storage register 10, and which enables information to be transmitted from the accumulator 14 through the accumulator output line 126 to the storage register 10.

The first word of information located by the modified instruction is fed via the selected memory drum input-output line 320 from the memory drum 38 to the drum-read and record 37 and passes via the F line 326 to the accumulator 14. It should be noted that since K1 has been terminated the word of information will not enter the control register 24. The word is fed via the accumulator output line 126 to the storage register 10 and circulates in the recirculation loop closed by E. The word is periodically forwarded from the storage register 10 via the distributor line 140 to the distributor 56.

The second consecutive address (caused by J and E in the control register 24) is now used to locate a second position on the memory drum 38. In the same manner as described for the first address, X and J are generated in the timing selector 30. X is fed via the X line 308 to the step counter 22 and generates K3 and terminates K2. J is fed via the J line 312 to the control register 24 and, with E, modifies the second consecutive address so that it becomes the third consecutive address.

As was the first word, the second word of information is read from the memory drum 38 into the drum-read and record 37 and is then passed to the accumulator 14. This second word, however, remains in the accumulator 14 since K2 is now absent from the precessing pulse register 12, and no gating signal is provided for transferring information from the accumulator 14 to the storage register 10.

K3 is fed via the K3 line 248 from the step counter 22 to the binary counter 54 and, with E, initiates the operation of the binary counter 54. The binary counter 54 periodically generates a series of signals which occur sequentially and which control the typing process as will be shown. The series of signals includes the signals CD, CB, AX, BE and CE. A signal BQ is normally sent via the BQ line 148 to the timing selector 30 and permits it to operate. K3 is sent via the K3 line 248 and J is sent via the J line 312 to the precessing pulse register 12, where they function with E to terminate the BQ signal, thus preventing any further operation of the timing selector 30 until BQ is later restored.

In the precessing pulse register 12, the circulating control pulse previously mentioned periodically generates two pulses AW1 and AW2 at predetermined time intervals. AW1 and AW2 are periodically forwarded via the AW1 line 124 and the AW2 line 128, respectively, to the distributor 56.

In the binary counter 54, when the pulse CD is generated it is fed via the CD line 546 to the distributor 56. CD functions with AW1 or AW2, whichever occurs earliest after the generation of CD, to generate a single AR.

AR is fed from the distributor 56 to the precessing pulse register 12 via the AR line 504 and functions to shift the circulating control pulse to a time position three pulse times earlier than the time position the circulating control pulse originally occupied in reference to its original position in a minor cycle. As a result, a pulse AS, which is equivalent in position to the shifted control pulse, is forwarded via the AS line 114 from the precessing pulse register 12 to the distributor 56.

During this time the first word of information to be typed out is circulating in the storage register 10 and is cyclically being transmitted to the distributor 56 via the distributor line 140.

When the binary counter 54 generates the pulse CB, it is fed to the typewriter circuits 52 via the CB line 554 and allows the typewriter circuits 52 to receive information signals from the actuator lines 548.

When the first AS (generated as a result of the first CD) is sent to the distributor 56, the first AS operates with CD on the first word of information and permits the three pulses which represent the most significant octal digit of the word to establish signals in the distributor 56 on the actuator lines 548a, 548b, and 548c which are connected to the typewriter circuits 52. The signals on the actuator lines 548 designate the character which the typewriter circuits 52 will later cause the keyboard 500 to print.

When the binary counter 54 generates the pulse AX, it is transmitted via the AX line 552 to the typewriter circuits 52. AX causes the designated typing operation to be performed.

The second AS then allows the second most significant octal digit to be typed and the process continues until each of the ten octal digits of the first word have been typed.

After a complete word has been typed, the binary counter 54 generates the two signals BE and CE. BE is sent via the BE line 564 to the typewriter circuits 52 and operates the space bar. The binary counter 54 sends CE via the CE line 556 to the distributor 56 to block temporarily the generation of further AR signals until the second word is ready to be typed.

The last AR, however, shifts the control pulse in the precessing pulse register 12 into position to generate a signal which is fed via the accumulator gating line 106 to the storage register 10. As a result, the second word is gated into the storage register 10 via the accumulator output line 126.

At the same time, BQ, which is normally fed via the BQ line 148 from the precessing pulse register 12 to the timing selector 30 to permit it to operate, is restored. The word designated by the third consecutive address is then located and forwarded to the accumulator 14 as was described for the second word designated by the second consecutive address.

At the end of the eighth word, the typewriter carriage has moved to such a position that it operates limit switch 502. This causes the carriage to be returned and the platen advanced, so the ninth word will be typed at the beginning of a new line, underneath the first word. This process is repeated after every eight words, so the sixty-four words in the channel are typed on eight lines of eight words each.

The second word and the remainder of the words to be typed are processed by use of the same sequence. Z and the consecutive addresses are fed to the step counter 22 via the Z control line 289 and address output line 250, respectively, and operate to prevent step K3 from being terminated until all of the words of one channel of the memory drum 38 have been typed. The system then steps to K0 and the octal type-out procedure is completed. The computer system is prepared to go to the next step as directed.

The computer system has functioned during the octal type-out procedure to locate a designated channel of the memory drum 38 and to type out the sixty-four words of information recorded on the channel.

XXV. BI-OCTAL TYPE-OUT

The computer system functions during the bi-octal type-out procedure illustrated in Fig. 17 to locate the designated channel of the memory drum 38, to read the thirty-pulse signal representation corresponding to the first word of information (five bi-octally coded characters) which is recorded in the first (00) position of the designated channel, and to perform a typing operation for each pair of groups of three pulses representing a character, and to continue reading and typing words of information until instructed to terminate the procedure.

If the program containing the words of instruction and the operands is assumed to have been inserted, the continue switch is depressed to start the automatic operation. A sequence-directing address corresponding to the location of the word of instruction on the memory drum 38 will be circulating within the control counter 29 as will hereinafter be indicated.

The automatic operation is begun at the K0 step. K0 is fed via the K0 line 242 from the step counter 22 to the control counter 29 and functions to gate the sequence-directing address via the sequencer output line 274 to the control register 24. The sequence-directing address passes through the control register 24 and is fed via the address output line 250 to the memory channel selector 32 and the timing selector 30.

In the memory channel selector 32, part of the sequence-directing address generates a signal on one line (designated by the address) of a group of relay selecting lines 330 which feed the drum-read and record 37. Each of the relay lines 330 is associated with a particular channel on the memory drum 38. This signal operates one of the relays (not shown) and aids in enabling the drum-read and record 37 to receive information from the designated channel of the memory drum 38 via the memory drum input-output line 320 which is connected to the contacts of the operated relay. At the same time that relay operation is initiated, the memory channel selector 32 sends a signal AJ via the AJ line 334 to the timing selector 30 where AJ temporarily prevents the generation of signals until the selected relay has had time to complete its operation.

During this time addresses W, which correspond to positions in a channel on the memory drum 38, are sequentially forwarded from the memory drum 38 via the W line 338 to the W generator 300 of the cycling unit 34, and then via the W output line 306 from the W generator 300 to the timing selector 30. The timing selector 30 compares each address W with the position-locating part of the sequence-directing address until an identical address W is found.

As a result of the identity of the addresses in the timing selector 30 a transfer pulse X and a continuing signal J are generated. J will be automatically terminated after thirty pulse times. X is transmitted via the X line 308 to the step counter 22 where it functions to generate the continuing signal K1 and to terminate K0 thereby stepping the computer system to step K1. J and K1 are fed via the J line 312 and the K1 line 244, respectively, to the control counter 29 and function to allow the sequence-directing address to be increased to the next consecutive address. J is also fed via the J line 312 to the drum-read and record 37 and functions to enable the drum-read and record 37 to receive the word of information stored in the selected position on the memory drum 38. J is also fed to the static control register 28 via the J line 312 and will aid in preparing for the subsequent generation of control signals E and BP.

K1 is fed via the K1 line 244 to the control register 24 and functions to permit the receipt of the word of information designated by the sequence-directing address. K1 also functions to gate a path for this word of information via the address output line 250 to the timing selector 30 and the memory channel selector 32. K1 is also fed via the K1 line 244 to the static control register 28 and aids in preparing for the subsequent generation of the control signals Z, E, Q and BP.

The word of instruction contained in the position on the memory drum 38 designated by the sequence-directing address is forwarded via the memory drum input-output line 320 from the memory drum 38 to the drum-read and record 37. The word passes through the drum-read and record 37 and is transferred via the F line 326 to the control register 24, and the word of instruction circulates in the control register 24 during the major portion of the bi-octal type-out procedure.

Pulses which are equivalent to the portions of the word of instruction which represent I and A3 are sent via the static control register input lines 226 to the static control register 28 and, as I and A3 are in this case an instruction for bi-octal type-out, the pulses generate the control signals Z, E, Q and BP.

In the following discussion of Z, E, Q and BP, it should be noted that although the multiple functions of the signals are sequentially explained, the effects of Z, E, Q and BP occur at substantially the same time unless otherwise noted.

Z is sent via the Z control line 289 from the static control register 28 to the drum-read and record 37, the storage register 10, the distributor 56, and the step counter 22.

Z will later aid to prepare the drum-read and record 37 to sequentially receive designated words of information from the memory drum 38 and to forward these words sequentially to the accumulator 14. Z prepares the storage register 10 to receive information subsequently from the accumulator 14 and will function in the distributor 56 to aid in generating the signal AR which will be used for shifting a control pulse as will be explained. Z will later function in the step counter 22 to aid in preventing the termination of step K3 and, will thereby provide for continuous operation of the computer system during the bi-octal type-out procedure. Z also functions in the step counter 22 to prevent generation of the BR signal.

E is sent via the E control line 293 from the static control register 28 to the precessing pulse register 12, the accumulator 14, the storage register 10, the control register 24, and the binary counter 54.

E functions in the precessing pulse regiser 12 to aid in later gating a control pulse which will initiate the signals which will be used to distribute the binary expressions of bi-octal digits, to aid in terminating the BQ signal, to close a recirculation loop for the control pulse, and to aid in subsequently generating the auxiliary signal BK which functions as will be shown. E aids in the closing of a recirculation loop in the accumulator 14 for the storage of information which will be received from the memory drum 38, and will operate in the storage register 10 after the termination of step K1 to close a recirculation loop for the storage of information which will be received from the accumulator 14. E prepares the control register 24 to later send addresses to the timing selector 30 and the memory channel selector 32 corresponding to the addresses of the words of information which are to be read. E will function during K3 to prepare the binary counter 54 to control the type-out process.

Q is fed via the Q control line 238 to the binary counter 54 and prepares the binary counter 54 for the typing-out operations as will be explained.

BP is sent via the BP control line 297 from the static control register 28 to the step counter 22 and will generate the signal AM after the J generated during step K1 has been terminated. AM is sent via the AM line 292 to the timing selector 30 and the precessing pulse register 12.

AM, which lasts thirty pulse times, prevents the timing selector 30 from functioning during that period. AM operates with E in the precessing pulse register 12 to generate BK and to gate the control pulse into the recirculation loop closed by E.

At this time, the instruction circulating in the control register 24 is modified by BK which is sent via the BK line 142 from the precessing pulse register 12 to the control register 24 and clears all but one part of the instruction. The uncleared part of the instruction functions as the channel-designating part of the address for locating the first word of information on the memory drum 38. Due to the clearing action of BK, the remainder of the address is zero and the address for the first word of information to be located on the memory drum 38 becomes the zero position on the channel designated by the instruction.

The new address is fed via the address output line 250 to the memory channel selector 32 and timing selector 30, and functions (as was described for the sequence-directing address) to aid in the memory channel selector 32 to select the designated channel of the memory drum 38 and to aid in generating X and J in the timing selector 30.

X is fed via the X line 308 to the step counter 22 and aids in generating K2 and terminating K1 thereby stepping the computer system to step K2.

J is fed via the J line 312 to the drum-read and record 37 and, with Z, will permit the located word of information to be received from the memory drum 38. J is also fed via the J line 312 to the control register 24 and operates with E to permit the circulating address to be increased numerically to the next consecutive address.

In the timing selector 30, a signal JD is produced as a result of the generation of J and is fed via the JD line 336 to the precessing pulse register 12. K2 is sent from the step counter 22 via the K2 line 246 to the precessing pulse register 12 and functions with the circulating control pulse, JD, and E, to generate a signal which is fed via the accumulator gating line 106 to the storage register 10, and which enables information to be transmitted from the accumulator 14 through the accumulator output line 126 to the storage register 10.

The first word of information located by the modified instruction is fed via the selected memory drum input-output line 320 from the memory drum 38 to the drum-read and record 37 and passes via the F line 326 to the accumulator 14. It should be noted that since K1 has been terminated the word of information will not enter the control 24. The word is fed via the accumulator output line 126 to the storage register 10 and circulates in the recirculation loop closed by E. The word is periodically forwarded from the storage register 10 via the distributor line 140 to the distributor 56.

The second consecutive address (generated by the prior action of J and E in the control register 24) is now used to located a second position on the memory drum 38. In the same manner as described for the first address, X and J are generated in the timing selector 30. X is fed via the X line 308 to the step counter 22 and generates K3 and terminates K2. J is fed via the J line 312 to the control register 24 and, with E, modifies the second consecutive address so that it becomes the third consecutive address.

As was the first word, the second word of information is read from the memory drum 38 into the drum-read and record 37 and is then passed to the accumulator 14. This second word, however, remains in the accumulator 14 since K2 is now absent from the precessing pulse register 12, and no gating signal is provided for transferring information from the accumulator 14 to the storage register 10.

K3 is fed via the K3 line 248 from the step counter 22 to the binary counter 54 and, with E, initiates the operation of the binary counter 54. The binary counter 54 periodically generates a series of signals which occur sequentially and which control the typing process as will be shown. The series of signals includes the signals CC, CD, CB, AX, CZ, and CE. A signal BQ is normally sent via the BQ line 148 to the timing selector 30 and permits it to operate. K3 is sent via the K3 line 248 and J is sent via the J line 312 to the precessing pulse register 12, where they function with E to terminate the BQ signal, thus preventing any further operation of the timing selector 30 until BQ is later restored.

In the precessing pulse register 12, the circulating control pulse previously mentioned periodically generates two pulses AW1 and AW2 at predetermined time intervals. AW1 and AW2 are periodically forwarded via the AW1 line 124 and the AW2 line 128, respectively, to the distributor 56.

Due to the presence of Q in the binary counter 54, the pulse CC is generated and is fed via the CC line 566 to the distributor 56. CC functions with AW1 or AW2, whichever occurs earliest after the generation of CC to generate a signal AR.

AR is fed from the distributor 56 to the precessing pulse register 12 via the AR line 504 and functions to shift the circulating control pulse to a time position three pulse times earlier than the time position the circulating control pulse originally occupied in reference to its original position in a minor cycle. As a result, a pulse AS which is equivalent in position to the shifted control pulse, is forwarded via the AS line 114 from the precessing pulse register 12 to the distributor 56.

During this time the first word of information to be typed out is circulating in the storage register 10 and is cyclically being transmitted to the distributor 56 via the distributor line 140.

When the binary counter 54 generates the pulse CB, it is fed to the type writer circuits 52 via the CB line 554 and allows the typewriter circuits 52 to receive information signals from the actuator lines 548.

When the first AS (generated as a result of the first CC) is sent to the distributor 56, the first AS operates with CC on the first word of information and permits the three pulses which represent the most significant octal digit of the most significant bi-octal digit of the word to establish a signal in the distributor 56 on the actuator line 548d which is connected to the typewriter circuits 52. Only one actuator line is used, since, in the code used, two of the three binary digits of the first octal digit of each pair are always zero as far as their action in the typewriter circuits 50 is concerned.

CD is then generated in the binary counter 54 and is forwarded via the CD line 546 to the distributor 56. CD initiates the generation of AS as did CC and operates with the resulting AS to allow the three pulses which represent the least significant octal digit of the most significant bi-octal digit of the word to establish signals on the actuator lines 548a, 548b, and 548c which are connected to the typewriter circuits 52.

The signals on the actuator lines 548 designate the operation which the typewriter circuits 52 will later cause the keyboard 500 to perform; i.e., the printing of a character, the operation of the space bar, etc. Thus a bi-octal digit may represent one of the numerical characters 0 through 9, or a decimal point, minus sign, space, or carriage return. It may also represent a "blank" or a "printer stop," as will be explained later.

The binary counter 54 next generates a pulse AX and transmits it via the AX line 552 to the typewriter circuits 52. AX causes the designated typing operation to be performed.

The third AS and fourth AS then allow the two octal digits which represent the second most significant bi-octal digit to be typed and the process continues until each of the five bi-octal digits of the first word have been typed (or performed).

The last AR generated for typing the first word generates a signal which is fed via the accumulator gating line 106 to the storage register 10. As a result, the second word is gated into the storage register 10 via the accumulator output line 126.

At the same time, BQ, which is normally fed via the BQ line 148 from the precessing pulse register 12 to the timing selector 30 to permit it to operate, is restored. The word designated by the third consecutive address is then located and forward to the accumulator 14 as was described for the second word designated by the second consecutive address.

The second word and the remainder of the words to be typed are processed by use of the same sequence. Z and the consecutive addresses are fed to the step counter 22 via the Z control line 289 and address output line 250, respectively, and operate to prevent step K3 from being terminated until a terminating instruction is received.

If a bi-octal character is encountered which cannot be interpreted by the typewriter, all the operations just described occur with the exception of the actual typewriter operation. These characters are inserted by the programmer to fill out a word when the number of active characters contained in it is less than five.

In the distributor 56, a signal CF is generated when a "printer stop" or procedure terminating signal is included in the word of information which is sent from the storage register 10 to the distributor 56. CF is fed via the CF line 570 to the step counter 22 and terminates step K3, thereby generating K0 and terminating the procedure. CF is also fed from the distributor 56 via the CF line 570 to the binary counter 54, and takes the place of Q, which disappears on termination of K3; CF, like Q, causes CE to appear after five characters rather than ten. When CE occurs, the CZ signal, is transmitted via the CZ line 568 to the distributor 56, where it causes termination of CF. The computer system is prepared to go to the next procedure as directed.

The computer system has functioned during the bi-octal type-out procedure to locate a designated channel of the memory drum 38, to type out the word of information read from the first position on the designated channel interpreting the data bi-octally, and to continue the typing out of successive sequential words of information from the channel until instructed by a word of information to terminate the procedure.

XXVI. REGISTER TYPE-OUT

The register type-out procedure illustrated in Fig. 18 is a manually initiated procedure which results in typing the address (comprising three binarily-expressed octal digits) which is circulating in the control counter 29, or in typing the word of information (comprising ten binarily-expressed octal digits) circulating in either the accumulator 14, the storage register 10, or the control register 24.

The manual operations which are performed to direct the register type-out procedure are ordinarily initiated when the computer is in the halt condition. The register type-out switch 506 is then adjusted to select the unit whose contents are to be typed out and the read-out switch (not shown) of the read-out 204 is operated. The remaining operations are performed automatically by the computer system.

When the register type-out switch 506 is adjusted to select the contents (ten octal digits) of either the accumulator 14, the storage register 10, or the control register 24, or the contents (three octal digits) of the control counter 29, and the read-out switch is operated, a signal AY is fed via the AY line 272 from the read-out 204 to the register type-out switch 506. AY passes through the register type-out switch 506 to the binary counter 54, which thereupon generates the continuous signal AZ which controls information flow. AZ also functions within the binary counter 54 to keep it operating until the proper number of characters are typed.

The signal circulating in the selected unit is fed to the register type-out switch 506 and emerges unchanged as the output signal CY at the CY line 562. More particularly, A(T) is the designation of the signal circulating in the accumulator 14 and will be fed continuously from the accumulator 14 via the A(T) line 150 to the register type-out switch 506; L(T) is the designation of the signal circulating in the storage register 10 and will be fed continuously from the storage register 10 via the L(T) line 152 to the register type-out switch 506; CR(T) is the designation of the signal circulating in the control register 24 and will be fed continuously from the control register 24 via the CR(T) line 252 to the register type-out switch 506; and AQ is the designation of the signal circulating in the control counter 29, and will be fed continuously from the control counter 29 via the AQ line 266 to the register type-out switch 506.

AZ is fed via the AZ line 560 from the register type-out switch 506 to the distributor 56 and permits the entry of CY which is continuously fed from the register type-out switch 506 via the CY line 562 to the distributor 56. AZ is also fed via the AZ line 560 to the precessing pulse register 12 to close a recirculation loop for the storage of a control pulse. When AZ is generated, the binary counter 54 is activated and will automatically generate a series of signals including A0, CD, CB, CA, and CE. A0 is fed via the A0 line 524 to the precessing pulse register 12 and gates a control pulse into the recirculation loop closed by AZ.

As a result of the circulating control pulse, the precessing pulse register 12 periodically generates two signals AW1 and AW2 which are periodically fed via the AW1 line 124 and the AW2 line 128, respectively, to the distributor 56.

When the binary counter 54 generates the signal CD, it is fed via the CD line 546 to the distributor 56. CD operates both to allow information to be sent from the distributor 56 to the typewriter circuits 52 and, with AW1 or AW2 (whichever arrives at the distributor 56 earliest after the generation of CD) to generate the signal AR.

AR is fed via the AR line 504 to the precessing pulse register 12 and functions to shift the circulating control pulse to a time position three pulse times earlier than the time position the circulating control pulse originally occupied in reference to its original position in a minor cycle. As a result, a pulse AS, which is equivalent in time position to the shifted control pulse, is forwarded via the AS line 114 from the precessing pulse register 12 to the distributor 56.

AS operates on CY (which is continuously being fed to the distributor 56) to distribute in parallel the three pulses which represent the most significant octal digit of CY via the three actuator lines 548 to the typewriter circuits 52.

When the signal CB is generated in the binary counter 54 it is fed via the CB line 554 to the typewriter circuits 52 and prepares the typewriter circuits 52 to receive the three pulse signal representing the most significant octal digit. The three binary digit signal received from the distributor 56 is registered and remains present in the typewriter circuits 52 until the binary counter 54 generates the signal AX which is fed via the AX line 552 to the typewriter circuits 52 and which causes the typing operation designated by the registered signal to be performed.

The remaining digits of the contents of the selected unit are typed in the manner described above. When AQ has been selected and the third digit has been typed, the binary counter 54 generates the signal CA which is fed via the CA line 526 to the typewriter circuits 52 and which operates the typewriter carriage return. When AQ has been selected and CA occurs, or when either A(T), L(T), or CR(T) has been selected and the tenth octal digit has been printed, the signal CE is generated in the binary counter 54. CE is fed via the CE line 556 to the distributor 56 to prevent the generation of further AR signals, and functions within the binary counter 54 to terminate the procedure.

Thus, the computer system has functioned during the register type-out procedure to type out the signal circulating in a selected unit and is prepared to go to the next procedure as directed.

The following signal table is intended as a guide in interpreting the various figures:

SIGNAL TABLE

| Transmission Line | Designation of Signal Carried | Signal Length (pulse times) | Signal Source | Notes on Signals |
|---|---|---|---|---|
| 106, accumulator gating line | | 29¾ | Precessing pulse register 12 | Permits information to enter accumulator 14. |
| 108, accumulator recirculation control line | | 29¾ | ___do___ | Completes recirculation loop in accumulator 14. |
| 112, AN line | AN | varies | ___do___ | Controls recirculation loop length in storage register 10 and accumulator 14. |
| 114, AS line | AS | 1 | ___do___ | Distributes information signals. |
| 116, storage register output line | | 30 | storage register 10 | Words of information. |
| 118, G output line | | 30 | accumulator 14 | Do. |
| 120, BL output line | BL | 1 | precessing pulse register 12 | Prepares for sending information to magnetic drum. |
| 124, AW1 line | AW1 | 1 | ___do___ | May generate and terminate AR signal. |
| 126, accumulator output line | | 30 | accumulator 14 | Word of information. |
| 128, AW2 line | AW2 | 1 | precessing pulse register 12 | May generate AR signal. |
| 130, AB line | AB | varies | ___do___ | Occurs at completion of multiplication. |
| 136, accumulator input line | | | ___do___ | Closes recirculation loop in accumulator 14. |
| 138, overflow indicator line | AD | 1 | accumulator 14 | Indicates overflow. |
| 140, distributor line | AK | 30 | storage register 10 | Word of information. |
| 142, BK line | BK | 1 | precessing pulse register 12 | Clears a portion of the signal in the control register 24. |
| 144, BN line | BN | 1 | ___do___ | Generates K3. |
| −148, BQ line | −BQ | 1 | ___do___ | Blocks timing selector 30. |
| 150, A(T) line | A(T) | 30 | accumulator 14 | Contents of accumulator 14. |
| 152, L(T) line | L(T) | 30 | storage register 10 | Contents of storage register 10. |
| 178, overflow indicator line | | 1 | ___do___ | Indicates high multiplication overflow. |
| 214, mode switch output line | | varies | manual control panel 20 | Halt instruction signal. |
| 218, insert output line | AF | ___do___ | ___do___ | Gates control pulse into precessing pulse register 12. |
| 220, halt output line | Y | ___do___ | ___do___ | Blocks timing selector 30. |
| 222, V line | V | ___do___ | ___do___ | Prepares control register 24 for receipt of address during insert procedures. |
| 224, AE line | AE | ___do___ | ___do___ | Aids arranging bi-octal data. |
| 226, static control register input lines | | | control register 24 | Instruction pulses. |
| 228, TT line | TT | varies | manual control panel 20 | Prevents K3. |
| 229, BR line | BR | 29 | step counter 22 | Aids to generate BQ signal. |
| 238, Q control line | Q | varies | static control register 28 | Controls bi-octal type-out. |
| 240, branch clear line | | | branch circuits 27 | Clears control counter 29. |
| 242, K0 line | K0 | varies | step counter 22 | Determines step K0. |
| 244, K1 line | K1 | ___do___ | ___do___ | Determines step K1. |
| 246, K2 line | K2 | ___do___ | ___do___ | Determines step K2. |
| 248, K3 line | K3 | ___do___ | ___do___ | Determines step K3. |
| 250, address output line | | 9 or 30 | control register 24 | Addresses. |
| 252, CR(T) line | CR(T) | 30 | ___do___ | Contents of control register 24. |
| −254, BX line | −BX | varies | manual control panel 20 | Prevents increase of address during erase. |
| 255, BF' line | BF' | ___do___ | ___do___ | Activates carriage return. |
| −256, AG line | −AG | ___do___ | ___do___ | Clears sequence-directing address in control counter. |
| 258, CJ line | CJ | 9 | branch circuit 27 | Generates AM signal. |
| 264, M control line | M | varies | static control register 28 | Low-order multiplication control. |
| 266, AQ line | AQ | 9 | control counter 29 | Contents of control counter 29. |
| 270, A control line | A | varies | static control register 28 | Addition control. |
| 271, BY line | BY | ___do___ | manual control panel 20 | One-step control. |
| 272, AY line | AY | ___do___ | ___do___ | Aids to control register type-out. |
| 274, sequencer output line | | 9 | control counter 29 | Sequence-directing address. |
| 275, continue input line | | varies | manual control panel 20 | Aids to terminate halt. |
| 278, halt instruction line | | ___do___ | static control register 28 | Causes a halt. |
| 280, S control line | S | ___do___ | ___do___ | Subtraction control. |
| 281, halt reset line | | ___do___ | manual control panel 20 | Terminates halt. |
| 282, BT line | BT | ___do___ | ___do___ | Prepares control register 24 to increase address. |
| 283, AT halt reset line | | ___do___ | ___do___ | Aids to terminate halt. |
| 284, BV line | BV | 1 | control register 24 | Gates control pulse into precessing pulse register 12. |
| 286, L control line | L | varies | static control register 28 | Logical multiplication control. |
| 287, R control line | R | ___do___ | ___do___ | Reverses tape direction. |
| 288, N control line | N | ___do___ | ___do___ | High order multiplication control. |
| 289, Z control line | Z | ___do___ | ___do___ | Tape record control. |
| 290, sequence changing lines | A2 or A3 | 9 | branch circuit 27 | Substitutes for sequence-directing address. |
| 292, AM line | AM | 30 | step counter 22 | Generally occurs during second minor cycle of K step. |
| 293, E control line | E | varies | static control register 28 | External procedures control. |
| 294, BM line | BM | ___do___ | ___do___ | Round-off control. |
| 295, D control line | D | ___do___ | ___do___ | Tape procedures control. |
| 296, B control line | B | 1 | ___do___ | Branch instruction control. |
| 297, BP control line | BP | 1 | ___do___ | Tape procedures control. |
| 298, branch instruction lines | A2 or A3 | 9 | control register 24 | Substitutes for sequence-directing address. |
| 306, W output line | W | 6 | W generator 300 | Magnetic drum addresses. |
| 308, X line | X | 1 | timing selector 30 | Indicates location of address and advances K step. |
| 312, J line | J | 30 | ___do___ | Generally occurs during first minor cycle of K step. |
| 316, FJD line | FJD | 30 | ___do___ | Aids transfer of information to magnetic drum. |
| 320, memory drum input-output lines | | 30 | drum-read and record 37 or memory drum 38 | Word of information. |
| 326, F line | | 30 | drum-read and record 37 | Do. |
| 330, relay selecting lines | | varies | memory channel selector 32 | Selects channel of magnetic drum. |
| 332, FJ line | FJ | 30 | timing selector 30 | Complements product of high order multiplication. |
| 334, AJ line | AJ | | memory channel selector 32 | Blocks timing selector 30. |
| 336, JD line | JD | 30 | timing selector 30 | Aids to generate BQ signal. |
| 338, W line | W | 6 | memory drum 38 | Magnetic drum addresses. |
| 340, cyclical signal lines | | 1 | ___do___ | Cyclical pulse signals. |
| 342, delay flop input line | | 1 | drum-read and record 37 | Initiates AJ signal. |
| 504, AR line | AR | varies | distributor 56 | Precesses control pulse in precessing pulse register 12. |
| 512, AL line | AL | 3 | ___do___ | Binary representation of an octal digit. |
| 520, AV line | AV | varies | typewriter circuits 52 | Aids to generate AR signal. |
| 522, distributor input lines | | vary | ___do___ | Binary digit representations. |

SIGNAL TABLE—Continued

| Transmission Line | Designation of Signal Carried | Signal Length (pulse times) | Signal Source | Notes on Signals |
|---|---|---|---|---|
| 524, AO line | AO | varies | binary counter 54 | Gates control pulse into preceeding pulse register 12. |
| 526, CA line | CA | do | do | Activates carriage return key. |
| 528, BD input line | BD | do | typewriter circuits 52 | Represents most significant bi-octal digit. |
| 530, AP line | AP | 3 | distributor 56 | Binary representation of an octal digit. |
| 532, AH line | AH | varies | typewriter circuits 52 | Prepares computer to receive information. |
| 534, AI line | AI | do | do | Aids to store words of information. |
| 536, tape output lines | | vary | tape unit 50 | Binary digit representation. |
| 538, sprocket pulse | | 1 | do | Indicates usable portion on magnetic tape. |
| 542, AU line | AU | varies | distributor 56 | Blocks timing selector 30 until magnetic tape halts. |
| 544, tape input lines | | 1 | do | Binary digit representations. |
| 546, CD line | CD | 1 | binary counter 54 | May aid to generate AR signal. |
| 548, actuator lines | | 1 | distributor 56 | Binary digit representation. |
| 552, AX line | AX | 1 | binary counter 54 | Aids in the type-out operation. |
| 554, CB line | CB | 1 | do | Prepares type-out circuits 580 to receive information. |
| −556, CE line | −CE | | do | Blocks the generation of AR signal. |
| 558, AT line | AT | varies | typewriter circuits 52 | Indicates start of typing line. |
| 560, AZ line | AZ | do | binary counter 54 | Aids to control register type-out. |
| 562, CY line | CY | 9 or 30 | register type-out switch 506 | Register type-out switch 506 output. |
| 564, BE line | BE | | binary counter 54 | Activates space bar. |
| 566, CO line | CO | | do | Type-out control signal. |
| 567, BF line | BF | varies | typewriter circuits 52 | Activates carriage return key. |
| 568, CZ line | CZ | do | binary counter 54 | Aids generation of CE signal. |
| 570, CF line | CF | do | distributor 56 | Aids in bi-octal type-out. |
| −572, BZ line | −BZ | do | typewriter circuits 52 | Blocks binary counter 54. |
| 605, positive five volts supply bus | | | | Positive voltage supply. |
| 610, Negative ten volts supply bus | | | | Negative voltage supply. |
| 620, Thyratron plage power supply bus | | | | Thyratron voltage supply. |

XXVII. DESCRIPTION OF SYMBOLS

Figure 19:
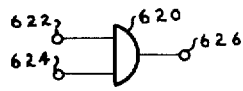
Figure 19:
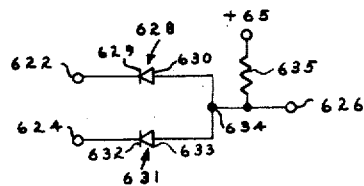
Figure 19:
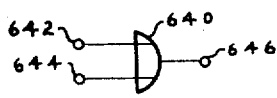
Figure 19:
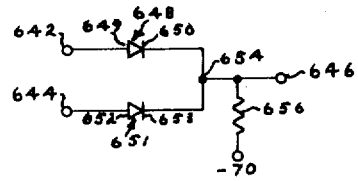
Figure 19:
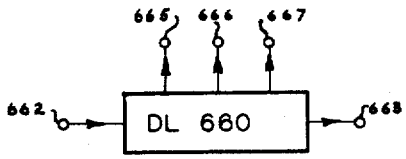
Figure 19:
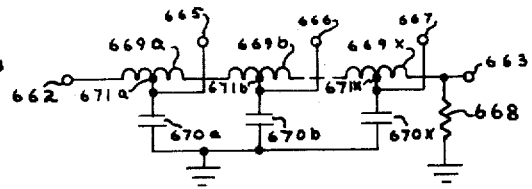
Figure 19:
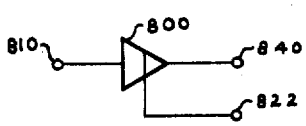
Figure 19:
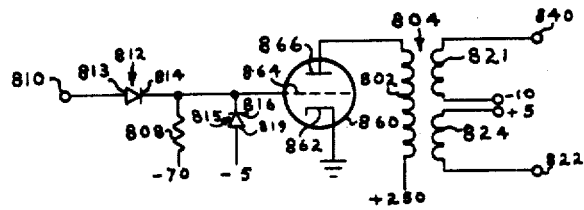

The schematic equivalents of the symbols which are hereinafter employed to simplify the detailed description of the units of the computer system which have been illustrated in block form are shown in Figs. 19, 20 and 21. For convenient reference, all positive and negative supply buses will generally be identified with a number corresponding with their voltage. The circuitry terminals corresponding to the same symbol terminals are identified by the same character reference numbers.

XXVIII. GATE

The gates used in the computer system are of the "coincidence" type, each comprising a crystal diode network which functions to receive input signals via a plurality of input terminals and to pass the most negative signal.

The symbol for a representative gate 620, having two input terminals 622 and 624, is shown in Fig. 19a. Since the signal potential levels in the computer are plus five volts (sometimes called positive signals) and minus ten volts (sometimes called negative signals), the potentials of the signals which may exist at the input terminals 622 and 624 are thereby limited.

If a potential of minus ten volts is present at one or both of the input terminals 622 and 624, a potential of minus ten volts will exist at the output terminal 626. Therefore, if one of the input signals to the input terminals 622 and 624 is positive and the other signal is negative, the negative signal is passed and the positive signal is "blocked."

When there is a coincidence of positive signals at the two input terminals 622 and 624, a positive signal is transmitted from the output terminal 626. In such case, it may be stated that a positive signal is "gated" or "passed" by the gate 620. When all of the input signals to a gate except one are made positive, in preparation for passing a positive signal when the remaining input signal is made positive, the gate may be described as being "primed."

The schematic details of the gate 620 are shown in Fig. 19b. Gate 620 includes the crystal diodes 628 and 631. Each of the input terminals 622 and 624 is coupled to one of the crystal diodes 628 and 631. Crystal diode 628 comprises the cathode 629 and the anode 630. Crystal diode 631 comprises the anode 633 and the cathode 632. More particularly, the input terminals 622 and 624 are respectively coupled to the cathode 629 of the crystal diode 628 and the cathode 632 of the crystal diode 631. The anode 630 of the crystal diode 628 and the anode 633 of the crystal diode 631 are interconnected at the junction 634. The anodes 630 and 633 are coupled via the resistor 635 to the positive voltage bus 65.

If negative potentials are simultaneously present at the input terminals 622 and 624, both of the crystal diodes 628 and 631 will conduct, since the positive supply bus 65 tends to make the anodes 630 and 633 more positive. The voltage at the junction 634 will then be minus ten volts since, while conducting, the anodes 630 and 633 of the crystal diodes 628 and 631 assume the potential of the associated cathodes 629 and 632.

When a positive signal is fed only to the input terminal 622, the cathode 629 is raised to a positive five volts potential and is made more positive than the anode 630, so that crystal diode 628 stops conducting. As a result, the potential at the junction 634 remains at the negative ten volts level. In a similar manner, when a positive signal is only present at the input terminal 624, the voltage at the junction 634 will not be changed.

When the signals present at both input terminals 622 and 624 are positive, the anodes 630 and 633 are raised to approximately the same potential as their associated cathodes 629 and 632 and the potential at the junction 634 rises to a positive potential of five volts.

The potential which exists at the junction 634 is transmitted from the gate 620 via the connected output terminal 626.

In the above described manner, the gate 620 is frequently used as a switch to govern the passage of one signal by the presence of one or more signals which control the operation of the gate 620.

It should be understood that the potentials of plus five volts and minus ten volts used for purpose of illustration are approximate, and the exact potentials will be affected in two ways. First, they will be affected by the value of the resistance 635 and its relation to the impedances of the input circuits connected to the input terminals 622 and 624. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operation taking place in the computer. Although the gate 620 is shown as having only two input terminals 622 and 624 connected through diodes 628 and 631 respectively to junction 634, it will be understood that any reasonable number of terminals may be similarly connected through diodes to junction 634 and that the junction will remain at the voltage of the most negative source connected to any of the input terminals. Many of the gates in the following description are shown as having three or more input terminals and such gates are to be taken as having a similar number of diodes connected to an output terminal as 626.

XXIX. BUFFER

The buffers used in this computer system are also known as "or" gates. Each buffer comprises a crystal diode network which functions to receive input signals via a plurality of input terminals and to pass the most positive signal.

The symbol for a representative buffer 640, having two input terminals 642 and 644, is shown in Fig. 19c. Since the signal potential levels in the computer system are minus ten volts and plus five volts, either one of these potentials may exist at the input terminals 642 and 644.

If a positive potential of five volts exists at one or both of the input terminals 642 or 644, a positive potential of five volts will exist at the output terminal 646. If a negative potential of ten volts is present at both of the input terminals 642 and 644, a negative potential of ten volts will be present at the output terminal 646.

The schematic details of the buffer 640 are shown in Fig. 19d. The buffer 640 includes the two crystal diodes 648 and 651. The crystal diode 648 comprises the anode 649 and the cathode 650. Crystal diode 651 comprises the anode 652 and the cathode 653. The anode 649 of the crystal diode 648 is coupled to the input terminal 642. The anode 652 of the crystal diode 651 is coupled to the input terminal 644. The cathodes 650 and 653 of the crystal diodes 648 and 651, respectively, are joined at the junction 654 which is coupled to the output terminal 646, and via the resistor 656 to the negative supply bus 70. The negative supply bus 70 tends to make the cathodes 650 and 653 more negative than the anodes 649 and 652, respectively, causing both crystal diodes 648 and 657 to conduct.

When negative ten volt signals are simultaneously present at input terminals 642 and 644, the crystal diodes 648 and 651 are conductive, and the potential at the cathodes 650 and 653 approaches the magnitude of the potential at the anodes 649 and 652. As a result, a negative potential of ten volts appears at the output terminal 646.

If the potential at one of the input terminals 642 or 644 increases to plus five volts, the potential at the junction 654 approaches the positive five volts level as this voltage is passed through the conducting crystal diode 648 or 651 to which the voltage is applied. The other crystal diode 648 or 651 stops conducting since its anode 649 or 652 becomes more negative than the junction 654. As a result, a positive potential of five volts appears at the output terminal 646.

If positive five volt signals are fed simultaneously to both input terminals 642 and 644, a positive potential of five volts appears at the output terminal 646, since both crystal diodes 648 and 651 will remain conducting. Thus the buffer 640 functions to pass the most positive signal received via the input terminals 642 and 644. The showing of buffer 640 with only two input terminals 642 and 644 and two diodes 648 and 650 respectively is not to be taken as limiting the inputs to two for any reasonable number of terminals and diodes may be connected to the junction 654 and the voltage of terminal 646 will always be substantially that of the most positive source. The showing of a buffer with three or more input leads in the following description is to be understood to mean that there are as many diodes having their cathodes connected to the output terminal as there are input leads.

XXX. DELAY LINE

The symbol for a representative electrical delay line 660 which is a lumped parameter type delay line and which functions to delay received pulses for discrete periods of time, is shown in Fig. 19e.

The delay line 660 comprises the input terminal 662, the output terminal 663, and a plurality of taps 665, 666, and 667. A pulse which is fed via the input terminal 662 to the delay line 660 will be delayed for an increasing number of pulse times before successively appearing at the taps 665, 666, and 667. When the pulse reaches the output terminal 663, the total delay provided by the delay line 660 has been applied. In the text which follows, the specific number of pulse-times delay which is encountered before a pulse travels from the input terminal to a tap of the delay line will be stated.

The delay line 660 shown in Fig. 19f comprises a plurality of inductors 669 connected in series, with the associated capacitors 670 which couple a point 671 on each inductor 669 to ground. A signal is fed into the delay line 660 at the input terminal 662 and the maximum delay occurs at the output terminal 663. The taps 665, 666, and 667 are each connected to one of the points 671 and provide varied delays. The delay line 660 is terminated by a resistor 668 in order to prevent reflections. Although in the delay line of Fig. 19f a tap is shown connected to each of the points 671, it should be understood that in actual practice there are ordinarily several untapped points 671 between successive taps.

XXXI. PULSE AMPLIFIER

The symbol for a representative pulse amplifier is shown in Fig. 19g. When a positive pulse is fed to the pulse amplifier 800 via the input terminal 810, the pulse amplifier 800 functions to transmit a positive pulse which swings from minus ten to plus five volts from its positive output terminal 840, and a negative pulse which swings from plus five to minus ten volts from its negative output terminal 822. At all other times, the pulse amplifier 800 has a negative potential of ten volts at its positive output terminal 840 and a positive potential of five volts at its negative output terminal 822.

The detailed circuitry of the pulse amplifier 800 is shown in Fig. 19h. The pulse amplifier 800 includes the vacuum tube 860, the pulse transformer 804 and associated circuitry. The vacuum tube 860 comprises the cathode 862, the grid 864 and the anode 866. The pulse transformer comprises the primary winding 802 and the secondary windings 821 and 824.

The crystal diode 812 couples the grid 864 of the vacuum tube 860 to the input terminal 810, the anode 813 of the crystal diode 812 being coupled to the input terminal 810, and the cathode 814 being coupled to the grid 864. The negative supply bus 70 is coupled to the grid 864 via the resistor 808 and tends to make the crystal diode 812 conductive. The grid 864 and the cathode 814 of the crystal diode 812 are also coupled to the cathode 816 of the crystal diode 815, whose anode 819 is coupled to the negative supply bus 5. The crystal diode 815 clamps the grid 864 at a potential of minus five volts thus preventing the voltage applied to the grid 864 from becoming more negative than minus five volts.

When a voltage more positive than minus five volts is transmitted to the input terminal 810, the crystal diode 812 conducts and the voltage is applied to the grid 864. Since the crystal diode 815 clamps the grid 864 and the cathode 814 of the crystal diode 812 at minus five volts, any voltage more negative than minus five volts will cause the crystal diode 812 to become non-conductive, and that input voltage will be blocked at the crystal diode 812. Thus, the clamping action of the crystal diode 815 will not affect the circuitry which supplies the input voltage.

The cathode 862 of the vacuum tube 860 is connected to ground potential. The anode 866 of the vacuum tube 860 is coupled by the primary winding 802 of the pulse transformer 804 to the positive supply bus 250. The outer ends of the secondary windings 821 and 824 of the pulse transformer 804 are coupled respectively to the positive output terminal 840 and the negative output terminal 822. The inner ends of the secondary windings 821 and 824 are coupled respectively to the negative supply bus 10 and the positive supply bus 5.

A positive pulse which is fed to the grid 864 of the vacuum tube 860 will be inverted at the primary winding 802 of the pulse transformer 804 which is wound to produce a positive pulse in the secondary winding 821 and a negative pulse in the secondary winding 824. These pulses respectively drive the positive output terminal 840 up to a positive five volts potential and the negative output terminal 822b down to a negative ten volts potential because of the circuit parameters.

When the vacuum tube 860 is non-conducting, the negative ten volts potential is fed through the secondary winding 821 and appears at the positive output terminal 840. At the same time, the positive five volts potential is fed through the secondary winding 824 to the negative output terminal 822. These latter conditions are the normally existing conditions at the output terminals 840 and 822.

Hereinafter, the pulse amplifier may be referred to simply as an amplifier and the fact that the amplifier is a pulse amplifier will be apparent from the use of the symbol shown in Fig. 19g.

XXXII. RESHAPER

A reshaper of the type used in the computer system is an electronic circuit which functions to reshape and retime positive pulses which have become poorly shaped and attenuated.

The symbol for a representative reshaper 734 is illustrated in Fig. 20a and comprises one or more input terminals of which the input terminal 739 is shown, one timing terminal 743 which receives reshaping and retiming pulses (also designated clocking or C pulses), one positive output terminal 745, one negative output terminal 746, and may include one or more blocking terminals 747 through which signals may be sent to make the reshaper 734 inoperative.

Except when positive pulses are fed to the input terminal 739 of the reshaper 734, a negative potential of ten volts is present at the positive output terminal 745 and a positive potential of five volts exists at the negative output terminal 746.

When a pulse is fed to the reshaper 734 via the input terminal 739, the pulse is reshaped by a clock pulse (received via the terminal 743), which is timed to delay the reshaped pulse for one-quarter of a pulse time, and is then transmitted from the reshaper 734 via the positive output terminal 745. While the positive pulse is being transmitted from the positive output terminal 745, a negative pulse is transmitted from the negative output terminal 746. In the following description of the units of the computer, the vertical line representing this negative terminal will be omitted from the reshaper symbol when it serves no function in the machine.

The detailed circuitry of the reshaper 734 is illustrated in Fig. 20b in which use is made of logical symbols previously described.

The reshaper 734 comprises the buffer 735, the gate 736 and the amplifier 737 in series. A positive pulse which is fed via the input terminal 739 of the buffer 735 is passed to the gate 736. Signals may also be fed via the blocking terminal 747 to the gate 736 and if the signal is negative, the gate 736 is blocked and the reshaper 734 is inoperative. The blocking terminal 747 is generally absent and if present usually receives a positive signal.

A series of identical clock pulses which are generated in the clock pulse generator of the cycling unit 34, Figure 23, as will later be described in detail, are transmitted to the gate 736 via the clock terminal 743. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 736. Since in many cases the pulse to be reshaped is originally produced by a previous reshaper and thus has approximately the same width as a clock pulse, its center point will be one-quarter pulse time later than the leading edge of the clock pulse which previously reshaped it. Hence its leading edge after passing through the new reshaper will be one quarter pulse time later than before, and on this basis it may be said that a reshaper introduces a one-quarter pulse time delay in the signals passing through it.

When the attenuated positive pulse reaches its full magnitude at the gate 736, the coinciding clock pulse is gated through the amplifier 737 and is amplified and causes a positive pulse to be transmitted from the positive output terminal 745, and a negative pulse to be transmitted from the negative output terminal 746 at the same time.

The positive output terminal 745 is also coupled to one input of the buffer 735 so that a positive signal which appears at the positive output terminal 745 is regenerative and will continue to exist until the clock pulse terminates at the gate 736. This effectively permits the entire clock pulse to be gated through the gate 736, even though the original pulse has decayed before the end of the clock pulse.

Stated more generally, a clock pulse is passed through the gate 736 from the earliest coincidence of that clock pulse with the full magnitude of the attenuated pulse until the termination of that clock pulse. As a result, a clock pulse is substituted for the attenuated pulse in the computer system after a delay of one-quarter of a pulse time.

XXXIII. D.-C. AMPLIFIER

The symbol for a representative D.-C. amplifier 870 is shown in Fig. 20c. When a positive signal is present at the input terminal 872, a positive signal of five volts appears at the positive output terminal 874 and a negative signal of ten volts is present at the negative output terminal 876. If a negative potential is present at the input terminal 872, the potentials at the output terminals 872 and 874 are reversed.

As shown in Fig. 20d, the D.-C. amplifier 870 includes the gate 806, the buffer 878, the vacuum tube 880, the transformer 900, the full-wave rectifiers 952 and 954, and the filters 956 and 958.

The input terminal 872 is connected to one input terminal of the gate 806. The other input terminal of the gate 806 is fed a one megacycle carrier signal from the signal generator 807 which is a signal generator of known type. The one megacycle carrier signal swings from minus ten to plus five volts.

One input terminal of the buffer 878 is connected to the output terminal of the gate 856. The other input terminal of the buffer 878 is connected to the negative supply bus 5. The buffer 878 couples the output of the gate 806 to the control grid 882 of the vacuum tube 880.

The vacuum tube 880 is a five element tube having a grounded cylindrical shield 890, and includes the anode 884 connected via the primary winding 902 of the transformer 900 to a positive supply bus 250. The junction 960 of the positive supply bus 250 and the primary winding 902 is coupled via the capacitor 910 to ground. The vacuum tube 880 also includes the suppressor grid 892 which is connected to ground, the screen grid 888 which is connected to the positive supply bus 125 and via the capacitor 894 to ground, and the cathode 886 which is grounded.

The anode 884 of the vacuum tube 880 is also connected via the coupling capacitor 898 to the neon tube 896 which is grounded. The capacitor 908 is connected in parallel with the primary winding 902 of the transformer 900 to form the parallel tank circuit 966 which is tuned to the frequency of the carrier signal.

The full-wave rectifier 952 is connected to the secondary winding 904 having its center tap 962 connected to the negative supply bus 10. The full-wave rectifier 952 includes the pair of crystal diodes 912 and 918. The anodes 914 and 920 of the crystal diodes 912 and 918 are respectively coupled to opposite ends of the secondary winding 904 of the transformer 900, and the cathodes 916 and 922 of the crystal diodes 912 and 918 are interconnected.

The full-wave rectifier 954 is connected to the secondary winding 906 having its center tap 964 connected to the positive supply bus 5. The full-wave rectifier 954 includes the pair of crystal diodes 924 and 930. The cathodes 926 and 932 of the crystal diodes 924 and 930 are coupled to opposite ends of the secondary winding 906, and the anodes 928 and 934 of the crystal diodes 924 and 930 are connected together.

The filter 956 which couples the cathodes 916 and 922 of the crystal diodes 912 and 918 to the positive output terminal 874 is a parallel tank circuit which includes the capacitor 936 and the inductor 938. The capacitor 944 connects the positive output terminal 874 to the negative supply bus 10. The positive output terminal 874 is also coupled via the resistor 948 to the negative supply bus 70.

The filter 958, which couples the anodes 928 and 934 of the crystal diodes 924 and 930 to the negative output terminal 876, is a parallel tank circuit which includes the capacitor 940 and the inductor 942. The capacitor 946 connects the negative output terminal 876 to the positive supply bus 5. The negative output terminal 876 is also coupled by the resistor 950 to the positive supply bus 65.

Initially, the crystal diodes 912 and 918 are in a conductive state such that the potential at the positive output terminal 874 is approximately minus ten volts. Similarly, the crystal diodes 924 and 930 are initially in a conductive state such that the potential at the negative output terminal 876 is approximately plus five volts.

When a signal is fed to the input terminal 872 it is combined with the one megacycle carrier and fed to the buffer 878. As previously noted, one input terminal of the buffer 878 is connected to a negative five volts supply bus so that all signals at the output of gate 806 which are equal to or more positive than minus five volts will be passed by the buffer 878. A signal passed by the buffer 878 is applied to the control grid 882 of the vacuum tube 880. The signal is amplified by vacuum tube 880 and appears across the parallel tank circuit 966. The parallel tank circuit 966 is tuned to the frequency of the incoming signal so that the maximum signal will be passed by the parallel tank circuit 966 to the full-fave rectifiers 952 and 954.

The full-wave rectifier 952 delivers a positive signal which is then filtered by the filter 956 to appear as a positive direct-current potential of approximately five volts at the positive output terminal 874. The full-wave rectifier 954 delivers a negative signal which is then filtered by the filter 958 to appear as a negative direct-current potential of approximately ten volts at the negative output terminal 876.

Thus, if a positive signal is present at the input terminal 872, the voltage at the positive output terminal 874 is plus five volts, and the potential at the negative output terminal 876 is minus ten volts. However, if no signal is present at the input terminal 872, the voltage at the positive output terminal 874 will be minus ten volts, and the potential at the negative output terminal 876 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

In the description which follows, the D.-C. amplifier may at times be referred to simply as an amplifier, and the fact that the amplifier is a D.-C. amplifier will be apparent from the use of the symbol shown in Fig. 20c.

XXXIV. TAPE-READING AMPLIFIER

The symbol for a representative tape-reading amplifier 970 is shown in Fig. 20e. The tape-reading amplifier 970 functions to amplify tape signals which are generated when a magnetic tape is fed past a magnetic head which is coupled to the input terminal 972. The amplified signals appear at the output terminal 974.

As shown in Fig. 20f, the tape-reading amplifier 970 includes the transformer 976 and the vacuum tubes 984 and 842. The transformer 976 comprises the primary winding 978 connected to the input terminals 972, the secondary winding 980 which couples the control grid 988 of the vacuum tube 984 to ground, and a core 856 provided with an electrostatic shield which is connected to ground to prevent noise from being fed to the control grid 988. The resistor 982 is in parallel with the secondary winding 980. The vacuum tube 984 also includes the anode 986 which is connected via the resistor 994 to the positive supply bus 250, and the cathode 990 connected via the resistor 992 to ground.

The vacuum tube 842 comprises the anode 844 connected via the resistor 850 to the positive supply bus 250, the control grid 846 connected via the resistor 854 to the negative supply bus 1, and the cathode 848 connected to ground. The anode 986 of the vacuum tube 984 is coupled via the capacitor 996 to the control grid 846 of the vacuum tube 842. The anode 844 of the vacuum tube 842 is connected via the capacitor 852 to the output terminal 974.

When a signal is read from the tape by the magnetic head it is applied to the primary winding 978 of the transformer 976, the secondary winding 980 of the transformer 976 applies an amplified signal to the control grid 988 of the vacuum tube 984. The signal is amplified by vacuum tubes 984 and 842 to produce an amplified signal at the output terminal 974.

In the text which follows, the tape-reading amplifier 970 may at times be referred to as an amplifier and the fact that the amplifier is a tape-reading amplifier will be apparent from the use of the symbol shown in Fig. 20e.

XXXV. DRUM-READING AMPLIFIER

The symbol for a representative drum-reading amplifier 438 is shown in Fig. 20g and comprises the input terminal 972' and the output terminal 974' (corresponding to the terminals 972 and 974 of the tape-reading amplifier shown in Fig. 20e). The drum-reading amplifier 438 (see Fig. 20g) functions to amplify the signals read from a magnetic drum.

The circuit of the drum-reading amplifier 438 is substantially the same as that described for the tape-reading amplifier 970 and illustrated in Fig. 20f.

The drum-reading amplifier 438 may be simply designated an amplifier in the text which follows and the fact that the amplifier is a drum-reading amplifier will be apparent by the use of the symbol shown in Fig. 20g.

XXXVI. SET DOMINANT FLIP FLOP

A set dominant flip flop of the type used in the computer system is a bi-stable electronic circuit with two output terminals, one of which is maintained at one potential level and the other of which is maintained at a second potential level to indicate one stable state. Upon receipt of a signal of suitable magnitude at its input the potential levels of the two output terminals are interchanged to indicate a second stable state.

The symbol for a representative set dominant flip flop 700 is illustrated in Fig. 21a. The set dominant flip flop 700 comprises one or more input terminals of which the input terminals 705 and 706 are illustrated, one or more reset terminals of which the reset terminal 716 is shown, one positive output terminal 711, and one negative output terminal 712.

One stable state of the set dominant flip flop 700 is the normal condition which is designated "reset" and exists when a negative potential of ten volts appears at the positive output terminal 711 and a positive potential of five volts appears at the negative output terminal 712. The second stable state is designated "set" and exists when a positive potential of five volts appears at the positive output terminal 711 and a negative potential of ten volts appears at the negative output terminal 712.

The set dominant flip flop 700 is set when a positive input signal is received via one or both of its input terminals 705 or 706, and this is true irrespective of any reset signal which may simultaneously be transmitted to the reset terminal 726 of the set dominant flip flop 700.

Once set, the set dominant flip flop remains set as long as positive signals are received via all the reset terminals such as 716 even though the "setting" pulse or signal has terminated. When the signal received via any reset terminal such as 716 becomes negative, the set dominant flip flop 700 is reset unless a positive pulse or signal is simultaneously being received via one or both of the input terminals 705 or 706.

Stated more generally, the set dominant flip flop 700 is set by the receipt of one or more positive input signals via the input terminals 705 or 706 and is reset by a coincidence of all negative input signals and at least one reset signal. After being reset, the set dominant flip flop 700 remains reset until the above recited set conditions are fulfilled.

The detailed circuitry of the set dominant flip flop 700 is illustrated in Fig. 21b employing some of the logical symbols previously described.

The set dominant flip flop 700 comprises the buffer 701, the D.-C. amplifier 702 and the gate 703.

The input terminals 705 and 706 are the input terminals of the buffer 701. A positive signal which is transmitted to either of the input terminals 705 and 706 is passed through the buffer 701 to the D.-C. amplifier 702, and causes the D.-C. amplifier 702 to generate a positive potential of five volts at its positive output terminal 711 and a negative potential of ten volts at its negative output terminal 712.

The gate 703 couples the positive output terminal 711 of the D.-C. amplifier 702 to the buffer 701. When a positive signal is present at the reset terminal 716, and at all other reset terminals which may be connected to the gate 703, the gate 703 passes the positive signal to the buffer 701. Thus a feedback path is provided which enables the positive potential of five volts to be maintained at the positive output terminal 711 and which is blocked only when a negative signal causes the gate 703 to be blocked.

It should be noted that a reset signal which causes the gate 703 to be blocked will not prevent a set signal at the buffer 701 from causing the D.-C. amplifier 702 to generate a positive potential of five volts at its positive output terminal 711 during the existence of the set signal.

In the text which follows, the set dominant flip flop may be referred to simply as a flip flop and the quality of being set dominant will be apparent from the use of the symbol shown in Fig. 21a.

XXXVII. RESET DOMINANT FLIP FLOP

A reset dominant flip flop of the type used in the computer system, is a bi-stable electronic circuit with two output terminals, one of which is maintained at one potential level and the other of which is maintained at a second potential level to indicate one stable state. Upon the receipt of at least two signals of suitable magnitude the potential levels of the two output terminals are exchanged to indicate a second stable state.

The symbol for a representative reset dominant flip flop 718 is illustrated in Fig. 21c. The reset dominant flip flop 718 comprises one or more input terminals of which the input terminals 723 and 724 are illustrated, one or more reset terminals of which the reset terminal 726 is illustrated, one positive output terminal 732 and one negative output terminal 733.

One stable state of the reset dominant flip flop 718 is the normal condition which is designated "reset" and exists when a negative potential of ten volts appears at the positive output terminal 732 and a positive potential of five volts appears at the negative output terminal 733. The other stable state is designated "set" and exists when a positive potential of five volts appears at the positive output terminal 732 and a negative potential of ten volts appears at the negative output terminal 733.

The reset dominant flip flop 718 is set when a positive signal is received via one or both of its input terminals 723 or 724, and positive signals are present at all of its reset terminals such as 726. Therefore, the reset dominant flip flop 718 will not be set if a reset (negative) signal is present at any reset terminal such as 726.

Once set, the reset dominant flip flop 718 remains set as long as a positive signal is received via the reset terminal 726 even though the "setting" signal has terminated, but when the signal at the reset terminal 726 is negative (and if the reset dominant flip flop has a plurality of reset terminals, if the signal at any one of the reset terminals is negative), the reset dominant flip flop 718 is then reset.

After being reset, the reset dominant flip flop 718 remains reset until the above recited set conditions are fulfilled.

The detailed circuitry of the reset dominant flip flop 718 is illustrated in Fig. 21d in which use is made of logical symbols previously described.

The reset dominant flip flop 718 comprises the buffer 719, the gate 720 and the D.-C. amplifier 721 in series. The input terminals 723 and 724 are the input terminals of the buffer 719.

The buffer 719 is coupled to the gate 720. The reset terminal 726 is also coupled to the gate 720, as are any additional reset terminals. When the gate 720 receives positive signals coincidentally from the buffer 719 and the reset terminal 726, the gate 720 passes a positive signal to the D.-C. amplifier 721, and causes the D.-C.

amplifier 721 to generate a positive potential of five volts at its positive output terminal 732 and a negative potential of ten volts at its negative output terminal 733.

The positive output terminal 732 is coupled directly to the buffer 719 so that when a positive signal is generated at the positive output terminal 732, it is regenerative. The positive signal will be maintained at the positive output terminal 732 until the gate 720 is blocked by a negative signal received via one of the reset terminals such as 726.

It should be noted that a negative signal at the reset terminal 726 will prevent a positive pulse or signal at the input terminals 723 and 724 from setting the reset dominant flip flop 718.

In the text which follows, the reset dominant flip flop may be referred to simply as a flip flop and the quality of being reset dominant will be apparent from the use of the symbol shown in Fig. 21c.

XXXVIII. DELAY FLOP

A delay flop of the type used in the computer system is a mono-stable electronic circuit with two output terminals, one of which is maintained at one potential level and the other of which is maintained at a second potential level to represent the stable state. Upon receipt of a signal of suitable magnitude, the potential levels of the two output terminals are exchanged for a predetermined period of time, after which the circuit automatically returns to its stable state.

The symbol for a representative delay flop 760 is illustrated in Fig. 21e. The delay flop 760 comprises one or more input terminals of which the input terminal 762 is illustrated, one positive output terminal 764, and one negative output terminal 768. The delay flop 760 may also include one or more reset terminals such as 766.

One stable state of the delay flop 760 is the normal condition which is designated "reset" and exists when a negative potential of ten volts appears at the positive output terminal 764 and a positive potential of five volts appears at the negative output terminal 768. The other state is designated "set" and exists when a positive potential of five volts appears at the positive output terminal 764 and a negative potential of ten volts appears at the negative output terminal 768.

The delay flop 760 is set when positive signals are simultaneously received via the input terminal 762 and all of the reset terminals such as 766 (if reset terminals are included in the delay flop 760). Once set, the delay flop 760 remains set for a predetermined period of time or for as long as a positive signal is received via all the reset terminals such as 766, depending on which is the shorter period of time.

The detailed circuitry of the delay flop 760 is illustrated in Fig. 21f in which use is made of logical symbols previously prescribed.

The delay flop 760 comprises the buffer 770, the gate 765, the D.-C. amplifier 774, and the delay line 778. The input terminal 762 is the input terminal of the buffer 770.

The output terminal of the buffer 770 and the reset terminal 766, as well as any additional reset terminals, are coupled to the gate 772 which feeds the D.-C. amplifier 774. The delay line 778 couples the negative output terminal 768 of the D.-C. amplifier 774 to the gate 772 so that normally the delay line 778 transmits a positive signal to the gate 772.

When the gate 772 receives positive signals coincidentally from the buffer 770, all of the reset terminals such as 766 and the delay line 778, the D.-C. amplifier 774 generates a positive potential of five volts at its positive output terminal 764 and a negative potential of ten volts at its negative output terminal 768. The D.-C. amplifier 774 transmits a negative potential of ten volts from its positive output terminal 764 and a positive potential of five volts from its negative output terminal 768 when a positive signal is not present at its input.

The positive output terminal 764 is coupled directly to the buffer 770 so that when a positive signal is generated at the positive output terminal 764, it is regenerative. The positive signal will be maintained at the positive output terminal 764 until the gate 772 is blocked by a negative signal received via one of the reset terminals such as 766, or by the negative signal which is fed from the negative output terminal 768 through the delay line 778.

Generally, the negative signal fed through the delay line 778 resets the delay flop 760 and, therefore, the delay in the delay line 760 controls the period of time for which the delay flop 760 may be set.

XXXIX. WRITE AMPLIFIER

The symbol for a representative write amplifier 790 is illustrated in Fig. 21g and includes the write terminal 673, the erase terminal 636, and the output terminal 675. The write amplifier 790 functions to reversibly energize the magnetic heads associated with the memory drum.

The write amplifier 790 as shown in Fig. 21h is composed of two circuits connected to the erase terminal 636 and the write terminal 673, respectively, and terminates in a switching circuit arangement which includes two triode vacuum tubes 657 and 749. These tubes are arranged such that during the write operation, triode 657 is in a nonconductive state while triode 749 is in a conductive state and current is caused to flow in one direction through the coil winding of the magnetic head, this condition being indicative of a zero and corresponding to erase.

When a one signal is to be recorded in the system, the conduction in the triode vacuum tubes 657 and 749 is switched such that triode vacuum tube 657 is conductive and the triode vacuum tube 749 is nonconductive and current is caused to flow in an opposite direction through the winding of the magnetic head to represent a one.

The circuit connected to the write terminal 673 includes the buffer 676. One input terminal of the buffer 676 is connected to the write terminal 673 and the other input terminal is connected to the negative supply bus 5.7. The output terminal of the buffer 676 is connected to the control grid 687 of the pentode 683.

The pentode 683 also includes the anode 684 connected via the resistor 690 to the positive supply bus 250, the suppressor grid 685 connected to ground, the screen grid 686 connected to the positive supply bus 125 and via the capacitor 689 to ground, and the cathode 688 connected to ground.

The primary winding 693 of the transformer 692 is connected across the resistor 690, and the secondary winding 695 is connected between the cathode 659 of the triode vacuum tube 657 and one terminal of the coupling capacitor 696. The other terminal of the coupling capacitor 696 is connected to a restorer circuit comprising the resistor 655 and the crystal diode 697. One end of the resistor 655 is connected to the cathode 698 of the crystal diode 697 and to the control grid 658 of the triode vacuum tube 657, while the other end of the resistor 655 is connected to the anode 699 of of the crystal diode 697 and to the negative supply bus 70.

The circuit connected to the erase terminal 636 includes the buffer 647. One input terminal of the buffer 647 is connected to the input terminal 636 and the other input terminal is connected to a negative supply bus 3.8. The output terminal of the buffer 647 is connected to the control grid 625 of the triode vacuum tube 621. The cathode 627 of the triode 621 is connected to ground and the anode 623 is connected to one end of the coupling capacitor 709 and the resistor 674. The other end of the resistor 674 if connected to the positive supply bus 250 and also via the capacitor 707 to ground.

The other end of the coupling capacitor 709 is connected to the control grid 784 of the pentode 780 and via the biasing resistor 708 to the positive supply bus 65.

The pentode 780 comprises the cathode 785 connected to ground, the control grid 784, the screen grid 783 connected via the resistor 728 to the positive supply bus 250 and via the decoupling capacitor 729 to ground, the suppressor grid 782 connected to ground, and the anode 781 connected to one end of the resistor 714 and to one end of the coupling capacitor 727 and to the cathode 725 of the crystal diode 715. The other end of the resistor 714 is connected to the positive supply bus 250 and via the capacitor 713 to ground.

The anode 717 of the crystal diode 715 is connected to the positive supply bus 125 such that the crystal diode 715 functions to clamp the anode 781 at a positive potential of one hundred twenty-five volts. The other end of the coupling capacitor 727 is connected to one end of the resistor 731, to the cathode 744 of the crystal diode 741, and via the grid resistor 748 to the grid 752 of the triode 749. The other end of the resistor 731 and the anode 742 of crystal diode 741 are interconnected and coupled to the negative supply bus 140. The crystal diode 741 functions to clamp the grid 752 of the triode vacuum tube 749 to a negative potential of one hundred forty volts.

The triode vacuum tubes 749 and 657 are effectively connected in series. The cathode 753 of the triode vacuum tube 749 is connected via the resistor 755 to the negative supply bus 70 and via the capacitor 754 to ground; the anode 751 is connected to the cathode 659 of the triode vacuum tube 657, to the output terminal 675 and via the damping resistor 672 to ground. The anode 691 is connected via the resistor 664 to the positive supply bus 90 and via the decoupling capacitor 661 to ground.

Initially, when no information is being transmitted to the write terminal 673 of the write amplifier 790 (such condition is hereinafter designated the normal or erase condition), the write terminal 673 is at a negative potential of ten volts and the erase terminal 636 is at a positive potential of five volts. The triode vacuum tube 657 and the pentode vacuum tubes 683 and 780 are nonconductive and the triode vacuum tubes 621 and 749 are conductive. Therefore, electron current flows via the triode vacuum tube 749 toward the output terminal 675.

When a one signal is applied to the write amplifier 790, the write terminal 673 is at a positive potential of five volts and the erase terminal 636 is at a negative potential of ten volts.

The positive signal at the write terminal 673 is passed by the buffer 676 and is applied to the control grid 687 of the pentode vacuum tube 683 and causes the pentode vacuum tube 683 to conduct. The negative drop in potential at the anode 684 of the pentode vacuum tube 683 is applied to the primary winding 693 of the transformer 692. The secondary winding 695 therefore applies an inverted and amplified signal via the coupling capacitor 696 to the grid 658 of the triode vacuum tube 657. At the same time, the negative signal at the erase terminal 636 operates via buffer 647 to cut off the triode vacuum tube 621. The positive rise in potential at the anode 623 of the triode vacuum tube 621 is applied via the coupling capacitor 709 to the control grid 784 of the pentode vacuum tube 780 and causes the pentode vacuum tube 780 to conduct.

The anode 781 of the pentode vacuum tube 780 becomes less positive but is clamped to a positive potential of one hundred twenty-five volts by the crystal diode 715. The negative swing in potential of the anode 781 is applied via the coupling capacitor 727 to the grid 752 of the triode vacuum tube 749.

Thus, when a one signal is applied to the write amplifier 790, a positive signal is applied to the triode vacuum tube 657 and a negative signal is applied to the triode vacuum tube 749 to interchange their conductive states so that the triode vacuum tube 657 is conductive and the triode vacuum tube 749 is nonconductive. Therefore, current flows to the output terminal 675 through the triode vacuum tube 657.

In summary, when a signal representing the binary digit zero is applied to the write amplifier 790, it causes current to flow from the output terminal 675 whereas when a signal representing the binary digit one is applied to the write amplifier 790, it switches conduction in the triode vacuum tubes 657 and 749 and causes current to flow towards the output terminal 675.

Since the output terminal 675 is connected in the computer system to a magnetic head, the current will flow through the coil winding in one direction for a one and in the reverse direction for a zero. The recording of a zero corresponds to erase.

XL. TAPE-WRITING AMPLIFIER

The symbol for a representative tape-writing amplifier 400 is shown in Fig. 21*i*. The tape-writing amplifier 400 functions to amplify pulses for recording on the magnetic tape and to provide an erasing voltage when no pulse is received. The tape-writing amplifier 400 includes the input terminal 402 and the output terminal 404.

As shown in Fig. 21*j*, the circuitry of the tape-writing amplifier 400 comprises the vacuum tube 406 having the anode 416 which is connected to the positive supply bus 250, the cathode 408 which is connected to the negative supply bus 70 via the resistor 414, the control grid 410 which is connected to the input terminal 402, and the screen grid 412 which is coupled to the positive supply bus 125. The output terminal 404 is connected to the cathode 414. In the computer system, the output terminal 404 is coupled to one end of the coil winding of a magnetic head. The other end of the coil winding is grounded.

If a positive pulse representing a one is not applied to the input terminal 402, the vacuum tube 406 is nonconducting. Since the output terminal 404 is coupled to the coil winding, current will flow from ground through the coil winding and via the resistor 414 to the negative supply bus 70.

If a positive pulse representing a one is fed to the input terminal 402, vacuum tube 406 will conduct, and the potential of the cathode 408 will swing positive causing current to flow from the cathode 408 via the coil winding to ground.

Stated otherwise, the current through the magnetic head will flow in one direction for a one, and in the reverse direction for a zero. The recording of a zero corresponds to erase.

In this manner, the tape-writing amplifier functions to provide writing and erasing voltages.

XLI. INTRODUCTION TO DETAILED DESCRIPTION

In the following sections, the details of the sub-units which have been shown in block symbol form and referred to in the procedures sections are illustrated in Figs. 22 to 44. The sub-units will be described in terms of the logical symbols.

The Figs. 22 to 44 are usually arranged so that input lines enter at the left and top sides of the figures and the output lines leave at the bottom and right sides of the figures. Generally, the input and output lines to and from the various sub-units have been previously referred to in the procedures sections. However, for convenience, certain inhibitory signals were not included in the description of the procedures. These inhibitory signals are included in the detailed description so that the number of input and output lines associated with a particular sub-unit may exceed the total number of input and output lines associated with the same sub-unit in all of the flow diagrams, but their inclusion in the computer system will be obvious to those skilled in the art.

Further, whereas polarity of signals was not indicated in the procedures, polarity is included in the description which follows. Therefore, a line which was referred to in the procedures may be represented as two lines carrying signals of opposite polarity. These two lines (designated as a positive line and a negative line) are coupled, respectively, to the positive and negative output terminals of the logical component which generates the signals which are to be transmitted. The two lines are differentiated by the use of a negative sign or absence of a sign preceding the numerical character reference of the line. For example, the AM line 292 becomes the AM line 292 and the AM line −292. The AM line 292 is coupled to the positive output terminal of the logical component which generates AM, and the AM line −292 is coupled to the corresponding negative output terminal.

The positive and negative output terminals of various logical components (flip flops, reshapers, etc.) may transmit either a positive or a negative signal at a given time. For example, the AM line 292 may conduct either a positive or negative signal as will be specifically indicated; likewise, the AM line −292 may transmit positive or negative signals as will be specifically indicated. The signals on the two lines, however, will, at a given time, always be opposite in polarity with respect to each other. Generally, where a positive line conducts a signal from a sub-unit, the associated negative line is also illustrated. However, for purposes of convenience, the associated negative line may be omitted.

Repetitious phrases such as "input terminals" and "output terminals" have been excluded where their absence does not create ambiguity. For example, when it is stated that a gate is coupled to a buffer, what is meant is that the output terminal of the gate is coupled to one of the input terminals of the buffer unless the text clearly indicates otherwise.

In the detailed description only one logical component is shown as generating a given signal. Where, however, this signal is transmitted to a plurality of components and the load exceeds the capacity of the transmitting component, it is to be assumed that sufficient parallel transmitting sources are available to sustain the load.

XLII. MEMORY DRUM 38

The memory drum 38 shown in Fig. 22 comprises the magnetic drum 3400 and the magnetic heads 3410a through 3410k. The memory drum input-output lines 320a through 320h, the W line 338, and the cyclical signal lines 340a and 340b, couple the eleven magnetic heads 3410 to other sub-units in the computer system.

The magnetic drum 3400 is a bronze casting with a magnetizable surface coating, and is positioned by suitable support members and rotated by a suitable motor. The magnetic heads 3410 are also held in fixed positions by suitable support members (not shown).

As the magnetic drum 3400 rotates each of the magnetic heads 3410 scans a corresponding channel 3411 on the magnetizable surface. The channels 3411 circumscribe the periphery of the magnetic drum 3400. Each channel 3411 is of such length that one thousand nine hundred and twenty pulses may be recorded in it corresponding to a maximum of sixty-four words each thirty binary digits long.

Channel 3411a has permanently recorded in it sixty-four address information signals W which are equally spaced along the channel 3411a. Each address information signal comprises six pulses representing six binary digits which are positioned so that they will always occur during the period t24¼ to t29¼ in the computer system. The sixty-four groups of six binary digits each, comprise a sequence of binary (or octal) numbers increasing successively by binary one, which represent the decimal numbers zero to sixty-three, inclusive, each number corresponding to the address of the associated position.

The channel 3411b which is scanned by the magnetic head 3410b has recorded in it a single pulse which serves as a time reference together with the address information signals W and, further, to initiate recirculation in the cycling unit 34. This single pulse is timed to enter the machine at time t29¾.

The channel 3411c which will be scanned by the magnetic head 3410c has permanently recorded in it one pulse in each possible pulse position. The total number of pulses in this channel is one thousand nine hundred and twenty (the number of pulses in sixty-four words of thirty pulses each) and these in turn are employed to generate the clock pulses which are used for shaping and timing purposes in the computer system.

The eight remaining channels 3411d to 3411k which are scanned by the magnetic heads 3410d to 3410k are information channels and each is divided into sixty-four positions corresponding to the sixty-four address information signals W. The sixty-four address information signals W designate the word positions in each information channel. Each position may contain one word of thirty binary digits so that a total of five hundred and twelve thirty-binary digit words may be recorded in the information channels on the memory drum 38.

Information signals enter or leave the memory drum 38 via the memory drum input-output lines 320a–h which respectively connect the magnetic heads 3410d–k to the drum-read and record 37. The cyclical signal lines 340 and the W line 338 respectively connect the magnetic heads 3410b–c to the cycling unit 34, and magnetic head 3410a to the W generated 300 (see Fig. 23).

In the computer system, the magnetic drum 3400 (see Fig. 22) rotates on its shaft at a speed of slightly less than thirty-six hundred revolutions per minute. As a result, the magnetic head 3410c reads pulses at a rate of approximately one hundred fifteen thousand per second, or roughly 3840 words per second.

The magnetic drum 3400 rotates continually during computer system operation and provides storage for a large number of signals and a means with which to initiate the generation of the cyclical signals.

XLIII. CYCLING UNIT 34

The cycling unit 34 shown in Figs. 23 and 24 in two parts (cycling unit 34a and cycling unit 34b) receives the output signals of the memory drum 38 which are transmitted via the cyclical signal lines 340a and 340b. The cycling unit 34 functions to convert the received signals into a plurality of cyclical signals which are utilized throughout the computer system to retime and reshape other signals.

Because of the large number of output signals involved, the output signals of the cycling unit 34 are shown as being conducted to output terminals. It should be understood that, in the figures associated with the descriptions which follow, a line which is illustrated as carrying a particular cyclical signal is connected to the corresponding output terminal in the cycling unit 34.

Pulses are transmitted via the cyclical signal line 340b from the magnetic drum to the cycling unit 34a at a rate of one hundred fifteen and two-tenths thousand per second. These pulses are sequentially fed via the cyclical signal line 340b to the amplifier 4270 and are amplified. The amplified pulses are then fed to the clipper 4275, which may be any suitable clipping circuit, and are shaped into square-wave pulses. These square-wave pulses are fed to and amplified by the amplifier 4260.

The pulses which constitute the signal at the positive output of the amplifier 4260 are hereinafter identified as C3 pulses. The positive swing portion of the pulses which constitute the signal at the negative output of the amplifier 4260 are hereinafter designated C1 pulses. The C1 and C3 pulses are one hundred eighty degrees out of phase. The phase relationship is shown in Fig. 25. The C pulses determine the period of a pulse time which is 8.68 microseconds long.

The positive output of the amplifier 4260 (see Fig. 23) is also fed through the delay line 4265 where the pulses are delayed for one-quarter of a pulse time and are then fed to and amplified by the amplifier 4290. The pulses which constitute the signal at the positive output of the amplifier 4290 are hereinafter identified as C0 pulses. The positive swing portions of the pulses which constitute the signal at the negative output of the amplifier 4290 are hereinafter designated C2 pulses. As were the C1 and C3 pulses, the C0 and C2 pulses are one hundred eighty degrees out of phase with each other. Furthermore, the C0 pulses lag their originating C3 pulses by one-quarter of a pulse time or ninety degrees, and the C2 pulses lag their corresponding C1 pulses by one-quarter of a pulse time or ninety degrees. This phase relationship is shown in Fig. 25; for example, pulse C0$a$ lags pulse C3$a$ and pulse C2$a$ lags pulse C1$a$.

The C0 and C3 pulses are transmitted to the gate 4110 (see Fig. 23). Since corresponding C0 and C3 pulses are ninety degrees out of phase and overlap each other for a quarter-pulse period, there is a signal output from the gate 4110 of pulses having a width equal to one-half of the width of the C0 and C3 pulses. These narrow pulses begin at the earliest coincidence of a C0 and C3 pulse at the input terminal of the gate 4110 and terminate when the C3 pulse terminates.

More particularly, the C3$a$ pulse which is transmitted to the gate 4110 will prime the gate 4110 so that when the C0$a$ pulse arrives one-quarter of a pulse time later it will be gated through. The termination of the C3 pulse one-quarter of a pulse time after the initiation of the narrowed pulse blocks the C0 pulse at the gate 4110 and thereby terminates the narrow pulse.

In an identical manner, C1 and C2 pulses are transmitted to the gate 4120 and form narrow pulses. The narrow pulses formed by C1 and C2, and by C0 and C3 occur alternately and are fed via the buffer 4250 through the delay line 4070 where they are delayed for one-eighth of a pulse time and are then fed to the amplifier 4240.

The narrow pulses are amplified by the amplifier 4240. Pulses from the positive output of the amplifier 4240 are hereinafter identified as I0 pulses, and the positive swing portion of the pulses from the negative output of the amplifier 4240 are hereinafter designated I1 pulses.

I1 and I0 are narrow pulses which are one hundred eighty degrees out of phase with each other. This phase relationship is shown by the pulses I0$a$ and I1$a$ which are generated by the pulses C0$a$ and C3$a$ as is illustrated in Fig. 25. I1 and I0 are utilized as inputs to numerous gates and function to remove objectionable spikes from pulses circulating in the computer system by permitting these gates to pass signals only for the duration of the I pulses. It should be noted that the I0 pulse always occurs during the middle of the C0 pulse, and that the I1 pulse always occurs during the middle of the C1 pulse.

C0, C1, C2 and C3 are clocking pulses which establish the basic timing of the computer system and which are used to synchronize other pulses with this basic timing. C pulses are also utilized for reshaping purposes.

Pulses are also transmitted via the cyclical signal line 340$a$ to the cycling unit 34$a$ shown in Fig. 23 at a rate of one pulse per revolution of the magnetic drum. These pulses are fed to the amplifier 4230. The amplifier 4230 amplifies the pulses and transmits each amplified pulse to recirculation loops H and P. The pulses appearing at the positive output of the amplifier 4230 constitute the cyclical signal OT0.

The recirculation loop H includes a six pulse-time delay and comprises the reshaper 4090, the delay lines 4017, the reshaper 4250, and delay line 4020 in series. The output from a tap on the delay line 4020 is fed back to the reshaper 4090 to complete the recirculation loop H. A pulse recirculating in recirculation loop H will require six pulse times in order to complete the path.

If an inhibiting signal is absent on the AG line —266 connected to the inhibiting terminal of the reshaper 4090 so that the AG line —266 carries a positive signal, a pulse which is transmitted from the amplifier 4230 passes through the reshaper 4090, where the pulse is reshaped and retimed, and is fed to the delay line 4017.

The delay line 4017 has a plurality of taps which are designated H$n$, the first of which is specifically H0. More particularly, $n$ represents the number of pulse times which will elapse after a pulse first appears at tap H0 and then appears at the designated tap. For example, when a pulse entering the delay line 4017 produces an H pulse at the tap H0 of the delay line 4017, it will produce an H pulse at the tap H1¾ one and three-quarters pulse times later.

The pulse moves through the delay line 4017 and produces an H pulse at each of the H$n$ taps at the designated time and is fed from the tap H3 to the reshaper 4250 where the pulse is reshaped and retimed.

The pulse is then fed from the output of the reshaper 4250 to the delay line 4020. In a similar manner, the pulse passes through the delay line 4020 and produces an H pulse at each H$n$ tap. For example, a pulse which causes a pulse at the tap H0 of the delay line 4017 will also cause a pulse five pulse times later at the tap H5 of the delay line 4020. The delay lines 4017 and 4020 have delays of three and one-quarter and two and one-quarter pulse times respectively, and tap H0 is a one-quarter pulse time delay and tap H3¾ is a half-pulse time delay from their respective input terminals.

As previously stated, a pulse received at the input of the reshaper 4090 from the output of the amplifier 4230 requires six pulse times in which to circulate once through the recirculation loop H. Recirculation is provided by the feed-back path which couples the tap H5¾ of the delay line 4020 to the input of the reshaper 4090, and, as there is a delay of one-quarter of a pulse time in each of the reshapers 4090 and 4250, the total delay is six pulse times.

A pulse fed from the amplifier 4230 to the reshaper 4090 will circulate in the recirculation loop H five times in one minor cycle (thirty pulse times). H pulses will result at times which are integral multiples of six pulse times plus the $n$ pulse times designated by the various H$n$ taps of the delay lines 4017 and 4020. Table I specifically lists the times at which H pulses occur during a minor cycle.

TABLE I

| No. of times pulse has been recirculated | H0 | H1¼ | H1¾ | H2 | H2¼ | H2¾ | H3 | H3¾ | H4¾ | H5 | H5¼ | H5¾ | H5¾ |
|---|---|---|---|---|---|---|---|---|---|---|---|---|---|
| 0 | 0  | 1¼  | 1¾  | 2  | 2¼  | 2¾  | 3  | 3¾  | 4¾  | 5  | 5¼  | 5¾  | 5¾  |
| 1 | 6  | 7¼  | 7¾  | 8  | 8¼  | 8¾  | 9  | 9¾  | 10¾ | 11 | 11¼ | 11¾ | 11¾ |
| 2 | 12 | 13¼ | 13¾ | 14 | 14¼ | 14¾ | 15 | 15¾ | 16¾ | 17 | 17¼ | 17¾ | 17¾ |
| 3 | 18 | 19¼ | 19¾ | 20 | 20¼ | 20¾ | 21 | 21¾ | 22¾ | 23 | 23¼ | 23¾ | 23¾ |
| 4 | 24 | 25¼ | 25¾ | 26 | 26¼ | 26¾ | 27 | 27¾ | 28¾ | 29 | 29¼ | 29¾ | 29¾ |
| 5 | 30 |     |     |    |     |     |    |     |     |    |     |     |     |

When a pulse is fed to the recirculation loop H, the pulse is also fed to the recirculation loop P. The recirculation loop P comprises the reshaper 4100, the delay line 4030, the reshaper 4263 and the delay line 4040 in series.

When the inhibiting signal is absent from the AG line

—266 connected to the inhibiting terminal of the reshaper 4100, the recirculation loop P produces a plurality of P pulses in a manner similar to that described above for H pulses. A pulse fed to the reshaper 4100 is reshaped and retimed and transmitted to the delay line 4030 where the pulse is delayed to originate the P pulses at the P$n$ taps of the delay line 4030. The pulse is then transmitted via the reshaper 4263, where the pulse is reshaped and retimed, to the delay line 4040. In the delay line 4040, the pulse generates the remainder of the P pulses at the P$n$ taps of the delay line 4040. Recirculation is from the tap P4¾ of the delay line 4040 to the input of the reshaper 4100. As above, $n$ designates the number of pulses which elapse in reference to the occurrence of a pulse at the tap H0 of the delay line 4017.

The recirculation loop P has a five pulse-time delay. Table II specifies the time at which P pulses occur during a minor cycle in reference to the occurrence of the associated pulse at the tap H0 of the delay line 4017.

from the positive output terminal of the amplifier 4205 are also fed through the delay line 4055 and are delayed one-quarter of a pulse time and appear at the tap T0 as T0 pulses. After an additional delay of one-quarter of a pulse time, the pulses appear at the tap T0¼ as T0¼ pulses.

H2¾, P3¾ and C3 are fed through the gate 4130 to the amplifier 4135 and appear at the positive output of the amplifier 4135 as T8¾ pulses.

H2¼ and P2¼ are fed with C1 to the gate 4170 whose output is transmitted to the amplifier 4175. The positive output pulses of amplifier 4175 are designated T2¼ and the negative output pulses are designated —T2¼. The T2¼ pulses appearing at the positive output terminal of the amplifier 4175 are fed through the delay line 4063 which has a one pulse-time delay. The delay line 4063 produces the T3¼ pulses.

H1¾, P0¾ and C3 are fed to the gate 4053 whose output pulses are transmitted to the amplifier 4057. The

TABLE II

| No. of times pulse has been recirculated | P0¾ | P1¼ | P1¾ | P2¼ | P2¾ | P3 | P3¼ | P3¾ | P4 | P4¼ | P4¾ | P4¾ |
|---|---|---|---|---|---|---|---|---|---|---|---|---|
| 0 | ¾ | 1¼ | 1¾ | 2¼ | 2¾ | 3 | 3¼ | 3¾ | 4 | 4¼ | 4¾ | 4¾ |
| 1 | 5¾ | 6¼ | 6¾ | 7¼ | 7¾ | 8 | 8¼ | 8¾ | 9 | 9¼ | 9¾ | 9¾ |
| 2 | 10¾ | 11¼ | 11¾ | 12¼ | 12¾ | 13 | 13¼ | 13¾ | 14 | 14¼ | 14¾ | 14¾ |
| 3 | 15¾ | 16¼ | 16¾ | 17¼ | 17¾ | 18 | 18¼ | 18¾ | 19 | 19¼ | 19¾ | 19¾ |
| 4 | 20¾ | 21¼ | 21¾ | 22¼ | 22¾ | 23 | 23¼ | 23¾ | 24 | 24¼ | 24¾ | 24¾ |
| 5 | 25¾ | 26¼ | 26¾ | 27¼ | 27¾ | 28 | 28¼ | 28¾ | 29 | 29¼ | 29¾ | 29¾ |

C3 pulses are fed from the positive output of the amplifier 4260 to the timing terminals of the reshapers 4090 and 4100 and are used for reshaping and retiming the circulating pulses. Pulses C1 are fed from the negative output of the amplifier 4260 to the timing terminals of the reshapers 4250 and 4263 and are used for reshaping and retiming the circulating pulses.

The major portion of the cyclical signals which are utilized for timing purposes throughout the computer system and which are hereinafter designated T are generated in the cycling unit 34$b$ shown in Fig. 24. Use is again made of the $n$ notation to designate the number of pulse times which elapse between the generation of H0 and the generation of the associated T pulse. The T pulses are produced by feeding combinations of H and P pulses with C pulses (for synchronization) through gates so that the coincidence of particular H and P pulses enable a corresponding T pulse to be generated at the desired time.

For example, H2, P3, and C0 are fed to the gate 4060 and, at coincidence, the gate 4060 feeds a pulse to the amplifier 4065. The pulse is amplified and appears at the negative output of the amplifier 4065 as a pulse —T8. By reference to Table I, it may be seen that pulses appear at the tap H2 of the delay line 4017 at two, eight, fourteen, twenty, and twenty-six pulse times after the associated pulse appears at the tap H0 of the delay line 4017. By reference to Table II, it may be seen that pulses appear at the tap P3 of the delay line 4030 at three, eight, thirteen, eighteen, twenty-three, and twenty-eight pulse times after the associated pulse appears at the tap H0 of the delay line 4017. The only coincidence of H2 and P3 pulses during one minor cycle occurs after eight pulse times delay. Hence, one T8 pulse is generated during each minor cycle and, since the negative output of the amplifier 4065 is utilized, the pulse is designated —T8. C0 which occurs each pulse time is used at the input to the gate 4060 to time the pulses —T8.

In the manner similar to that described above, other combinations of H and P pulses with C pulses are fed through various combinations of gates and amplifiers, and in certain cases delay lines, in order to generate T pulses.

H5¾ and P4¾ are fed with C3 through the gate 4200 to the amplifier 4205 whose positive output transmits pulses designated T29¾ and whose negative output transmits pulses designated —T29¾. Pulses transmitted pulses transmitted from the positive output of the amplifier 4057 are the T25¾ pulses.

H0, P4 and C0 are transmitted to the gate 4023 whose output pulses are fed to the amplifier 4025. The pulses appearing at the positive output terminal of the amplifier 4025 are designated T24 and the negative output pulses of the amplifier 4025 are designated —T24.

H5, P4 and C0 are fed to the gate 4043 whose output pulses are transmitted to the amplifier 4045. Pulses appearing at the positive output terminal of the amplifier 4045 are T29 pulses and pulses appearing at the negative output terminal of the amplifier 4045 are —T29 pulses.

H2¾, P1¾ and C3 are fed to the gate 4083 whose output pulses are transmitted to the amplifier 4085 and appear at the negative output terminal of the amplifier 4085 as —T26¾ pulses.

H5¾, P4¾ and C2 are fed to the gate 4140 whose output pulses are fed to the amplifier 4143. Pulses appearing at the positive output terminal of the amplifier 4143 are designated T29¾ pulses. Pulses appearing at the negative output terminal of the amplifier 4143 are designated —T29¾ pulses.

H5¼, P4¼ and C1 are transmitted to the gate 4073 whose output terminal is coupled to the amplifier 4075. The pulses at the positive and negative output terminals of the amplifier 4075 are designated T29¼ and —T29¼, respectively.

H5¾, P2¾ and C3 are sent to the gate 4160 whose output pulses are fed to the amplifier 4165 to produce the T17¾ pulses.

H3¾, P2¾ and C3 are transmitted to the gate 4150 whose output pulses are fed to the amplifier 4155. Pulses appearing at the negative output terminal of the amplifier 4155 are —T27¾ pulses.

H5, P3 and C0 are transmitted to the gate 4180. The resulting output pulses are fed to the amplifier 4185 whose negative output pulses are —T23.

H5¾ and P3¾ are fed with C2 to the gate 4190. The resulting output pulses are fed to the amplifier 4195 whose negative output pulses are —T23¾.

H4¾, P3¾ and C3 are fed to the gate 4210 whose output pulses are fed to the amplifier 4215 so that T28¾ and —T28¾ pulses will appear respectively at the positive output and negative output terminals of the amplifier 4215.

H1¼ and P1¼ are fed with C1 to the gate 4033 whose output pulses are transmitted to the amplifier 4035. The positive output pulses of the amplifier 4035 are hereinafter designated T1¼.

It should be noted that the designation of a T pulse and the designation of the terminal of the amplifier transmitting that T pulse are identical. Further, input terminals of other circuit elements which have the same T-pulse designation are assumed to be connected by an electrically conducting line to the corresponding terminal of the amplifier or delay line producing the T pulse. The same procedure is followed to designate other cyclical signal paths.

XLIV. W GENERATOR 300

The W generator 300 shown in Fig. 23 receives address information signals W from the memory drum 38 (see Fig. 22). The address information signals W are six-pulse signals which are received during the period p24¼ to p29¼.

The address information signals W indicate positions on the magnetic drum 3400 in which thirty-pulse signals may be recorded or from which thirty-pulse signals may be read. The W generator 300 shown in Fig. 23 functions to amplify and synchronize the pulses of the address information signals W and to transmit these signals via the W output lines 306 and —306.

More particularly, the W signals are received by the W generator 300 via the W line 338 and are fed to the amplifier 4220 and amplified. The signal which appears at the positive output terminal of the amplifier 4220 is fed to the gate 4010 and is gated through by C1 pulses which are fed from the negative output terminal of the amplifier 4260 of the cycling unit 34 to the gate 4010.

The synchronized output signal transmitted by the gate 4010 is sent to the amplifier 4015 and is amplified. The signals W appearing at the positive output terminal of the amplifier 4015 are transmitted from the W generator 300 via the W output line 306. The signals —W appearing at the negative output terminal of the amplifier 4015 are transmitted from the W generator 300 via the W output line —306.

As previously mentioned, each address information signal W is timed by virtue of its position on the magnetic drum 3400 to occur during p24¼ to p29¼ (six pulse times) and, as thirty pulse times exist between corresponding pulses of successive W signals, only one W signal is generated per minor cycle.

XLV. DRUM-READ AND RECORD 37

The drum-read and record 37 shown in Fig. 26 comprises the drum read 350, the drum record 352, the operation selector 354, and the relay section 356. The drum-read and record 37 functions to couple the memory drum to the remainder of the computer system so that signals may be transmitted to and from the memory drum.

The operation selector 354 functions to determine whether the drum-read and record 37 will transmit signals to or receive signals from the memory drum. The governing element of the operation selector 354 is the flip flop 3195 whose set or reset condition determines the operation of the relays 3430 which control whether the drum read 350 or the drum record 352 will be connected to the drum.

The reset signal which is received by the flip flop 3195 from the negative output terminal of the amplifier 3203 is normally positive and permits the flip flop 3195 to be set. The flip flop 3195 may be set by a positive signal from the gate 3300 which functions to pass a positive signal when positive signals are coincidently fed to it via the BL line 120 and the AH line 532, respectively.

The flip flop 3195 may also be set by a positive signal which may be received from the buffer 3133 which is fed by signals from the gate 3255 or the gate 3260 as next described.

At the coincidence of positive signals on the Z control line —289, the D control line 295, and the R control line —287, the gate 3250 passes a positive signal to the gate 3255. When a positive signal is next transmitted via the AM line 292 to the gate 3255, the gate 3255 is primed to pass the next T28¾ received. T28¾ is transmitted via the buffer 3133 to the flip flop 3195 which is thus set.

The flip flop 3195 may also be set by a positive signal received via the buffer 3133 from the gate 3260. When a positive signal is present on the E control line —293, the positive signal is fed to the gate 3260. Thereafter, positive signals are transmitted via the J line 312 and the K3 line 248, respectively, to the gate 3260 which is thus primed to pass the next T28¾ pulse received. T28¾ is fed via the buffer 3133 to the flip flop 3195 which is then set.

The negative output terminal of the amplifier 3203 is normally positive and permits the flip flop 3195 to be maintained in a set condition. If, however, there is a coincidence of the positive signals on the J line 312 and the K0 line 242 and T28¾, the gate 3280 will pass T28¾ to the amplifier 3203 whose negative output terminal will then transmit a negative pulse to the reset terminal of the flip flop 3195 and will reset the flip flop 3195.

The output terminal of the flip flop 3195 is coupled via the amplifier 3193 to the relay coil 3433a of the relay 3430a which controls the position of the movable relay contact 3435 and determines whether the drum-read 350 or the drum record 352 will be connected to the memory drum.

The movable relay contact 3435 of the relay 3430a is normally positioned to meet the contact 3437a which permits the drum read 350 to be coupled to the memory drum via one of the memory drum input-output lines 320 which may be connected to the movable relay contact 3435.

If, however, the flip flop 3195 is set by any of the aforementioned combinations of signals, a positive signal is fed from the positive output terminal of the flip flop 3195 via the amplifier 3193 to the relay coil 3433a of the relay 3430a, and causes the movable relay contact 3435 to change its position so that it makes contact with the contact 3437b of relay 3430a and couples the drum record 352 to the memory drum via one of the memory drum input-output lines 320.

Only one of the memory drum input-output lines 320 is coupled to the movable relay contact 3435 at a given time and this line is selected in accordance with a signal which is received via one of the relay selecting lines 330. A positive signal which is transmitted to the drum-read and record 37 via one of the relay selecting lines 330 functions to operate the movable contact 3383 of one of the relays 3380 thereby coupling the movable relay contact 3435 of the relay 3430a to one of the memory drum input-output lines 320. In this manner a predetermined channel of the magnetic drum is coupled to the movable relay contact 3435.

When the movable relay contact 3435 is in a position such that the drum read 350 is made operative, information is fed to the drum-read and record 37 via the selected memory drum input output line 320. The word is fed through the movable relay contact 3435 and the contact 3437a of the relay 3430a to the amplifier 3060 and is amplified and fed to the reshaper 3075.

The reshaper 3075 is operative when there is a coincidence of positive signals on the K0 line —242, the J line 312, and the line which couples the buffer 3085 to the reset terminal of the reshaper 3075.

The buffer 3085 passes a positive signal to the reshaper 3075 if a positive signal is present on the E control line —293 or on the Z control line 289.

The reshaper 3075 receives the word from the memory drum as has been described and reshapes and synchronizes the pulses of this signal. The output signals of the reshaper 3075 are transmitted from the drum-read and record 37 via the F lines 326 and −326.

When the flip flop 3195 is set and the drum record 352 made operative, the drum-read and record 37 receives a word of information and its negative equivalent via the G lines 118 and −118, respectively, and transmits the word to the memory drum 38 via one of the memory drum input-output lines 320.

As described above only one of the memory drum input-output lines 320 is selected at a given time and this memory drum input-output line 320 is selected by the operation of the relays 3380.

The controlling element of the drum record 352 is the flip flop 3183 which permits the word to be transmitted through the drum record 352. The flip flop 3183 is maintained in a set condition when positive signals are fed to the buffer 3103 via the lines conducting the cyclical signals −T29 and I1 since the buffer 3103 is connected to the reset terminal of the flip flop 3183. (−T29 is positive at all times other than at time $t29$, when −T29 is negative.) The flip flop 3183 can be set by signals received from either of the gates 3240 or 3043.

When a positive signal is fed via the K3 line 248 to the delay line 3245, the positive signal is delayed one pulse time and passed to the gate 3240. A positive signal may also be fed via the E control line −293 to the gate 3240. When a positive signal is fed via the FJD line 316 to the gate 3042, the gate 3042 is primed to pass the next T29 which is received. T29 is transmitted to the gate 3240 which, when primed by positive signals on the E control line −293 and the K3 line 248, gates T29 to the flip flop 3183 which is thereby set.

The output of the gate 3042 is also fed to the gate 3043 where, when a positive signal is present on the K3 line 248 and a positive signal is transmitted from the gate 3250, a positive signal is fed to the flip flop 3183 which is thereby set.

When the flip flop 3183 is set, the gates 3070 and 3303 are primed to pass the word and the positive swing portions of its negative equivalent as received via the G lines 118 and −118 respectively. The word passes through the gate 3070 and is fed to the write input terminal of the write amplifier 3080 and is transmitted through the movable relay contact 3435 of the energized relay 3430a to one of the memory drum input-output lines 320.

At the same time the positive swing portions of the negative equivalent of the word is fed through the gate 3303 to the erase input terminal of the write amplifier 3080, and is amplified by the write amplifier 3080 whose output terminal is coupled by the movable relay contact 3435 to the same memory drum input-output line 320. The transmission of the negative signal to the memory drum via the memory drum input-output line 320 corresponds to the spaces between the "1's" to zeros and insures that an erasure will be made on the magnetic drum, except where ones are recorded.

To insure that the drum read 350 operates correctly following the functioning of the drum record 352, the setting of the flip flop 3195 causes a positive signal to be fed via the amplifier 3193 to the relay coil 3433b of the relay 3430b as well as to relay coil 3433a of the relay 3430a. This positive signal causes the movable relay contact 3439 to make contact with the contact 3445 of the relay 3430b and grounds the input of the amplifier 3060 during drum record thereby preventing overloading of the amplifier 3060 by the large cross-talk signals present during drum record. Such an overload would decrease the gain of amplifier 3060 for a long time after a drum record operation thus interfering with subsequent drum read operations.

The buffer 3113 is included in the drum-read and record 37 to perform the auxiliary function of transmitting a signal via the delay flop input line 342 from the drum-read and record 37. The buffer 3113 passes a positive signal when it receives positive signals from either the positive output terminal of the amplifier 3203 or from the buffer 3133 which pass positive signals as previously described.

In the manner as described above the drum-read and record 37 selectively functions to couple the memory drum 38 to the remainder of the computer system so that information signals may be transmitted to or received from the memory drum 38.

XLVI. THE MEMORY CHANNEL SELECTOR 32

The memory channel selector 32 shown in Fig. 27 functions to receive address information signals and to utilize one portion (the channel designation) of each address information signal to generate a signal which is transmitted to the drum-read and record 37 (see Fig. 26) which energizes one of the relays 3380 which couples an associated channel of the magnetic drum to the drum-read and record 37.

The controlling elements of the memory channel selector 32 of Fig. 27 are the flip flops 3017a, 3017b and 3017c which generate a combination of signals which control the generation of a relay-selecting signal.

More particularly, the memory channel selector 32 receives address information signals via the address output line 250. An address information signal comprises nine pulse positions but only the three pulse positions which occur last in time and correspond to the channel designation are utilized in the generation of the relay-selecting signal.

An address information signal which is sent to the memory channel selector 32 via the address output line 250 is timed so that the three utilized pulse positions occur during $t0\frac{1}{4}$ to $t2\frac{1}{4}$. The address information signal is forwarded via the address output line 250 to the gate 3010c, and to the delay line 3013 which comprises two taps which feed the gates 3010a and 3010b. The tap of the delay line 3013 which feeds the gate 3010b transmits pulses which have been delayed for one pulse time. The tap of the delay line 3013 which feeds the gate 3010a transmits pulses two pulse times after the pulses have been fed to the input of the delay line 3013.

The three gates 3010 are each primed when a positive signal is present on the J line −312 simultaneously with the cyclical signal T2¼, and each gate 3010 functions to gate one of the three utilized pulses of the address information signal which may be present to the associated flip flops 3017.

The three pulse positions of the address information signal occurring between $t0\frac{1}{4}$ and $t2\frac{1}{4}$ are utilized to establish the relay-selecting signal in accordance with the pulses present in these positions. The pulse which occurs at $t0\frac{1}{4}$, if present, is fed via the delay line 3013 to the gate 3010a and is delayed two pulse times so that its occurrence at the gate 3010a is at $t2\frac{1}{4}$. The second pulse of the address information signal occurs at $t1\frac{1}{4}$ and, if present, is fed via the address output line 250 through the delay line 3013 to the gate 3010b and, since it is delayed for one pulse time, its occurrence at the gate 3010b is also at $t2\frac{1}{4}$. The third pulse of the address information signal which occurs at $t2\frac{1}{4}$, if present, is fed directly to the gate 3010c and also arrives at the gate 3010c at $t2\frac{1}{4}$. Pulses which occur at times other than recited above do not appear at the gates 3010 at $t2\frac{1}{4}$ and thus are not passed through the gates 3010 to the flip flops 3017.

At $t2\frac{1}{4}$ the three utilized pulses of the address information signal are gated through the gates 3010 and are fed to the flip flops 3017a, 3017b and 3017c. Since there are three flip flops 3017 whose positive and negative output terminals are utilized, the associated output signals may be combined in eight different combinations. The positive and negative output terminals of the flip flops 3017 are coupled to the gates 3100 as shown in Table III.

TABLE III

| Gate | FF 3017a | | FF 3017b | | FF 3017c | |
|---|---|---|---|---|---|---|
| | Pos. | Neg. | Pos. | Neg. | Pos. | Neg. |
| 3100a | | X | | X | | X |
| 3100b | X | | | X | | X |
| 3100c | | X | X | | | X |
| 3100d | X | | X | | | X |
| 3100e | | X | | X | X | |
| 3100f | X | | | X | X | |
| 3100g | | X | X | | X | |
| 3100h | X | | X | | X | |

The pulses of the address information signal which are gated through the gates 3010 set or do not set the flip flops 3017 depending on whether each particular pulse position is filled or not filled, and thus the conditions are established for passing a signal through one and only one of the eight gates 3100 in accordance with the channel code present on the address output line 250.

More particularly, the eight channels of the magnetic drum, which include the channel with which it is desired to communicate, are numbered from zero to seven. The three pulses of the address information signal which are utilized in the memory channel selector 32 represent binary digits which may represent the octal numbers from zero to seven.

For example, should the three utilized pulses of the address information signal represent zero (no pulse, no pulse, no pulse), each of the flip flops 3017 would be in the reset condition. As a result, a positive signal appears at the negative output terminal of the flip flop 3017c and is fed to the gates 3100a to 3100d. A positive signal is also fed from the negative output terminal of the flip flop 3017b to the gates 3100a, 3100b, 3100e and 3100f, and a positive signal is fed from the negative output terminal of the flip flop 3017a to the gates 3100a, 3100c, 3100e and 3100g.

It will be noted that a coincidence of positive signals occurs only at the gate 3100a which therefore gates a positive signal to the amplifier 3105a which amplifies the signal and transmits it via the relay selecting line 330a to the drum-read and record 37 (see Figs. 26 and 27) where the amplified signal will operate the relay 3380a and thereby couple channel zero of the magnetic drum to the drum-read and record 37.

Should, for example, the three utilized pulses of the address information signal binarily represent the octal number six (no pulse, pulse, pulse) the flip flop 3017a would remain reset, but the flip flops 3017b and 3017c would be set. In this example, a positive signal would appear at the negative output terminal of the flip flop 3017a and at the positive output terminals of the flip flops 3017b and 3017c.

The positive signal is fed from the negative output terminal of the flip flop 3017a to the gates, 3100a, 3100c, 3100e and 3100g. The positive signal is sent from the positive output terminal of the flip flop 3017b to the gates 3100c, 3100d, 3100g and 3100h.

The positive signal is fed from the positive output terminal of the flip flop 3017c to the inputs to the gates 3100e, 3100f, 3100g and 3100h. It will be noted that a coincidence of positive signals occurs only at the gate 3100g.

As a result, a positive signal is fed through the gate 3100g to the amplifier 3105g and is amplified and transmitted via the relay selecting line 330g to the drum-read and record 37 and couples channel six of the magnetic drum to the drum-read and record 37.

In this manner, each of the information channels of the magnetic drum may be selectively coupled to the drum-read and record 37. Table IV shows the conditions of the flip flops 3017 which are established to transmit positive signals via the various relay selecting lines 330.

TABLE IV

| Relay selecting line active | Condition of— | | | Magnetic Drum Channel Selected |
|---|---|---|---|---|
| | Flip Flop 3017a | Flip Flop 3017b | Flip Flop 3017c | |
| 330a | reset | reset | reset | 0 |
| 330b | set | reset | reset | 1 |
| 330c | reset | set | reset | 2 |
| 330d | set | set | reset | 3 |
| 330e | reset | reset | set | 4 |
| 330f | set | reset | set | 5 |
| 330g | reset | set | set | 6 |
| 330h | set | set | set | 7 |

The memory channel selector 32 also includes the AJ generator 348 which provides a positive signal which is transmitted via the AJ line 334 to the timing selector and which operates to block the operation of the timing selector until the relays 3380 of the drum-read and record 37 have had sufficient time in which to operate fully. The AJ generator 348 functions only when there is a change in the set or reset condition of any of the flip flops 3017 and thus provides a positive signal only when a change in memory channel selection takes place.

The negative and positive output terminals of each of the flip flops 3017 are coupled via the capacitors 3420 to the buffer 3033. Should there be a change in the set or reset condition of any of the flip flops 3017 there will be a change in the output signals of the flip flops 3017. This change which results in the selection of a different relay 3380 in the drum-read and record 37, as has been described, is also reflected in the memory channel selector 32 by the generation of pulses in the differentiating circuits 3420 which couple the flip flops 3017 to the buffer 3033.

It should also be noted that the delay flop input line 342 also carries signals to the buffer 3033.

Positive signals which are fed to the buffer 3033 are transmitted to the delay flop 3041. Upon receipt of a positive signal, the delay flop 3041 generates a positive signal for three milliseconds and transmits this positive signal via the AJ line 334 to the timing selector 30 (see Figs. 26, 27 and 28) wherein the positive signal functions to block the operation of the timing selector 30 as will be described.

In this manner a delay in the computer system operation is introduced only while the state of the relays 3380 is changed by a change in the condition of one or more of the flip flops 3017 and the delay does not occur otherwise.

Stated more generally, if the flip flops 3017 are in a given state with some set and the remainder reset as a result of the receipt of an address information signal by the memory channel selector 32, and a second information signal is transmitted to the memory channel selector 32, there are two possibilities. The first possibility is that the second address information signal is the same as the first address information signal and as a result the set or reset condition of each of the flip flops 3017 is not changed and no positive signal is generated by the delay flop 3041. The second possibility is that the second address information signal differs from the first address information signal and the set or reset condition of at least one of the flip flops is changed and as a result a positive signal is generated by the delay flop 3041. Thus, the signal AJ is generated in response to a change in the set or reset condition of any of the flip flops 3017.

As will be shown, the address information signal which is fed via the address output line 250 to the memory channel selector 32 is transmitted every minor cycle to the memory channel selector 32 and the channel designation part of this address information signal which is utilized within the memory channel selector 32 is passed through the gates 3010 at t2¼ during every minor cycle other than that minor cycle during which a negative signal exists on the J line —312.

As a result of the address information signal being transmitted to the memory channel selector 32 during every minor cycle, a cyclical signal, namely t2¼ as previously indicated, is used as a gating pulse at the input terminals of the gates 3010.

Cyclical signals are also used as reset signals for the flip flops 3017. The buffer 3093 provides the reset signal for the flip flops 3017 and receives the cyclical signals I0 and —T2¼, and the signal which is received via the J line 312. The negative portion of I0 is used to narrow the reset pulse to insure that the setting pulse dominates the resetting pulse. Any set flip flops 3017 will be reset at essentially t2¼ (as a result of the narrowed reset pulse generated by I0 and —T2¼ pulses) during any minor cycle when the signal on the J line 312 is negative and no set pulse is present at its input.

As a result, when a flip flop 3017 is set and a positive signal is transmitted to the input terminal of that flip flop 3017 no change in its set condition occurs, but when the flip flop 3017 is set and a positive pulse is not transmitted to its input terminal, the reset signal forwarded from the buffer 3093 resets the flip flop 3017.

The above recited reset signal insures that no change in the set or reset condition of the flip flops 3017 will occur unless the change is directed as a result of a change in the address information signal.

In the above described manner the memory channel selector 32 functions to receive address information signals and establish signals on the relay selecting lines 330 and energize a predetermined relay 3380 in the drum-read and record 37 which selects the designated information channel of the magnetic drum 3400 to be coupled to the drum-read and record 37.

XLVII. THE TIMING SELECTOR 30

The timing selector 30 illustrated in Fig. 28 sequentially receives the sixty-four address information signals W via the W output lines 306 and —306 and functions to compare these address information signals W with other address information signals which are received via the address output lines 250 and —250. The timing selector 30 generates a transfer pulse X and certain other auxiliary signals when a signal W is identical to the compared address information signal.

The controlling element of the timing selector 30 is the flip flop 3040. When the flip flop 3040 is in the reset condition at a specific time, the timing selector 30 will generate the transfer pulse X and certain other auxiliary signals. The flip flop 3040 is set (and thereby prevented from initiating the generation of X and the auxiliary signals) when a positive signal is received from one of the gates 3180 or 3190.

For purposes of comparison, the address information signals W and —W are fed to the timing selector 30 via the W output lines 306 and —306, respectively. More particularly, the address signals W (hereafter called signals W) and —W (hereafter called signals —W) are sent, respectively, to the gates 3190 and 3180. Each signal W and —W is of six pulse times duration and occurs during t24¼ to t29¼ of a minor cycle.

A positive address information signal is transmitted via the address output line 250 to the timing selector 30 during t24¼ to t29¼ of each minor cycle and is fed to the gate 3180 and compared with the successive signals —W. One comparison is made at the gate 3180 and one comparison is made at the gate 3190 during a minor cycle.

The narrow pulses I1 are also fed to the gates 3180 and 3190 and serve the purpose of preventing objectionable spikes from being passed through the gates 3180 and 3190.

The gate 3180 does not pass a positive signal when there is identity between the positive address information signal and the compared signal —W, and the gate 3190 does not pass a positive signal when there is identity between the negative address signal and the compared signal W as will be explained. Stated otherwise, the gates 3180 and 3190 pass positive signals to set the flip flop 3040 and prevent the subsequent generation of X during the minor cycles in which the address information signal is not identical to the compared address information signal W.

When the address information signal and signal W are identical in each pulse time of the period of t24¼ to t29¼, the inputs to each of the gates 3180 and 3190 cannot simultaneously be positive since the positive address information signal is compared to —W at the gate 3180, and the negative address information signal is compared to positive W at the gate 3190. Hence there will be no positive output from either gate 3180 or 3190.

When the address information signal differs from W in any pulse position, one of the gates 3180 or 3190 will receive two positive pulses at that particular pulse time and will pass a set pulse to the flip flop 3040.

For example, assuming for convenience that the address signals and the signals W have a three-pulse time length, if the signal W consists of the signal "pulse, pulse, pulse" and, the negative address information signal consists of the signal "no pulse, pulse, no pulse" (corresponding to the positive address signal "pulse, no pulse, pulse") the gate 3190 would pass at least one pulse because the signals are not identical. More particularly, when the second pulses of both of the signals are transmitted to the gate 3190, the coincidence of the two positive pulses gates a pulse through the gate 3190 and sets the flip flop 3040.

At the same time, the converse of these signals is being applied to the gate 3180. The negative of the signal W is "no pulse, no pulse, no pulse" and the positive address information signal is "pulse, no pulse, pulse." As the first pulses of the positive address information signal and the negative signal —W are transmitted to the gate 3180, the no pulse of —W blocks the gate 3180. The coincident absence of a second pair of pulses should indicate the difference between the signals. However, no signal is passed to set the flip flop 3040. This situation is the reason for the use of the other gate 3190 which does pass a signal to the flip flop 3040 to indicate the difference between the address information signals.

The flip flop 3040 is reset every minor cycle by a —T23¾ pulse and, since the address information signal and the signal W are transmitted to the timing selector 30 at t24¼ to t29¼, any disagreement between the two signals will cause the flip flop 3040 to be set during the period t24¼ to t29¼ of one minor cycle and until t23¾ of the next minor cycle.

A positive signal appearing at the negative output terminal of the flip flop 3040 when the flip flop 3040 is in reset condition is fed via the gate 3520 (if primed by T29¾) through the buffer 3507 to the gate 3500. When the gate 3500 is primed, the positive signal is then passed through the D.-C. amplifier 3505 whose amplified output signal is transmitted from the timing selector via the FJ line 332. More particularly, the positive signal which appears at the terminal of the flip flop 3040 is gated through the gate 3520 by the cyclical pulse T29¾. Therefore, the set or reset condition of the flip flop 3040 at t29¾ determines whether X and the auxiliary signals can be generated as will be shown.

The gate 3500 is normally primed by the presence of a positive signal on the one-step control line —219 and by positive signal received from the buffer 3060. The buffer 3060 passes a positive signal to the gate 3500 when a positive signal is present on the V line —222 which is coupled to the buffer 3060, or when the buffer 3060 receives a positive signal via the delay line 3205 from the gate 3200. The gate 3200 will pass a positive signal to the delay line 3205 at the coincidence of positive signals on K3 line 248 and AI line 534. The delay line 3205 delays the output of the gate 3200 for one and two-quarters pulse times.

If the required conditions are met, and the gate 3500 is primed to pass a positive pulse received from the buffer 3507, the gate 3500 will feed the positive pulse to the D.-C. amplifier 3505 whose positive output terminal is coupled to the FJ line 332. The positive signal is also fed back through the gate 3510 and via the buffer 3507 to the gate 3500 to maintain the output of D.-C. amplifier 3505 if the gate 3510 is primed by a signal received from the buffer 3515.

The signals which are sent to the buffer 3515 are —T29¾ and the narrow pulse I1 so that regeneration is permitted at all times other than t29¾. It should be noted that the circuitry in the timing selector 30 comprising the buffer 3507, the gates 3500 and 3510, and the amplifier 3505 is a modified flip flop which may be set by a pulse at t29¾, and is fed through the buffer 3515. The signal which appears at the positive output terminal of the amplifier 3505 is designated FJ.

The positive signal which appears at the positive output terminal of the amplifier 3505 is transmitted through the delay line 3035 where it is delayed for one pulse time. The output signal of the delay line 3035 is designated FJD and is fed back via the FJD line 316 to the input terminal of the flip flop 3040 to serve a purpose hereinafter described. FJD lasts for a minor cycle as did FJ but lags one pulse time behind FJ.

FJD is transmitted from the timing selector 30 via the FJD line 316, and is also fed to the reshaper 3055 which uses a T29¾ timing pulse instead of a clock pulse and is thereby operative only at t29¾. Since FJD is delayed for one pulse time by the delay line 3035, the reshaper 3055 passes a positive pulse from its positive output terminal during the minor cycle following the minor cycle in which FJD is generated. Stated more generally, the modified flip flop which includes the D.-C. amplifier 3505 is used as a memory for a minor cycle and the output signal of this modified flip flop is sampled by the reshaper 3055 during the next successive minor cycle.

The pulse appearing at the positive output terminal of the reshaper 3055 is designated the transfer pulse X. X is transmitted from the timing selector 30 via the X line 308a. The signal appearing at the negative output of the reshaper 3055 constitutes the negative transfer pulse X and is transmitted from the timing selector 30 via the X line —308. X is also transmitted from the timing selector 30 via the delay line 2555, wherein X is delayed one-quarter of a pulse time, and X is conducted from the delay line 2555 via the X line 308b.

The timing selector 30 also includes the J signal generator 344 which functions to generate the signal J for 30 pulse times following the receipt of a delayed transfer pulse X. X is transmitted from the delay line 2555 via the X line 308b to the J signal generator 344 and is fed to the flip flop 2570. The reset signal fed to the flip flop 2570 is a —T29¾ pulse. Since X is transmitted to the flip flop 2570 at T29¾ due to the one-quarter pulse time delay in the delay line 2555, the flip flop 2570 can only be set at t29¾, and a positive signal at the positive output terminal of the flip flop 2570 is terminated at t29¾ of the next minor cycle as a result of the reset pulse —T29¾. The signal at the positive output terminal of the flip flop 2570 constitutes the signal J. The signal at the negative output terminal of the flip flop 2570 is designated —J.

J is transmitted from the timing selector 30 via the J line 312. —J is transmitted from the timing selector 30 via the J line —312. J is also fed to the delay line 2575 wherein J is delayed for one-half of a pulse time. The delayed signal J constitutes the signal JD which is transmitted from the delay line 2575 via the JD line 336.

In the timing selector 30, the signals FJD and J are fed back to the flip flop 3040 via the FJD line 316 and the J line 312 respectively. Other signals fed to the flip flop 3040 are the signals AM, AU, —AB, AJ, and —BQ. These signals are received via the AM line 292, the AU line 542, the AB line —130, the AJ line 334, and the BQ line —148, respectively. When one or more of the signals are positive, the flip flop 3040 is set and the transfer pulse X cannot be generated. The timing selector 30 is thus "blocked."

In summary, the timing selector 30 receives address information signals and address information signals W and functions to compare these signals and to generate the transfer pulse X and other auxiliary signals if not "blocked" when the address information signal is identical to an address information signal W.

XLVIII. STEP COUNTER 22

The step counter 22 shown in Fig. 29 functions to generate the K and AM signals and comprises the K0 signal generator 230, the K1 signal generator 232, the K2 signal generator 234, the K3 signal generator 236, and the AM signal generator 260.

Each of the K signal generators 230—236 has both positive and negative output terminals such that when a positive signal is present at the positive output terminal a negative signal is present at the corresponding negative output terminal. Similarly, if a negative signal is present at the positive output terminal, a positive signal is present at the corresponding negative output terminal.

In regard to the positive output terminals of the K signal generators 230—236, a positive signal may be present at and transmitted from the positive output terminal of only one of the K signal generators 230—236 at a given time. For example, when there is a positive signal present at the positive output terminal of the K2 signal generator 234, there are negative signals present at the positive output terminals of the K0 signal generator 230, the K1 signal generator 232, and the K3 signal generator 236.

In regard to the negative output terminals of the K signal generators 230—236, a negative signal may be present at and transmitted from the negative output terminal of only one of the K signal generators 230—236 at a given time. For instance, in the example illustrated in the preceding paragraph, a negative signal will be present at the negative output terminal of the K2 signal generator 234 and positive signals will be present at the negative output terminals of the K0 signal generator 230, the K1 signal generator 232, and the K3 signal generator 236.

The computer system generally functions during a procedure in four basic steps, namely; K0, K1, K2 and K3. Some of the K steps are excluded in certain procedures. The K steps are periods of time which exist while the associated positive K signal is being generated at the positive output terminal of the equivalent K signal generator 230—236. Thus, for example, when a positive signal is present at the positive output terminal of the K1 signal generator 232, the computer system is at the step K1. Since, as previously mentioned, a positive signal may be present at the positive output terminal of only one of the K signal generators 230—236 at a given time, only one K step can exist at a given time. Hereinafter, the adjective "positive" in describing a K signal may be omitted and the adjective "negative" will always be included.

The step counter 22 further functions to generate the K signals in a sequential manner starting with K0 and advancing through K1, K2 and K3 unless certain of the K signals are excluded from a procedure.

At the beginning of a procedure, there are positive signals normally present at the negative output terminals of the K signal generators 232—236 so that the K1 line —244, the K2 line —246, and the K3 line —248 (which are connected to the negative output terminals of the respective K signal generators) conduct positive signals to the K0 signal generator 230. These positive signals exist at the negative terminals because the computer system has not yet functioned to introduce signals to the step counter 22 to change the normal states of the K signal generators.

When (as is normal) the X line —308, is at a positive potential, it, together with the three previously mentioned positive signals which are also fed to the K0 generator, function to enable the K0 signal generator 230 to generate K0 as will be explained in detail.

K0 is transmitted from the K0 signal generator 230 via the K0 lines 242 and 242a, respectively, to other parts of the computer system and to the K1 signal generator 232. The negative signal —K0 at the negative output of the K0 signal generator is transmitted from the K0 signal generator via the K0 line —242. These conditions exist when the computer system is at the K0 step.

K0 is fed to the K1 signal generator 232 via the K0 line 242a to prime the K1 signal generator 232 for the generation of K1. During the computer system operation and at $t29\frac{3}{4}$, the signal on the X line —308 may become negative and terminate the generation of K0. K0, however, is delayed in the K0 signal generator 230 for three-quarters of a pulse time and is fed via the K0 line 242a to the K1 signal generator 232 which thereby maintains its primed condition. At $t29\frac{3}{4}$ of the same minor cycle during which the signal on the X line —308 became negative, a positive pulse is transmitted via the X line 308b to the K1 signal generator 232 and, with K0, enables the K1 signal generator 232 to generate K1.

K1 is transmitted via the K1 line 244 from the step counter 22 and via the K1 line 244a to the K2 signal generator 234 which is thereby primed for the generation of K2. —K1 is transmitted from the K1 signal generator 232 via the K1 line —244.

In manner similar to that already described, K1 is terminated and K2 generated followed by the termination of K2 and the generation of K3 as successive X signals are received.

When K3 is terminated, the step counter 22 has completed a cycle and, once again, all of the inputs to the K0 signal generator 230 are positive. As a result, K0 is again generated.

As will be noted in the subsequent detailed explanation of the step counter 22, there are additional control signals involved which may prevent, continue, or initiate out of turn the generation of a K signal. These signals function in conformance with the requirements of certain procedures as previously mentioned.

At the beginning of a procedure, the flip flops 2625, 2615, and 2590 are normally reset since the computer system has not functioned to provide a setting signal. Positive signals are fed from the negative output terminals of the flip flops 2625, 2615, and 2590 via the K1 line —244, the K2 line —246, and the K3 line —248, respectively, to the gate 2642 of the K0 signal generator 230.

The normal potential of the X line —308 which is coupled to the gate 2642 is positive, and, since all of the signals fed to the gate 2642 are positive, the gate 2642 passes a positive signal to the amplifier 2562. The positive signal which results at the positive output terminal of the amplifier 2562 is K0 and is transmitted via the K0 line 242 from the step counter 22 (at all other times when there is a negative signal at the positive output of the amplifier 2562, K0 is defined as being absent). The negative signal which appears at the negative output of the amplifier 2562 is —K0 and is transmitted via the K0 line —242 from the step counter 22.

K0 is fed from the amplifier 2562 to the delay line 2565 and is delayed three-quarters of a pulse time before being passed via the K0 line 242a to the gate 2620 of the K1 signal generator 232.

The generation of K0 is continued until one of the lines which are inputs to the gate 2642 conducts a negative signal at which time K0 is terminated. This negative signal occurs if one of the other K signal generators 232—236 is caused to generate its respective K signal, but more generally when a negative pulse is received via the X line —308 at $t29\frac{3}{4}$.

K0, because it is delayed three-quarters of a pulse time by the delay line 2565 during its transmission via the K0 line 242a to the K1 signal generator, remains present at the input to the gate 2620 after K0 has been terminated. Thus, when a positive pulse (in association with the negative pulse or the X line —308) is transmitted via the X line 308b to the gate 2620 at $t29\frac{3}{4}$, the positive pulse is passed to the flip flop 2625.

The flip flop 2625, once set, will remain set until a negative signal appears on the halt output line 220, the X line —308, or at the output terminal of the buffer 2560. The halt output line 220 is normally positive and the X line —308 is negative only when the X signal occurs, and thus is negative at most only during the period $t29\frac{3}{4}$ to $t0$ inclusive. Inputs to the buffer 2560 are the signals on the E control line —293, the AM line —292, the Z control line 289, and the cyclical signal —T29¾. Unless all of these inputs are negative, the buffer 2560 passes a positive signal to a reset terminal of the flip flop 2625. Thus in most cases, the flip flop 2625 is set at $t0$ by the positive signal passed through the gate 2620.

The output signal of the buffer 2560 constitutes the signal BR which is transmitted from the step counter 22 via the BR line 279. The signal appearing at the positive output terminal of the flip flop 2625 of the K1 signal generator 232 constitutes the signal K1 and is transmitted from the step counter 22 via the K1 line 244. The negative signal appearing at the negative output terminal of the flip flop 2625 constitutes the signal —K1 and is transmitted via the K1 line —244 to the gate 2642, and from the step counter 22 to the other circuits of the computer system.

K1 is also fed from the positive output terminal of the flip flop 2625 to the delay line 2627 and is delayed three-quarters of a pulse time before being fed via the K1 line 244a to the gate 2610 of the K2 signal generator 234.

At $t29\frac{3}{4}$ of a subsequent minor cycle if the signal on the X line —308 becomes negative, the flip flop 2625 is reset and K1 terminated. K1, since it is delayed for three-quarters of a pulse time by the delay line 2627, remains present at the gate 2610 so that when the signal on the X line 308b occurs at $t29\frac{3}{4}$, lasting until $t0\frac{1}{4}$, the gate 2610 passes a positive signal to set the flip flop 2615 of the K2 signal generator 234.

The flip flop 2615, once set, will remain so until a negative signal is fed to one of its reset terminals via the X line —308 or the B control line —296. The latter is coupled to a reset terminal of the flip flop 2615 via the delay line 2613 which delays signal for three-quarters of a pulse time.

In a manner as previously described, the flip flop 2615 is set to $t0$ by the positive pulse which is fed through the gate 2610. The positive signal which appears at the positive output of the flip flop 2615 constitutes the signal K2 which is transmitted from the step counter 22 via the K2 line 246. At the same time, a negative signal appears at the negative output terminal of the flip flop 2615 which constitutes the signal —K2 and which is transmitted via the K2 line —246 to the input to the gate 2642, and from the step counter 22. K2 is also fed to the delay line 2617 and is delayed for three-quarters of a pulse time and is then fed to the gate 2595 and primes the K3 signal generator 236 for generation of the signal K3.

When a delayed X signal next occurs at $t29\frac{3}{4}$ of a minor cycle, it is fed via the X line 308b to the gate 2595. A negative signal on the X line —308 occurs one quarter pulse time earlier (at $t29\frac{3}{4}$) and resets the flip flop 2615, thereby terminating K2. K2, however, is maintained as an input signal to the gate 2595 by the operation of the delay line 2617 as previously described. As a result, the positive pulse on the X line 308b is passed through the gate 2595 and the amplifier 2993 to the flip flop 2590 of the K3 signal generator 236, where it sets the flip flop 2590. The positive signal appearing at the positive output terminal of the flip flop 2590 constitutes the signal K3.

The flip flop 2590 may be set in the alternative by positive signals transmitted directly to the flip flop 2590 via either the AH line 532 or the BN line 144. These signals will set the flip flop 2590 irrespective of any signal received from the amplifier 2993.

K3 is transmitted via the K3 line 248 from the step counter 22. The negative signal, −K3, is transmitted from the negative output terminal of the flip flop 2590 via the K3 line −248 to the gate 2642, and from the step counter 22.

The flip flop 2590 may be reset under a number of different conditions. Ordinarily it will be reset when a negative X pulse occurs on the X line −308. If, however, the output terminal of the gate 2650 is positive, it will hold the output terminal of the buffer 2530 positive in spite of the negative signal on the X line −308, thus preventing this signal from resetting the flip flop 2590.

The output terminal of the gate 2650 will be positive only if all of its input terminals are positive. One of these inputs is the E signal, received on the E control line 293. Thus, in general, normal resetting of the flip flop 2590 will be prevented only when E is present; that is, during a tape or typewriter operation. Two other signals fed to the gate 2650 are received on the CF line −570 and the TT line 228; these signals are normally positive, but if either becomes negative, the output terminal of the gate 2650 also becomes negative and allows the next X signal to reset the flip flop 2590.

The remaining input terminal of the gate 2650 is coupled to the positive output terminal of the flip flop 2605. The flip flop 2605 is reset every minor cycle by the signal −T23¾. The X signal on the X line −308 occurs at time −t29¾. Therefore, even if the three previously described signals fed to the gate 2650 are positive, the flip flop 2605 will be in the reset state when X occurs and will thus prevent the signal passed by the gate 2650 from interfering with the normal resetting of the flip flop 2590, unless one of the set inputs of the flip flop 2605 receives a positive pulse at some point in the interval between the occurence of X and the T23¾ which immediately preceded it. More generally, the flip flop 2605 must be set after time t23¾ of the minor cycle during which an X signal occurs if it is to prevent that X signal from resetting the flip flop 2590.

The flip flop 2605 can receive a set signal from any one of the three gates 2550, 2567, and 2600.

Signals fed to the gate 2550 are the cyclical signal I1, the cyclical signal T24¼, the signal on the Z control line 289, and the signal on the address output line −250. The latter is a negative pulse signal, so the address output line −250 is at a positive potential except during the occurrence of a pulse. Thus at time t24¼, if Z is present (as is the case during type-out or tape record procedures), the gate 2550 will have all its input terminals positive and hence will pass a pulse to set the flip flop 2605, unless at this time a pulse occurs on address output line −250.

The gate 2567 is fed by the I1 signal, the negative signal −T24¼, the Z control line 289, and the address output line 250. The −T24¼ input is positive at all times except −t24¼; Z, as before, is present during a type-out or tape record procedure; the address output line 250 is positive whenever a pulse appears on it. Because of the −T24¼ signal, a pulse on the address output line 250 appearing at this time will not be transmitted through the gate 2567, but a pulse in any of the other position will pass through and set the flip flop 2605 whenever Z is present.

The combined effect of the gates 2550 and 2567, therefore, is to pass a pulse to set flip flop 2605 whenever Z is present, unless the signal on the address output lines 250 and −250 contains a pulse at time t24¼ and no pulse at times t25¼, t26¼, t27¼, t28¼, or t29¼. As previously explained, pulses occurring before t23¾ or after t29¾ are not significant. Thus only one particular combination of pulses appearing on address output lines 250 and −250 during the critical interval will fail to set the flip flop 2605, and consequently only this particular combination of pulses will permit normal termination of step K3 by the X signal during a type-out or tape record procedure.

Coupled to the gate 2600 are the I1 signal, the clock pulse signal C1, the address output line −250, and the Z control line −289. The latter line will be positive only if Z is absent. Therefore, the gate 2660 will not pass pulses during a type-out or tape record procedure, but may operate at any other time. As previously noted, however, the gate 2650 operates only during tape and typewriter operations. The action of the gate 2600 is only of significance during tape and typewriter operations. Thus, gate 2600 performs a significant function during tape read and tape reverse procedures.

As before, the interval following t23¾ and preceding t29¾ is of interest. Since the C1 signal occurs every pulse time, the gate 2600 will pass a pulse to set the flip flop 2605 at some time during this interval unless pulses are present on address output line −250 at all the times C1 can occur. These times are t24¼, t25¼, t26¼, t27¼, t28¼, and t29¼. Pulses occurring at any of these times on the address output line −250, being negative pulses, will prevent corresponding C1 pulses from passing through the gate, but since only one C1 pulse is needed to set flip flop 2605, it follows that every C1 pulse in the interval must be blocked, and hence a pulse must be present on address output line −250 at every such time during the interval, in order to prevent setting of the flip flop 2605. Thus only this one particular pulse combination on the address output line −250 can fail to set the flip flop 2605 and thus can permit the X signal to terminate the K3 step.

Therefore, when, under the conditions described, no positive signal exists at the output terminal of the gate 2650, an X signal on line −308 can reset the flip flop 2590. When K3 terminates, the signal appearing at the negative output terminal of the flip flop 2590 becomes positive and is transmitted to the gate 2642 via the K3 line −248.

The cycle has been completed and all of the signals fed to the gate 2642 are again positive. The K0 signal generator 230 is thereby enabled to generate K0 as previously described.

The step counter 22 also includes the AM signal generator 260. The AM signal generator 260 comprises the gate 2583 and the flip flop 2585.

The signals appearing on the JD line 336, the K3 line 248, the M control line 264 and the cyclical signal T29¾ are fed to the gate 2583. When all of the signals transmitted to the gate 2583 are positive, and, more particularly, at t29¾, the gate 2583 will feed a positive setting pulse to the flip flop 2585 which will remain set until the next occurrence of the cyclical signal −T29¼, which is fed to the reset terminal of the flip flop 2585. The signal appearing at the positive output terminal of the flip flop 2585 constitutes the signal AM which is transmitted from the step counter 22 via the AM line 292. The signal at the negative output terminal of the flip flop 2585 is −AM and is transmitted from the step counter 22 via the AM line −292.

The flip flop 2585 may also be set by a positive signal received via the BP control line 297 or by a signal received by the CJ line 258. As previously mentioned, the positive signal which thereafter appears at the positive output terminal of the flip flop 2585 constitutes the signal AM.

In the above described manner, the step counter 22 functions to generate the signals K0, K1, K2, K3 and AM.

XLIX. SEQUENCER 26

The sequencer 26 shown in Fig. 30 comprises the branch circuit 27 and the control counter 29. The sequencer 26 generates the sequence-directing address signals which direct the automatic operation of the computer system through a programmed sequence.

The control counter 29 directs the location of instruction signals in the computer system by generating and transmitting a series of sequence-directing addresses. At the beginning of automatic computer system operation, the control counter 29 transmits the sequence-directing address 000 (octal) and, thereby, determines the location of the first instruction signal which determines the first procedure to be executed by the computer system. Thereafter, the control counter 29 transmits sequence-directing addresses which are numerically increased by one during each programmed procedure until the computer system is halted; or until a branch instruction procedure occurs in the program and operates through the branch circuit 27 to change the normal sequence of operation of the control counter 29.

Detailed descriptions of the control counter 29 and branch circuit 27 follow.

L. THE CONTROL COUNTER 29

The control counter 29 shown in Fig. 30 generates successive sequence-directing addresses, and comprises a ten-pulse-time delay recirculation loop 2490 and the unit adder 262. The unit adder 262 functions to increase the sequence-directing address by one when operated. The recirculation loop 2490 includes the reshaper 2240, the delay line 2070, the reshaper 2255, the delay line 2080, the amplifier 2260, and the gate 2170, in series.

A signal corresponding to the sequence-directing address circulating in the recirculation loop 2490 will pass through the reshaper 2240 to the delay line 2070 (five pulse times delay ), then via the reshaper 2255 to the delay line 2080 (four and two-quarters pulse times delay). The signal is then fed to the amplifier 2260 whose positive output terminal is coupled via the gate 2170 back to the reshaper 2240 to complete the recirculation loop 2490. The gate 2170 is normally primed by positive signals received from the negative output terminals of the flip flops 2137 and 2155, and via the AG line —256.

When the signal passes through the reshaper 2240, it is timed and reshaped with C3. The signal passing through the reshaper 2255 is timed and reshaped by C0. Since each of the reshapers 2240 and 2255 constitutes a delay of one-quarter of a pulse time, the total delay of the recirculation loop 2490 is ten pulse times.

The sequence-directing address which circulates in the recirculation loop 2490 as a nine-pulse-time signal is tapped from the delay line 2070 and is fed to the gate 2220 such that $p0$ (corresponding to the least significant digit) appears at the gate 2220 at times $t4$, $t14$ and $t24$. During K0, a positive signal is present on the K0 line 242 which is coupled to the gate 2220, and the sequence-directing address is passed through the gate 2220 and transmitted from the sequencer 26 via the sequencer output line 274. The AQ line 266 is coupled to the positive output terminal of the reshaper 2240 and conducts any signal which may be circulating in the control counter 29 to other sections of the computer system.

The sequence-directing address continues to circulate through the recirculation loop 2490 until the unit adder 262 diverts its path and causes it to be numerically increased by one. The unit adder 262 comprises the gate 2133, the flip flop 2137, the gate 2160 and the delay line 2475, and includes the retain switch 2700 having the movable contact 2690 and the contacts 2680 and 2685.

Normally, the flip flop 2137 is reset so that the signal appearing at its negative output terminal is positive. This positive signal is fed to the gate 2170 which completes the feed-back path of the recirculation loop 2490. However, when the flip flop 2137 is set, the signal appearing at the negative output terminal of the flip flop 2137 is negative and blocks the gate 2170 thereby opening the recirculation loop 2490.

When the flip flop 2137 is set, the signal appearing at the positive output terminal of the flip flop 2137 is positive and is fed to the gate 2160 which, with the presence of the cyclical signals I0 and C2, is thereby primed. The negative output terminal of the amplifier 2260 is coupled to the gate 2160 so that when the gate 2160 is primed the inversion of the signal which has previously been circulating in the recirculation loop is then circulated via the gate 2160. Thus, the gate 2160 replaces the gate 2170 in the feedback path of the recirculation loop 2490 when flip flop 2137 is set.

The gate 2133 is coupled to the flip flop 2137 and is fed signals via the J line 312 and the K1 line 244, as well as the cyclical signal T29¼ and a signal from the retain switch 2700. The retain switch 2700 is normally positioned such that the movable contact 2690 connects the positive supply bus 5 to the gate 2133 via the contact 2680. When positive signals are received via the J line 312 and the K1 line 244 and the cyclical signal T29¼ appears, the gate 2133 functions to pass a positive pulse setting the flip flop 2137. This will occur only once during a procedure; more particularly, at $t29¼$ of the J cycle of the step K1.

When the flip flop 2137 is set, the gate 2170 is blocked and the gate 2160 is primed. The inverted sequence-directing address begins to circulate in the modified recirculation loop via the negative output terminal of the amplifier 2260. A signal which will reset the flip flop 2137 is transmitted from the negative output terminal of the reshaper 2240 via the delay line 2475, wherein signals are delayed for one-quarter of a pulse time before being fed to the reset terminal of the flip flop 2137. It is the function of this reset signal to limit the addition to the sequence-directing address so that the sequence-directing address is numerically increased only by one. If not otherwise reset, the flip flop 2137 will be reset at time $t8$ since the —T8 signal is also connected to a reset terminal.

As will be recalled, the signal circulating in the recirculation loop 2490 is a nine-pulse-time signal which is equivalent to the binary expression of the sequence-directing address. The least significant digit ($p0$) occurs first in time in the signal. If the least significant binary digit is a zero (no pulse), the potential representing it is negative, so that the potential appearing at the negative output terminal of the amplifier 2260 will be positive and will be fed back into the recirculation loop via the gate 2160 as a positive pulse representing the binary digit one. This positive pulse is fed to the reshaper 2240 and appears at the negative output terminal of the reshaper 2240 as a negative pulse. The negative pulse is fed via the delay line 2475 to the reset terminal of flip flop 2137 and causes the flip flop 2137 to be reset. The delay of the delay line 2475 prevents the resetting of the flip flop 2137 until the single pulse position being operated upon has been modified and re-entered into the recirculation loop 2490.

When the flip flop 2137 is reset, the signal appearing at the negative output terminal of the flip flop 2137 becomes positive and the gate 2170 once again becomes a part of the recirculation loop 2490. The signal which appears at the positive output terminal of the flip flop 2137 becomes negative and blocks the gate 2160 so that the gate 2160 no longer functions to feed an inverted signal which it receives into the recirculation loop 2490. Thus, the normal recirculation path is restored.

As a result, if the least significant binary digit of the sequence-directing address is a zero, a one is substituted for that zero and the binary number which is represented by the signal is thereby increased by one.

However, if the least significant binary digit of the sequence-directing address is a one when the flip flop 2137 is set and the recirculation loop 2490 modified, then, as the pulse which represents the least significant binary digit of the address is positive, the signal which appears at the negative output terminal of the amplifier 2260 is negative (representing a zero).

Thus, a positive pulse is not fed via the gate 2160 to the reshaper 2240. The corresponding potential which appears at the negative output terminal of the reshaper 2240 will be positive. The positive signal is fed from the negative output terminal of the reshaper 2240 via the delay line 2475 and is delayed and forwarded to the reset terminal of the flip flop 2137 which remains set.

This process then repeats itself. Positive pulses are fed to the amplifier 2260 and a negative potential representing a zero is substituted in place of each positive pulse representing a one. When, however, the first zero appearing in the signal is fed to the amplifier 2260, a positive pulse appears at the negative output terminal of the amplifier 2260. This positive pulse, in a manner as previously described, is fed via the gate 2160 to reshaper 2240 and causes a negative signal to appear at the negative output terminal of the reshaper 2240. This negative signal is fed via the delay line 2475 to the reset terminal of the flip flop 2137 and causes the flip flop 2137 to be reset.

When the flip op 2137 is reset, the positive signal appearing at the negative output terminal of the flip flop 2137 is transmitted to the gate 2170 and restores the gate 2170 as part of the recirculation loop 2490. The negative signal appearing at the positive output terminal of the flip flop 2137 is fed to the gate 2160 and blocks the gate 2160 thereby blocking the modified recirculation loop 2490.

In this manner, where the least significant binary digit of the sequence-directing address is a one and the flip flop 2137 has been set, a zero is substituted for the one. The unit adder 262 then continues to substitute zeros for ones until the first zero is encountered and replaced by a one in the sequence-directing address, at which time the flip flop 2137 is reset as previously described and the unit adder 262 ceases to function.

If the sequence-directing address is 777 (octal) represented by a signal having a pulse in each of the nine positions, at time *t*8 the flip flop 2137 will be reset by the —T8 pulse after all the ones have been replaced by zeros to make the sequence-directing address 000 (octal).

In summary, the unit adder 262 is primed to function when positive signals appear on the J line 312 and the K1 line 244, and the retain switch 2700 is in the positive position. Since K1 will occur but once during a procedure, the unit adder 262 will function only once during a procedure, the addition operation being initiated at time *t*29¼ by the T29¼ pulse.

When it is desired to keep the same sequence-directing address circulating in the control counter 29 the retain switch 2700 is operated so that the movable contact 2690 contacts the contact 2685 which is coupled to the negative supply bus 10. The negative signal is fed to the gate 2133 and blocks the gate 2133 thereby preventing the flip-flop 2137 from being set. The unit adder 262 therefore does not function and the signal circulating in the recirculation loop 2490 continues to circulate unchanged.

In the manner as described above, a sequence-directing address circulates in signal form in the control counter 29 and is numerically increased by one during each procedure unless prevented from being increased by operation of the retain switch 2700.

LI. BRANCH CIRCUIT 27

The branch circuit 27, when directed, functions to replace the sequence-directing address which is circulating in the control counter 29 with a new sequence-directing address, (designated either A2 or A3, and representing the contents of address A2 or A3 respectively stored on the memory drum).

The branch circuit 27 includes the flip flop 2155 which when set forwards a negative signal from its negative output terminal to the gate 2170 of the control counter 29. This negative signal functions to block the gate 2170 clearing the signal circulating in the control counter 29.

To set the flip flop 2155, the inversion of a word of information (designated A1 and representing the contents of address A1) is forwarded via the F line —326 to the branch circuit 27 and is fed through the delay line 2660 to the gate 2150. The delay line 2660 delays the pulses of the signal for one-quarter of a pulse time. The gate 2150 is primed by positive signals received via the K2 line 246 and via the B control line 296.

When the signal on the K2 line 246 is positive and when a positive pulse is received at *t*29¼ via the B control line 296, the gate 2150 samples $p29$ of A1. The most significant digit ($p29$) of A1 represents the sign. If A1 is a number which is positive or zero, there is an absence of a pulse in $p29$, whereas if the number is negative there is a pulse in $p29$.

The branch circuit 27 functions to clear the signal circulating in the control counter 29 when the number received is positive or zero. When the number is negative, the branch circuit 27 permits the sequence to continue unmodified.

Since the inversion of the contents of address A1 is fed bia the delay line 2660 to the gate 2150, the output of the delay line 2660 at time *t*29¼ will be positive only if the contents of address A1 is either positive or zero. If the gate 2150 is primed by the K2 line 246 and the B control line 296 at this time, the flip flop 2155 will set.

A negative signal then appears at the negative output terminal of the flip flop 2155 and is fed via the branch clear line 240 to the gate 2170 of the control counter 29, and this negative signal operates to prevent recirculation in the recirculation loop 2490 of the control counter 29.

When the flip flop 2155 is set, a positive signal is forwarded from its positive output terminal to the gates 2204 and 2194. The signal which appears at the positive output terminal of the flip flop 2155 and which is at this time positive constitutes the signal CJ. CJ is transmitted from the sequencer 26 via CJ line 258. Since the cyclical signal —T8 is fed to the reset terminal of the flip flop 2155, the flip flop 2155 remains set for eight and three-quarters pulse times during which the signal circulating in the control counter 29 is blocked at the gate 2170.

The gates 2204 and 2194 respectively receive the address A3 and A2 via the branch instruction lines 298a and 298b respectively and, depending upon which one is primed, send A2 or A3 to be substituted in the control counter 29 in place of the sequence-directing address.

If the contents of A1 is negative, the inverted contents of A1 will be negative in $p29$ and flip flop 2155 will not be set, allowing the sequence-directing address circulating in the control counter 29 to remain unchanged.

A3 (a nine pulse-time signal) is fed every minor cycle via the branch instruction line 298a to the gate 2204 with its earliest pulse occurring at *t*29¾. A2 (a nine pulse-time signal) is transmitted every minor cycle to the gate 2194 via the branch instruction line 298b, and is also timed so that its earliest pulse occurs at t29¾.

The flip flop 2147 (normally reset) determines which of the gates 2204 or 2194 will be primed. The reset signal of the flip flop 2147 is the signal which appears on the K1 line —244, and therefore the flip flop 2147 may be maintained in set condition during any step other than the step K1. The positive output terminal of the flip flop 2147 is coupled to the gate 2204 and the negative output terminal of the flip flop 2147 is coupled to the gate 2194.

A1 (the inverted contents of which is sent to the flip flop 2155) is a thirty-pulse signal and is transmitted via the F line 326 to the flip flop 2147 with p0 occurring at t0. If A1 numerically represents zero (an absence of pulses), the flip flop 2147 will remain reset with a positive signal at its negative output terminal. As a result, the gate 2194 will be primed. When A2 is fed to the gate 2194 via the branch instruction line 298b, A2 passes through the gate 2194 to the reshaper 2240 and, via the sequence changing line 290b, enters the recirculation loop 2490 of the control counter 29 to constitute a new sequence-directing address.

If the contents of A1 is greater than zero, it will contain at least one positive pulse and, when the word is transmitted via the F line 326 to the flip flop 2147, the positive pulse (or pulses) sets the flip flop 2147. The positive signal appearing at the positive output terminal of the flip flop 2147 primes the gate 2204 and enables A3 to be transmitted via the branch instruction line 298a through the gate 2204 and, via the sequence changing line 290a, to the reshaper 2240. A3 thus enters the recirculation loop 2490 of the control counter 29 to replace the removed sequence-directing address.

In the above described manner the branch circuit 27 functions to receive and sample a word of information contained in address A1 and when the required control signal is present on the B control line 296 to allow the substitution of A2 or A3 for the sequence-directing address.

LII. CONTROL REGISTER 24

The control register 24 shown in Fig. 31 comprises the thirty-pulse-time-delay recirculation loop 2450 with associated circuitry, and the unit adder 273. The primary function of the control register 24 is to receive a thirty-pulse-time signal (representing a word of information) and to transmit portions of this signal as instruction signals or address information signals as will be shown. Other functions of the control register 24 are to generate consecutive addresses sequentially when directed to do so by control signals, and to store address information signals.

The control register 24 performs its function of transmitting instruction signals by receiving a word comprising instruction pulses in series, and by transmitting a portion of these instruction pulses in parallel to the static control register 28 shown in Fig. 32. Since (as will be shown) the static control register 28 generally utilizes only those pulses which are received at t29¼ or t29¾, instruction pulses which are transmitted by the control register 24 at other times are generally not significant to the computer system operation and will not be discussed.

The word which comprises instruction pulses may also include the addresses A1, A2, and A3. The control register 24 functions to modify the phasing of the instruction signal and to continuously transmit the rephased word on the conducting lines so that the earliest pulse of one address (A1, A2, or A3) occurs at t24¼ on a different line. As will be shown, this enables a different address to control the operation of the timing selector 38 (shown in Fig. 28) in accordance with which line is selected to be coupled to the timing selector 38 by gating means.

More particularly, information signals received by the control register 24 may contain pulses which represent the instruction (I) and three addresses (A3, A2, and A1). The instruction portion of the signal generally comprises the three pulse positions p27–p29, inclusive. In special cases, the instruction portion of the signal comprises the twelve pulse positions p18–p29, inclusive.

When the instruction is given in the three pulse positions p27–29, the remaining twenty-seven pulse positions contain the representations of the three addresses. Each address is represented in a nine-pulse-time signal which signifies three octal digits expressed binarily. The address A3 includes p18–p26; A2 includes p9–p17; A1 includes p0–p8.

In Fig. 31, the entire word of information is transmitted to the control register 24 via the F line 326 and is conducted to the gate 2140 so that the earliest pulse p0 arrives at t0. During K1, a positive signal is present on the K1 line 244 and is fed to the gate 2140. As the retain CR switch 2500, which is coupled to the gate 2140, normally is positioned to feed a positive potential to the gate 2140, the gate 2140 is primed to pass an information signal into the recirculation loop 2450 as will be shown. The recirculation loop 2450 comprises: the gate 2243 (or in the alternative, the gate 2253), the reshaper 2275, the delay line 2015, the reshaper 2173, the delay line 2020, the reshaper 2185, the delay line 2035, the reshaper 2190, the delay line 2045, the reshaper 2200, the delay line 2055, the reshaper 2210, the delay line 2063 and the reshaper 2225; all in series, with the output of the reshaper 2225 being fed to the gate 2243 or the gate 2253.

The word which is passed by the gate 2140 is fed to the reshaper 2275 (which may also receive information signals via the AP output line 530) and is timed and reshaped by C1. Each pulse of the information signal is delayed for one-quarter of a pulse time in the reshaper 2275. The negative output terminal of the reshaper 2275 is coupled to the gate 2280 and the delay line 2276. The positive output terminal of the reshaper 2275 is coupled to the gate 2053 and to the delay line 2015. The signal appearing at the positive output terminal of the reshaper 2275 is fed to the delay line 2015 and is delayed for five and two-quarter pulse times before being transmitted.

The delay line 2015 is tapped at one pulse time delay by the static control register input line 226b, and at two pulse times delay by the static control register input line 226c.

The signal is forwarded from the output terminal of the delay line 2015 to the reshaper 2173 and is timed and reshaped by C0. The positive output terminal of the reshaper 2173 is coupled to the gate 2273, and to the delay line 2020.

The static control register input line 226d taps the delay line 2020 such that a pulse which is fed to the delay line 2020 will arrive after two-quarters of a pulse time. The static control register input line 226e taps the delay line 2020 at a delay of two and two-quarters pulse times. The static control register input line 226f taps the delay line 2020 at a delay of three and two-quarters pulse times.

The delay line 2020 is coupled to the reshaper 2185 so that a signal fed from the positive output terminal of the reshaper 2173 via the delay line 2020 to the reshaper 2185 is delayed for four pulse times by the delay line 2020.

The pulses of the word are timed and reshaped in the reshaper 2185 by C1. Pulses appearing at the positive output terminal of the reshaper 2185 are transmitted from the control register 28 via the static control register input line 226g and are also transmitted to the delay line 2035.

The static control register input line 226h taps the delay line 2035 at a point such that pulses entering the delay line 2035 are delayed for one and one-quarter pulse times. A signal passing through the delay line 2035 is delayed for four and two-quarter pulse times before being fed to the reshaper 2190.

The branch instruction line 298a taps the delay line 2035 at the same terminal as does the static control register input line 226h and conducts the word via the amplifier 2295 from the control register 24.

Pulses of the information signal entering the reshaper 2190 are timed and reshaped by C0. The positive output terminal of the reshaper 2190 is coupled to the gate 2233 and to the delay line 2045. Signals appearing at the positive output terminal of the reshaper 2190 are fed via the delay line 2045, wherein the pulses are delayed for five and one-quarter pulse times, to the reshaper 2200.

The pulses of the information signal are timed and reshaped by C2 and are delayed for one-quarter of a pulse time before appearing at the positive output terminal of the reshaper 2200. Signals appearing at the positive output terminal of the reshaper 2200 are transmitted from the control register 24 via the branch instruction line 298b and via the delay line 2055 to the reshaper 2210. Signals fed to the reshaper 2210 via the delay line 2055 are delayed for three and one-quarter pulse times by the delay line 2055.

The pulses of the information signal fed to the reshaper 2210 are timed and reshaped by C0 and are delayed for one-quarter of a pulse time before appearing at the positive output terminal of the reshaper 2210. The positive output terminal of the reshaper 2210 is coupled to the gate 2213 and to the delay line 2063. Pulses of the information signal appearing at the positive output terminal of the reshaper 2210 are fed to the delay line 2063 wherein they are delayed five and three-quarter pulse times before being sent to the reshaper 2225.

Pulses of the information signal received by the reshaper 2225 are timed and reshaped by C0 and are delayed for one-quarter of a pulse time before they appear at the positive output terminal of the reshaper 2225.

Recirculation from the reshaper 225 to the reshaper 2275 is in the alternative from the positive output terminal of the reshaper 2225 via the gate 2243, or from the negative output terminal of the reshaper 2225 via the gate 2253, according to which gate 2243 or 2253 is primed as will be explained.

At $t29¼$ of a minor cycle during K1 and when a word is circulating in the recircualtion loop, signals are fed from the negative output terminal of the reshaper 2275 to the gate 2280, from the positive output terminal of the reshaper 2275 to the gate 2053, and from the delay line 2015 via the static control register input lines 226b and 226c from the control register 24. T29¼ and I1 are fed to the gates 2280 and 2053.

Since the reshaper 2275 causes a one-quarter pulse-time delay, p29 arrives at the output terminals of the reshaper 2275 at $t29¼$. As a result, p29 of the word will cause a signal to appear at the negative output terminal of the reshaper 2275 and this signal is transmitted from the gate 2280 of the control register 24 via the static control register input line 226a1 at $t29¼$. Furthermore, p29 of the information signal is passed through the gate 2053 at $t29¼$ and transmitted from the control register 24 via the static control register input line 226a2.

The p28 pulse is tapped from the delay line 2015 by the static control register input line 226b and, since it is delayed one-quarter of a pulse time by the reshaper 2275 and one additional pulse time by the delay line 2015, p28 is transmitted from the control register 24 via the static control register input line 226b at $t29¼$.

At $t29¼$, p27 of the word is transmitted from the delay line 2015 and from the control register 24 via the static control register input line 226c.

It will be recalled that when the instruction portion of the word occurs in three pulse positions, these three pulse positions are p27–p29, inclusive. From what has been described it can be seen that the instruction signal of three pulse positions is transmitted from the control register 24 simultanously at $t29¼$ via control register input lines 226a1, 226a2, 226b and 226c.

Other instruction pulses when they exist are transmitted from the control register 24 at $t29¼$ or $t29¾$.

At $t29¾$ the p23 pulse of the instruction signal is transmitted from the control register 24 via the static control input line 226d. At $t29¾$ the p21 pulse of the instruction signal is transmitted from the delay line 2020 and from the control register 24 via the static control register input line 226e, and p20 of the instruction signal is transmitted from the delay line 2020 via the static control register input line 226f.

The p19 pulse of the instruction signal is delayed for a total of ten and one-quarter pulse times before appearing at the positive output terminal of the reshaper 2185 at $t29¼$ and being transmitted from the control register 24 via the static control register input line 226g.

At $t29¾$ the p18 pulse of the instruction signal is transmitted from the delay line 2035 and from the control register 24 via the static control register input line 226h.

Although it is apparent that signals are transmitted via the static control register input lines 226 at times other than $t29¼$ and $t29¾$, it will be shown in the description of the static control register 28 that only the signals which are transmitted via the static control register input lines 226 at $t29¼$ and $t29¾$ are utilized.

The control register 24 also functions during the computer system operation to transmit the instruction signal such that in a given K step the earliest pulse of a particular address information signal (A3, A2, or A1) will be transmitted from the control register 24 at $t24¼$ via the address output lines 250 and −250.

The gates 2213, 2233 and 2273 function to control the timing of the transmitting of the word so that the particular address information signal involved is transmitted at the proper time. These gates 2213, 2233 and 2273 feed the reshaper 2230 whose timing signal is C1. −T23 and −T23¾ are fed to the blocking terminals of the reshaper 2230 so that the reshaper 2230 is inoperative at $t23$ and $t23¾$.

The sequence-directing address is fed to the reshaper 2230 via the sequencer output line 274 timed so that its earliest pulse occurs at $t24$ when it is transmitted.

When the sequence-directing address passes through the reshaper 2230, where the signal is timed and reshaped, the sequence-directing address is delayed for one-quarter of a pulse time in the reshaper 2230 before being transmitted from the positive and negative output terminals of the reshaper 2230 via the address output lines 250 and −250, respectively.

The gate 2213 is primed by the positive signals normally present on the E control line −293 and on the line which connects the buffer 2970 to the gate 2213.

The signals appearing on the K1 line 244, the V line 222 and the AI line 534 are fed to the buffer 2970. If any of the signals appearing on these lines are positive, the buffer 2970 passes a positive signal to the gate 2213. Because K1 is fed to the buffer 2970 and because the signal appearing on the E control line −293 is normally positive, the gate 2213 is normally primed to pass the information signal which is received from the positive output terminal of the reshaper 2210 during the step K1.

The delay at the positive output terminal of the reshaper 2210 which occrues when a pulse enters the recirculation loop 2450 until it reaches the positive output terminal of the reshaper 2210 totals twenty-four pulse times so that the word arrives at the positive output terminal of the reshaper 2210 at $t24$.

The signal which begins at p0 and extends through p8 comprises pulses which represent the address A1. A1 is fed to the gate 2213 once every minor cycle during K1 such that the p0 pulse of A1 passes through the gate 2213 at $t24$.

The signal is fed from the gate 2213 to the reshaper 2230 as previously mentioned and is timed and reshaped and transmitted from the control register 24 every minor cycle during K1 via the address output line 250 with p0 occurring at $t24¼$. The signal at the negative output terminal of the reshaper 2230 is transmitted from the control register 24 via the address output line —250.

The gate 2233 is primed when positive signals are transmitted to it via the K2 line 246 and the E control line —293. Since a positive signal is normally present on the E control line —293 and since a positive signal is present on the K2 line 246 during K2, the gate 2233 is normally primed to pass any signal received during K2.

Signals are fed to the gate 2233 from the positive output terminal of the reshaper 2190. A $p9$ pulse of the word circulating in the recirculation loop 2450 undergoes a fifteen pulse time delay after it enters the reshaper 2275 and travels through the recirculation loop 2450 to the positive output terminal of the reshaper 2190. As a result, $p9$ appears at the positive output terminal of the reshaper 2190 at $t24$ and is transmitted to the gate 2233. A2 which occurs from $p9$–$p17$ is therefore transmitted to the gate 2233 so that its earliest pulse occurs at $t24$.

The information signal is transmitted from the gate 2233 to the reshaper 2230 where each pulse is timed and reshaped and delayed for one-quarter of a pulse time so that the $p9$ pulse of the word is transmitted from the control register 24 at $t24\frac{1}{4}$ of every minor cycle during K2.

The gate 2273 is primed by positive signals which are transmitted to it via the AI line —534, the V line —222, and from the buffer 2079.

The signals appearing on the E control line 293 and the K3 line 248 are fed to the buffer 2079. Since positive signals are normally present on the AI line —534 and the V line —222 and since a positive signal is present on the K3 line 248 during K3, the gate 2273 is generally primed to pass any information signal which is fed to it during K3. The gate 2273 may also be primed when a positive signal is present on the E control line 293.

The positive output terminal of the reshaper 2173 is coupled to the gate 2273 and is so situated in the recirculation loop 2450 as to have signals appear at its positive output terminal which are delayed six pulse times in the recirculation loop 2450. As a result, the $p18$ pulse of the word circulating in the recirculation loop 2450 arrives at the gate 2273 at $t24$ and during K3 is gated through to the reshaper 2230.

The $p18$ pulse of the word constitutes the earliest pulse of the address A3 and is transmitted through the gate 2273 to the reshaper 2230 wherein pulses are delayed for one-quarter of a pulse time. The $p18$ pulse appears at the output terminals of the reshaper 2230 at $t24\frac{1}{4}$ of every minor cycle during K3.

In the above described manner, the recirculation loop 2450 of the control register 24 functions during the various K steps to initiate the transmission of the address A1, A2 and A3 so that they are, when directed, transmitted from the control register 24 with their earliest pulses occurring at $t24\frac{1}{4}$.

As previously mentioned there are alternative recirculation paths within the recirculation loop 2450 and these are controlled by the gates 2243 and 2253. These gates 2243 and 2253 are utilized when it is desired to transmit a series of successive addresses from the control register 24, and function to aid in enabling the control register 24 to increase A3 or A1 numerically by one each time a positive signal is received via the J line 312 depending upon which of the gates 2123 or 2267 passes a signal. The gates 2243 and 2253 function in conjunction with the unit adder 273.

The unit adder 273 is included in the control register 24 to enable the control register 24 to supply a series of consecutive A3 or A1 addresses which start at 000 (octal) and are increased numerically by one for each J signal received when the proper control signals are present.

The control register 24 before supplying consecutive A3 addresses is cleared by a control signal so that the initial address is 000. This operation is controlled by the flip flop 2115 whose negative output terminal is coupled to the gate 2243. A positive signal is normally present at the negative output terminal of the flip flop 2115 thereby priming the gate 2243 so that it is a part of the recirculation loop 2450.

When a positive signal is transmitted via the BK line 142 to the flip flop 2115, the flip flop 2115 is set and a negative potential appears at the negative output terminal of the flip flop 2115. The negative potential is fed to the gate 2243 and operates to block the gate 2243 thereby opening the recirculation loop and causing the signal to become a constant negative potential which is equivalent to the address 000. The signal which is transmitted to the reset terminal of the flip flop 2115 is —T23¾ and thus the flip flop 2115 may be set until $t23\frac{3}{4}$.

The controlling element of the unit adder 273 is the flip flop 2125 whose set or reset condition controls which one of the gates 2243 or 2253 will function to pass signals. The flip flop 2125 is set by signals received in the alternative from the gates 2123 or 2267. The signals appearing on the E control line 293 and the J line 312, as well as the cyclical signal T17¾, are fed to the gate 2123. As a result when there is a positive signal present on the E control line 293 and when a positive signal is present on the J line 312 at $t17\frac{3}{4}$, the gate 2123 feeds a positive signal to the flip flop 2125 which is thereby set.

When positive signals are fed to the gate 2302 via the BT line 282 and the J line 312, and when the cyclical pulse T29¾ is positive, the gate 2302 feeds a positive signal through the amplifier 2300 to the gate 2267.

The signals appearing at the positive output terminal of the amplifier 2300 constitute a signal which is transmitted from the control register 24 via the BV line 284. Positive pulses may appear on the BV line at $t29\frac{3}{4}$.

The gate 2267 is also fed by normally positive signals transmitted on the BX line —254. When there is a coincidence of positive signals at the gate 2267, the gate 2267 passes a positive signal to the flip flop 2125 and sets the flip flop 2125. The positive output terminal of the flip flop 2125 is coupled to the gate 2253. The gate 2253 is also fed by I0 and C0 pulses. The negative output terminal of the flip flop 2125 is coupled to the gate 2243.

Normally a positive signal is present at the negative output terminal of the flip flop 2125 and the gate 2243 completes the recirculation loop 2450 of the control register 24. The gate 2243 is also fed by the buffer 2097 and the negative output terminal of the flip flop 2115. The buffer 2097 passes a positive signal when a positive signal is received from the manually controlled retain CR switch 2500, the V line 222, the BT line 282, or the K0 line —242.

When it is desired to supply consecutive addresses as previously mentioned, and the flip flop 2125 is set, a positive signal is fed from the positive output terminal of the flip flop 2125 to the gate 2253. Thereby, the gate 2253 completes the recirculation loop 2450.

It has already been noted that the negative output terminal of the reshaper 2225 is coupled to the gate 2253 and thus when the gate 2253 becomes operative, the signal passing through the gate 2253 is inverted.

In order to properly function for the A3 address, the unit adder 273 must begin to operate when the earliest pulse ($p18$) of the address A3 will be the next pulse to appear at the output terminals of the reshaper 2225. Therefore, the signal which sets the flip flop 2125 occurs at $t17\frac{3}{4}$ immediately preceding the appearance of the signal representing A3 at the output terminals of the reshaper 2225. For proper unit adding to the A1 address flip flop 2125 must be set at time $t29\frac{3}{4}$ when the earliest pulse ($p0$) of the address A1 will be the next pulse to appear at the output terminals of the reshaper 2225.

The unit adder 273 (when unit adding to address A3) reacts to two types of situations; namely, the situation where the earliest digit of A3 is a zero so that the unit adder 273 must cause a one to be substituted for the zero, and secondly where the earliest digit of A3 is a one so that the unit adder 273 must cause the first one and each successive one to become a zero until the first zero in the signal is reached, at which point a one is substituted and no further changes made in the address.

When the unit adder 273 is operative and the earliest digit of A3 is sent to the reshaper 2225 and is negative (zero), a corresponding positive pulse appears at the negative output terminal of the reshaper 2225 and is transmitted through the gate 2253 to the reshaper 2275. The positive pulse is passed through the gate 2253 by the pulses I0 and C0. The positive pulse is transmitted through the reshaper 2275 and appears at the negative output terminal of the reshaper 2275 as a negative potential which is fed via the delay line 2276 (wherein the signal is delayed for one-quarter of a pulse time) to the reset terminal of the flip flop 2125. The appearance of a negative signal at the reset terminal of the flip flop 2125 causes the flip flop 2125 to be reset thereby terminating the unit adding operation. In this manner the condition is met whereby a one is substituted for a zero where a zero constitutes the earliest digit of A3, and the unit adding operation is terminated.

If the earliest digit of A3 is a one, a corresponding negative potential occurs at the negative output terminal of the reshaper 2225. This negative signal blocks the gate 2253 so that no signal is passed to the reshaper 2275. As a result, a positive potential is fed via the delay line 2276 to the reset terminal of the flip flop 2125. The flip flop 2125 remains set and causes the unit adding operation to continue.

The unit adding operation will successively repeat itself until a zero appears in A3, which will cause a positive pulse to appear at the negative output terminal of the reshaper 2225. The positive pulse (due to I0 and C0) is sent via the gate 2253 to the reshaper 2275 and will cause a negative potential to appear at the negative output of the reshaper 2275. The negative potential is sent via the delay line 2276 to the reset terminal of the flip flop 2125 and will cause the flip flop 2125 to be reset. As a result a negative potential appears at the positive output terminal of the flip flop 2125 which causes the gate 2253 to be blocked and a positive signal appears at the negative output terminal of the flip flop 2125 and primes the gate 2243 thereby establishing the gate 2243 as a part of the recirculation loop 2450.

In this manner, when the earliest digit of A3 is a one, the unit adder 273 functions to replace the one with a zero and to continue replacing ones with zeros until a zero is encountered in A3 at which point the unit adder 273 replaces the zero with a one and terminates the unit adding procedure. In a similar manner unit adding to the A1 address takes place when directed by the proper control signals.

When positive signals are present on the K0 line —242, the BT line 282 and/or the V line 222 which are fed to the buffer 2097, or when a positive signal is fed to the buffer 2097 from the retain CR switch 2500, the buffer 2097 forwards a positive signal to the gate 2243. When one of these signals along with the other priming signals already mentioned are fed to the gate 2243, they cause the signal circulating in the recirculation loop 2450 to be retained without modification unless the unit adder 273 is functioning.

In the manner described the control register 24 functions to transmit instruction and address information signals at designated times, to generate consecutive addresses sequentially when directed by control signals to do so, and to store address information signals without modification when so directed by the proper control signals.

LIII. THE STATIC CONTROL REGISTER 28

The static control register 28 shown in Fig. 32 functions during a procedure to receive an instruction signal and to generate control signals which are used in the computer system to direct the performance of the procedure indicated by the instruction.

The static control register 28 comprises a plurality of flip flops and gates. The gates are each fed by different combinations of signals transmitted to the static control register 28, and can pass signals to set one or more of the flip flops which generate the control signals which are transmitted from the static control register 28 at times $t29\frac{1}{4}$ or $t29\frac{3}{4}$.

The signal appearing at the positive output terminal of the flip flop 2059 constitutes the control signal A which is transmitted from the static control register 28 via the A control line 270. The flip flop 2059 can be set when a positive signal is fed to its reset terminal via the K0 line —242. The flip flop 2059 is set when the static control register 28 receives a positive pulse via the static control register input line 226a2. This positive pulse, which only appears at $t29\frac{1}{4}$, is fed to the flip flop 2059 via the amplifier 2343. The flip flop 2059 is thus set and the positive signal, which appears at the positive output terminal of the flip flop 2059 at $t29\frac{1}{4}$, is transmitted from the static control register 28 via the A control line 270.

The positive output terminal of the flip flop 2033 transmits the control signal M from the static control register 28 at $t29\frac{1}{4}$ via the M control line 264. The flip flop 2033 can be set when there are positive signals on the E control line —293 and the K0 line —242 which are connected to reset terminals of the flip flop 2033. The flip flop 2033 is set by a positive signal received from the gate 2037.

The gate 2037 is primed when the static control register 28 receives a positive pulse via the static control register input line 226a1. This positive pulse which only appears at $t29\frac{1}{4}$, is fed to the gate 2037 via the amplifier 2333. Another signal fed to the gate 2037 is the signal transmitted from the buffer 2089. The buffer 2089 passes a positive signal when the static control register 28 receives a positive signal via the static control register input line 226c (at $t29\frac{1}{4}$) which is coupled to the buffer 2089 via the amplifier 2323.

The buffer 2089 will also pass a positive signal when the static control register 28 receives a positive signal via the static control input line 226b. This positive pulse, which only appears at $t29\frac{1}{4}$, is fed to the buffer 2089 via the positive output terminal of the amplifier 2310.

The signal appearing at the positive output terminal of the flip flop 2069 constitutes the control signal L which is transmitted from the static control register 28 at $t29\frac{1}{4}$ via the L control line 286. When a positive signal exists on the K0 line —242 which is coupled to the reset terminal of the flip flop 2069, the flip flop 2069 will be set by a positive pulse which is received from the gate 2068.

The gate 2068 will pass a positive pulse when the positive signals are present at its input terminals. When the static control register 28 receives a positive pulse via the static control register input line 226a2, which is present only at $t29\frac{1}{4}$, this positive pulse is transmitted to the gate 2068 via the positive output terminal of the amplifier 2343. The gate 2068 receives a second positive pulse when the static control register 28 receives a positive pulse via the static control register input line 226b. This positive pulse is forwarded to the gate 2068 via the positive output terminal of the amplifier 2310.

The third signal is transmitted to the gate 2068 from the negative output terminal of the amplifier 2323 which transmits a positive potential from its negative output terminal when no positive signal is received via the static control register input line 226c.

The positive output terminal of the flip flop 2043 feeds the control signal S from the static control register 28 at $t29\frac{1}{4}$ via the S control line 280. When a positive signal is present on the K0 line —242, which is coupled to the reset terminal of the flip flop 2043, the flip flop 2043 will be set by a positive pulse received from the gate 2047.

The gate 2047 transmits a positive pulse to the flip flop 2043 when three positive signals are fed to the gate 2047. A positive pulse is fed to the gate 2047 at *t*29¼ from the positive output terminal of the ampifier 2343 when a positive pulse (present only at *t*29¼) is received via the static control register line 226*a*2.

A second positive pulse is received at the gate 2047 from the positive output terminal of the amplifier 2323. When the static control register 28 receives a positive pulse via the static control register input line 226*c*, a positive pulse appears at the positive output terminal of the amplifier 2323.

The third signal fed to the gate 2047 is from the negative output terminal of the amplifier 2310. When the static control register 28 does not receive a positive pulse via the static control register input line 226*b*, a positive potential appears at the negative output terminal of the amplifier 2310 and is transmitted to the gate 2047.

At the coincidence of three positive signals (at *t*29¼) at the gate 2047, the gate 2047 feeds a positive pulse to the flip flop 2043 and sets the flip flop 2043. As a result a positive signal appears at the positive output terminal of the flip flop at *t*29¼ and is transmitted from the static control register 28 via the S control line 280.

The signal appearing at the positive output terminal of the flip flop 2017 constitutes the control signal E and is transmitted from the static control register 28 at *t*29¼ via the E control line 293. The signal which appears at the negative output terminal of the flip flop 2017 is transmitted from the static control register 28 via the E control line —293.

When a positive signal is present on the K0 line —242 which is coupled to the reset terminal of the flip flop 2017, the flip flop 2017 will be set by a positive pulse received from the gate 2016. The gate 2016 is primed by positive signals received via the J line 312 and the K1 line 244, and passes a pulse when there is a coincidence of positive signals at the remaining four input terminals.

When the static control register 28 does not receive a positive pulse via the static control register input line 226*b*, a positive potential appears at the negative output terminal of the amplifier 2310. This positive potential is transmitted to the gate 2016. When the static control register 28 does not receive a positive pulse via the static control register input line 226*c*, a positive potential appears at the negative output terminal of the amplifier 2323 and is transmitted to the gate 2016.

When a positive pulse is transmitted to the static control register 28 via the static control register input line 226*a*1, which is present only at *t*29¼, it is amplified by the amplifier 2333 and transmitted to the gate 2016. When the static control register 28 receives a positive pulse via the static control register input line 226*g*, it is amplified by the amplifier 2184 and transmitted to the gate 2016.

If at *t*29¼ each of the six signals fed to the gate 2016 is positive, a pulse is fed from the gate 2016 to the flip flop 2017 and causes the flip flop 2017 to be set. As a result a positive signal appears at positive output terminal of the flip flop 2017 and a negative signal appears at its negative output terminal at *t*29¼.

The pulse which is transmitted from the gate 2016 to the flip flop 2017 is also transmitted through the amplifier 2355 to the delay line 2353. The delay line 2353 delays the pulse one-quarter of a pulse time so that a pulse designated BP is transmitted via the BP control line 297 from the static control register 28 at *t*29¾.

The signal which appears at the positive output terminal of the flip flop 2029 constitutes the control signal N and is transmitted from the static control register 28 at *t*29¼ via the N control line 288. The signal which appears at the negative output terminal of the flip flop 2029 is transmitted from the static control register 28 at *t*29¼ via the N control line —288. When a positive signal is present on the K0 line —242, which is coupled to the reset terminal of the flip flop 2029, the flip flop 2029 will be set by a positive pulse received from the gate 2027.

If the static control register 28 receives a positive pulse via the static control register input line 226*a*1 at *t*29¼, it is transmitted to the amplifier 2333 and amplified and fed to the gate 2027. When the static control register 28 receives a positive pulse via the static control register input line 226*b* it is amplified by the amplifier 2310 and transmitted to the gate 2027. If a coincidence of positive signals exists at its input terminals at *t*29¼, the gate 2027 feeds a positive pulse to the flip flop 2029 causing it to be set. As a result a positive voltage appears at the positive output terminal of the flip flop 2029 and is transmitted from the static control register 28 at *t*29¼ via the N control line 288.

The signal which appears at the positive output terminal of the flip flop 2167 constitutes the control signal BM and is transmitted from static control register 28 at *t*29¼ via the BM line 294. When a positive signal is present on the K0 line —242, which is coupled to the reset terminal of the flip flop 2167, the flip flop 2167 will be set by a positive pulse received from the gate 2390.

The gate 2390 receives a positive pulse from the amplifier 2333 when a positive pulse is fed to the amplifier 2333 via the static control register input line 226*a*1 at *t*29¼. A positive pulse when fed to the static control register 28 via the static control register input line 226*b* is transmitted to the amplifier 2310, and amplified and transmitted to the gate 2390. When the static control register 28 receives a positive pulse via the static control register input line 226*c* it is transmitted via the amplifier 2323 to the gate 2390.

At a coincidence of positive signals at all of its input terminals at *t*29¼, the gate 2390 feeds a positive pulse to the flip flop 2167 and causes it to be set. As a result, a positive signal appears at the positive output terminal of the flip flop 2167 and is transmitted from the static control register 28 at *t*29¼ via the BM control line 294.

The pulse appearing at the positive output terminal of the amplifier 2285 constitutes the control signal B and is transmitted from the static control register 28 at *t*29¼ via the B control line 296. The amplifier 2285 is fed by the gate 2330. The gate 2330 will pass a positive signal when there is a coincidence of positive pulses at each of its three input terminals.

When the static control register 28 receives a positive pulse via the static control register input line 226*a*2 at *t*29¼, the positive pulse is amplified by the amplifier 2343 and transmitted to the gate 2330. When a positive pulse is transmitted via the static control register input line 226*b* to the amplifier 2310, the positive pulse is amplified and is fed to the gate 2330. The gate 2330 may also receive a positive pulse from the positive output terminal of the amplifier 2323 which is fed a positive pulse via the static control register input line 226*c*.

At the coincidence of the three positive pulses at the input terminals of the gate 2330 at *t*29¼, a positive pulse is transmitted to the amplifier 2285 and a positive pulse appears at the positive output terminal of the amplifier 2285. This positive pulse is transmitted from the static control register 28 at *t*29¼ via the B control line 296.

The signal appearing at the positive output terminal of the flip flop 2073 constitutes the signal D which will be generated at *t*29¾ when signals are present on the static control register input line 226*d* at *t*29¾, and the K1 line 244 at *t*29¼.

A positive signal on the K1 line 244 is fed via the delay line 2325, wherein a delay of one-quarter of a pulse time occurs, to the gate 2320. The delay line 2325 maintains the positive signal for one-quarter of a pulse time after K1 has terminated. The gate 2320 is, therefore, primed during K1 to pass the cyclical signal T29¾ each time it appears at the gate 2320. T29¾ is gated to the amplifier 2363 whose positive output terminal is coupled to the gate 2077.

If a positive signal is transmitted from the positive output terminal of the flip flop 2017 to the reset terminal of the flip flop 2073, at t29¾ the flip flop 2073 will be set by a pulse received from the gate 2077. When the flip flop 2073 is set, a positive signal appears at the positive output terminal and is conducted from a static control register 28 at t29¾ via the D control line 295.

The signal appearing at the positive output terminal of the flip flop 2085 constitutes the control signal Q and is transmitted from the flip flop 2085 via the Q control line 238. When a positive signal is transmitted from the positive output terminal of the flip flop 2017 to the reset terminal of the flip flop 2085, the flip flop 2085 will be set by a pulse received from the gate 2087.

When a positive pulse is received by the gate 2087 via the static control register input line 226e simultaneously with a T29¾ pulse from the amplifier 2363, the flip flop 2085 is set at t29¾. The positive potential which then appears at the positive output terminal of the flip flop 2085 is conducted from static control register 28 at t29¾ via the Q control line 238.

The signal which appears at the positive output terminal of the flip flop 2093 constitutes the control signal R. When a positive signal is transmitted from the positive output terminal of the flip flop 2017 to the reset terminal of the flip flop 2093, the flip flop 2093 will be set by a pulse received from the gate 2095. The gate 2095 receives a pulse via the static control register input line 226f and also receives a pulse at t29¾ from the amplifier 2363.

Thus the flip flop 2093 can be set at t29¾ and the positive signal which then appears at its positive output terminal is transmitted from the static control register 28 via the R control line 287.

The signal appearing at the positive output terminal of the flip flop 2104 constitutes the control signal Z. When a positive signal is transmitted from the positive output terminal of the flip flop 2017 to the reset terminal of the flip flop 2104, the flip flop 2104 will be set by a positive pulse received from the gate 2107. When a positive pulse is transmitted to the gate 2107 via the static control register input line 226h at t29¾, the gate 2107, which receives pulses at t29¾ from the amplifier 2363, forwards a positive pulse to the flip flop 2104. As a result, the flip flop 2104 is set and a positive potential appears at its positive output terminal and is conducted from the static control register 28 at t29¾ via the Z control line 289.

The K0 line —242 is coupled to the gate 2183. The gate 2183 is also fed signals from the positive output terminal of the amplifier 2333, the negative output terminal of the amplifier 2310, the negative output terminal of the amplifier 2323, the negative output terminal of the amplifier 2184, and the negative output terminal of the flip flop 2017 via the delay line 2187 wherein signals are delayed for three-quarters of a pulse time. At a coincidence of positive signals at all of its input terminals the gate 2183 transmits a positive pulse via the halt instruction line 278 from the static control register 28.

The control signals which are generated by the static control register 28 for the various procedures which are controlled by these signals are listed in Table V.

In the manner as described above, the static control register 28 functions to receive instruction signals via the static control register input lines 226 and generate various control signals which are distributed through the computer system.

TABLE V

| Procedure: | Control signals |
|---|---|
| Addition | A. |
| Subtraction | S and A. |
| Logical multiplation | A and L. |
| Low order multiplication | M. |
| High order multiplication | M and N. |
| Roundoff | M, N and BM. |
| Branch instruction | A and B. |
| Tape read | E, D and BP. |
| Halt | (No designation). |
| Tape reverse | E, D, R and BP. |
| Tape record | E, D, BP and Z. |
| Type-out octal | Z, E and BP. |
| Type-out bi-octal | Z, Q, E and BP. |

LIV. MANUAL CONTROL PANEL 20

The manual control panel 20 shown in Fig. 33 comprises the erase 200, the insert 202, the read-out 204, the mode switch 206, the continue 208, the initiate 210 and the halt 212, and functions to enable manual operations to produce certain control signals.

The erase 200 enables a typing error to be corrected. The positive five volt supply bus 605 is coupled to the contacts 2870b and 2875a of the erase 200. The negative ten volt supply bus 610 is coupled to the contacts 2870a and 2875b of the erase 200. The BF' line 255 is coupled by the movable contact 2880a in the alternative to either of the contacts 2870a or 2870b. The BX line —254 is coupled by the movable contact 2880b in the alternative to either the contact 2875a or 2875b. The normal position of the movable contacts 2880 are such that the movable contacts 2880 coupled the contacts 2870a and 2875a to the BF' line 255 and the BX line —254 respectively such that there is a negative potential present on the BF' line 255 and a positive potential present on the BX line —254.

When the movable contacts 2880 are brought in contact with the contacts 2870b and 2875b, the polarities of the voltages on the BF' line 255 and the BX line —254 are reversed to that a positive five volts is impressed on the BF' line 255 and a negative ten volts is impressed on the BX line —254. The BF' line 255 and the BX line —254 conduct the potentials respectively impressed upon them from the manual control panel 20.

The insert 202 includes the flip flop 2557 whose positive and negative output terminals transmit signals from the manual control panel 20 via the V lines 222 and —222 respectively.

When the insert 202 receives a positive signal via the halt output line 220, the positive signal is fed to the contact 2885a so that when the movable contact 2890 connects the contacts 2885a and 2885b, the positive potential is fed to the flip flop 2557 and causes the flip flop 2557 to be set.

When the flip flop 2557 is set, a positive signal appears at the positive output terminal of the flip flop 2557 and is transmitted from the manual control panel 20 via the V line 222, and a negative signal appears at the negative output terminal of the flip flop 2557 and is transmitted from the manual control panel 20 via the V line —222.

The potential appearing at the contact 2885b when it is coupled by the movable contact 2890 to the contact 2885a is conducted from the manual control panel 20 via the insert output line 218. This signal, hereinafter designated AF, is conducted from the manual control panel 20 for the period of time during which the movable contact 2890 couples the contacts 2885a and 2885b.

The positive signal which appears at the positive output terminal of the flip flop 2557 is maintained from when the flip flop 2557 is set until a negative signal appears at the reset terminal of the flip flop 2557. Signals are fed through the buffer 2513 to reset the flip flop 2557. The signals fed to the buffer 2513 are the cyclical signal —T28¾ and the signal appearing on the AI line —534.

When there is a coincidence of negative signals at the input terminals of the buffer 2513 the flip flop 2557 is reset.

Since the cyclical signal —T28¾ is fed to the buffer 2513, the flip flop 2557 is reset at t28¾, and as a result the positive signal appearing at the positive output terminal of the flip flop 2557 is made negative at t28¾.

The gate 2720 is an alternative means of setting the flip flop 2557 and passes a positive signal when positive signals are received simultaneously via the BT line 282 and the X line 308a.

The read-out 204 functions to transmit a positive potential from the manual control panel 20 via the AY line 272. The positive five volt supply bus 605 is connected to the contact 2900a and, when the movable contact 2905 couples the contact 2900a to the contact 2900b, the positive potential is impressed upon the AY line 272. The positive five volts poetential is then conducted from the manual control panel 20 via the AY line 272.

The mode switch 206 comprises the buffers 2980 and 2900, and a selector switch which includes a series of contacts 2710 and the associated contacts 2715 which respectively couple the movable contacts 2705a and 2705b to the buffers 2980 and 2990, or to the remainder of the manual control panel 20.

The positive five volts supply bus 605 is connected to the movable contact 2705a. The negative ten volts supply bus 610 is connected to the movable contact 2705b.

When the movable contacts 2705 are positioned to meet the contacts 2710a and 2715a (one step), the positive five volts potential is conduced via the contact 2710a and via the BY line 271 from the manual control panel 20, and to the continue 208. The negative ten volts potential is fed to the contact 2715a and conducted via the continue input line 275 to the continue 208.

When the movable contacts 2705 are positioned so as to meet the contacts 2710b and 2715b (one-instruction), the positive five volts potential and the negative ten volts potential are fed to the contacts 2710b and 2715b respectively. The positive five volts potential is conducted from the contact 2710b to the halt 212. The negative ten volts potential is fed from the contact 2715b via the continue input line 275 to the continue 208.

When the movable contacts 2705 are positioned to meet the contacts 2710c and 2715c (continuous), the positive five volts potential is conducted to the contact 2710c which is an open circuit, and the negative ten volts potential is coupled to the contact 2715c. The negative ten volts potential is fed from the contact 2715c via the continue input line 275 to the continue 208.

When the movable contacts 2705 couple the positive five volts potential and the negative ten volts potential respectively to the contacts 2710d and 2715d (insert octal), the positive five volts potential is conducted via the contact 2710d to the halt 212, and the negative ten volts potential is coupled to the contact 2715d which is an open circuit.

When the movable contacts 2705 are positioned to couple the positive five volts potential and the negative ten volts potential respectively to the contacts 2710e and 2715e (fill octal), the positive five volts potential is fed from the contact 2710e to the buffer 2980, and the negative ten volts potential is blocked at the contact 2715e since there is no circuit connected to the contact 2715e. The positive five volts potential passes through the buffer 2980 and is conducted from the manual control panel 20 via the BT line 282. The positive potential is also fed from the buffer 2980 via the BT line 282 to the halt 212 and the insert 202.

When the movable contacts 2705 are positioned to meet the contacts 2710f and 2715f (insert bioctal), the positive five volts potential is fed to the contact 2710f and the negative ten volts potential is fed to the contact 2715f. The positive five volts potential is fed from the contact 2710f to the buffer 2990 and passes through the buffer 2990, and is conducted from the manual control panel 20 via the AE line 224. The positive five volts potential is also conducted from the buffer 2990 via the AE line 224 to the halt 212. The negative ten volts potential which is fed to the contact 2715f is blocked since there is no circuitry connected to the contact 2715f.

When the movable contacts 2705 couple the positive five volts potential and the negative ten volts potential respectively to the contacts 2710g and 2715g (fill bi-octal), the positive five volts potential which appears at the contact 2710g is fed to the buffers 2980 and 2990 and is passed to the halt 212 and insert 202. The positive potentials appearing at the output terminals of the buffers 2980 and 2990 are transmitted respectively via the BT line 282 and the AE line 224 from the manual control panel 20.

In the above described manner, the mode switch 206 functions to convert manual operations into control signals for the procedures one-step, one-instruction, continuous, insert octal, fill octal, insert bi-octal and fill bi-octal.

The initiate 210 functions to couple the negative ten volts supply bus 610 to the AG line —256 which conducts the negative ten volts potential from the manual control panel 20. The negative ten volts supply bus 610 is coupled to the contact 2910a and when the movable contact 2915 connects the contact 2910a to the contact 2910b, a negative ten volts potential is impressed upon the AG line —256 which conducts the negative ten volts potential from the manual control panel 20.

In the continue 208 which includes the continue switch 2930 having two directional contacts, the normal position of the movable contacts 2930 is such that the movable contacts 2930 couple the contact 2920a to contact 2920b, and contact 2940a to contact 2940b. When the continue 208 receives a negative signal of ten volts via the continue input line 275, this signal is normally conducted from the continue 208 via the halt reset line 281 to the halt 212. The negative ten volts potential is received by the continue 208 from the mode switch 206 via the continue input line 275 and is fed to the contact 2920a and through the movable contact 2930a to the contact 2920b to which the halt reset line 281 is connected.

Initially, no voltage is transferred as a result of the contact 2940a being coupled by the movable contact 2930b to the contact 2940b but the capacitor 2960 is connected to the movable contact 2930b. When the movable contact 2930b is connected to the contact 2945 the capacitor 2960 is negatively charged by the negative ten volts potential which is fed via the negative ten volts supply bus 610 to the contact 2945, since the remaining terminal of capacitor 2960 is grounded. Thereafter, when the movable contact 2930b is again connected to the contact 2940a, the capacitor 2960 discharges via the reset terminal of the flip flop 2630 and performs a function hereinafter indicated.

When the switch 2930 is operated such that the movable contact 2930a connects the contacts 2925a and 2925b, a positive signal which is fed to the contact 2925a via the AT line 558 is conducted to the input terminal of the flip flop 2540.

A positive signal is fed via the K0 line 242 to the flip flop 2540 during K0 enabling the flip flop 2540 to be set. When the flip flop 2540 is set, a negative signal appears at its negative output terminal and is transmitted via the AT halt reset line 283 to the halt 212. When K0 terminates, the flip flop 2540 is reset and a positive signal appears at its negative output terminal.

The flip flop 2630 is set by positive signals received from the gate 2730 and is reset when a negative signal is received via the contact 2940a from the capacitor 2960 as previous described. When a positive signal is received by the gate 2730 via the BY line 271 and when a positive pulse (present only at t29¾) occurs on the X line 308a, the gate 2730 passes a positive pulse to the flip flop 2630 and causes the flip flop 2630 to be set. When the flip flop 2630 is set, a negative signal appears at its negative output terminal and is fed to the delay line 2635 which causes a delay of one and two-quarters pulse times. Signals appearing at the output terminal of the delay line 2635 are conducted from the manual control panel 20 via the one-step control line 219.

As already noted, the positive pulse which is transmitted to the gate 2730 via the X line 308a occurs at t29¾ and will therefore cause the flip flop 2630 to be set at t29¾. Since the delay of the delay line 2635 is one and two-quarters pulse times the negative signal will initially appear on the one-step control line 219 at t1 of the next minor cycle.

The function of the halt 212 is to transmit a positive signal via the halt output line 220 when directed by the necessary control signals to do so. The halt 212 will transmit the required positive signal when the flip flop 2515 is set.

The flip flop 2515 is set by a positive signal which is received from the gate 2510 or the halt instruction line 278. The gate 2510 is primed during K0 when a positive signal is present on the K0 line 242. The other signal fed to the gate 2510 is the signal received via the buffer 2675. The mode switch 206 transmits a positive signal to the buffer 2675 of the halt 212 in any of the manners previously described, and a positive signal is also received by the buffer 2675 when the flip flop 2520 is set so that a positive signal is fed from the positive output terminal of the flip flop 2520 to the buffer 2675.

The buffer 2675 may also be fed a positive signal from the contact 2805b which may be coupled via the movable contact 2825a to the contact 2805a to which is connected the positive five volts supply bus 605. When the movable contact 2825b is depressed, the associated movable contact 2825a couples the contact 2815a to the contact 2815b and thereby couples the negative ten volts supply bus 610 to the TT line 228 so that a negative signal TT is transmitted from the manual control panel 20.

The flip flop 2520 is set when a positive signal is transmitted to the manual control panel 20 via the overflow indicator line 138 which is coupled to the input terminal of the flip flop 2520.

At a coincidence of positive signals fed to the gate 2510, the flip flop 2515 is set and a positive signal appears at its positive output terminal. This positive signal is transmitted from the manual control panel 20 via the halt output line 220.

The flip flops 2515 and 2520 are reset by negative signals which are transmitted to their respective reset terminals from the buffer 2640. The buffer 2640 transmits negative signals to the flip flops 2515 and 2520 when negative signals are simultaneously fed to the buffer 2640 via the halt reset line 281 and the AT halt reset line 283. The flip flops 2515 and 2520 are therefore only reset when the switch of the continue 208 has been completely depressed and released. This feature greatly reduces the possibility that "switch chatter" in continue 208 might cause the passage of an undesired plurality of signals through the buffer 2640.

Thus, the manual control panel 20 functions to convert manual operations into control signals which are transmitted from the manual control panel 20 and permits the computer system operation to be directed by such manual operations.

LV. THE ACCUMULATOR 14

The accumulator 14, illustrated as the accumulator 14a–14c in Figs. 34, 35, and 36 respectively, comprises the adder 160 (see Fig. 34), the overflow circuit 162, the carry circuit 168, the sign senser 164 (see Fig. 35), the complementer 166, and the recirculation loop 172a–c (see Figs. 34–36). The accumulator 14 functions to receive and store or arithmetically manipulate information signals.

Generally, the accumulator 14 functions to receive a word which circulates in the recirculation loop 172 and which is timed such that when a second word is received, the two words are in phase, i.e., the earliest digits of the words of information occur at a given point in the recirculation loop at the same time as do the succeeding pulses of the two words.

More particularly, if a first word of information circulates in the recirculation loop and its first digit arrives at the adder 160 (see Fig. 34) at t0, the first digit of a second word of information which is fed to the accumulator 14 also arrives at the adder 160 at t0. When the necessary control signals are present, the adder 160 manipulates the two words of information so that a binary addition results. The adder 160 functions with the carry circuit 168 to provide for the proper addition of two binary numbers expressed in serial form.

The adder 160 and the carry circuit 168 react to eight situations. The eight situations are illustrated in Table VI wherein zeros indicate the absence of a pulse and ones indicate the presence of a pulse. The first word received is referred to as the addend and the second word is referred to as the augend.

TABLE VI

| Situation | Addend | Augend | Carry | Sum | New Carry |
|---|---|---|---|---|---|
| 1 | 0 | 0 | 0 | 0 | 0 |
| 2 | 0 | 0 | 1 | 1 | 0 |
| 3 | 0 | 1 | 0 | 1 | 0 |
| 4 | 1 | 0 | 0 | 1 | 0 |
| 5 | 1 | 0 | 1 | 0 | 1 |
| 6 | 1 | 1 | 0 | 0 | 1 |
| 7 | 0 | 1 | 1 | 0 | 1 |
| 8 | 1 | 1 | 1 | 1 | 1 |

When the result of a binary addition is a number which the computer system cannot properly manipulate, a signal is forwarded from the adder 160 to the overflow circuit 162 and, as a result, a signal is generated which is transmitted from the accumulator 14 via the overflow indicator line 138 and computer operation is halted. If the sum is within the capacity of the computer, it is stored in the recirculation loop 172.

When directed by certain control signals the complementer 166 (see Fig. 35) functions to complement the word circulating in the recirculation loop 172 of the accumulator 14. This function will hereinafter be described in detail. The complementer 166 may also complement an operand of an arithmetic process.

Another function is performed in the accumulator 14 by the sign senser 164 which, when directed by certain control signals, functions to store information indicating whether the signs of two successive numbers entering the accumulator 14 are alike or different. If necessary to a proper solution of an arithmetic problem, the accumulator 14 subsequently functions to utilize the stored information to cause the complementer 166 to complement the number circulating in the accumulator 14 at a later time.

When the accumulator 14 is to perform a subtraction operation, the first number introduced into the accumulator 14 is complemented by the complementer 166 and is added to the second number which is introduced into the accumulator 14.

In respect to the detailed operation of the accumulator 14, information signals which represent numbers expressed in binary form and which are of thirty pulse times duration are transmitted to the accumulator 14 via the F line 326 and enter the recirculation loop 172 at the buffer 1010 via the gate 1430. The only other signal sent to the gate 1430 is the signal which appears on the K1 line —244, which is negative only during step K1. As a result, information signals may be gated into the recirculation loop 172 during any K step other than K1.

The recirculation loop 172 comprises the following elements in series: the buffer 1010 (see Fig. 34), the gate 1080, the reshaper 1044, the delay line 1015 (see Fig. 35), the reshaper 1195, the delay line 1050, the reshaper 1053, the delay line 1025, the reshaper 1065, the delay line 1035, the reshaper 1075, the delay line 1043, the reshaper 1049, the gate 1077, the buffer 1093, the reshaper 1085 (see Fig. 36), one of the gates 1180, 1023, 1143, 1117, 1310, 1300, and the reshaper 1105 the output of which is fed back to the buffer 1010 (see Fig. 34) to complete the recirculation loop 172.

A word appearing on the F line 326 is fed from the gate 1430 through the buffer 1150 to the amplifier 1173. The positive output of the amplifier 1173 is fed via the addend input line 182 through the buffer 1010 to the gate 1080.

The gate 1080 is normally primed to pass the information signal by positive signals which are transmitted to the gate 1080 from the negative output terminal of the amplifier 1020 and the positive output terminal of the D.-C. amplifier 1130 and by the narrow pulse I0.

When the gate 1080 is primed, the information signal passes through the gate 1080 to the reshaper 1044 and each pulse of the information signal is timed and reshaped by C1 pulses. The information signal is transmitted from the positive output terminal of the reshaper 1044 via the sum output line 170 to the delay line 1015 (see Fig. 35) wherein each pulse of the information signal is delayed for four and three quarter pulse times before being fed to the reshaper 1195.

Each pulse of the information signal is timed and reshaped in the reshaper 1195 by C1 pulses and is transmitted from the positive output terminal of the reshaper 1195 to the delay line 1050. The A(T) line 150 is coupled to a tap on the delay line 1050 and conducts the word circulating in the recirculation loop from the accumulator 14 such that p0 occurs at t9. The delay line 1050 delays each pulse of the information signal for four and three quarters pulse times and transmits the information signal from its output terminal via the reshaper 1053 to the delay line 1025. The reshaper 1053 utilizes C1 pulses to time and reshape the pulses of the information signal. The delay line 1025 comprises a delay of nine and three-quarter pulse times.

The information signal is fed from the output terminal of the delay line 1025 to the reshaper 1065 wherein the pulses of the information signal are timed and reshaped by C1 pulses.

The information signal is fed from the positive output terminal of the reshaper 1065 to the delay line 1035 and each pulse of the information signal passes through the delay line 1035, which introduces a delay of four and three-quarter pulse times, to the reshaper 1075 wherein each pulse of the information signal is timed and reshaped by C1 pulses.

The pulses of the information signal are transmitted from the positive output terminal of the reshaper 1075 through the delay line 1043 wherein the pulses are delayed for four pulse times before being fed to the reshaper 1049.

The pulses of the information signals are timed and reshaped in the reshaper 1049 by C2 pulses and are fed from the positive output terminal of the reshaper 1049 to the gate 1077.

The gate 1077 is normally primed by a positive signal fed to the gate 1077 from the negative output terminal of the flip flop 1017 and by the narrow I0 pulses. When primed, the gate 1077 passes the information signal through the buffer 1093 via the coupling line 154 to the reshaper 1085 (see Fig. 36) and the pulses of the information signal are reshaped in the reshaper 1085 by C3 pulses.

The information signal is then transmitted from the positive output terminal of the reshaper 1085 in the alternative through one of the gates 1180, 1023, 1143, 1117, 1310, or 1300 to the reshaper 1105. When the accumulator 14 is to function, one of these gates is made operative by the appropriate control signals.

The gate 1180 is primed to pass the information signal from the reshaper 1085 when there are positive pulses present on the accumulator input line 136, and positive signals present on the N control line —288 and the M control line 264, except when the cyclical signals —T26¾, —T27¾ and —T28¾ occur. Thus the gate 1180 may pass all pulses of the information signal which are transmitted to it except those which are transmitted via the gate 1180 at t26¾, t27¾, and t28¾. This gate is used during the low order multiplication procedure and blocks the three most significant digits of the products.

The gate 1023 is primed to pass the information signal from the reshaper 1085 when a positive signal is received via the A control line 270. It functions to complete the recirculation path in the accumulator 14 during the addition, subtraction, and logical multiplication procedures.

The gate 1143 is primed to pass the information signal when a positive signal is fed to the gate 1143 via the AN line 112. It functions to complete the recirculation path with the normal amount of delay (30 pulses) during the last part of the high order multiplication procedure.

The gate 1117 is primed when positive signals are fed to it via both the M control line 264 and the K2 line 244. As a result, the gate 1117 can only function during K2 to pass the information signals which are fed to it; its purpose is to permit the multiplier to recirculate in the accumulator 14 while the multiplicand is being located in the memory.

The gate 1310 is primed to pass information signals when positive signals are fed to it via the halt output line 220 and the K3 line 248. As a result, the gate 1310 can function during K3 to pass information signals only if the computer is in the "halt" condition. Its purpose is to permit information signals to recirculate in the accumulator 14 during the various insert and fill procedures.

The gate 1300 is primed to pass information signals when positive signals are fed to it via the E control line 293 and via the accumulator recirculation control line 108. Its purpose is to permit information signals to recirculate in the accumulator 14 during the various type-out and tape procedures.

The gate 1440 is not a part of the recirculation loop in the sense that it passes an information signal. The gate 1440 functions to gate a T25¾ pulse into the recirculation loop when it is primed by the presence of positive signals on the AM line 292 and the BM line 294. The T25¾ pulse is gated into the recirculation loop via the reshaper 1105. This pulse produces the effect of rounding off the product during the rounded multiplication procedure.

The gate 1034 functions to recirculate information received from the delay line 1043 (see Figs. 35 and 36) via the recirculation line 156, but operates to decrease the length of the recirculation loop by one pulse time. The tap of the delay line 1043 which feeds the gate 1034 is such that a pulse entering the delay line 1043 will be delayed for three and two-quarters pulse times before being fed via the twenty-nine pulse-time path to the gate 1034. As a result, a portion of the delay of the recirculation loop 172 comprising the delay between the first and third taps of the delay line 1043 and the reshapers 1044 and 1085 is bypassed and the total delay of the recirculation loop is decreased by one pulse time.

The gate 1034 (see Fig. 36) is primed by the presence of positive signals on the AN line —112, the N control line 288, and the accumulator recirculation control line 136, and is blocked by the cyclical signal —T28¾. Thus the gate 1034 will pass an information signal which is fed to it at any time other than t28¾. The output of gate 1034 is coupled to the reshaper 1105.

It will be noted that the positive output terminal of the reshaper 1085 is coupled to the accumulator output line 126 which conducts signals from the accumulator 14. The total delay of the recirculation loop 172 to the positive output terminal of the reshaper 1085 is such that a p0 pulse fed to the recirculation loop at t0 will be conducted from the accumulator 14 via the accumulator output line 126 at t29¾.

In the reshaper 1105, the signals received are timed and reshaped by C0 pulses. The positive output terminal of the reshaper 1105 is coupled by the augend input line 158 to the buffer 1010 (see Fig. 34) and thus the recirculation loop 172 is completed. Signals are fed via the augend input line 158 to the buffer 1010 and are generally recirculated through the portion of the recirculation loop 172 comprising the thirty pulse-time path.

When an information signal is fed to the thirty pulse-time path of the recirculation loop 172, the signal is timed such that the earliest pulse occurs repeatedly at the buffer 1010 at t0. Thus when a second information signal is fed to the accumulator 14 via the F line 326 during a K step other than K1, it passes through the gate 1430 and is fed via the buffer 1150 through the amplifier 1173 to the buffer 1010, and its earliest pulse occurs at the buffer 1010 at t0 so that the second information signal is in phase with the first information signal which is circulating in the recirculation loop 172.

Because of the aforementioned phasing of the two information signals, the adder 160 can function to add the numbers represented by the information signals digit by digit beginning with the earliest pulse of each of the information signals and progressing through the thirtieth pulse of each of the two information signals (it will be recalled that the thirtieth and last digit of each of the information signals represents the sign of the number which an information signal represents).

As will be recalled from Table VI, there are eight conditions which must be met in order to be able to perform binary addition. This entails the use of the carry circuit 168 which functions when the addition of a digit in one information signal to its associated digit in the other information signal results in a number with a carry digit as will be explained.

In the adder 160 the first information signal is recirculated via the augend input line 158 to the buffer 1010 and is also fed to the gates 1330, 1340 and 1270. The second information signal which is received by the adder 160 from the poisitive output terminal of the amplifier 1173 via the addend input line 182 is fed not only to the buffer 1010 but also to the gates 1340, 1350 and 1270.

Signals, if gated through the gates 1330, 1340 and 1350, are passed via the buffer 1027 to the amplifier 1020. The positive output terminal of the amplifier 1020 is coupled to the input terminal of the delay line 1135 of the carry circuit 168 and to the gate 1240 of the overflow circuit 162.

The signal appearing at the positive output terminal of the amplifier 1020 is fed to the gate 1410 (whose other input is blocked except during logical multiplication), and through the delay line 1135 and delayed for three-quarters of a pulse time before being fed to the gate 1133.

The gate 1133 is primed to pass signals which are transmitted to it from the delay line 1135 by the narrow pulses I1, but is blocked at time t29¾ by the cyclical signal −T29¾. Signals which pass through gate 1133 are sent to the reshaper 1037. Pulses fed to the reshaper 1037 are timed and reshaped by C0 pulses. The positive output terminal of the reshaper 1037 is coupled by means of the carry input line 180 to the gates 1270, 1350, 1330 and to the buffer 1010. The negative output terminal of the reshaper 1037 is coupled to the gate 1240 of the overflow circuit 162.

The conditions to be satisfied in the addition process have been described heretofore, and were illustrated in Table VI. It should be recalled that a zero in the augend, addend, or carry digit is equivalent to the absence of a positive pulse on the augend input line 158, the addend input line 182, or the carry input line 180, as the case may be, and a one is equivalent to the presence of a positive pulse on the respective line.

In the first situation listed in Table VI, all three digits are zero. Therefore there are no input signals to the gates 1330, 1340, and 1350, and hence no carry signal is produced. Similarly, there are no input signals to the buffer 1010, and hence no signal arrives at the gate 1080 from the buffer 1010. Since there are no input signals to gate 1270, it passes no pulses.

The gate 1410 is normally blocked as previously described; hence there are no input signals to the reshaper 1044 and no pulse appears on the sum output line 170. Since no pulse is equivalent to a zero, this is the desired result.

In the second case shown in Table VI, there are zeros in the augend and addend but a one in the carry digit. This is equivalent to a pulse on the carry input line 180 but none on either the addend input line 182 or the augend input line 158. In this case one input signal appears at the buffer 1010, and this signal passes through it, through the gate 1080, and the reshaper 1044, giving a one (i.e., a pulse) on the sum output line 170.

Since none of the gates 1330, 1340, or 1350 has both inputs positive, no carry signal results, and the carry is thus a zero. The desired result of a sum digit equal to one and a carry digit equal to zero is thus produced.

In the third and fourth situations listed in Table VI a similar result is obtained, since in each case the buffer 1010 receives an input signal which is eventually delivered to the sum output line 170, and in each case no carry signal is produced because none of the carry gates 1330, 1340, or 1350 has positive signals on both inputs.

The fifth case in Table VI corresponds to the appearance of positive pulses (representing ones) on the addend input line 182 and the carry input line 180. Under these conditions positive signals are present at both inputs of the gate 1350, and this gate therefore produces an output pulse which passes through the buffer 1027 to the amplifier 1020. The signal from the positive output of the amplifier 1020 passes through the delay line 1135, the gate 1133, and the reshaper 1037 as already described, and appears as the carry input in the next digit position.

The buffer 1010 now has two of its inputs positive; it passes a positive pulse to the gate 1080. At this time, however, there is also a negative pulse applied to the gate 1080 from the negative output of the amplifier 1020. The gate 1080 therefore does not pass the pulse from the buffer 1010, and no pulse appears on the sum output line 170. Therefore the required conditions have been satisfied, namely, a pulse (i.e., a one) in the carry output, and no pulse (i.e., a zero) on the sum output line 170.

Cases 6 and 7 of Table VI are handled in a manner similar to case 5, except that in case 6 the carry pulse is passed by the gate 1340, and in case 7 by the gate 1330.

Cases 5, 6, and 7 are all characterized by the fact that the carry pulse from the amplifier 1020 is used to block the gate 1080 in order to assure a zero in the sum. In case 8 of Table VI, however, a one is desired in the sum, but since in this case pulses are present on all three inputs of the adder 160, all three carry gates 1330, 1340, and 1350 produce outputs and the resulting signal at the amplifier 1020 will block the gate 1080 as in cases 5, 6, and 7. In case 8, however, all three inputs to the gate 1270 receive positive pulses. The gate 1270 therefore passes a pulse, which is fed to the reshaper 1044 and appears on the sum output line 170. This satisfies the requirement of case 8 that the sum digit should be a one; since the carry digit is also a one as previously noted, the necessary conditions of case 8 have been fulfilled.

Thus the adder 160 fulfills the eight sets of conditions for binary addition, as set forth in Table VI. As previously noted, any carry pulse resulting from the addition of one set of simultaneously-appearing inputs to the adder 160 is delayed and becomes the carry input corresponding to the next following digit. This satisfies the condition for the addition of two multi-digit binary numbers represented in serial form.

The conditions which exist in the adder 160 and the carry circuit 168 of the accumulator 14 are outlined in Table VII for each of the eight situations which may arise during binary addition.

TABLE VII

| Situation | Gate 1330 | Gate 1340 | Gate 1350 | Gate 1270 | Positive output terminal amplifier 1020 (new carry) | Gate 1080 | Input terminal reshaper 1044 |
|---|---|---|---|---|---|---|---|
| 1 | Blocked | Blocked | Blocked | Blocked | Negative | Blocked | Negative. |
| 2 | do | do | do | do | do | Passes | Positive. |
| 3 | do | do | do | do | do | do | Do. |
| 4 | do | do | do | do | do | do | Do. |
| 5 | Passes | do | do | do | Positive | Blocked | Negative. |
| 6 | Blocked | Passes | do | do | do | do | Do. |
| 7 | do | Blocked | Passes | do | do | do | Do. |
| 8 | Passes | Passes | do | Passes | do | do | Positive. |

During the logical multiplication procedure the carry circuit 168 operates in a different manner. In this case negative signals are fed via the L control line —286, the J line —312, and the K3 line —248. As a result none of the inputs to the buffer 1170 is positive; its output is therefore negative, and since this output is fed to the amplifier 1130, a negative potential appears at the positive output terminal of the amplifier 1130. This negative potential is fed to the reshaper 1037 and causes the reshaper 1037 to be blocked so that no carry digits are passed from the carry circuit 168 to the adder 160. When the negative signal is fed to the amplifier 1130, a positive signal appears at its negative output terminal and is fed to the gate 1410 so that the gate 1410 replaces the gate 1080 as a means of gating positive pulses from the adder 160 via the reshaper 1044 into the recirculation loop 172.

During the logical multiplication procedure a word of information is sent to the gate 1430 via the F line 326, and is gated through the gate 1430 and passes through the buffer 1150 and the amplifier 1173, appearing on the addend input line 182. Simultaneously a word of information recirculating in the accumulator 14 appears on the augend input line 158. If, in any digit, either word of information contains a zero, at least one of the inputs of the gate 1340 will not be positive, and the gate 1340 will not pass a pulse. If and only if corresponding digits in both words of information are ones, pulses will appear simultaneously at both inputs of the gate 1340, and it will pass a pulse which will go through the buffer 1027 and the amplifier 1020 and will be applied to the gate 1410. Since the gate 1410 is primed the pulse is transmitted from the adder 160 via the reshaper 1044 to the recirculation loop 172. Thus a pulse enters the recirculation loop 172 only in those digit positions when the words of information on the addend input line 182 and the augend input line 158 both contained ones.

The overflow circuit 162 functions to indicate that the result of an arithmetic operation in the accumulator 14 is a number which the computer system cannot properly manipulate.

When two positive numbers represented by two information signals are added in the adder 160 and there is a carry from p28 to p29 of the resulting signal, the fact is indicated by the overflow circuit 162 in that a signal is transmitted from the accumulator 14 via the overflow indicator line 138.

The addition of two positive numbers should result in an absence of a pulse in p29 of the resulting information signal indicating that the result is positive. Thus, when two positive numbers are added and a pulse results in p29, a negative number is incorrectly indicated and is detected by the overflow circuit 162.

When two negative numbers are added and there is no carry from p28 to p29, there is an indication of a positive result from adding two negative numbers and since this is incorrect the overflow circuit 162 indicates the fact by transmitting a positive pulse via the overflow indicator line 138.

More particularly, the overflow circuit 162 produces a positive pulse on the overflow indicator line 138 when a positive pulse is fed to the buffer 1055. The buffer 1055 will pass a positive pulse when it receives a positive pulse in the alternative from either the overflow indicator line 178 or from any of the gates 1240, 1250 or 1260.

The gates 1240 and 1250 are partially primed when positive signals are transmitted to the gate 1230 of the overflow circuit 162 via the A control line 270 and the L control line —286 and by the narrow pulses I0 and the cyclical pulses T29. At a coincidence of positive signals being fed to the gate 1230, the positive pulse is gated through at t29 and fed through the amplifier 1145 to the gates 1240 and 1250 so that the gates 1240 and 1250 can pass positive pulses only at t29.

One of the signals fed to the gate 1260 is T29 so that the gate 1260 will only pass a positive pulse at t29. As a result a positive pulse can be fed through the buffer 1055 from the gates 1240, 1250, and 1260 only at t29. A second input to the gate 1260 is the signal which appears on the N control line 288 and when this signal is positive the gate 1260 is primed to pass a pulse at t29.

When a positive pulse is fed from the positive output terminal of the reshaper 1037 at t29, the pulse is transmitted to the gates 1250 and 1260 and, if one of the gates 1250 and 1260 is primed, the pulse will be gated to the buffer 1055.

If a positive pulse is transmitted from the positive output terminal of the amplifier 1020 to the gate 1240 at t29 and a negative pulse is not transmitted from the negative output terminal of the reshaper 1037 of the carry circuit 168 at t29 and the gate 1240 is primed, a positive pulse will be gated to the buffer 1055.

If at t29 a positive pulse is transmitted from the positive output terminal of the reshaper 1037 to the gate 1250 and the gate 1250 is primed by a positive signal from the amplifier 1145, and the negative output terminal of the amplifier 1020 does not transmit a negative pulse to the gate 1250, the gate 1250 will transmit a pulse at t29 to the buffer 1055.

If a positive pulse is fed from the positive output terminal of the reshaper 1037 to the gate 1260 and the gate 1260 is primed by positive signals on the AN line 112 and the N control line 288 and the cyclical signal T29, the gate 1260 will transmit a positive pulse to the buffer 1055.

The buffer 1055 passes any of the aforementioned pulses which are transmitted to it, or the pulse which is transmitted to it at t28¾ via the overflow indicator line 178.

In the above-mentioned manner the overflow circuit 162 functions to indicate a result which the computer system cannot properly manipulate.

The complementer 166 (see Fig. 35) functions to complement the number which is circulating in the recirculation loop in the accumulator 14 when the complementer 166 is instructed by the appropriate signal to do so. More particularly, the flip flop 1017 functions to select which of the two gates 1067 or 1077 (controlling the thirty and twenty-nine pulse time paths respectively) will function to complete the recirculation loop 172.

Normally, the flip flop 1017 is reset so that a positive potential appears at its negative output terminal and is fed to the gate 1077. Thus the gate 1077 is normally a part of the recirculation loop 172 of the accumulator 14 so that the information signals circulate in the thirty pulse time path.

In the complementer 166, the gate 1059 controls whether information may be forwarded to set the flip flop 1017. The gate 1059 is partially primed by signals transmitted to it via the buffer 1057 either from the positive output terminal of the flip flop 1155 or from the gate 1041.

When positive signals are transmitted to the complementer 166 from the positive output terminal of the flip flop 1160 of the sign senser 164, and by the FJ line 332 and the K3 line 248, the gate 1197 receives these signals and is primed to pass the T29¾ pulse which is fed to it. This positive pulse is fed to the flip flop 1155 which is set and which sends a positive signal from its positive output terminal through the buffer 1057 to the gate 1059.

The flip flop 1155 is reset after a minor cycle by the cyclical signal —T29. The flip flop 1155 may be set in the alternative by a positive signal transmitted from the positive output terminal of the amplifier 1095 of the sign senser 164, and in this case a positive signal is also transmitted from the positive output terminal of the flip flop 1155 via the buffer 1057 to the gate 1059.

The gate 1041 will transmit a positive signal to the gate 1059 via the buffer 1057 when positive signals are transmitted to the gate 1041 via the S control line 280, the J line 312 and the K3 line 248. At a coincidence of positive signals fed to the gate 1041, a positive signal is transmitted via the buffer 1057 to the gate 1059.

The gate 1059 is also primed by the cyclical signals —T29 and —T29¼ so that the gate 1059 can be made operable during a minor cycle at times other than t29 and 29¼.

In detail, a word of information which is circulating in the recirculation loop 172 of the accumulator 14 will be fed from the positive output terminal of the reshaper 1075 to the delay line 1043 and will be fed first via a tap to the reshaper 1049 and one pulse time later to the gate 1059.

The gate 1059 will be primed for one minor cycle, starting just prior to the arrival of the least significant digit of the word of information circulating in the accumulator 14. If the least significant digit of this word is a zero (the absence of a pulse), no pulse is passed by the gate 1059, and the flip flop 1017 will not be set. As long as only zeros occur in the word, this condition continues. Since under these conditions no pulses pass through the reshaper 1049 and the gate 1077, the signals representing the word appearing on the coupling line 154 are identical with those representing the word originally circulating in the accumulator 14 (i.e., they represent zeros). When the first one occurs in the word circulating in the accumulator 14, it is represented by a pulse. This pulse passes through the delay line 1043, the reshaper 1049, the gate 1077, and the buffer 1093, appearing on the coupling line 154.

This pulse representing the first one also passes on through the delay line 1043 and passes through the gate 1059, setting the flip flop 1017. Since it passes through additional delay before reaching the gate 1059, it does not set the flip flop 1017, however, until after it has passed through the gate 1077.

When the flip flop 1017 is set, its negative output terminal becomes negative and blocks the gate 1077, preventing any further signals from passing through the gate 1077 during that minor cycle. The positive output terminal of the flip flop 1017 simultaneously becomes positive, priming the gate 1067. The gate 1067 will now pass the clock pulses (C2) except in those positions where they are blocked by negative pulses from the reshaper 1049. Such negative pulses correspond to ones in the word circulating in the accumulator 14. The result is that wherever the original word has a one, no pulse (i.e., a zero) appears at the output of the gate 1067 and hence in the word on the coupling line 154, but wherever the original word contains a zero, the gate 1067 passes a C2 pulse which is equivalent to a one in the word on the coupling line 154.

The flip flop 1017 is reset after a minor cycle by the cyclical signal —T29 which is fed to the reset terminal of the flip flop 1017 and the recirculation loop is restored so that recirculation again takes place through the gate 1077.

The foregoing description can be summarized by stating that the word of information circulating in the accumulator 14 is allowed to remain unchanged until the first one appears; this first one is allowed to remain unchanged, but all subsequent ones are replaced by zeros and zeros are replaced by ones. This fulfills the condition for forming the complement.

In the above described manner, the complementer 166 functions to complement a number when the appropriate signals are transmitted to the complementer 166.

The sign senser 164 functions when directed by the appropriate control signals to store the information as to whether the sign of a number circulating in the recirculation loop of the accumulator 14 is positive or negative and can also transmit a signal to the complementer 166 to make the complementer 166 operative when necessary to the proper solution of a problem.

The p29 pulse of an information signal circulating in the recirculation loop 172 is fed from the delay line 1015 at t0 to the gate 1153. The gate 1153 is partially primed when positive signals are transmitted in the alternative to the sign senser 164 via the AM line 292 or the J line 312 which positive signals pass through the buffer 1109 to the gate 1153. Other signals fed to the gate 1153 are the signals which appear on the K3 line 248 and the N control line 288 and T0. When all the priming signals fed to the gate 1153 are positive, the gate 1153 functions to pass the pulse (if present) which is fed to it from the delay line 1015 at t0. This pulse will be present if the word circulating in the accumulator 14 is negative.

The pulse passes through the gate 1153 and is amplified by the amplifier 1095 whose negative output is coupled via the buffer 1111 to the reset terminal of the flip flop 1160, and whose positive output is coupled via the gate 1165 to the set terminal of the flip flop 1160, and is also coupled directly to the set terminal of the flip flop 1155 in the complementer 166.

The negative output terminal of the flip flop 1160 is coupled via the delay line 1285 to the buffer 1111 and the gate 1165. An additional reset terminal of the flip flop 1160 is coupled to the K1 line —244 such that the flip flop 1160 may only be set during K steps other than K1.

When a positive pulse is fed to the amplifier 1095, the negative signal which appears at its negative output terminal is transmitted to the buffer 1111 but does not function since a positive signal is being fed to the buffer 1111 via the delay line 1285 from the negative output terminal of the flip flop 1160. The gate 1165 is primed by the positive signal also received via the delay line 1285 from the negative output terminal of the flip flop 1160. The pulse passes through the gate 1165 to the flip flop 1160 which is thereby set. The delay line 1285 functions to keep its input to the gate 1165 positive for at least the duration of the positive pulse, even though the potential of the negative output of the flip flop 1160 may become negative before the full pulse has passed through the gate 1165, and to keep its input of the buffer 1111 positive at least until the end of the negative pulse received by the buffer 1111 from the amplifier 1095.

When the flip flop 1160 has been set, its negative output terminal becomes negative. Since this terminal is connected via the delay line 1285 to the gate 1165, that gate is blocked and will not pass the next positive pulse received from the amplifier 1095. On the other hand, the negative output terminal of the flip flop 1160, since it is also connected via the delay line 1285 to the buffer 1111, no longer makes its input to that buffer positive. Therefore, when a negative pulse from the amplifier 1095 is applied to the other input of the buffer 1111, making both buffer inputs negative, the buffer output will also become negative and will reset the flip flop 1160. The delay line 1285 in this case functions to permit its input to the buffer 1111 to remain negative for at least the duration of the negative pulse even though the potential of the negative output of the flip flop 1160 may become positive before the full pulse has passed through the buffer 1111, and to block the gate 1165 at least until the end of the positive pulse received from the amplifier 1095.

Thus the first pulse received by the amplifier 1095 following step K1 will set the flip flop 1160, but if a second pulse is received, it will reset the flip flop 1160. The flip flop 1160, the delay line 1285, the gate 1165, the buffer 1111, and the amplifier 1095 therefore function together as a binary counter, which changes from whichever state it is in to the other state each time a positive pulse is received by the amplifier 1095.

Each pulse received by the amplifier 1095 is also delivered to the flip flop 1155, thereby setting it. In this fashion each such pulse activates the complementer 166.

In the high order multiplication procedure, the multiplier and multiplicand are successively received by the accumulator 14. If the multiplier is negative, a pulse will pass through the gate 1153 as described previously. This pulse will activate the complementer, causing the negative number to be complemented, and will also set the flip flop 1160. If the multiplier is positive, it will not be complemented and the flip flop 1160 will not be set.

If the multiplier is positive but the multiplicand is negative, a pulse will pass through the gate 1153, causing the multiplicand to be complemented and the flip flop 1160 to be set. Again, if the multiplicand is positive, no action takes place in the sign senser 164.

If both multiplier and multiplicand are negative, both will be complemented, but the amplifier 1095 will receive two successive pulses from the gate 1153, and the flip flop 1160 will be first set and later reset as previously described.

To summarize, then, the flip flop 1160 will remain set after receipt of both multiplier and multiplicand if either was negative, but will be reset if both were negative, and will never be set if both were positive. Mathematically, if two positive factors are multiplied or if two negative factors are multiplied, the product is positive, but if one positive and one negative factor are multiplied, the product is negative. Since the flip flop 1160 will remain set only if one positive and one negative factor are received, the fact that it remains set is an indication that the product of those factors should be negative.

The positive output of the flip flop 1160 is connected to the gate 1197. After the multiplication is completed, positive control signals are present on both the K3 line 248 and the FJ line 332. Now if the flip flop 1160 has been set, indicating that the product should be negative, the next T29¾ pulse will be permitted to pass through the gate 1197, activating the complementer 166 to complement the product, thus making it negative.

Summarizing, then, the sign sensing circuits 164 function to cause complementing a negative multiplier or multiplicand prior to a high order multiplication procedure, to remember the proper sign information for the product, and to cause complementing of the product if the factors were such that their product should be negative.

The accumulator 14 may also receive a word of information from the storage register output line 116 (see Fig. 34) which passes the word via the gate 1012 to the buffer 1150. The gate 1012 is primed when positive signals are received via the accumulator gating line 106 and from the buffer 1137.

The buffer 1137 passes a positive signal when positive signals are received in the alternative from either the AH line 532, the M control line 264, or from the gate 1280. The gate 1280 passes a positive signal when positive signals are received via both the D control line 295 and the Z control line —289.

Any word circulating in the recirculation loop 172 of the accumulator 14 is continuously fed from the delay line 1043 (see Fig. 35) to the reshaper 1115 so that p0 occurs at t29. The reshaper 1115 times and reshapes the pulses of the word with C1 pulses and transmits the word and its negative equivalent from the accumulator 14 via the G output lines 118 and —118 respectively, timed so that p0 occurs at t29¼, for subsequent recording on the memory drum.

LVI. PRECESSING PULSE REGISTER 12

The precessing pulse register 12 illustrated in Fig. 37 comprises the recirculation loop 1255 of either thirty, twenty-nine, or twenty-seven pulse-times delay, in the alternative. The precessing pulse register 12 chiefly functions to receive individual pulses or information signals and to change the relative time position of the received signals. In certain cases, the precessing pulse register 12 may contain both control pulses and information signals in its recirculation loop 1255 at the same time.

The recirculation loop 1255 comprises: the reshaper 1543; the delay line 1515; the reshaper 1555; the delay line 1525; the reshaper 1565; the delay line 1535; the reshaper 1575; the delay line 1545; the gate 1573, the gate 1600, or the gate 1590 and the reshaper 1588 in series.

The signals received by the precessing pulse register 12 may be fed via the gates 1610, 1553, 1561 or the buffer 1643 into the recirculation loop 1255. The signal which is passed by one of the above listed gates or buffer is fed to the reshaper 1543 and is timed and reshaped by C0 before being transmitted to the delay line 1515. Pulses are delayed for one-quarter of a pulse time by the reshaper 1543.

The delay line 1515 delays the pulses for nine and three-quarters pulse times so that a p0 pulse fed into the recirculation loop 1255 at the reshaper 1543 at t29¾ arrives at the output terminal of the delay line 1515 at t9¾. The signal is transmitted from the delay line 1515 to the reshaper 1555 and is timed and reshaped by C0 pulses and delayed for one-quarter of a pulse time. The p0 pulse will reach the positive output terminal of the reshaper 1555 at t10.

Pulses appearing at the positive output terminal of the reshaper 1555 are transmitted to the delay line 1525 and also via the AW2 line 128 from the precessing pulse register 12.

The delay line 1525 comprises a delay of nine and three-quarter pulse times such that the p0 pulse arrives at the output terminal of the delay lines 1525 at t19¾. The output terminal of the delay line 1525 is coupled to the reshaper 1565, and pulses which are transmitted from the delay line 1525 are timed and reshaped in the reshaper 1565 by C0 pulses. The p0 pulse appears at the positive output terminal of the reshaper 1565 at t20.

Pulses are transmitted from the positive output terminal of the reshaper 1565 to the delay line 1535 wherein the pulses are delayed for four and three-quarter pulse times. The p0 pulse appears at the output terminal of the delay line 1535 at t24¾.

The output terminal of the delay line 1535 is coupled to the reshaper 1575 wherein pulses are timed and reshaped by C0 pulses; p0 occurs at the positive output terminal of the reshaper 1575 at t25.

The positive output terminal of the reshaper 1575 is coupled to the delay line 1545. The delay line 1545 has four taps, three of which present alternative recirculation paths and close the recirculation loop 1255 so that the recirculation loop 1255 may consist of different time lengths as previously mentioned. The remaining tap is situated on the delay line 1545 so that p0 arrives at t25¾. Pulses arriving at this tap of the delay line 1545 are transmitted at t25¾ from the precessing pulse register 12 via the AW1 line 124.

In regard to the alternative recirculation paths, pulses which are fed from the positive output terminal of the reshaper 1575 are delayed in the delay line 1545 one and two-quarter pulse times before being forwarded to the gate 1590 so that p0 arrives at the gate 1590 at t26½. These pulses are fed through the reshaper 1588 and are reshaped by C3 pulses and delayed for another one-quarter of a pulse time by the reshaper 1543 before being recirculated.

As has been indicated, the pulses which are fed to the gate 1590 have been delayed twenty-six and three-quarter pulse times from the input terminal of the reshaper 1543 and when a positive signal is fed to the precessing pulse register 12 and transmitted to the gate 1590 via the AR line 504, the gate 1590 passes the pulse received from the delay line 1545 to the reshaper 1588.

Pulses which are fed to the reshaper 1588 are timed and reshaped by C3 pulses and are transmitted from the positive output terminal of the reshaper 1588 to the reshaper 1543 to complete the 27 pulse-time path of the recirculation loop 1255, and from the precessing pulse register 12 via the AS line 114.

Pulses which are fed from the positive output terminal of the reshaper 1575 are delayed for three and three-quarters pulse times in the delay line 1545 before being fed to the gate 1600 so that p0 occurs at t28¾. When the gate 1600 is primed and the gate 1590 and the gate 1573 blocked, the pulses are fed to the reshaper 1545 with a twenty-nine pulse-time delay to complete the twenty-nine pulse-time path of the recirculation loop 1255.

Pulses which are fed from the positive output terminal of the reshaper 1575 are delayed for four and three-quarter pulse times before being fed to the gate 1573 so that p0 occurs at t29¾ (a thirty pulse-time delay). When the gate 1573 is primed, the pulses are fed to the reshaper 1543 thus completing the thirty pulse-time path of the recirculation loop 1255.

As indicated, the recirculation loop 1255 of the precessing pulse register 12 may comprise delays of twenty-seven, twenty-nine and thirty pulse times, in the alternative, according to which path of the recirculation loop 1255 is made operative. The computer system functions to complete only one recirculation path at a time by blocking the recirculation gates which are not associated with the selected recirculation path.

The gate 1600 in the twenty-nine pulse-time path is primed to pass pulses by positive signals which are transmitted to it via the M control line 264 and the K3 line 248, and by the cyclical signals I1 and −T28¾. As a result, the gate 1600 is only operative during K3 and functions to gate through all pulses except those which arrive at T28¾.

The gate 1573 in the thirty pulse-time path is primed when positive signals are received via the AR line −504 and from the buffer 1583. The buffer 1583 will pass a positive signal when positive signals are transmitted to it in the alternative by either the E control line 293, the V line 222, or the AZ line 560.

The gate 1590 in the twenty-seven pulse-time path is primed when a positive signal is present on the AR line 504.

Signals may be fed to the recirculation loop 1255 of the precessing pulse register 12 by one of the gates 1561, 1553, 1610, or the buffer 1643 as previously indicated.

The gate 1561 is primed when positive signals are received via the buffer 1542 from either the insert output line 218 or the A0 line 524. The primed gate 1561 passes the cylical signal T8¾. The pulse T8¾, which is used as a control pulse, is gated into the recirculation loop 1255 and is fed to the delay line 1545. The pulse T8¾ will pass through the gate 1590 to the reshaper 1588 when a positive signal is transmitted to the gate 1590 via the AR line 504.

As already noted the twenty-seven pulse-time path of the recirculation loop comprises a twenty-seven pulse times delay so that the T8¾ pulse arrives at the positive output terminal of the reshaper 1588 at t5¾ and is recirculated via the reshaper 1543. T8¾ is also transmitted at t5¾ from the positive output terminal of the reshaper 1588 via the AS line 114.

It will also be noted that T8¾, which was originally transmitted to the recirculation loop 1255 at t8¾, completes one cycle through the twenty-seven pulse-time path of the recirculation loop 1255 and commences its second cycle through the recirculation loop 1255 at t5¾ due to the positive signal which was fed to the precessing pulse register 12 via the AR line 504. Thus, when a positive signal is present on the AR line 504, the pulse in the recirculation loop 1255 is shifted from a given time position to a time position which is three pulse times earlier.

This shifting of a pulse earlier in relative time position (regardless of the number of pulse times involved) will hereinafter be referred to as "precessing" and the operation termed "precession." The pulse may be referred to as a "precessed pulse."

The use of the T8¾ pulse enables one pulse to serve multiple functions. As will be recalled from the procedures in which information was inserted into the computer system, a pulse circulating in the precessing pulse register 12 was utilized to distribute both the address and the word in serial form. T8¾ is precessed in three three-pulse-time steps from t8¾ back to t29¾ to distribute the three octal digits of an address, and is then further precessed in ten three-pulse-time steps to distribute the ten octal digits of information. As a result, only one control pulse need be introduced into the recirculation loop 1255 for both an address and a word.

The precessed pulse is also fed from the delay line 1545 to the gate 1600. In the computer system operation, however, the gate 1600 will not be primed during this particular precessing operation. The pulse is also fed from the delay line 1545 to the gates 1573 and 1620. The gate 1573 is ordinarily not primed unless the priming conditions which have been recited exist.

At the gate 1620, the control pulse is blocked until it is precessed to arrive at the reshaper 1543 via the gate 1600 at t28¾ and, as a result of the additional delay in the delay line 1545, arrives at the gate 1620 at t29¾. When this condition is met and when a positive signal is fed to the gate 1620 via the buffer 1560, the cyclical signal T29¾ will gate the precessed control pulse through the gate 1620.

The buffer 1560 passes a positive signal to the gate 1620 when positive signals are fed to it in the alternative from either the gate 1670, the gate 1680, the gate 1633, on the AR line 504 via the delay line 1554.

The gate 1670 passes a positive signal when positive signals are fed to it via the M control line 264 and the N control line −288. At the coincidence of two positive signals, the gate 1670 passes a positive signal via the buffer 1560 to the gate 1620.

The gate 1680 passes a positive signal when positive signals are fed to it via the E control line 293, the JD line 336, and the K2 line 244. When there is a coincidence of positive signals during K2, the gate 1680 passes a positive signal via the buffer 1560 to prime the gate 1620.

The gate 1633 is fed positive signals via the N control line 288 and from the delay line 1635. A normally positive signal is fed from the negative output terminal of the flip flop 1735 to the delay line 1635, in which there is a one pulse time delay, and the positive signal is fed to the gate 1633. The delay line 1635 enables a positive signal to be maintained at the input terminal of the gate 1633 for one pulse time after the flip flop 1735 has been set. When there is a coincidence of positive signals at the two input terminals of the gate 1633, a positive signal is fed via the buffer 1560 to prime the gate 1620.

When a positive signal is fed to the precessing pulse register 12 via the AR line 504, it is fed to the buffer 1560 via the delay line 1554 which causes a four pulse time delay. The delay line 1554 enables the positive signal which is received via the AR line 504 to be maintained positive for four pulse times after the signal becomes negative. The positive signal passes through the buffer 1560 to the gate 1620 and aids in priming the gate 1620.

When the gate 1620 is primed by a positive signal from the buffer 1560, a pulse is passed through the gate 1620 at $t29¾$ to the amplifier 1605. The positive output terminal of the amplifier 1605 is coupled to the flip flops 1637, 1595, and 1623, and to the BL output line 120 which transmits the pulse from the precessing pulse register 12. The amplifier 1605 also transmits pulses via the buffer 1675 to the accumulator gating line 106 and functions to improve the rise time of the signals generated by the flip flop 1623 as will be shown. The negative output terminal of the amplifier 1605 is coupled to the gate 1760 which function as will be explained.

The flip flop 1637 has two reset terminals, one of which is fed by the BR line 279 and the other by signals from the buffer 1603. When positive signals are received via the BR line 279 and the buffer 1603, the flip flop 1637 may be set. The buffer 1603 will pass a positive signal to the reset terminal of the flip flop 1637 when positive signals are fed to it in the alternative from either the E control line —293, the K3 line —248 or the J line —312.

When the above reset conditions do not prevent setting, the flip flop 1637 may be set by a positive pulse received from the positive output terminal of the amplifier 1605. The signal appearing at the positive output terminal of the flip flop 1637 is transmitted from the precessing pulse register 12 via the BQ line 148.

The flip flop 1595 may be maintained in set condition when a positive signal is fed to its reset terminal via the K0 line —242; thus, the flip flop 1595 may be set during steps other than K0. When the above recited reset condition is met and a positive pulse is transmitted from the positive output terminal of the amplifier 1605, the flip flop 1595 is set and causes the "word-complete" neon bulb 1500, which couples the positive output terminal of the flip flop 1595 to ground, to be ignited. This is a visual indication that the pulse circulating in the recirculation loop has been precessed to occur at the gate 1620 at $t29¾$.

The reset terminal of the flip flop 1623 is fed by the cyclical signal $-T29¾$. As a result, the flip flop 1623 may be set at any time other than $t29¾$, and is reset (after having been set) at the next occurrence of the cyclical signal $-T29¾$ at $t29¾$.

When the flip flop 1623 receives a positive pulse at $t29¾$ from the positive output terminal of the amplifier 1605, the flip flop 1623 is caused to be set after the termination of the cyclical signal $-T29¾$. The positive signal which then appears at the positive output terminal of the flip flop 1623 is transmitted via the buffer 1675 from the precessing pulse register 12 via the accumulator gating line 106.

The negative output terminal of the flip flop 1623 is coupled to the gate 1760, as is the negative output terminal of the amplifier 1605. At a coincidence of positive signals at its two input terminals the gate 1760 transmits a positive signal via the accumulator recirculation control line 108.

In the above described manner, the precessing pulse register 12 functions to generate a number of control signals which are transmitted from the precessing pulse register 12 to other parts of the computer system when the pulse circulating in its recirculation loop 1255 has been precessed so as to occur at the gate 1620 at $t29¾$.

The precessing pulse register 12 also functions to receive a $T29¾$ pulse which is fed to the recirculation loop 1255 via the buffer 1643. The buffer 1643 is fed by the BV line 284 and by signals transmitted from the positive output terminal of the amplifier 1617. Pulses only appear on the BV line 284 at $t29¾$ and are fed via the buffer 1643 to the reshaper 1543 of the recirculation loop.

The gate 1548 feeds the amplifier 1617. The signals which appear on the AM line 292 and the E control line 293, and the cyclical signal $T29¾$ are fed to the gate 1548. When there is a coincidence of positive signals on the AM line 292 and the E control line 293, the gate 1548 passes the $T29¾$ pulse to the amplifier 1617. The amplifier 1617 amplifies and transmits the pulse through the buffer 1643 to the reshaper 1543 of the recirculation loop 1255 where the pulse circulates and is precessed.

The positive output terminal of the amplifier 1617 is also coupled to the gate 1690 and to the BK line 142. The BK line 142 conducts the signal which appears at the positive output terminal of the amplifier 1617 from the precessing pulse register 12. The gate 1690 is primed to pass the pulse received from the positive output terminal of the amplifier 1617 when a positive signal is fed to the gate 1690 via the Z control line —289. When thus primed, the gate 1690 transmits a positive pulse at $t29¾$ via the BN line 144 from the precessing pulse register 12.

The gate 1553 is another means by which a pulse may be inserted into the recirculation loop 1255 of the precessing pulse register 12. The gate 1553 is primed when positive signals are fed to it via the N control line 288 and the AM line 292. When the gate 1553 is thus primed, it passes the cyclical signal $T28¾$ which is fed to the recirculation loop 1255 via the reshaper 1543. The pulse, which is thereby introduced into the recirculation loop at $t28¾$, is precessed in a manner similar to that previously described.

Information signals can be transmitted into the recirculation loop 1255 via the gate 1610 which feeds the reshaper 1543. The gate 1610 is primed when positive signals are transmitted to it via the J line 312, the M control line 264, and the K3 line 248. As a result, the gate 1610 passes information into the recirculation loop 1255 only during the J cycle of the K3 step. A word which is fed via the accumulator output line 126 to the gate 1610 leads the basic timing cycle of the computer system by one-quarter of a pulse time so that p0 occurs at $t29¾$. When primed the gate 1610 passes the word into the recirculation loop 1255 via the reshaper 1543. This word is also redistributed from the precessing pulse register 12 via a branch of the accumulator output line 126.

Until modified, the recirculation loop 1255 is generally thirty pulse times long; i.e., the word is recirculated from that tap of the delay line 1545 which feeds the gate 1573. When the word contained in the precessing pulse register 12 is to be used as a multiplier, however, the computer system selects the twenty-nine pulse-time path of the recirculation loop 1255 by transmitting positive signals via the M control line 264 and the K3 line 248 to the gate 1600. When the cyclical signals I1 and —T28¾ coincide as positive signals at the input terminals of the gate 1600, the word circulating in the recirculation loop 1255 is recirculated via the gate 1600.

Thus, the $p0$ pulse of the word (which appears at the input terminal of the reshaper 1543 at $t29¾$) arrives at the input terminal of the reshaper 1543 at $t28¾$ when it completes one cycle through the twenty-nine pulse-time path of the recirculation loop 1255; the $p1$ pulse which has completed one cycle through the modified recirculation loop arrives at the input terminal of the reshaper 1543 at $t29¾$; and each successive pulse of the information signal when it completes one cycle through the modified recirculation loop arrives at the input terminal of the reshaper 1543.

During the second cycle of the word through the modified recirculation loop 1255, each pulse of the word occurs two pulse times earlier relative to its original position; on the third cycle each pulse occurs three pulse times earlier and so on.

It has been noted that the cyclical signal —T28¾ is fed to the gate 1600. As a result, the pulse occurring at the gate 1600 at $t28¾$ will be blocked.

As a result of the precessing of the word successive pulses beginning with $p0$ are blocked at the gate 1600 during successive cycles of the word through the recirculation loop 1255.

More particularly, a $p0$ pulse of the word circulating in the recirculation loop is transmitted from the delay line 1545 to the gate 1600 at $t28¾$, if the recirculation loop 1255 has been modified to include the twenty-nine pulse-time path. The —T28¾ cyclical signal blocks this pulse so that it ceases to circulate in the recirculation loop. However, $p0$ is also transmitted from the delay line 1545 at $t29¾$ to the gate 1620, and is gated through by the cyclical signal T29¾ when the gate 1620 is primed as previously described. If $p0$ is a positive pulse (representing a "1") it is fed from the gate 1620 to the amplifier 1605, and is fed through the buffer 1675 and transmitted from the precessing pulse register 12 via the accumulator gating line 106.

During the next cycle in which the word (less $p0$) circulates in the recirculation loop 1255, $p1$ is transmitted from the delay line 1545 to the gate 1600 at $t28¾$ and is blocked by —T28¾. However, $p1$ is also transmitted from the delay line 1545 to the gate 1620 at $t29¾$ and is passed through as was $p0$.

In this manner, in successive cycles of the word through the twenty-nine pulse time path of the recirculation loop 1255, successive pulses beginning with $p0$ are fed through the gate 1620 from the delay line 1545 and are blocked at the gate 1600. This process may continue until all of the pulses of the information signal have been blocked at the gate 1600.

The processing pulse register 12 also functions to generate certain auxiliary control signals. More particularly, these control signals are the signals which appear at the positive output terminals of the flip flops 1735 and 1518.

The gate 1127 is primed when positive signals are fed to it via the AM line —292, the J line —312 and the K3 line 248, and by the cyclical signals C3 and I1. As a result, during any minor cycle of K3 other than the J and AM cycles the gate 1127 passes a positive signal to the amplifier 1123. The positive output terminal of the amplifier 1123 is coupled to the accumulator input line 136 and to the delay line 1537.

A three-quarter pulse time delay in the delay line 1537 functions to maintain the signal which is fed to the delay line 1537 from the positive output terminal of the amplifier 1123 for three-quarters of a pulse time after the gate 1127 is blocked. Signals are fed from the output terminal of the delay line 1537 to the gate 1533.

The gate 1533 is also fed by the signal appearing at the positive output terminal of the flip flop 1528, by the signal which appears on the N control line 288 and by the cyclical signal T29¾. The flip flop 1528 is set by the cyclical signal T2¼ when a positive signal is transmitted to its reset terminal from the negative output terminal of the reshaper 1543.

The flip flop 1528 and the gate 1553 constitute a feature of the precessing pulse register 12. During the high order multiplication procedure, the gate 1553 introduces a pulse (T28¾) to the recirculation loop 1255 which already contains the multiplier. Thus, the precessing pulse register 12 may contain a circulating control pulse and information at the same time. The function of the pulse is to prevent the flip flop 1528 from being maintained in set condition until the multiplication is complete. Due to the precessing which occurs during high order multiplication, T28¾ is eventually blocked at the gate 1600 when the multiplication is complete.

When there is a coincidence of positive signals fed to the gate 1533, the T29¾ pulse is fed to the flip flop 1735 and causes the flip flop 1735 to be set at $t29¾$. The signal which appears at the positive output terminal of the flip flop 1735 (designated AN) is transmitted from the precessing pulse register 12 via the AN line 112. The signal which appears at the negative output terminal of the flip flop 1735 is fed to the delay line 1635. The flip flop 1735 is eventually reset when the signal on the K3 line 248 becomes negative since the K3 line 248 is coupled to the reset terminal of the flip flop 1735.

The flip flop 1518 may be set when positive signals are fed in the alternative to the buffer 1790 either from the negative output terminal of the reshaper 1543 or via the E control line 293. When either of these signals are positive the buffer 1790 feeds a positive signal to the reset terminal of the flip flop 1518 and thus enables the flip flop 1518 to be set.

The appearance of any "one" in a word circulating in the recirculation loop 1255 causes a negative pulse to be fed from the negative output terminal of the reshaper 1543 to the reset terminal of the flip flop 1518 and causes the flip flop 1518 to be reset. When there are all zeros in the word, the flip flop 1518 remains set for the entire minor cycle. This feature enables the precessing pulse register 12 to detect when all of the active multiplying digits of a multiplier have been utilized.

The flip flop 1518 is set by either the cyclical signal T29¼, by a positive signal received via the E control line 293, or by a positive signal which may be received from the gate 1513. A positive signal is passed when the gate 1513 receives positive signals via the N control line 288 and when the cyclical signal T1¼ is positive.

When the flip flop 1518 is set, a positive signal appears at its positive output terminal and is transmitted from the precessing pulse register 12 via the AB line 130 and a negative signal appears at the negative output terminal and is transferred from the precessing pulse register 12 via the AB line —130.

In this manner the precessing pulse register 12 functions to precess a pulse which is circulating in the recirculation loop 1255 or pulses of a word which may be a multiplier, and also to generate the various control signals which have been indicated.

LVII. STORAGE REGISTER 10

The storage register 10 shown in Fig. 38 functions to receive, store and transmit information signals. The storage register 10 includes a recirculation loop 1800 of thirty or thirty-one pulse times delay in the alternative.

The recirculation loop 1800 comprises: the reshaper

1814; the delay line 1817; the reshaper 1824; the delay line 1825; the reshaper 1837; the delay line 1835; the reshaper 1847; the delay line 1845; the reshaper 1857; all in series, and includes any one of the recirculation gates 1820, 1900, 1841 and 1836.

The storage register 10 can receive words of information via the gates 1813, 1855, and via the AL line 512, which are coupled to the reshaper 1814 of the recirculation loop 1800. These words are transmitted to the storage register 10 so that $p0$ occurs at $t29\tfrac{3}{4}$ and $p29$ occurs at $t28\tfrac{3}{4}$.

When a word is received by the storage register 10 and fed to the reshaper 1814, the pulses of the word are timed and reshaped by C0 pulses in the reshaper 1814, and appear at the positive output terminal of the reshaper 1814 after the pulses have been delayed for one-quarter of a pulse time in the reshaper 1814. Therefore, $p0$ will occur at $t0$, $p1$ at $t1 \ldots p29$ at $t29$ at the positive output terminal of the reshaper 1814.

The signal is fed from the positive output terminal of the reshaper 1814 to the delay line 1817 wherein the pulses of the signal are delayed for nine and three-quarters pulse times, such that a $p0$ pulse which is forwarded to the recirculation loop will occur at the output terminal of the delay line 1817 at $t9\tfrac{3}{4}$.

The signal is forwarded from the delay line 1817 to the reshaper 1824 wherein the pulses of the signal are timed and reshaped by C0 pulses. The word is fed from the positive output terminal of the reshaper 1824 to the delay line 1825 with $p0$ occurring at $t10$.

Pulses fed to the delay line 1825 are delayed for nine and three-quarters pulse times before being transmitted to the reshaper 1837, wherein the pulses of the signal are timed and reshaped by C0 pulses, with $p0$ occurring at $t19\tfrac{3}{4}$.

The pulses of the word are delayed for one-quarter of a pulse time in the reshaper 1837 and are fed to the delay line 1835 such that $p0$ occurs at $t20$. There is a delay of nine and two-quarter pulse times in the delay line 1835 which feeds the word to the reshaper 1847, with $p0$ occurring at $t29\tfrac{2}{4}$.

In the reshaper 1847, wherein the pulses of the signal are timed and reshaped by C3 pulses and delayed for one-quarter of a pulse time, $p0$ appears at the positive output terminal of the reshaper 1847 at $t29\tfrac{3}{4}$.

The positive output terminal of the reshaper 1847 is coupled to the gates 1836, 1841 or 1900, one of which is primed to feed the signals via the reshaper 1814 back to compete the thirty pulse-time path of the recirculation loop 1800.

Pulses of the information signal are also fed from the positive output terminal of the reshaper 1847 to the delay line 1845 in which pulses are delayed for three-quarters of a pulse time. The delay line 1845 transmits the signal to the reshaper 1857 which times and reshapes the pulses with C3 pulses.

From the positive output terminal of the reshaper 1857 the signal is transmitted to the gates 1820 and 1290. The gate 1820 when primed completes the thirty-one pulse-time path of the recirculation loop 1800 so that the recirculation loop 1800 becomes thirty-one pulse times in length as a result of the additional delay caused by the delay line 1845 and the reshaper 1857.

Pulses which are transmitted from the positive output terminal of the reshaper 1857 to the gate 1290 when the gate 1290 is primed are transmitted from the storage register 10 via the overflow indicator line 178.

The gate 1290 is primed when positive signals are fed to it via the AN line 112 and the accumulator gating line 106, and when the cyclical signal $T28\tfrac{3}{4}$ which is fed to the gate 1290 is positive. When the above-recited conditions are met, the gate 1290 passes a positive pulse at $t28\tfrac{3}{4}$.

The gate 1820 is primed when positive signals are fed to it via the K3 line 248, the M control line 264, and from the buffer 1860, in addition to the positive cyclical signals I1 and $-T28\tfrac{3}{4}$. The buffer 1860 passes a positive signal to the gate 1820 when fed positive signals by either the AN line 112 or the N control line $-288$. As a result of the cyclical signal $-T28\tfrac{3}{4}$, the gate 1820 passes all of the pulses of a received word other than that which is fed to the gate 1820 at $t28\tfrac{3}{4}$.

The gate 1841 of the thirty pulse-time path is primed when it receives positive signals via the AN line $-112$, the K3 line 248 and the N control line 288.

The gate 1836 is primed when it receives positive signals on the E control line 293, the K1 line $-244$, and the accumulator recirculation control line 108.

The gate 1900 of the thirty pulse-time path is primed when it receives a positive signal via the AH line 532.

The computer system primes only one of the recirculation gates 1836, 1841, and 1900 when the thirty pulse-time path is selected. When thus primed the selected gate couples the positive output terminal of the reshaper 1847 to the reshaper 1814 completing the thirty pulse-time path. Further, the computer system selects either the thirty or the thirty-one pulse-time path, depending on the function the control register 10 is to perform.

As previously mentioned, information is fed to the storage register 10 and into the recirculation loop 1800 via either of the gates 1813 or 1855 or directly by the AL line 512, which are all connected to input terminals of the reshaper 1814.

The gate 1813 is primed when positive signals are fed to it via the AM line 292 and when the cyclical signals $-T28\tfrac{3}{4}$ and I1 are present and positive. Thus the gate 1813 passes all of the pulses of the information signal which are received via the accumulator output line 126 other than the pulse which occurs at $t28\tfrac{3}{4}$.

The gate 1855 is primed when positive signals are fed to it via the Z control line 289 and the accumulator gating line 106. When thus primed the gate 1855 passes the entire information signal, which is received via the accumulator output line 126, into the recirculation loop 1800.

Information which is recirculated in the thirty pulse-time path via the gate 1836 is also fed from the gate 1836 to the amplifier 1663 wherein the pulses of the signal are amplified. The signal is transmitted from the positive output terminal of the amplifier 1663 and leaves the storage register 10 via the distributor line 140.

Information is tapped from the delay line 1817 by the L(T) line 152 so that a pulse will be delayed for nine pulse times after the pulse enters the recirculation loop 1800 until it appears on the L(T) line 152. The pulses which appear on the L(T) line 152 are transmitted from the storage register 10.

The buffer 1016 receives information signals from the positive output terminal of the reshaper 1847 via the reshaper 1875, and from the positive output terminal of the reshaper 1814, and transmits these signals from the storage register 10 via the storage register output line 116.

It will be noted that a $p0$ pulse will be present at the positive output terminal of the reshaper 1814 at $t0$. This $p0$ pulse will occur at the positive output terminal of the reshaper 1847 at $t29\tfrac{3}{4}$. Since it is transmitted to the buffer 1016 via the reshaper 1875, wherein the pulses of the information signal are delayed for one-quarter of a pulse time, $p0$ also arrives at the positive output terminal of the reshaper 1875 at $t0$.

A signal is transmitted from the positive output terminal of the reshaper 1814 to the buffer 1016 to enable the signal to be transmitted from the storage register 10 via the storage output terminal 118 during the same cycle in which information is introduced to the recirculation loop of the storage register 10. This feature is utilized during the multiplication operation and enables the storage register 10 to transmit the multiplicand before the multiplicand is delayed for a minor cycle in the recirculation loop 1800.

The thirty-one pulse time path of the recirculation loop 1800 is a feature of the storage register 10 and makes possible the transmission of a word from the storage register 10 such that the pulses of the word are each delayed for one pulse time. This is equivalent to a left shift in a multiplication process and enables the computer system to properly add partial products during low order multiplication.

More particularly, if a sum of partial products circulates in the computer system and is in phase with the basic timing cycle, a partial product which lags the basic timing cycle by one pulse time may be added without further compensation to the circulating sum. The one pulse time lag is caused by the use of the thirty-one pulse-time path.

As described, the storage register 10 functions to receive, store and transmit information signals and comprises a recirculation loop which may be thirty or thirty-one pulse times in the alternative as selected by certain control signals.

LVIII. TYPEWRITER CIRCUITS 52

The typewriter circuits 52 comprise the type-in circuits 575 shown in Fig. 39, and the type-out circuits 580 and limit switch 502 shown in Fig. 40. The typewriter circuits 52 function to encode information typed into the computer system, and to decode information to be typed out of the computer system.

When an octal digit is typed on the keyboard 500 (see Fig. 39) of the type-in circuits 575, the typewriter circuits 52 function to generate signals which represent the octal number expressed in the binary system. When a decimal number is typed on the keyboard 500, the typewriter circuits 52 function to generate signals which are the binary representation of the bi-octally coded decimal number. Conversely the signals which are fed to the type-out circuits 580 from the remainder of the computer system and which express numbers binarily coded, cause the typewriter circuits 52 to perform specified typing operations.

The keyboard 500 comprises the space bar 508, the carriage return key 516, and a series of ten keys 5380a–k which are attached to the associated movable contacts 5405a–b and 5385a–k. When the carriage return key 516, the space bar 508 or one of the keys 5380a–k is depressed, a potential is impressed upon the associated contact 5395a–b or 5389a–k.

When in normal position each of the movable contacts 5385a–k meet the associated contact 5383a–k and transfers the impressed voltage to the next consecutive movable contact 5385.

When positive signals are fed to the gate 6012 via the halt output line 220 and the AZ line —560, the gate 6012 feeds a positive signal to the keyboard 500. The positive signal is fed from the gate 6012 to the movable contacts 5405a, 5405b and 5385a. If the carriage return key 516, the space bar 508 or the key 5380a is operated, the positive signal is impressed upon the associated contact 5395a, 5395b or 5389a.

When the movable contact 5385a is in its normal position the positive signal is fed through the contact 5383a to the movable contact 5385b. If each of the remaining movable contacts 5383 are in their respective normal positions the positive signal will be further fed from the movable contact 5385b to the contact 5383k.

The controlling elements of the type-in circuits 575 are a plurality of flip flops which function to generate the required signals when set and which are set in different combinations by operation of the keys.

When the carriage return key 516 is operated, the movable contact 5405a meets the contact 5395a and, if a positive signal is present on the movable contact 5405a, a positive signal is fed to the gate 6011. If a positive signal is fed from the positive output terminal of the flip flop 6020 to the gate 6011, the positive signal from the contact 5395a will cause the gate 6011 to pass the cyclical signal T17¾ to the flip flop 6010.

The flip flop 6010 is then set at $t17\tfrac{3}{4}$ and a positive signal appears at its positive output terminal, and a negative signal appears at its negative output terminal. The signal which appears at the positive output terminal of the flip flop 6010 is transmitted from the typewriter circuits 52 via the AI line 534. The signal which appears at the negative output terminals of the flip flop 6010 is transmitted from the typewriter circuits 52 via the AI line —534. The flip flop 6010 is reset when a negative pulse is fed to its reset terminal via the X line —308.

When the space bar 508 is operated, the positive signal is fed via the contact 5395b to the flip flop 6020 and, if a positive signal is fed via the V line 222 to the reset terminal of the flip flop 6020, the flip flop 6020 is set. As a result a positive signal appears at the positive output terminal of the flip flop 6020 and a negative signal appears at the negative output terminal.

The positive output terminal of the flip flop 6020 is coupled to the gate 6011, as previously indicated. Signals are transmitted from the positive output terminal of the flip flop 6020 via the AH line 532. The signal which appears at the negative output terminal of the flip flop 6020 is transmitted from the typewriter circuits 52 via the AH line —532.

The remaining keys 5380 excepting the key 5380k are utilized to type numbers into the typewriter circuits 52. The function of the key 5380k will be hereinafter indicated.

The key 5385a is used for the insertion of the number 0. When the key 5380a is operated, a positive signal is impressed upon the contact 5389a and is conducted to the flip flop 6078 and causes the flip flop 6078 to be set when a positive signal is present at its reset terminal. The signal appearing at the positive output terminal of the flip flop 6078 is fed to the buffer 6053.

The remaining numbers 1–9 are binarily expressed through various combinations of signals generated by the flip flops 6038, 6048, 6058, and 6068. The signals which appear at the positive output terminals of the flip flops 6038, 6048 and 6058 are utilized to express the binary form of an octal digit. The signal which appears at the positive output terminal of the flip flop 6068 is utilized to express the single binary digit which appears in the more significant of the two octal digits which represent a bi-octally coded decimal digit.

The numbers from 0 to 7 may be binarily coded by use of the flip flops 6038, 6048 and 6058 alone. The most significant octal digit of bi-octally coded 8 or 9 is a one and hence may be binarily expressed as one and requires but one flip flop for its representation.

Each signal generated by one of the flip flops 6038, 6048 and 6058 represents one of the three binary digits which are required to express the digits from 0 to 7. The signal generated at the positive output terminal of the flip flop 6038 represent the least significant binary digit; the signal generated at the positive output terminal of the flip flop 6048 represent the second least significant binary digit; and the signal generated at the positive output terminal of the flip flop 6058 represent the most significant binary digit. Hence, if a positive signal appears at the positive output terminal of the flip flop 6038 and a negative potential appears at the positive output terminals of the flip flops 6048 and 6058 what is expressed is the binary equivalent of the number one (001). If positive signals appear at the positive output terminals of each of the flip flops 6038, 6048 and 6058 what is expressed is the binary equivalent of the octal or decimal digit seven (111).

When the digit one is typed by depressing the key 5380b, a positive signal is impressed upon the contact 5389b and is fed to the flip flop 6038 and causes the flip flop 6038 to be set.

When the key 5380c is depressed to type the decimal or octal digit 2, a positive signal is fed via the contact 5389c to the flip flop 6048 and causes the flip flop 6048 to be set.

To type the decimal or octal digit 3, the key 5380d is depressed causing a positive signal to be fed via the movable contact 5385d to the contact 5389d. The signal is conducted from the contacts 5389d to the flip flops 6038 and 6048 causing both flip flops 6038 and 6048 to be set, thus binarily expressing the decimal or octal digit 3.

When the key 5380e is operated to insert the decimal or octal digit 4 into the computer system, a positive signal is fed via the movable contact 5385e to the contact 5389e and then to the flip flop 6058 and causes the flip flop 6058 to be set.

To type the decimal or octal digit 5, the key 5380f is depressed causing the movable contacts 5385f to transfer a positive signal to the contact 5389 f. As a result the flip flops 6038 and 6058 are set to binarily express the decimal or octal digit 5.

When the key 5380g is depressed to insert the decimal or octal digit 6 into the typewriter circuits 52, a positive signal is fed via the movable contact 5385g to the contact 5389g and then to the flip flops 6048 and 6058, and causes the flip flops 6048 and 6058 to be set thus binarily expressing the decimal or octal digit 6.

To type the decimal or octal digit 7 into the computer system, the key 5380h is depressed thereby causing the movable contact 5385h to transfer the positive signal to the contact 5389h. Thus the flip flops 6038, 6048 and 6058 are set and express the decimal or octal digit 7 in the binary system.

To type the decimal digit 8 (bi-octally coded as 10 wherein one is the most significant digit), the key 5380i is depressed and causes a positive signal to be sent through the movable contact 5385i to the contact 5389i and causes the flip flop 6068 to be set. Thus 8 is bi-octally coded. The least significant bi-octal digit is binarily expressed as 0 by the flip flops 6038, 6048 and 6058 which are not set.

When the decimal number 9 is typed the operation of the key 5380j causes the positive signal to be fed via the movable contact 5385j to the contact 5389j. Thus the flip flops 6038 and 6068 are set so that the bi-octally coded 9 is expressed in the binary system.

In this manner the octal digits from 0 to 7 and the decimal digits from 0 to 9 are coded and expressed in the binary system by a plurality of signals.

Provision is also made for the minus sign which is typed on the key 5380k which, in a manner similar to the aforementioned typing operations, causes the flip flops 6048 and 6068 to be set. Thus provision is made for encoding the minus sign.

The contact 5383k is coupled to the differentiating circuit 5390. A positive change in potential at the contact 5383k, which is caused by the return to normal position after operation of any of the aforementioned keys, will enable the differentiating circuit 5390 to transmit a positive pulse to the amplifier 6033 which feeds the relay coil 5440.

When a pulse is fed through the relay coil 5440 to ground, the movable contact 5445 is caused to meet the contact 5450. The movable contact 5445 is coupled to the negative ten volts supply bus 610 and thus a negative potential is impressed upon the contact 5450.

The negative potential is fed to the reset terminals of the flip flops 6038, 6048, 6058, 6068 and 6078. Since the mechanical arrangement insures that any switch operated will remain so for more than fifty milliseconds, there is ample time for the flip flop outputs on lines 522a–d to be received and stored before the flip flops are reset.

The signals appearing at the positive output terminals of the flip flops 6038, 6048, 6058, 6068 and 6078 are transmitted to the buffer 6053, and if any of these signals are positive, a positive signal is transmitted from the typewriter circuits 52 via the AV line 520.

The signals appearing at the positive output terminals of the flip flops 6038, 6048, 6058 and 6068 are transmitted from the typewriter circuits 52 via the distributor input lines 522a–d.

In this manner, the type-in circuits 575 function to receive digits and to encode them in the binary system as a plurality of asynchronous signals.

The type-out circuits 580 as shown in Fig. 40 function to decode signals and cause the keyboard 500 to perform the typing operations designated by the signals which are decoded.

The signals to be decoded are fed to the typewriter circuits 52 via the actuator lines 548a–d. The signals appearing on the actuator lines 548a–d set or do not set the flip flops 5045, 5055, 5065 and 5075 depending upon whether the signals are positive or not. The set or reset conditions of the flip flops 5045, 5055, 5065 and 5075 may represent the binary coded octal or decimal digits or typing operations (i.e. carriage return, etc.) in a manner similar to that described for the type-in circuits 575.

The flip flops 5045, 5055, 5065 and 5075 may be set when a positive signal is present at their associated reset terminals via the CB line 554. The signals which appear at the positive and negative output terminals of the flip flops 5045, 5055, 5065 and 5075 are fed in various combinations to the gates 5570a–m.

The gate 5570a passes a positive signal when positive signals are fed to it from the negative output terminal of the flip flops 5045, 5055, 5065 and 5075, and via the CE line —556.

The gate 5570b passes a positive signal when positive signals are fed to it from the negative output terminals of the flip flops 5045, 5065 and 5075, and from the positive output terminal of the flip flop 5055.

A positive signal is passed through the gate 5570c when positive signals are fed to it from the negative outputs of the flip flops 5045, 5055, 5075, and from the positive output terminal of the flip flop 5065.

The gate 5570d passes a positive signal when positive signals are fed to it from the negative output terminals of the flip flops 5045 and 5075 and from the positive output terminals of the flip flops 5055 and 5065.

A positive signal is passed through the gate 5570e when positive signals are fed to the gate 5570e from the negative output terminals of the flip flops 5045, 5055, 5065, and from the positive output terminal of the flip flop 5075.

The gate 5570f passes a positive signal when positive signals are fed to it from the negative output terminals of the flip flops 5045 and 5065 and from the positive output terminals of the flip flops 5055 and 5075.

The gate 5570g passes a positive signal when it receives positive signals from the negative output terminals of the flip flops 5045 and 5055, and from the positive output terminals of the flip flops 5065 and 5075.

The gate 5570h passes a positive signal when it receives positive signals from the negative output terminal of the flip flop 5045 and from the positive output terminals of the flip flops 5055, 5065 and 5075.

A positive signal is fed through the gate 5570i when a positive signal is fed to the gate 5570i from the positive output terminal of the flip flop 5045 and from the negative output terminals of the flip flops 5055, 5065 and 5075.

The gate 5570j passes a positive signal when it receives positive signals from the positive output terminals of the flip flops 5045 and 5065 and from the negative output terminals of the flip flops 5065 and 5075.

The gate 5570k passes a positive signal when fed positive signals from the positive output terminals of the flip flops 5045 and 5065, and from the negative output terminals of the flip flops 5055 and 5075.

The gate 5570l passes a positive signal when it receives positive signals from the positive output terminals of the flip flops 5045, 5055 and 5065, and from the negative output terminal of the flip flop 5075.

The gate 5570m passes a positive signal when it receives positive signals from the positive output terminals of the flip flops 5045 and 5075, and from the negative output terminals of the flip flops 5055 and 5065.

The gates 5570a–k are coupled to the thyratrons 5580a–k. The gates 5570l and 5570m are coupled via the buffers 6065 and 6073, respectively, to the thyratrons 5580l and 5580m. Each thyratron 5580 comprises an anode 5600, a shield 5620, a control grid 5610, and a cathode 5612 which is grounded. (For convenience, the majority of the character references associated with the elements of the thyratrons 5580b–m are omitted.)

The anodes 5600 of the thyratrons 5580 are coupled via the printer magnets 5590 to the movable contact 5555 which is operated by the relay coil 5530. When the movable contact 5555 is coupled to the contact 5533 because of the energization of the relay coil 5530, the anodes 5600 are coupled to the thyratrons plate power supply bus 620.

The shields 5620 of the thyratrons 5580a to 5580k are coupled to the AX line 552, and when a positive signal is fed to the shields 5620a via the AX line 552 the thyratrons 5580a to 5580k are primed to conduct. The shields 5620l and 5620m of the thyratrons 5580l and 5580m, respectively, are coupled to ground and are thereby always ready to be fired.

When a positive signal is fed from any one of the gates 5570a–k to one of the associated thyratrons 5580a–k, the positive signal is impressed upon the associated grid 5610a–k and causes that thyratron 5580 to conduct. When a thyratron 5580 conducts, the printer magnet 5590 which is associated with the conducting thyratron 5580 is operated by closure of contact 5555 to contact 5533 of relay 5530 to actuate the associated printing lever (not shown) of the keyboard 500.

Similarly, the thyratrons 5580l and 5580m are operated when positive signals are received from the buffers 6063 and 6073. The buffer 6063 passes a positive signal when it receives a positive signal from the gate 5570l or via the BE line 564.

The buffer 6073 passes a positive signal when it receives a positive signal from the gate 5570m, or via the CA line 526, or from the buffer 5322. The printer magnets 5590l or 5590m are thus operated in the manner previously described and cause the designated typing operation to be performed.

The buffer 5322 receives signals via the BF' line 255 or the BF line 567, and when either of these signals is positive the buffer 5322 passes a signal to the buffer 6073 to function as previously indicated, and also via the buffer 5320 to the D.-C. amplifier 5325. The D.-C. amplifier 5325 feeds the relay coil 5530 which is connected to ground and couples the thyratron plate power supply bus 620 to the movable contact 5555.

When the thyratron 5580m conducts and the printer magnet 5590m functions as previously described, a positive signal is fed from the printer magnet 5590m to the flip flop 5090.

If a positive signal is present at the reset terminal of the flip flop 5090 via the AT line −558, the flip flop 5090 is set by the positive signal received from the printer magnet 5590m. The signal which appears at the negative output terminal of the flip flop 5090 is transmitted from the typewriter circuits 52 via the BZ line −572.

As has been described, the type-out circuits 580 function to receive signals and to decode these signals and to cause the designated typing operations to be performed.

The typewriter circuits 52 also include the limit switch 502 which includes the carriage contacts 5685 which are affixed to the carriage (not shown) of the typewriter. The carriage contact 5685a couples the positive five volts supply bus 605 to the AT line 558 when the carriage is at the beginning of a line of typing, and to the BF line 567 when the carriage is at the end of a line. The carriage contact 5685b couples the negative ten volts supply bus 610 to the AT line −558 when the carriage is at the beginning of a line.

The binary and octal forms of any given number are related in a very simple fashion. If the binary digits are taken in groups of three, the value of any such group is equal to the corresponding digit in the octal form of the same number. For example, the binary form of the decimal number 43 is 101011. Taking the latter number in groups of three digits gives the groups 101 and 011, which are the binary equivalents of 5 and 3 respectively. But 53 is also the octal form of the decimal number 43.

This relationship is used in the computer to simplify typewriter operation. Typing of a thirty digit binary number as a binary number would require thirty key strokes, but the thirty binary digits are equivalent to ten octal digits, and the corresponding octal number would thus require only ten keystrokes. The simple relationship between binary and octal forms makes it a very simple matter to cause one keystroke, representing an octal digit, to generate and store in the computer the corresponding three binary digits, and output from computer to typewriter is similarly made simple.

LIX. SYNCHRONIZER 58

The synchronizer 58 comprises the distributor 56 and the binary counter 54 which includes the register type-out switch 506.

The synchronizer 58 primarily functions to generate the signals which are used to convert a plurality of asynchronous information signals into a synchronized signal of serial pulses which are arranged in a predetermined order. The synchronizer 58 also functions to generate the signals which control the type-out operations of the computer system.

A detailed description of the circuits which perform these functions follows.

LX. DISTRIBUTOR 56

The distributor 56 comprises the data arranger 590 (see Fig. 41), the delay switch 592 and the AR signal generator 595 (see Fig. 42).

The data arranger 590 functions to receive a plurality of information signals (each signal representing a binary digit) and to convert each signal to a single pulse, and to arrange the resulting pulses in serial order so that the pulse which represents the least significant binary digit is positioned earliest with successive pulses representing successively more significant digits. The data arranger 590 also performs the reverse of the above-recited functions.

The delay switch 592 functions to generate a delaying control signal for a fixed period of time during the tape procedures to permit the magnetic tape to accelerate or decelerate properly before being used in conjunction with the remainder of the computer system.

The AR signal generator 595 functions to generate the control signal AR which is transmitted from the distributor 56 to aid in precessing the control pulse which circulates in the precessing pulse register 12.

Information signals are fed to the data arranger 590 shown in Fig. 41 via the distributor input lines 522a–d or the tape output lines 536a–c and are either positive or negative depending on the number represented. If one of the distributor input lines 522 or the tape output lines 536 carries a positive signal, the binary digit one is represented. If one of these lines carries a negative potential, the binary digit zero is represented.

If the binary representation of an octal digit of an address is transmitted to the distributor 56 via the distributor input lines 522, the three distributor input lines 522a, 522b and 522c are utilized. These lines carry the signals which represent a total of three binary digits which represent one octal digit. The least significant binary digit of the representation of the octal number is received via the distributor input line 522a; the second least significant binary digit is received via the distributor input line 522b; and the most significant binary digit is received via the distributor nput lne 522c.

In the data arranger 590 the distributor input line 522a feeds the gate 5210, the distributor input line 522b feeds the gate 5235, and the distributor input line 522c feeds the gate 5255.

The gates 5210, 5235 and 5255 are also fed by the AH line −532 which when positive partially primes the gates 5210, 5235 and 5255.

When a negative potential is being fed to any of the gates 5210 5235 or 5255 by one of the associated distributor input lines 522, that gate is blocked. When the AH line −532 is positive, the gates 5210, 5235 and 5255 can be primed by a positive signal on the associated distributor input line 522. The gates 5210, 5235 and 5255 are also fed by the delay line 5015.

The tap of the delay line 5015 which feeds the gate 5210 is such that a control pulse fed to the input terminal of the delay line 5015 will appear at the gate 5210 one-quarter of a pulse time later. The tap of the delay line 5015 which feeds the gate 5235 is such that a control pulse which is fed to the input terminal of the delay line 5015 will appear at the gate 5235 one and one-quarter pulse times later. The tap of the delay line 5015 which feeds the gate 5255 is such that a control pulse which is fed to the input terminal of the delay line 5015 will appear at the gate 5255 two and one-quarter pulse times later.

When the gates 5210, 5235 and 5255 receive a positive signal via the AH line −532 and positive or negative signals from the distributor input lines 522, and a control pulse is fed to the distributor 56 via the AS line 114, if the most significant octal digit is being operated upon, the control pulse is timed to occur at $t5\frac{3}{4}$. The control pulse occurs at $t2\frac{3}{4}$ for the second most significant octal digit which is to be distributed and at $t29\frac{3}{4}$ for the third most significant octal digit which is to be distributed, this being the last digit of the address typed. If more than three digits are typed, each successive control pulse occurs three pulse times earlier in the timing cycle than the one which preceded it.

When a control pulse is fed via the AS line 114 to the data arranger 590 at $t5\frac{3}{4}$, it is transmitted to the amplifier 5330 and is fed to the delay line 5015. The control pulse is fed from the delay line 5015 to the gate 5210 at $t6$ and, if the gate 5210 is primed, is passed via the buffer 5143 to the amplifier 5130 whose positive output terminal transmits the pulse via the AP output line 530 from the distributor 56.

In the delay line 5015, the control pulse is further delayed and fed to the gate 5235 at $t7$ and, if the gate 5235 is primed, the pulse is passed via the buffer 5143 to the amplifier 5130.

It will be noted that a pulse received by the amplifier 5130 from the gate 5235 occurs one pulse time after the receipt of a pulse from the gate 5210. As a result the two pulses are serially arranged in the successive pulse time positions $t6$ and $t7$.

In the delay line 5015, the control pulse is still further delayed and fed to the gate 5255 at $t8$ and, if the gate 5255 is primed, the gate 5255 transmits a pulse via the buffer 5143 to the amplifier 5130. The pulse arrives at the positive output terminal of the amplifier 5130 at $t8$.

The three signals which are fed to the gates 5210, 5235 and 5255 are thus converted to pulse form and arranged serially in the three consecutive pulse times $t6$, $t7$, and $t8$ such that the least significant binary digit is represented earliest in time. Should one of the gates 5210, 5235 or 5255 receive a negative potential via the associated distributor input line 522, the result would be the absence of a pulse in the appropriate position in the three pulse time signal which is subsequently transmitted from the positive output terminal of the amplifier 5130.

As previously indicated, the next control pulse which is transmitted to the data arranger 590 via the AS line 114 is timed to occur at $t2\frac{3}{4}$ so that the binary representation of the second most significant octal digit of the address is distributed in a similar way in the three pulse times $t3$, $t4$ and $t5$. In this manner the distributor 56 continues to receive address information signals via the distributor input lines 522 and to convert the signals to pulse form, arrange them serially and transmit them via the AP output line 530.

When a decimal digit of a number is being inserted into the computer system, the binary digit signal equivalent which represents the most significant octal digit of the bi-octal representation of the decimal digit is forwarded to the distributor 56 via the distributor input line 522d. Since the two most significant binary digits of this octal digit are always zero, only one line, namely the distributor input line 522d, is needed to convey the information. This signal is fed to the gate 5083 of the data arranger 590. The gate 5083 can be primed only when bi-octally coded information is forwarded to the distributor 56.

The gate 5083 is primed when it receives positive signals via the AH line 532 and via the distributor line 585. (Note that the AH line −532 is positive for the insertion of the address whereas the AH line 532 is positive for the insertion of numerical data.)

When the gate 5083 is thus primed, the positive or negative potential which is fed to the gate 5083 via the distributor input line 522d is fed to the buffer 5043 which is coupled to the gate 5200.

The gate 5200 is also fed by the pulse which is fed to the distributor 56 via the AS line 114. When information is being fed to the gate 5200, the first control pulse which is forwarded to the data arranger 590 via the AS line 114 occurs at $t26\frac{3}{4}$ and is forwarded to the gate 5200 which is coupled to the buffer 5028.

The buffer 5028 passes the pulse, if one is present, to the amplifier 5120 and as a result the positive output terminal of the amplifier 5120 transmits the pulse from the distributor 56 via the AL line 512 at $t26\frac{3}{4}$.

The three signals which represent the least significant octal digit of the bi-octally coded decimal digit are transmitted to the distributor 56 via the distributor input lines 522a, 522b and 522c. The signal representing the least significant binary digit of the least significant octal digit representation is fed via the distributor input line 522a to the gate 5093; the signal which represents the next most significant binary digit is fed via the distributor input line 522b to the gate 5122; the signal which represents the most significant binary digit is fed via the distributor input line 522c to the gate 5152.

The gates 5093, 5122 and 5152 are primed by a positive signal which is received via the distributor line −585. It will be noted that the gate 5093 is thus primed to pass a signal when the gate 5083 is blocked and the gate 5083 is primed to pass a signal when the gate 5093 is blocked. Thus the gate 5200 can only pass one information signal at a given time.

When primed, the gates 5093, 5122 and 5152 pass the signals received via the distributor input lines 522, respectively, through the buffers 5043, 5053 and 5063 to the gates 5200, 5225 and 5240, respectively.

The gate 5200 is fed the next control pulse received in the data arranger 590 on AS line 114. This control pulse is also transmitted to the delay line 5015 via the amplifier 5330. The delay line 5015 forwards the control pulse to the gate 5225 one pulse time after the control pulse is received by the delay line 5015, and thus enables the gate 5225 to transmit information one pulse time after the gate 5200 has passed its information.

The delay line 5015 transmits the control pulse to the gate 5240 two pulse times after the delay line 5015 receives the control pulse from the amplifier 5330 and then enables the gate 5240 to pass information.

As a result, the gates 5200, 5225 and 5240 transmit their information in the three pulse times ($t23¾$, $t24¾$, and $t25¾$) beginning with the pulse time in which the second control pulse was transmitted to the distributor 56 via the AS line 114.

When octal information is transmitted to the distributor 56, the first control pulse is transmitted to the distributor 56 via the AS line 114 at $t26¾$, and successive control pulses are precessed three pulse times for the distribution of each binary representation of successive octal digits.

When the information which is forwarded to the distributor 56 is bi-octally coded, the control pulses are transmitted to the distributor 56 via the AS line 114 at the same times as for octal information. However, the two octal digits representing a decimal digit are alternately distributed due to the signals on the distributor lines 585 and —585. Thus, for example, the control pulse which occurs on the AS line 114 at $t23¾$ is the first pulse to operate on the gates 5200, 5225 and 5240, and the control pulse which occurs at $t17¾$ is the second pulse to operate upon these gates. The control pulses occurring at $t26¾$, $t20¾$, etc., operate only on the gate 5200 due to the inhibiting signal on the distributor line —585.

The delay line 5015 also sequentially feeds the gates 5040, 5050, 5060 and 5070 which receive information from the reshaper 5145. A word of information is fed to the reshaper 5145 once each minor cycle either via the distributor line 140 or from the gate 5260, and the pulses of the information signal are timed and reshaped in the reshaper 5145 by C0 pulses. The gate 5260 passes positive pulses when there is a coincidence of positive signals which are fed to it via the AZ line 560 and the CY line 562 (which carries information signals).

The word which is transmitted from the positive output terminal of the reshaper 5145 is continuously fed to the gates 5040, 5050, 5060 and 5070, and three pulse time groups of the word are sequentially fed through the gate 5040 or 5050, 5060 and 5070.

The gate 5040 is partially primed when a positive signal is fed to it via the CC line 566. The gates 5050, 5060 and 5070 are partially primed when they receive positive signals via the CD line 546.

The gate 5040 is utilized when bi-octally coded information is to be decoded and is the path through which the pulse representing the least significant binary digit of the most significant octal digit of the pair of octal digits is sent.

When bi-octal information is transmitted from the positive output terminal of the reshaper 5145, it is transmitted to each of the gates 5040, 5050, 5060 and 5070. The first control pulse which is transmitted to the distributor 56 via the AS line 114 at $t26¾$ passes through the amplifier 5330 to the delay line 5015 and is transmitted to the gates 5040 and 5050 at $t27$. At $t28$, the control pulse is transmitted from the delay line 5015 to the gate 5060, and at $t29$ it is transmitted to the gate 5070.

When bi-octally coded information is being received, the gates 5050, 5060 and 5070 are at first blocked by a negative signal received via the CD line 546. The gate 5040, however, is at first partially primed by a positive signal received on the CC line 566.

As a result, the gate 5040 is primed at $t27$ due to the control pulse and functions to pass the pulse of the information signal which occurs at the gate 5040 at $t27$. This will be the $p27$ pulse of the information signal which is transmitted to the distributor 56 at $t26¾$ and is delayed for one-quarter of a pulse time by the reshaper 5145.

Since the information is bi-octally coded, the digit passed by the gate 5040 will be that binary digit which represents the most significant digit of the pair of octal digits which expresses the most significant decimal digit.

The next control pulse forwarded to the distributor 56 via the AS line 114 occurs at $t23¾$ and is fed from the delay line 5015 to the gates 5040 and 5050 at $t24$, to the gate 5060 at $t25$, and to the gate 5070 at $t26$.

The gate 5040 is now blocked by a negative signal received by the CC line 566 and the gates 5050, 5060 and 5070 are primed by positive signals received via the CD line 546. As a result, the gate 5050 passes the pulse of the information signal which is fed to it at $t24$; the gate 5060 passes the pulse which is fed to it at $t25$; and the gate 5070 passes the pulse which is fed to it at $t26$. These pulses are the $p24$, $p25$ and $p26$ pulses of the information signal.

The pulses passed by the gates 5040, 5050, 5060 and 5070 are transmitted from the distributor 56 via the actuator lines 548.

In a similar manner the gates 5110, 5140 and 5175 are utilized to distribute information. The gates 5110, 5140 and 5175 are primed by the positive signal which is received via the Z control line 289. The gates 5110, 5140 and 5175 are utilized to transmit octal information only. The gate 5110 is coupled to the tap of the delay line 5015 such that a control pulse fed to the delay line 5015 is delayed for one-quarter of a pulse time before being transmitted to the gate 5110; the control pulse is delayed for one and one-quarter pulse times by the delay line 5015 before being transmitted to the gate 5140; and the control pulse is delayed for two and one-quarter pulse times by the delay line 5015 before being transmitted to the gate 5175.

Information is fed to the gates 5110, 5140 and 5175 from the positive output terminal of the reshaper 5145. When the proper control signals are present, the information is transmitted from the gates 5110, 5140 and 5175 of the distributor 56 via the tape input lines 544a–c.

Similarly, octal information fed to the data arranger 590 via the tape output lines 536 is passed to the buffers 5043, 5053, and 5063 which respectively feed the gates 5200, 5225, and 5240.

The gate 5200 receives the control pulse from the AS line 114; the gate 5225 receives the control pulse from a tap of the delay line 5015 so that the control pulse is delayed for one pulse time; the gate 5240 receives the control pulse from a tap of the delay line 5015 so that the control pulse is delayed for two pulse times. When properly primed, the gates 5200, 5225, and 5240 feed sequential pulses via the buffer 5028 to the amplifier 5120 which feeds the AL line 512.

The data arranger 590 also generates an auxiliary control signal which is transmitted from the distributor 56 via the CF line 570. More particularly, the delay line 5015 is coupled to the gate 5980 via the tap which causes the control pulse to be delayed for one and one-quarter pulse times. The gate 5980 also receives a signal from the CC line 566, and receives the pulses of the information signal which are transmitted to the gate 5980 from the positive output terminal of the reshaper 5145.

When there is a coincidence of positive signals fed to the gate 5980, a positive pulse is transmitted to the flip flop 5990. The flip flop 5990 can be set when a positive signal is transmitted to its reset terminal via the CZ line 568. The signals which appear at the positive output terminal of the flip flop 5990 are transmitted from the distributor 56 via the CF line 570.

In the above described manner, the data arranger 590 functions to receive information signals, to convert the signals to pulse form, to arrange the pulses serially so that the earlier pulses represent the lesser significant binary digits, and to transmit the signal comprising these arranged pulses from the distributor 56. Likewise, the data arranger 590 functions to distribute a signal of serial pulses to a plurality of output lines such that a different pulse of the signal appears on each line.

The AR signal generator 595 shown in Fig. 42 functions to receive certain control signals as will be shown to utilize these signals to generate a control signal AR which is transmitted from the distributor 56 via the AR line 504.

The gate 5020 controls the generation of the signal AR. The gate 5020 passes a positive signal when it receives positive signals via the CE line —556 and from the buffers 5010 and 5230.

The buffer 5010 passes a positive signal when a positive signal is received from either the CD line 546, the AV line 520, the CC line 566, or from the positive output terminal of the delay flop 5315.

The delay flop 5315 can be set for seven hundred fifty microseconds when positive signals are fed to each of its three reset terminals via the D control line 295, from the negative output terminal of the flip flop 5305, and from the contact 5645b of the delay switch 592.

The contact 5645b normally is at a negative potential which is received from the negative ten volts supply bus 610 via the movable contact 5650. The movable contact 5650 meets the contact 5645b due to the normally energized state of the polarized relay 5095 which comprises the relay coil 5655 in parallel with the capacitor 5660 (two microfarads) and the resistor 5665 (one thousand ohms) in series. A conventional relay could be used in place of the polarized relay 5095, as it is not required to be sensitive to current direction.

The polarized relay 5095 is normally energized since it couples the positive five volts supply bus 605 to the D control line 295 (normally at a minus ten volt potential). When D is generated (thereby initiating the movement of the magnetic tape in the computer) and sent to the synchronizer 58, the capacitor 5660 discharges through the resistor 5665 and after a suitable time delay (dependent on the relay element parameters) during which the magnetic tape reaches operating speed, the polarized relay 5095 is de-energized. The movable contact 5650 then moves to the contact 5645a, permitting the contact 5645b to assume a positive potential of approximately five volts as a result of its connection to the positive five volts supply bus 605 via the resistor 5113.

In this manner, the delay flop 5315 is prevented from being set until the magnetic tape associated with the computer system has reached operating speed. While the magnetic tape is being accelerated to normal operating speed, a reset terminal of the delay flop 5315 must be kept at a negative potential in order to prevent any electronic noise accompanying the acceleration of the magnetic tape from setting the delay flop 5315 via the sprocket pulse line 538.

When positive signals are present at the reset terminals of the delay flop 5315 and a sprocket pulse is fed to the distributor 56 via the sprocket pulse line 538, the sprocket pulse is amplified by the tape read amplifier 5170 and fed to the delay flop 5315 thereby causing the delay flop 5315 to be set. The negative swing of the voltage at the negative output terminal of the delay flop 5315 is fed to the differentiating circuit 5103 and causes a negative pulse to be transmitted on the coupling line —586. The positive signal which then appears at the positive output terminal of the delay flop 5315 is transmitted to the buffer 5010.

The buffer 5010 is coupled to the gate 5020 and to the reset terminal of the flip flop 5035, and the positive signal transmitted from the buffer 5010 functions to aid in priming the gate 5020 and to permit the flip flop 5035 to be set.

Two other signals are fed to the distributor 56 to enable the gate 5020 to pass a positive signal. These signals are fed via the AW1 line 124 and the AW2 line 128, respectively. The AW2 line 128 is coupled to the buffer 5230. The AW1 line 124 feeds the amplifier 5150 whose positive output terminal is coupled to the delay line 5023. A pulse which is transmitted through the delay line 5023 is delayed for one pulse time and is fed via the buffer 5230 to the gate 5020.

Initially, pulses are fed to the distributor 56 via the AW1 line 124 at t25¾ and pulses are fed via the AW2 line 128 at t10 (but the pulses are later precessed). Pulses are fed to the distributor 56 via the AW1 line 124 and AW2 line 128 at a rate of one pulse on each AW line per minor cycle.

When the gate 5020 is primed by a positive signal on the CE line —556 and by a positive signal from the buffer 5010, as previously mentioned, the gate 5020 will pass the pulses received from the AW1 line 124 and the AW2 line 128, and the earliest pulse received will set the flip flop 5025.

If, for example, the AW1 pulses are being transmitted to the distributor 56 at t25¾ and the AW2 pulses are being transmitted to the distributor 56 at t10, and the buffer 5010 passes a positive signal as a result of the delay flop 5315 being set by a sprocket pulse at any given time (for example, t27), the flip flop 5025 is set by the AW2 pulse at t10.

The next consecutive AW1 pulse which is fed to the distributor 56 is fed via the amplifier 5150 to the delay line 5023 and, besides being fed to the buffer 5230, is delayed for one-quarter of a pulse time and is transmitted to the gate 5030 which is coupled to the positive output terminal of the flip flop 5025. Thus during the next minor cycle and, more particularly, at t26 the positive signal which appears at the positive output terminal of the flip flop 5025 allows a pulse to pass through the gate 5030 and set the flip flops 5035 and 5160.

The negative output terminal of the flip flop 5035 transmits a negative potential when the flip flop 5035 is set. The negative potential is fed through the delay line 5037 (a one-half pulse time delay) to the reset terminal of the flip flop 5025 and causes the flip flop 5025 to be reset at t26½.

The positive signal which appears at the positive output terminal of the flip flop 5160 is transmitted via the delay line 5167 to the gate 5410. The delay line 5167 delays the positive signal which is transmitted by the flip flop 5160 for three-quarters of a pulse time after the positive signal is generated. The gate 5410 is partially primed by a positive signal which is fed to it via the Z control line —289. The gate 5410 also receives the delayed AW1 pulse from the delay line 5023 as it is fed to the gate 5030. Thus the gate 5410 passes the positive signal from the delay line 5167 at t26, but, because of the action of the delay line 5167, this occurs one minor cycle later than the setting of the flip flop 5160. The positive pulse is fed from the gate 5410 through the buffer 5220 to the amplifier 5340.

The positive output terminal of the amplifier 5340 is coupled to the flip flop 5080, and also to the flip flop 5017 via the gate 5012. If the gate 5012 is primed by positive signals received via the AE line 224 and the AH line 532, the positive signal transmitted from the positive output terminal of the amplifier 5340 will set both of the flip flops 5017 and 5080.

The signals which appear at the positive and negative output terminals of the flip flop 5080 are transmitted from the distributor 56 via the AR lines 504 and —504, respectively. The signals which appear at the positive and negative output terminals of the flip flop 5017 are fed via the distributor lines 585 and —585, respectively, to the data arranger 590 (see Fig. 41).

When the next AW1 pulse is transmitted to the amplifier 5150 (see Fig. 42), a negative pulse appears at its negative output terminal and is fed to the reset terminals of the flip flops 5017 and 5080. The negative pulse is fed to the reset terminal of the flip flop 5080 via the buffer 5280. The negative pulse causes the flip flop 5017 to be reset, but its positive output terminal continues to feed a positive signal via the delay line 5050 and the buffer 5280 to the reset terminal of the flip flop 5080 for one additional pulse time. Since the output terminal of the delay line 5050 is coupled to the reset terminal of the flip flop 5080 via the buffer 5280, the flip flop 5080 is not reset by the receipt of the negative pulse at the buffer 5280 from the negative output terminal of the amplifier 5150.

If, however, the flip flop 5017 was not previously set by reason of the blocking of the gate 5012, the negative pulse which is transmitted from the negative output terminal of the amplifier 5150 resets the flip flop 5080 since the signal transmitted from the positive output terminal of the flip flop 5017 is also negative.

Thus, if a positive signal is present on the AE line 224, as will be the case during bi-octal input from the typewriter the flip flops 5017 and 5080 are both set, the flip flop 5017 is reset by the first AW1 pulse following the one which set both the flip flops 5017 and 5080, but the flip flop 5080 remains set until the next following AW1 pulse. If the AE signal is absent, as will be the case during octal input from the typewriter, only the flip flop 5080 is set, and it is reset by the first AW1 pulse following the one which sets it.

The flip flop 5160 is reset by the AW1 pulse next following the one which sets it. A negative AW1 pulse is fed to the reset terminal of the flip flop 5160 from the negative output terminal of the amplifier 5150 via the buffer 5215. Before the flip flop 5160 is set, its negative output is at a positive potential, and acting through the delay line 5165 counteracts the effect of the negative pulse at the buffer 5215, the delay line 5165 maintaining the positive potential for at least the duration of the pulse. On the following minor cycle, however, the negative output of the flip flop 5160 is negative and hence does not interfere with the next negative pulse at the buffer 5215, therefore permitting the pulse to reset the flip flop 5160.

The priming of the gate 5400 when positive signals are received via the Z control line 289 and from the positive output terminal of the flip flop 5025 enables the AW1 pulse to be transmitted directly from the delay line 5023 (after being delayed for one-quarter of a pulse time) through the gate 5400. The pulse is forwarded from the gate 5400 via the buffer 5220 to the amplifier 5340 and is amplified and transmitted to the flip flop 5080 which is thereby set. Therefore, when the Z signal is received, the AR generator 595 requires less time in which to generate the signal AR, since the one minor cycle delay involved in the action of the flip flop 5160 and the gate 5410 is effectively bypassed.

In this manner the AR signal generator 595 functions to generate control signals which have been illustrated and to transmit these signals from the AR signal generator 595 via the distributor lines 585 and —585 and the AR lines 504 and —504.

The AR signal generator 595 also functions to generate another control signal. When the delay flop 5315 is set, the positive swing is differentiated in the differentiating circuit 5675 and the resulting positive pulse is fed through the amplifier 5340 to the flip flop 5293 and the gate 5540. When a positive signal is fed to the reset terminal of the flip flop 5293 via the D control line 295, the flip flop 5293 is set by the positive pulse received from the amplifier 5340 and a negative signal appears at the negative output terminal of the flip flop 5293. The negative output terminal of the flip flop 5293, however, is coupled to the gate 5540 by the delay line 5285 and, hence, a positive potential is retained at the input terminal of the gate 5540 for three-quarters of a pulse time after the flip flop 5293 is set.

The gate 5540 passes the pulse received from the amplifier 5340 and transmits the pulse to the amplifier 5270. The coupling line —582 conducts the signal generated at the negative output terminal of the amplifier 5340 from the AR signal generator 595.

The delay switch 592 also generates the signal AU which is transmitted from the synchronizer 58 to the timing selector 30. AU functions to block the operation of the timing selector 30 during the period in which the magnetic tape is decelerating in a tape procedure so that if the next successive procedure is also a tape operation, the magnetic tape is stopped before the second tape operation is begun.

More particularly, a signal is fed on the D control line —295 through the differentiating circuit 5545 to the flip flop 5305 which generates AU. When D is generated (thereby initiating the movement of the magnetic tape) and the signal on the D control line —295 swings from positive to negative, a negative pulse is fed by the differentiating circuit 5545 to the flip flop 5305 which remains in its normal reset state. Thus, a negative potential remains at the positive output terminal of the flip flop 5305 and is transmitted from the delay switch 592 via the AU line 542.

The positive output terminal of the flip flop 5305 is also coupled to the contact 5550b via the polarized relay 5105 which comprises the relay coil 5630 in parallel with the capacitor 5635 and the resistor 5640 which are in series. The contact 5550b is also coupled to the positive five volts supply bus 605. The relay 5105 may be a standard relay rather than a polarized relay, since it is not required to be sensitive to current direction.

Since the potential at the positive output terminal of the flip flop 5305 is normally negative, a potential difference exists between the contact 5550b and the positive output terminal of the flip flop 5305. This potential difference causes the polarized relay 5105 to be normally energized as shown in Fig. 42. Thus, a positive potential is fed from the contact 5550b via the movable contact 5555 to the reset terminal of the flip flop 5305 which is thereby enabled to be set.

When D terminates and the magnetic tape starts to decelerate, the positive swing of the potential on the D control line —295 causes the differentiating circuit 5545 to send a setting pulse to the flip flop 5305. As a result, the potential at the positive output terminal of the flip flop 5305 becomes equal to the potential at the contact 5550b and AU is transmitted from the synchronizer 58 via the AU line 542.

In the polarized relay 5105, the potential change is delayed as the capacitor 5635 has to discharge through the resistor 5640. In the computer system, the capacitor 5635 may have a capacitance of two microfarads and the resistor 5640 may have a resistance of one thousand ohms.

The rate of discharge of the capacitor 5635 causes the polarized relay to become de-energized after sufficient time has elapsed to allow the magnetic tape to come to rest. The movable contact 5555 then moves to the contact 5550a which is coupled to the negative ten volts supply bus 610 and causes the flip flop 5305 to be reset.

In this manner, the delay switch 592 prevents the next procedure from beginning before the magnetic tape has completely stopped moving.

LXI. BINARY COUNTER 54

The binary counter 54 shown in Fig. 43 is a seven-stage binary counter which comprises the stages 5600a to 5600g, and includes the register type-out switch 506. The binary counter 54 primarily functions to generate a plurality of control signals which are used to control the type-out operations.

The register type-out switch 506 is a four-gang selector switch which receives certain of the information and control signals that are transmitted to the binary counter 54 and selectively passes these signals either to the seven-stage binary counter or from the binary counter 54. The register type-out switch 506 is the means of selecting a sub-unit whose contents are to be typed out in a register type-out procedure.

The binary counter 54 is operative when a positive signal is received by the stage 5600a from the buffer 5360 and also via the BZ line —572. The signal received via the BZ line —572 is negative while the carriage return key of the typewriter is actuated and then prevents the binary counter 54 from counting. The buffer 5360 passes a positive signal when a positive signal is received from the positive output terminal of either of the flip flops 5100 or 5115.

The flip flop 5115 is set by a positive signal received from the register type-out switch 506. The flip flop 5100 is set by either a positive signal transmitted from the register type-out switch 506 or from the gate 5290.

The gate 5290 passes a positive signal when positive signals are fed to it via the K3 line 248, the E control line 293 and the D control line —295. At a coincidence of positive signals, the gate 5290 passes a positive signal to the flip flop 5100 which causes the flip flop 5100 to be set.

When the binary counter 54 is thus made operative, the cyclical signal OT0, which is fed to the stage 5600a, initiates the counting process.

The stage 5600a, which is the first stage of the binary counter 54, is coupled to the stage 5600b via the delay line 5827 and via the stage coupling line 5525a. The stage 5600b is coupled to the stage 5600c via the delay line 5837 and the stage coupling line 5225b. The stage 5600c is coupled to the stage 5600d via the delay line 5846 and the stage coupling line 5525c. The stage 5600d is coupled to the stage 5600e via the delay line 5858 and the stage coupling line 5525d. The stage 5600e is coupled to the stage 5600f via the delay line 5867 and the stage coupling line 5525e. The stage 5600f is coupled to the stage 5600g via the delay line 5877 and the stage coupling line 5525f. Each of these delay lines has a delay of three-quarters of a pulse time.

The stages 5600a to 5600g generate signals which represent a seven digit binary number wherein the stage 5600a produces the signal which represents the least significant binary digit and each successive stage produces the next most significant digit so that the stage 5600g generates a signal which represents the most significant binary digit.

For example, should the stage 5600a produce a positive signal and the remaining stages 5600b to 5600g produce negative signals, the binary counter 54 represents 0000001, the binary equivalent of the number one. Should the stage 5600d produce a positive signal and the remaining stages 5600 produce negative signals, the binary counter 54 would produce signals which represent 0001000, the binary equivalent of the number eight. The positive signals produced by the stages 5600 of the binary counter 54 would be capable of producing the binary equivalents of numbers up to and including the highest number which may be represented by a seven digit binary number, although in fact they are never called upon to produce a binary number larger than 1010111.

The cyclical signal OT0 which is fed into the stage 5600a is the signal which is counted and as each OT0 is received by the binary counter 54 the next successive binary number is represented.

The cyclical pulse OT0 is forwarded via the stage coupling lines 5525 from the first stage 5600 of the binary counter 54 through each successive stage 5600 until blocked at the input terminal of a particular stage 5600. A stage 5600 may be blocked as the result of a negative signal fed via the associated delay line from the prior stage 5600. More particularly, if the stage 5600a is producing a positive signal (hereinafter designated "set"), the OT0 cyclical pulse enters the stage 5600a of the binary counter 54 and causes the stage 5600a and each successive set stage 5600 of the binary counter 54 to be reset until the first stage 5600 is encountered which is reset. The cyclical pulse OT0 causes this reset stage 5600 to be set and OT0 is blocked at the input terminal of the next successive stage 5600.

In this manner the binary counter 54 functions to produce signals which represent a seven digit binary number which is increased numerically by one each time OT0 is transmitted to the operative binary counter 54.

The logical details of a typical stage (the stage 5600d) are illustrated in Fig. 43.

When the flip flop 5850 is reset, a negative signal appears at its positive output terminal. A positive signal appears at its negative output terminal and is fed via the delay line 5855 to the gate 5783 (which is coupled to the input terminal of the flip flop 5850) and to the buffer 5853 (which is coupled to the reset terminal of the flip flop 5850).

When the gate 5910 of the stage 5600d is primed by a positive signal which is transmitted from the stage 5600c via the delay line 5846, the next OT0 pulse which is transmitted from the stage 5600c via the stage coupling line 5525c passes through the gate 5910 to the amplifier 5780. The amplifier 5780 transmits the OT0 pulse to the gate 5783. The gate 5783 is primed by the positive signal which is transmitted from the negative output terminal of the flip flop 5850 via the delay line 5855. The positive signal is maintained for three-quarters of a pulse time after the flip flop is set to insure that the gate 5783 is not blocked until the flip flop 5850 is set. The OT0 pulse is also transmitted as a negative pulse from the negative output of the amplifier 5780 to the buffer 5853, but does not affect the potential of the output of this buffer, since the other input of the buffer 5853 is being held positive by the signal from the delay line 5855. This signal remains positive for three quarters of a pulse time after the flip flop 5850 is set, by which time the negative pulse has ended and the negative output of the amplifier 5780 is again positive. Hence during the sequence of events just described the output of the buffer 5853 remains positive at all times, and no negative signal appears at the reset terminal of the flip flop 5850 to interfere with its setting.

The OT0 pulse is also transmitted from the positive output terminal of the amplifier 5780 via the stage coupling line 5525d to the input terminal of the stage 5600e and bypasses the major portion of the stage 5600d. Until the flip flop 5850 is set, however, a negative signal is transmitted from its positive output terminal via the delay line 5858 to the stage 5600e, and therefore the pulse transmitted to stage 5600e from the amplifier 5780 has no effect on stage 5600e.

When the stage 5600d is generating a positive signal at the positive output terminal of the flip flop 5850, the next OT0 pulse received by the stage 5600d causes a negative potential to appear at the negative output terminal of the amplifier 5780. This negative potential is transmitted to the buffer 5853. Since the flip flop 5850 is set, a negative potential appears at its negative output terminal and is transmitted via the delay line 5855 to the buffer 5853. As both signals being fed to the buffer 5853 are negative, the buffer 5853 transmits a negative potential to the reset terminal of the flip flop 5850 which is thus reset. The negative signal from the delay line 5855 blocks the gate 5783, thus preventing the positive pulse from the amplifier 5780 from reading the flip flop 5850 and and interfering with its resetting. Again the delay line 5855 causes the signals fed by it to the gate 5783 and the buffer 5853 to remain until after the pulse from the amplifier 5780 has ended. The flip flop 5850 may also be reset by a signal received from the amplifier 5363 as will be hereinafter indicated.

A OT0 pulse received by the stage 5600d, when that stage is set, in addition to resetting the stage 5600d as just described, will also set the stage 5600e. This occurs because, when the stage 5600d is set, its positive output terminal transmits a positive signal via the delay line 5858 to the stage 5600e, thus permitting the pulse received from the amplifier 5780 to set the stage 5600e.

Each of the remaining stages of the binary counter 54 functions in a similar manner and comprises the same elements with the same connections excepting for the number of reset terminals for the associated flip flop.

More particularly, in each of the blocks which represent the stages 5600 of the binary counter, the two input lines which are coupled to the input terminals of the stage 5600 are coupled to a gate which is equivalent to the gate 5910 of the stage 5600d. The two lines which are connected to the output terminals of a stage 5600 are coupled respectively to an amplifier and flip flop which correspond to the amplifier 5780 and the flip flop 5850 of the stage 5600d. Lines connected to the reset terminals of a stage 5600 are connected to reset terminals which correspond to the reset terminals of the flip flop 5850. There may be fewer lines connected to the reset terminals of the stage 5600 corresponding to fewer reset terminals on the flip flop 5850. Where a negative output line exists, it will be so stated and the line is connected to the negative output terminal of a flip flop which is equivalent to the flip flop 5850 of the stage 5600d.

As previously mentioned, the binary counter 54 utilizes various combinations of the signals which are generated by the stages 5600 to generate certain control signals as will next be illustrated.

When the gate 5270 is primed by a positive signal, which is transmitted to the binary counter 54 via the Q control line 238, and when positive signals are transmitted to the gate 5270 from the positive output terminal of the stage 5600b and the negative output terminal of the stage 5600c, the gate 5270 passes a positive signal to the D.-C. amplifier 5353. The D.-C. amplifier 5353 transmits the positive signal from the binary counter 54 via the CC line 566.

The buffer 5350 can only pass a negative signal at $t17\frac{3}{4}$ as a result of receiving the cyclical signal $-T17\frac{3}{4}$. The buffer 5350 will pass a positive signal even at $t17\frac{3}{4}$ unless negative signals are received from the positive output terminals of both of the stages 5600b and 5600c. The buffer 5350 transmits signals from the binary counter 54 via the CB line 554.

The gate 5480 passes a positive signal when positive signals are fed to it from the positive output terminals of the stages 5600b and 5600c. At a coincidence of these positive signals, the gate 5480 transmits a positive signal from the binary counter 54 via the AX line 552.

The gate 5510 passes a positive signal when positive signals are transmitted to it from the positive output terminal of the stage 5600b, and from the negative output terminals of the stages 5600c, 5600d and 5600e, and from the register type-out switch 506. At a coincidence of these positive signals, the gate 5510 transmits a positive signal from the binary counter 54 via the A0 line 524.

The gate 5490 passes a positive signal when positive signals are fed to it from the positive output terminals of the stages 5600d and 5600e, and from the flip flop 5115. At a coincidence of these positive signals, the gate 5490 transmits a positive signal from the binary counter 54 via the CA line 526.

The gate 5460 passes a positive signal when positive signals are fed to it from the output terminals of the stages 5600e and 5600g and via the Q control line $-238$. Signals which are passed by the gate 5460 are transmitted from the binary counter 54 via the BE line 564.

When a positive signal is transmitted from the negative output terminal of the stage 5600b via the delay line 5836 to the gate 5500, and when a positive signal is transmitted from the positive output terminal of the stage 5600c, the gate 5500 transmits a positive signal to the D.-C. amplifier 5370. The delay line 5836 delays the positive signal which is transmitted through it to the gate 5500 for one pulse time after the positive signal appears at the negative output terminal of the stage 5600b. The D.-C. amplifier 5370 transmits the signal from the binary counter 54 via the CD line 546.

The amplifier 5303 transmits the signal appearing at its positive output terminal from the binary counter 54 via the CE line 556, and the signal appearing at its negative output terminal from the binary counter 54 via the CE line $-556$. The amplifier 5303 is fed by the buffer 5300 which is fed in the alternative by signals which appear on the CA line 526 and by signals forwarded from the gates 5470 and 5922.

The gate 5470 passes a positive signal when positive signals are fed to it from the positive output terminals of the stages 5600e and 5600g. The gate 5922 passes a positive signal when positive signals are fed to it from the output terminals of the stages 5600d and 5600f and when a positive signal is fed to the gate 5922 from the buffer 5923. The buffer 5923 passes a positive signal when positive signals are fed to it via either the Q control line 238 or the CF line 570.

When the buffer 5300 passes a positive signal which is received in any of the above-described manners, a positive signal appears at the positive output terminal of the amplifier 5303 and a negative signal appears at the negative output terminal of the amplifier 5303. These signals are transmitted via the CE lines 556 and $-556$, respectively.

The negative output terminal of the amplifier 5303 is also coupled via the delay line 5307 to the buffer 5313 which feeds the D.-C. amplifier 5363. The delay line 5307 maintains the signal which appears at the negative output terminal of the amplifier 5303 one pulse time after the signal has been terminated. The buffer 5313 is also fed by the signal which appears at the negative output terminal of the amplifier 5780 of the stage 5600d. This signal is received via the delay line 5788 which is a one-half pulse time delay line.

When the buffer 5313 receives a negative signal via the delay line 5307, it can transmit a negative pulse received via the delay line 5788. This negative signal is transmitted through the amplifier 5363 and is sent from the binary counter 54 via the CZ line 568. This negative signal is also transmitted to the reset terminals of the stages 5600d-g and causes them to be reset. The flip flop 5100 or 5115, whichever may be set at this time, is also reset when the negative signal is transmitted to it from the amplifier 5363 via the CZ line 568. The positive signal being transmitted from the positive output terminal of the flip flop 5100 or 5115 via the buffer 5360 to the stage 5600a is thus terminated.

The flip flop 5115 is set by a positive signal which is received from the register type-out switch 506. The signal which appears at the positive output terminal of the flip flop 5115 is transmitted to the contact 5650d of the register type-out switch 506, and also via the buffer 5360 to the stage 5600a as an alternative means of making the seven-stage counter operative. The flip flop 5115 is reset when a negative signal is transmitted to its reset terminal from the positive output terminal of the amplifier 5363.

The register type-out switch 506, as previously indicated, functions to receive information and control signals and to pass these signals in a manner as directed by the position of the movable contacts 5640a to 5640d.

The negative output terminal of the flip flop 5100 is coupled to the contacts 5660a, 5670a and 5680a. When the movable contact 5640a is coupled to any of these contacts, the signal appearing at the negative output terminal of the flip flop 5100 is fed through the register type-out switch 506 and from the binary counter 54 via the AZ line $-560$.

The negative output terminal of the flip flop 5115 is coupled to the contact 5650a of the register type-out switch 506. When the movable contact 5640a is coupled to the contact 5650a, the signal which appears at the negative output terminal of the flip flop 5115 is transmitted from the binary counter 54 via the AZ line $-560$.

A control signal is fed to the register type-out switch 506 via the AY line 272 and is fed via the movable contact 5640b to one of the contacts 5660b, 5670b or 5680b which are coupled to the input terminal of the flip flop 5100, or the signal is transmitted from the movable contact 5640b through the contact 5650b to the input terminal of the flip flop 5115.

Information signals are fed to the contacts 5650c, 5660c, 5670c and 5680c, respectively, from the AQ line 266, the L(T) line 152, the A(T) line 150, and the CR(T) line 252. The movable contact 5640c may be positioned to couple any of the above recited lines to the CY line 562 which conducts the received information signal from the binary counter 54.

The contacts 5660d, 5670d and 5680d are coupled to the positive output terminal of the flip flop 5100. The contact 5650d is coupled to the positive output terminal of the flip flop 5115. Signals are fed from the contacts 5650d, 5660d, 5670d and 5680d via the movable contact 5640d to the AZ line 560 which conducts signals from the binary counter 54 and also to the gate 5510.

In the above described manner the register type-out switch 506 functions to receive information and control signals and to distribute them to the remainder of the binary counter 54 and also to transmit certain of these signals from the binary counter 54.

LXII. TAPE UNIT 50

The tape unit 50 functions either to receive information signals and to record them on the magnetic tape of the tape and drive unit 514, or to read information signals from the magnetic tape of the tape and drive unit 514 and to transmit the information signals to another part of the computer system.

The tape and drive unit 514 comprises a magnetic tape, magnetic reading and recording heads, and a reversible tape-driving mechanism which is controlled by relays. This apparatus is not shown since it is well known to those skilled in the art.

The information pulses which are transmitted to the tape unit 50 are received via the tape input lines 544a to 544c. The three pulses each represent one of the three binary digits which represent the octal number which is to be recorded in binary form upon the magnetic tape.

The three pulses which are read at a given time from the magnetic tape of the tape and drive unit 514 also represent the three digits of an octal number. These three pulses are converted to signals in the tape unit 50 and are transmitted from the tape unit 50 via the tape output lines 536a–c.

Information is read out of or read into the tape and drive unit 514 in accordance with the positions of the movable contacts 5465a–c which are positioned by the relay coils 5475a–c which are coupled in series to the D.-C. amplifier 5205.

When a positive signal is transmitted to the tape unit 50 via the Z control line 289, the signal is amplified by the D.-C. amplifier 5205 and transmitted to the relay coils 5475. As a result, the movable contacts 5465 couple the contacts 5430 to the tape and drive unit 514 so that information may be recorded upon the magnetic tape.

In their normal positions, the movable contacts 5465 couple the contacts 5420 to the tape and drive unit 514 so that information will be transmitted from the tape and drive unit 514.

When a positive signal is transmitted via the D control line 295 to the tape and drive unit 514, the magnetic tape is caused to move past the magnetic reading and recording heads in a "forward" direction. The positive signal received via the D control line 295 terminates after 640 octal digits have been recorded upon or read from the magnetic tape.

When a positive signal is transmitted to the tape and drive unit 514 via the R control line 287, the magnetic tape is caused to move in a direction opposite to that resulting from the positive signal on the D control line 295. The positive signal on the R control line 287 will terminate after 640 octal digits have been read from the magnetic tape. The octal digits which are read from the magnetic tape during the presence of a positive signal on the R control line 287 are blocked in another part of the computer system and are not used.

When information is to be recorded on the magnetic tape the information pulse representing the least significant binary digit of the binary expression of an octal digit is transmitted via the tape input line 544a to the tape-writing amplifier 5185a and is amplified and transmitted through the contact 5430a via the movable contact 5465a to the tape and drive unit 514.

The second least significant digit is transmitted via the tape-writing amplifier 5185b to the tape and drive unit 514, and the most significant binary digit is transmitted via the tape-writing amplifier 5185c.

When information is to be read from the tape and drive unit 514 and the movable contacts 5465 couple the contacts 5420 to the tape and drive unit 514, the least significant binary digit representation is transmitted via the tape reading amplifier 5180a to the flip flop 5287a. The second least significant digit is transmitted via the tape reading amplifier 5180b to the flip flop 5287b, and the most significant digit is transmitted via the tape reading amplifier 5180c to the flip flop 5287c The flip flops 5287 can be set when positive signals are present at their reset terminals via the coupling lines —582 and —586, the Z control line —289, and the E control line 293.

The flips flops 5287 will or will not be set in accordance with the signals which are forwarded to them via the associated tape reading amplifier 5180. The signals which appear at the positive output terminals of the flip flops 5287 are transmitted from the tape unit 50 via the tape output lines 536.

When the magnetic tape is in motion in the tape and drive unit 514, sprocket pulses, which are recorded on the magnetic tape in positions corresponding to sections of the magnetic tape which have acceptable magnetic properties, control the transfer of information pulses between the magnetic tape and the remainder of the computer system. These sprocket pulses are transmitted from the tape unit 50 via the sprocket pulse line 538.

The magnetic tape and the means for generating sprocket pulses are described and claimed in the copending application of Samuel Lubkin, Serial No. 369,923, titled Magnetic Recording System and filed July 23, 1953, now Patent No. 2,817,829, granted December 24, 1957, to the assignee of the present application.

In this manner the tape unit 50 functions to receive information pulses and to record them in the tape and drive unit 514, and to read pulses from the tape and drive unit 514 and transmit equivalent signals to other parts of the computer system, as well as to provide sprocket pulses during tape operations.

LXIII. CONCLUSION

A compact fully-automatic general-purpose digital computer has been described. The computer will operate at comparatively high speeds with great precision. The computer can be constructed at a cost well within the reach of a large number of industrial users. When properly programmed, the computer can perform data processing operations which may or may not include arithmetic operations.

While the novel features of the invention as applied to a preferred embodiment have been shown and described, it will be understood that various omissions and substitutions in the form and details of the device illustrated and changes in its operation may be made by those skilled in the art without departing from the spirit of the invention.

What is claimed is:

1. In a computer system wherein an undesired word of information may be superseded by a desired word of information, a memory unit for storing words of information and having a plurality of storage locations, each storage location being identified by an address, an address storage means for storing the address of the storage location in which the next entered word of information is to be stored in said memory unit, an input means to receive a word of information and controlled by said address storage means to store said word in said storage location identified by said address storage means, said input means altering the address in said address storage means to that of the subsequent address as said word of information is recorded in said memory unit, and a control unit operable to cause operation of said input means, said control unit including a device for transmitting a control signal to said address storage means when an undesired word of information is transferred to said memeory unit, said address storage means being prevented by said control signal from responding to operation of said input means and changing the address stored therein as the undesired word of information is stored whereby the next word of information is transferred to the same address in the memory unit and replaces the previously recorded undesired word of information.

2. In a computer system wherein an entry of an undesired word of information may be corrected by replacing said undesired word with the desired word of information, an input unit for encoding words of information, a memory unit having a plurality of storage areas, each area being identified by an address and capable of storing a word of information, an address storage means for storing the address of the storage location to receive the succeeding word, a first control means operable to cause a word of information to be transmitted from said input unit to the storage location of said memory unit which is identified by the address stored in said address storage means, said address storage means being controlled by said input unit to change the existing address for the word of information being stored to the address for the succeeding word of information, and a second control unit operable to simultaneously transmit control signals to said address storage means and said first control means, respectively, when an undesired word is transmitted to a storage location of said memory unit, said first control means being responsive to said control signal for automatically causing said undesired word of information to be transmitted to said memory unit, said address storage means being responsive to said control signal to retain unchanged the address of the storage location where the undesired word of information is stored in said memory unit whereby the next word of information will be transmitted to the same address in the memory unit to replace the previously recorded undesired word of information.

3. In a computer system, apparatus for controlling the typing out of a plurality of digits, the operation requiring a certain number of steps for each digit to by typed, comprising a cyclical pulse source for generating cyclical pulses, a multi-stage counter coupled to said cyclical pulse source, first, second and third serially connected sections of said multi-stage counter being composed of certain of the stages, said stages being selectively activated for counting the cyclical pulses, each count being characterized by a given combination of activated and non-activated stages, said first section dividing the frequency of the cyclical pulses, said second section having a number of sequential combinations of activated and non-activated stages corresponding to the required number of steps, said third section being responsive to the completion of a sequence in said second section for counting the number of completed sequences, the number of completed sequences corresponding to the number of digits typed out, a first plurality of gates coupled to said second section and responding selectively to certain combinations of activated and non-activated stages in said second section for passing signals, a second plurality of gates coupled to said third section and responding selectively to certain combinations of activated and non-activated stages in said third section for passing signals, and a utilization unit responsive to said first plurality of gates for typing out digits and to said second plurality of gates for terminating the type-out operation.

4. In a data processing system having a storage device containing information arranged in groups of digits, each group being designated by a specific address, a digital typing device, a control device to detect said digits seriatim and to operate said typing device in accordance with the value of the digit detected, and an address generator to select a group of digits for detection by said control device, the combination of a function control device settable to initiate operation of said control device, a cyclically operating step counter settable under control of said function control device to activate said control device and normally cyclically reset to reset said control device and thereby terminate typing of said digits at the end of the typing of a group of digits, a bi-stable device cyclically reset and settable to hold said step counter in set condition, and gating means receiving signals representative of the address in said address generator and effective to set said bi-stable device for all but one address whereby typing will be terminated after typing of the group of digits designated by said one address.

5. In a data processing system having a storage device containing information arranged in groups of digits, each group being designated by a specific address, a register to temporarily retain a group of digits, a digital typing device, a typing control device settable to detect a digit of the group of digits in said register and to operate said typing device to print the digit detected, a group transfer means to transfer a group of digits from said storage device to said register, and an address generator designating the group of digits to be transferred and settable as any group of digits is transferred to designate the next group to be transferred, the combination of a function control device settable to initiate a type-out operation, a step counter activated thereby to first energize said group transfer means to transfer a first group of digits from said storage device to said register and thereafter set said typing control device, means normally effective as the last digit of a group is typed to reset said step counter and thereby terminate a type-out operation, a bi-stable device cyclically resettable to an ineffective condition and settable to prevent resetting of said step counter by said normally effective means, a gating means receiving signals representing the address in said address generator and rendered effective by said function control device to pass said signals to set said bi-stable device, said gating means being so arranged as to prevent passage therethrough of a predetermined one of said address designating signals whereby the type-out operation will be terminated after the last digit of a group is typed and a predetermined address is designated by said address generator.

References Cited in the file of this patent
UNITED STATES PATENTS

| | | |
|---|---|---|
| 2,512,860 | Henrich | June 27, 1950 |
| 2,570,716 | Rochester | Oct. 9, 1951 |
| 2,587,532 | Schmidt | Feb. 26, 1952 |
| 2,604,262 | Phelps | July 22, 1952 |
| 2,609,143 | Stibitz | Sept. 2, 1952 |
| 2,611,813 | Sharpless et al. | Sept. 23, 1952 |
| 2,625,607 | Eckert et al. | Jan. 13, 1953 |
| 2,652,554 | Williams et al. | Sept. 15, 1953 |
| 2,674,727 | Spielberg | Apr. 6, 1954 |
| 2,679,638 | Bensky et al. | May 25, 1954 |
| 2,689,950 | Bayliss et al. | Sept. 21, 1954 |

(Other references on following page)

UNITED STATES PATENTS

| | | |
|---|---|---|
| 2,701,095 | Stibitz | Feb. 1, 1955 |
| 2,707,591 | May | May 3, 1955 |
| 2,721,990 | McNaney | Oct. 25, 1955 |
| 2,737,342 | Nelson | Mar. 6, 1956 |
| 2,739,299 | Burkhart | Mar. 20, 1956 |
| 2,750,532 | Samuel | June 12, 1956 |
| 2,755,994 | Williams et al. | July 24, 1956 |
| 2,767,908 | Thomas | Oct. 23, 1956 |
| 2,796,218 | Tootill et al. | June 18, 1957 |

OTHER REFERENCES

24 Digit Parallel Computer, With Magnetic Drum Memory, Engineering Research Associates, February 15, 1949 (cited in High Speed Computing Devices, Engineering Research Associates, McGraw-Hill Book Co., Inc., page 219, item 10, copyrighted July 28, 1950); pages 18–21, 24–30, 42–44, 59–60; Figures 3.3–1, 3.3–5 to 3.3–11 inclusive, 3.5–1 to 3.6–3 inclusive, 3.6–4 only (18 drawing sheets).

A Functional Description of the EDVAC, University of Pa., Philadephia, Pa., Nov. 1, 1949; volumes I and II, pages 2–3 to 2–11, 6–7 to 6–10, 3–18 to 3–23; Figures 104–2LD–7, 104–2LC–9, 104–6LD–7, 104–2LD–12, 104–4LC–3, 104–6LC–1.

Barnes et al.: An Electronic Digital Computer Using Cold Cathode Counting Tubes for Storage, September 1951, Electronic Engineering, pages 341–343 only.

The Univac System, Review of Electronic Digital Computers, Joint AIEE–IRE Computer Conference, February 1952, pages 9–11 only.

Description of a Magnetic Drum Calculator, The Staff of the Harvard University Computation Laboratory (Cambridge, Mass.). Copyrighted August 22, 1952; pages 156–212 only.

A Short Description of the EDSAC Type Calculator Circuits used in Leo, J. M. Pinkerton, J. Lyons and Co. Ltd., July 25, 1951, received in U.S. Patent Office Mail Division, Aug. 7, 1951; pages 7–9, 29; dwgs. LC55 and LC56 only.